United States Patent
Nishikawa et al.

(10) Patent No.: US 6,636,513 B1
(45) Date of Patent: *Oct. 21, 2003

(54) SWITCHING SYSTEM

(75) Inventors: Yasuhiro Nishikawa, Yokohama (JP); Jun Itoh, Yokohama (JP); Hideo Kuriyama, Yokohama (JP)

(73) Assignee: Fujitsu Limited, Kawasaki (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/836,295
(22) PCT Filed: Sep. 5, 1996
(86) PCT No.: PCT/JP96/02508
  § 371 (c)(1),
  (2), (4) Date: May 5, 1997
(51) Int. Cl.$^7$ .......................... H04L 12/28; H04L 12/56
(52) U.S. Cl. ............................ 370/395.1; 370/398
(58) Field of Search ................... 370/395, 398, 370/410, 399, 426, 360, 381, 382, 383, 385, 395.2, 395.1, 422; 379/202, 229, 230

(56) References Cited

U.S. PATENT DOCUMENTS

| | | | |
|---|---|---|---|
| 4,979,164 A | * 12/1990 | Ardon | 379/269 |
| 5,202,885 A | 4/1993 | Schrodi et al. | |
| 5,390,170 A | 2/1995 | Sawant et al. | |
| 5,392,402 A | * 2/1995 | Robrock, II | 395/200 |
| 5,396,485 A | 3/1995 | Ohno et al. | |
| 5,434,852 A | 7/1995 | La Porta et al. | |
| 5,487,063 A | 1/1996 | Kakuma et al. | |
| 5,600,643 A | * 2/1997 | Robrock, II | 370/399 |
| 5,680,390 A | * 10/1997 | Robrock, II | 370/229 |

FOREIGN PATENT DOCUMENTS

EP  0 631 456 A2  12/1994

(List continued on next page.)

OTHER PUBLICATIONS

Lecture Transactions from 1994 IEICE Autumn Convention B–526, Sep. 5, 1994, Masami Iio, NIT Switching System Laboratory: "Discussion on Service Parallel Condition when a Plurality of BCSMs are Present under Advanced In Service".

(List continued on next page.)

Primary Examiner—Ajit Patel
(74) Attorney, Agent, or Firm—Katten Muchin Zavis Rosenman

(57) ABSTRACT

For example, a communication service controlling exchange apparatus (1) which can control a condition of a communication service to be provided includes call control memories (131-1 to 131-M) individually provided for paths between user terminals. User terminal registration information of those user terminals which can enjoy a communication service of a desired form is registered in the call control memories (131-1 to 131-M), and a communication service providing section (121) for linking the call control memories (131-1 to 131-M) with each other so that a communication service of the desired form can be provided is formed. A link changing control section (122) for changing the mutually linked condition of the pertinent ones of the call control memories (131-1 to 131-M) is provided in order to allow form changing to a communication service of a different form. Consequently, communication services of a plurality of kinds of forms can be provided by the single exchange apparatus (1).

59 Claims, 105 Drawing Sheets

FOREIGN PATENT DOCUMENTS

| | | |
|---|---|---|
| JP | 58-151159 | 9/1983 |
| JP | 06-169318 | 6/1994 |
| JP | 6-268747 | 9/1994 |
| JP | 06-268747 | 9/1994 |
| JP | 07-7570 | 1/1995 |
| JP | 07-038571 | 2/1995 |
| JP | 07-050672 | 2/1995 |
| JP | 07-087101 | 3/1995 |
| JP | 07-095214 | 4/1995 |
| JP | 7-143226 | 6/1995 |
| JP | 07-143226 | 6/1995 |
| JP | 07-202906 | 8/1995 |
| JP | 07-264284 | 10/1995 |

OTHER PUBLICATIONS

Lecture Transactions from 1995 IEICE Communication Society Convention SB–5–1, Aug. 15, 1995, Takashi Takekasa, Chosei Ogino, Yasuji Nakao, Kyo Wakahara, KDD Laboratory: "Call Control In Switching State Model for IN on B–ISDN".

Lecture Transactions from 1996 IEICE General Convention B–689, Mar. 11, 1996, Takuji Kishida, Yoshiji Kondo, NTT Network Service System Laboratory: "On Wide–Band Service with Effective Control by a Plurality of Service Logics".

* cited by examiner

FIG. 11

| FORM TYPE | PVC SERVICE | | SVC SERVICE | |
|---|---|---|---|---|
| | P-P | P-MP | P-P | P-MP |
| BROADCAST TYPE | — | ◯ | — | ◯ |
| COMPOSITE TYPE | — | ◯ | — | ◯ |
| MERGE TYPE | — | ◯ | — | ◯ |
| MULTIPOINT TYPE | — | ◯ | — | ◯ |

↕ TYPE CHANGING

→ FORM CHANGING

◯ : PATTERN PRESENT
P-P : POINT TO POINT
P-MP : POINT TO MULTIPOINT

TO FIG. 14

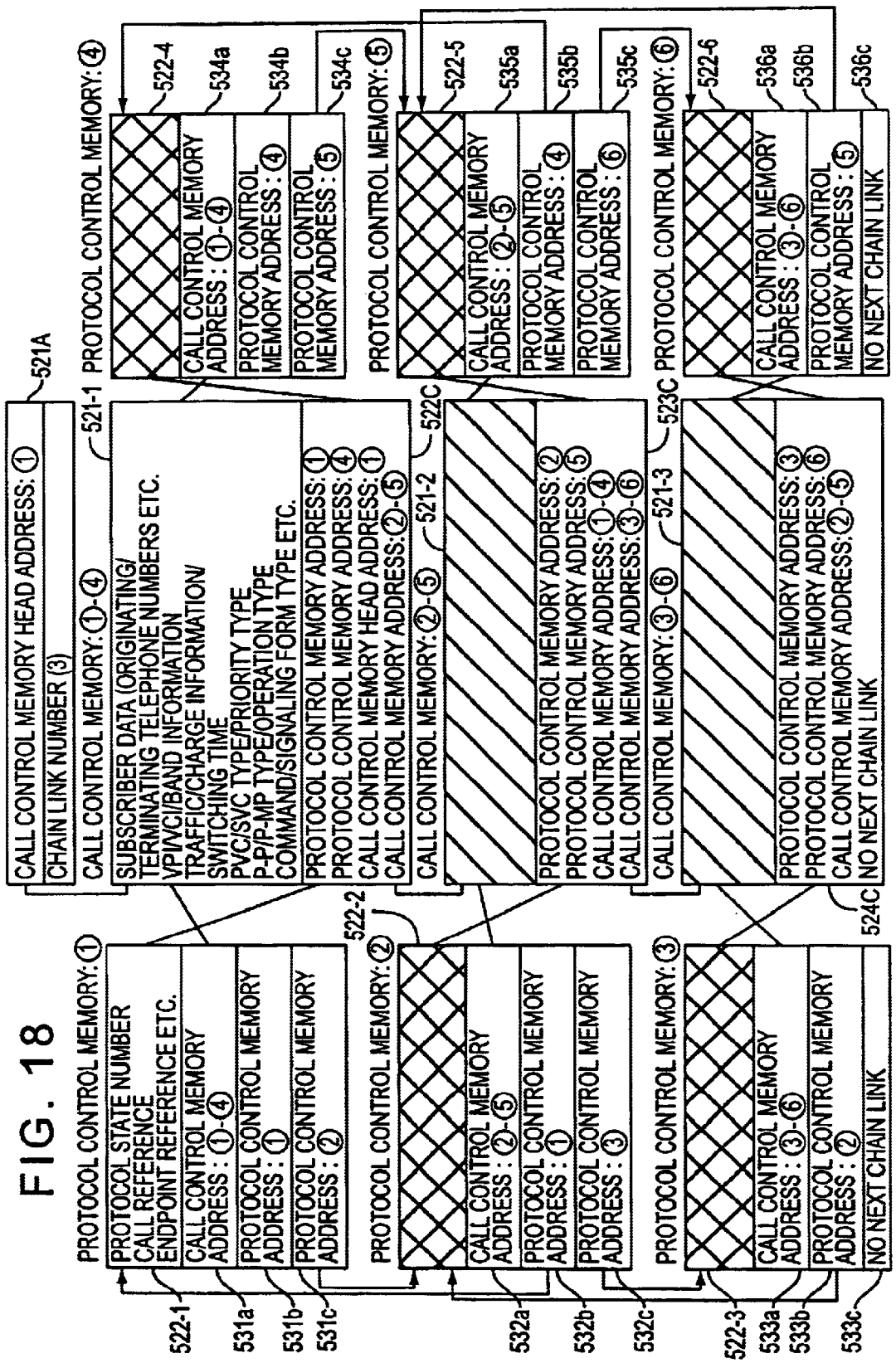

TO FIG. 21

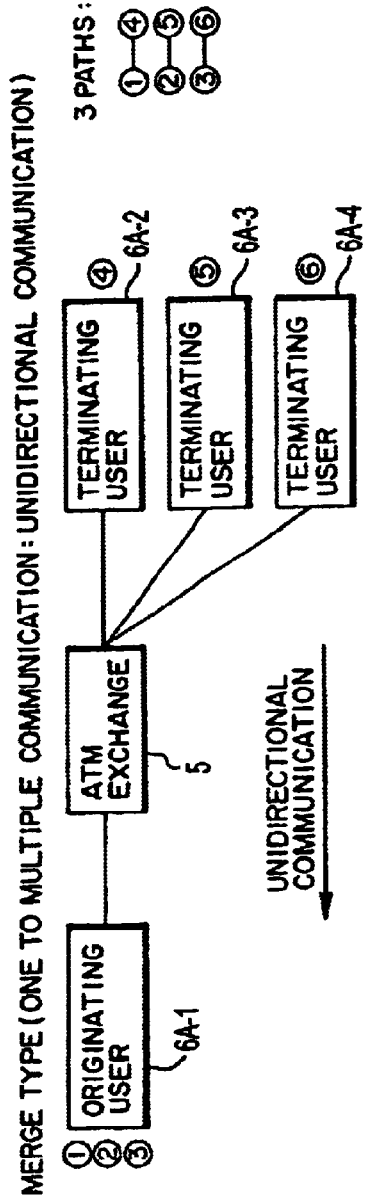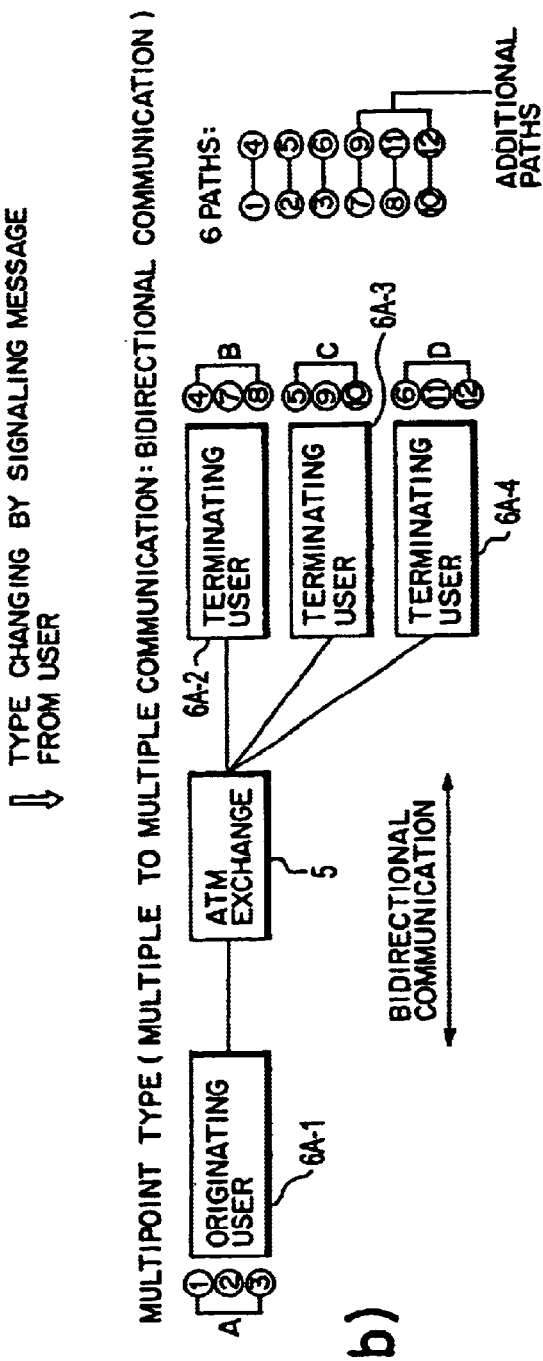
FIG. 23(a)
FIG. 23(b)

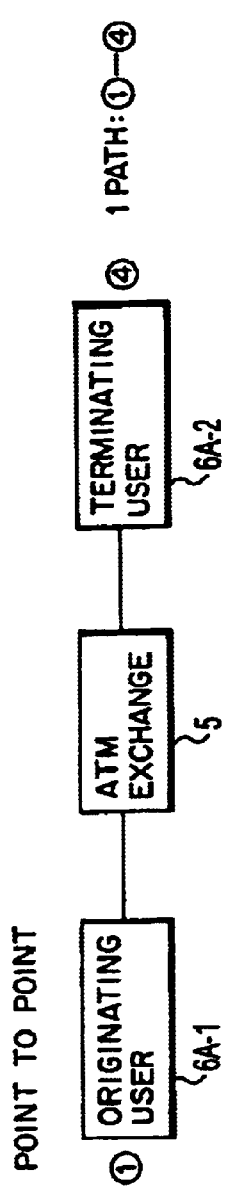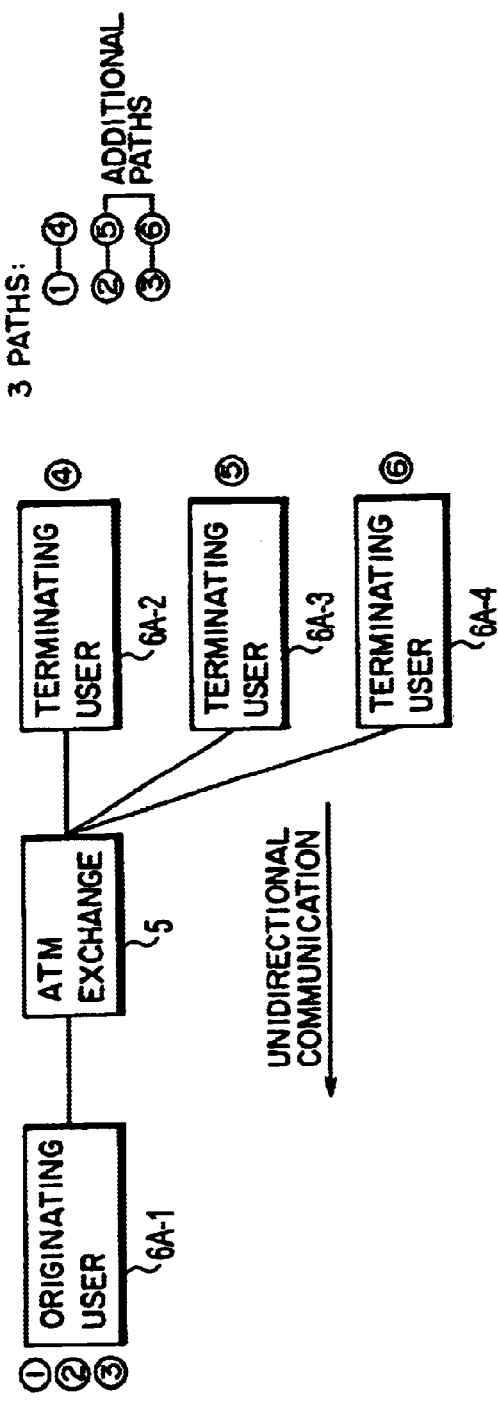
FIG. 28(a)
FIG. 28(b)

TO FIG. 34

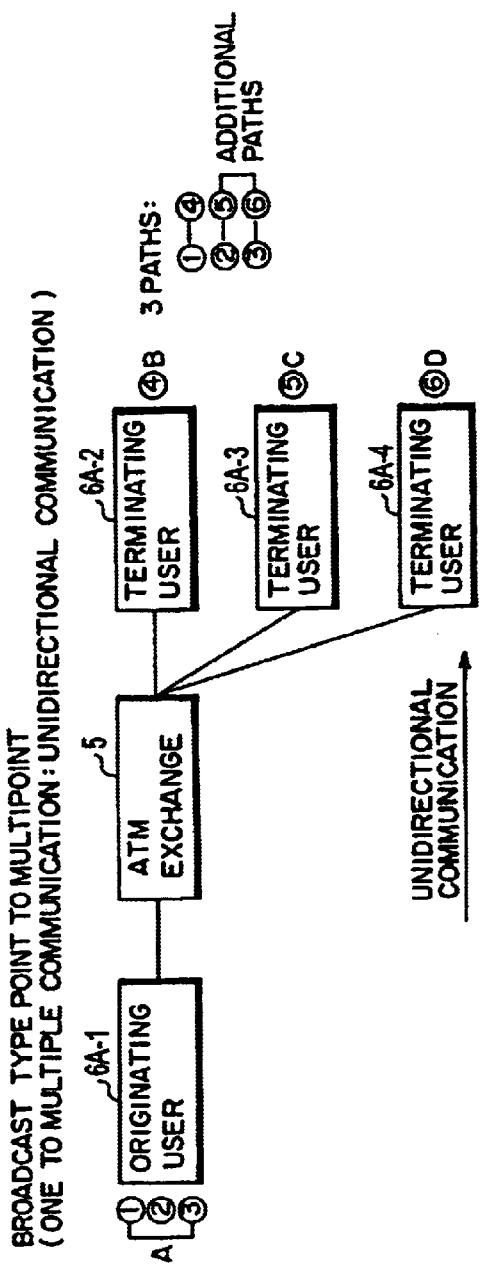
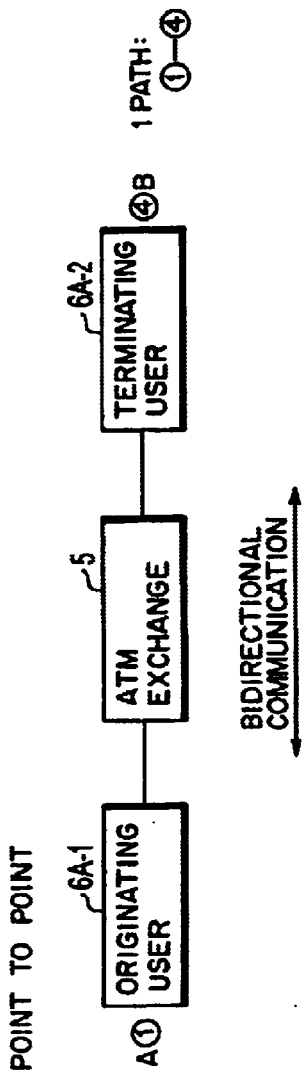
FIG. 43(a)
FIG. 43(b)

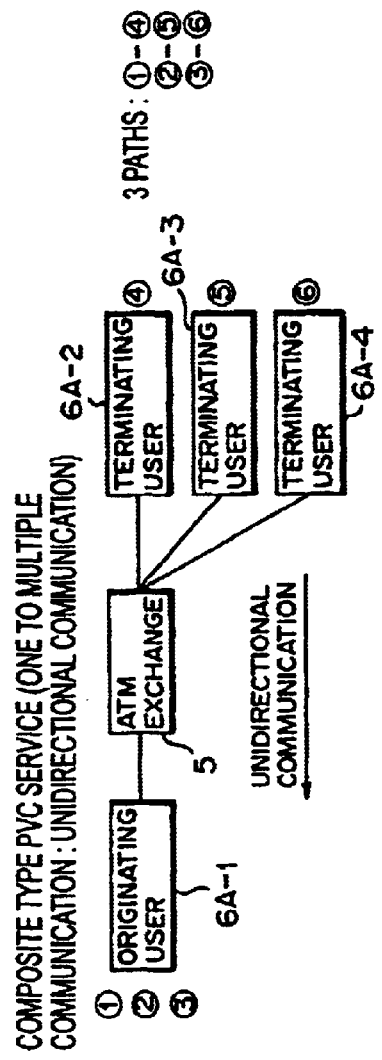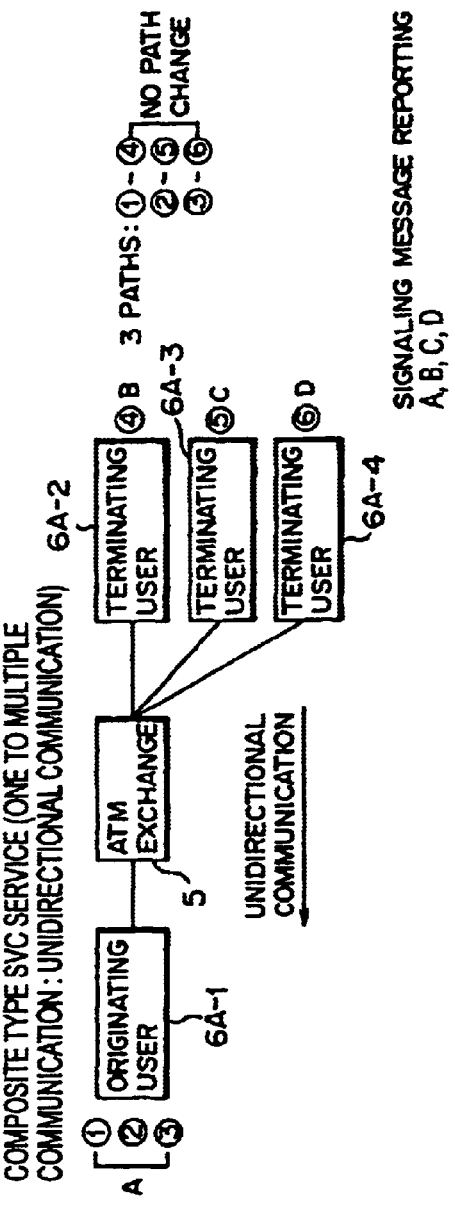
FIG. 50(a)
FIG. 50(b)

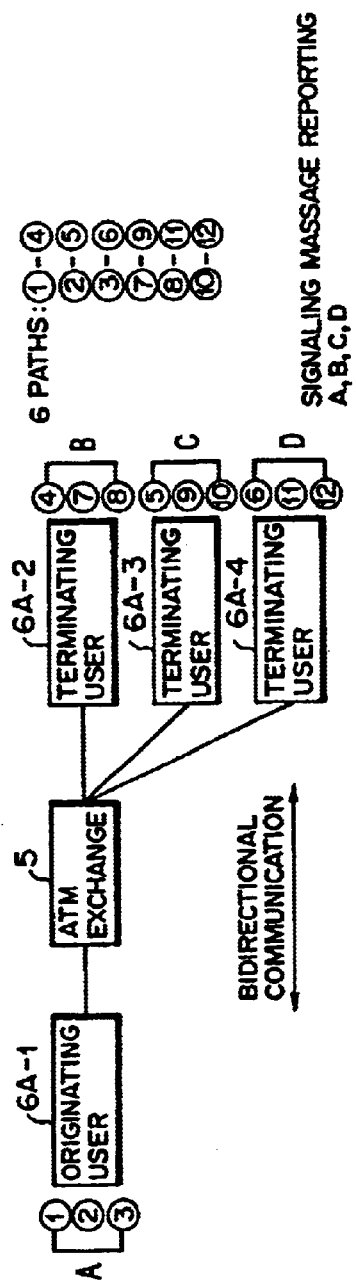
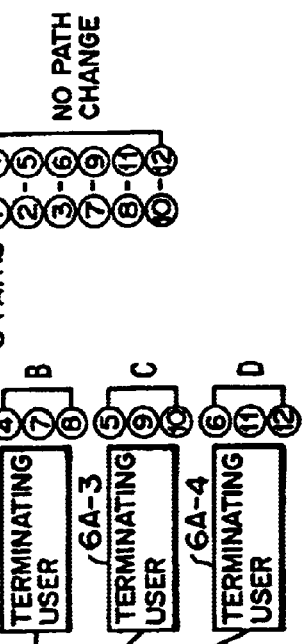
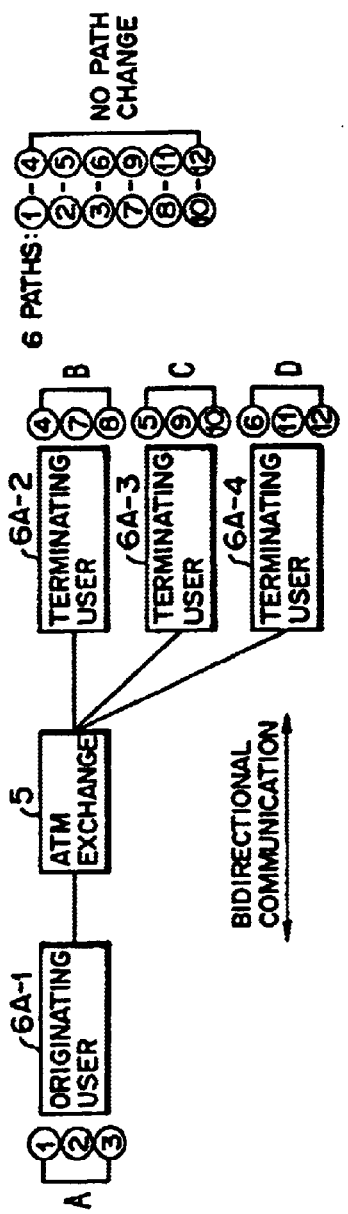

FIG. 71

| SERVICE FORM | AFTER CHANGE | | | | | | | | | |
|---|---|---|---|---|---|---|---|---|---|---|
| PRIOR TO CHANGE | ① | ② | ③ | ④ | ⑤ | ⑥ | ⑦ | ⑧ | ⑨ | ⑩ |
| ① | | O | O | O | O | O | O | O | O | O |
| ② | O | | O | O | O | O | O | O | O | O |
| ③ | O | O | | O | O | O | O | O | O | O |
| ④ | O | O | O | | O | O | O | O | O | O |
| ⑤ | O | O | O | O | | O | O | O | O | O |
| ⑥ | O | O | O | O | O | | O | O | O | O |
| ⑦ | O | O | O | O | O | O | | O | O | O |
| ⑧ | O | O | O | O | O | O | O | | O | O |
| ⑨ | O | O | O | O | O | O | O | O | | O |
| ⑩ | O | O | O | O | O | O | O | O | O | |

O: CHANGING POSSIBLE

① : PVC SERVICE (P-P)
② : SVC SERVICE (P-P)
③ : BROADCAST TYPE PVC SERVICE (P-MP)
④ : BROADCAST TYPE SVC SERVICE (P-MP)
⑤ : COMPOSITE TYPE PVC SERVICE (P-MP)
⑥ : COMPOSITE TYPE SVC SERVICE (P-MP)
⑦ : MERGE TYPE PVC SERVICE (P-MP)
⑧ : MERGE TYPE SVC SERVICE (P-MP)
⑨ : MULTIPOINT TYPE PVC SERVICE (P-MP)
⑩ : MULTIPOINT TYPE SVC SERVICE (P-MP)

FIG. 74

FORM (TYPE) CHANGING SIGNALING MESSAGE

| |
|---|
| PVC/SVC KIND |
| P-MP TYPE KIND |
| OPERATION KIND |
| ORIGINATION CALL REFERENCE |
| ORIGINATION ACCOMMODATION POSITION |
| ORIGINATING TELEPHONE NUMBER/ADDRESS |
| ORIGINATION VPI/VCI |
| ORIGINATION USE BAND |
| ORIGINATION USE CELL KIND |
| ENDPOINT REFERENCE (FOR EXISTING) |
| TERMINATION CALL REFERENCE |
| ADDITIONAL TERMINATION ACCOMMODATION POSITION |
| ADDITIONAL TERMINATING TELEPHONE NUMBER/ADDRESS |
| ADDITIONAL TERMINATION VPI/VCI |
| ADDITIONAL TERMINATION USE BAND |
| ADDITIONAL USE CELL KIND |
| ENDPOINT REFERENCE (FOR ADDITIONAL) |
| ⋮ |

SIMILARLY DESIGNATED FOR ADDITIONAL REGISTRATIONS

FIG. 100(a)

[USER—NETWORK INTERFACE]

| GFC (4 BITS) | VPI (8 BITS) | VCI (16 BITS) | PT (2 BITS) | Res (1 BIT) | CLP (1 BIT) | HEC (8 BITS) |

[INTRANETWORK—INTERNETWORK INTERFACE]

| VPI (12 BITS) | VCI (16 BITS) | PT (2 BITS) | Res (1 BIT) | CLP (1 BIT) | HEC (8 BITS) |

81

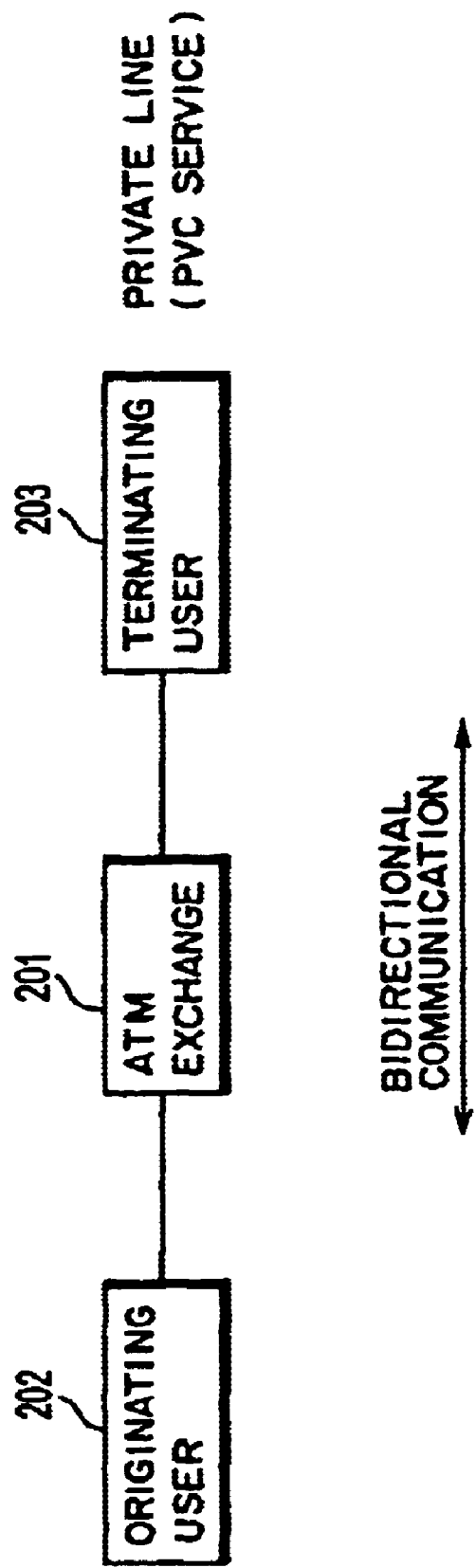

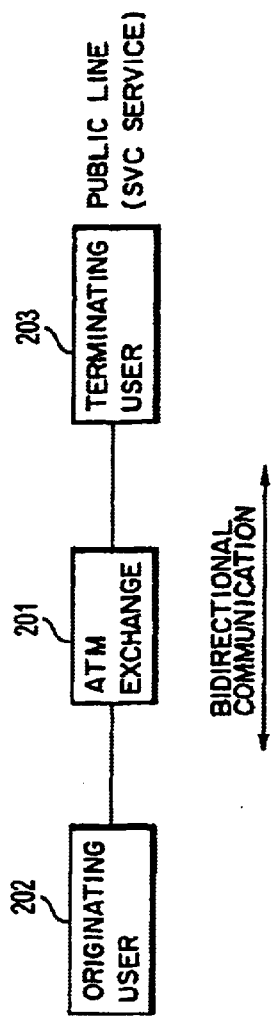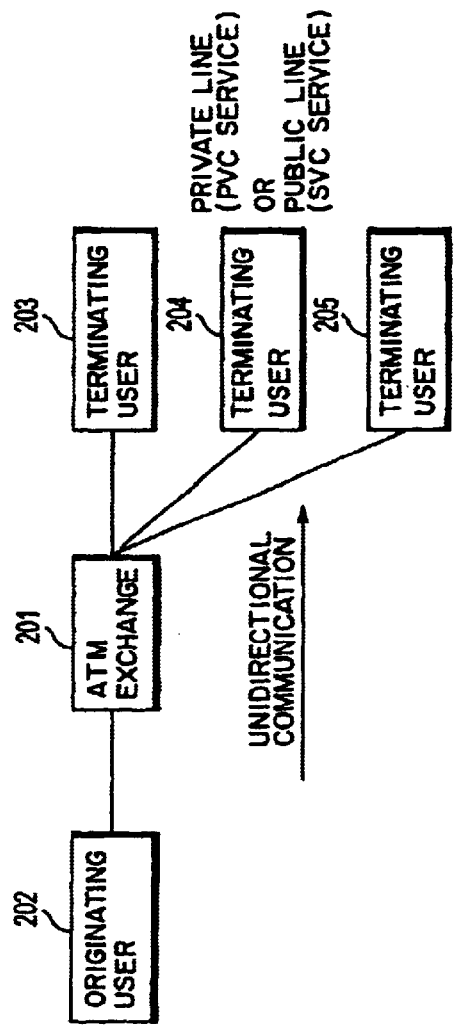
FIG. 103(a)
FIG. 103(b)

FIG. 105

| 8 | 7 | 6 | 5 | 4 | 3 | 2 | 1 | OCTETS |
|---|---|---|---|---|---|---|---|---|
| 0 | \multicolumn{7}{l|}{BROADBAND BEARER CAPABILITY INFORMATION ELEMENT IDENTIFIER} | 1 |
| 1 ext | \multicolumn{2}{l|}{CODING STANDARD} | \multicolumn{5}{l|}{IE INSTRUCTION FIELD} | 2 |
| \multicolumn{8}{l|}{LENGTH OF B-BC CONTENTS} | 3 |
| \multicolumn{8}{l|}{LENGTH OF B-BC CONTENTS (CONTINUED)} | 4 |
| 0/1 ext | 0 SPARE | | \multicolumn{5}{l|}{BEARER CLASS} | 5 |
| 1 ext | 0 SPARE | | \multicolumn{2}{l|}{TRAFFIC TYPE} | \multicolumn{3}{l|}{TIMING REQUIREMENTS} | 5a* (NOTE 1) |
| 1 ext | \multicolumn{2}{l|}{SUSCEPTIBILITY TO CLIPPING} | \multicolumn{2}{l|}{0 0 SPARE} | \multicolumn{3}{l|}{USER PLANE CONNECTION CONFIGURATION} | 6 |

NOTE 1 - THIS OCTET WILL ONLY BE PRESENT IF BEARER CLASS X IS INDICATED IN OCTET 5.

SWITCHING SYSTEM

This is a 371 continuation of application Ser. No. PCT/EP96/02508 filed on Sep. 5, 1996.

FIELD OF THE INVENTION

This invention relates to a communication service controlling exchange apparatus, and more particularly to a communication service controlling exchange apparatus of the type which accommodates a plurality of user terminals and can control conditions of communication services to be provided to the individual user terminals and which can provide a plurality of kinds of forms of communication services.

BACKGROUND OF THE INVENTION

Normally, a communication service controlling exchange apparatus signifies a so-called exchange, and, for example, an ATM (Asynchronous Transfer Mode) exchange effects desired exchanging control for an ATM cell (packet data) having a header part having information of a destination of transfer and a data part in which actual data are held so that operation conditions of communication services to be provided to user terminals accommodated in the exchange may be controlled.

Here. communication services provided by the ATM exchange have two forms including a so-called point to point type and a point to multipoint type.

However, only one service form actually exists, and this is a point to point PVC (Permanent Virtual Channel) service by which, as shown in FIG. 102, user terminals 202 and 203 accommodated in an ATM exchange 201 via a private line perform bidirectional communication in a one to one relationship. It is to be noted that the PVC signifies a permanent virtual path-permanent virtual channel with which the other party is determined in advance and eliminates the necessity for interworking between an originating terminal and a terminating terminal upon communication.

Meanwhile, service forms which are expected in the current stage are a point to point SVC (Switched Virtual Channel) service by which, as shown in FIG. 103(*a*), user terminals 202 and 203 accommodated in an ATM exchange 201 perform bidirectional communication in a one to one relationship via a public network and a point to multipoint service of the broadcast (Broadcast) type by which, as shown in FIG. 103(*b*), a user terminal 202 perform communication (unidirectional communication) with a plurality of user terminals (203 to 205).

It is to be noted that the SVC requires interworking between an originating terminal and a terminating terminal when communication is to be effected in order to set a virtual path-virtual channel between the parties.

Meanwhile, for the point to multipoint service of the broadcast type shown in FIG. 103(*b*), both of a PVC service which makes use of a private line and an SVC service which makes use of a public network or line are examined.

By the way, while, for the point to point service (one to one communication: bidirectional communication), two services including such a service (PVC service) by a private line as shown in FIG. 102 and such a service (SVC service) by a public network as shown in FIG. 103(*a*) are examined in the current stage, for the point to multipoint service (one to multiple communication), only a broadcast type service (one to multiple service: unidirectional communication) is examined, and besides, in the service form of the broadcast type, operation services are limited only to unidirectional communication such as video-on-demand communication.

Accordingly, taking future user needs into consideration, the communication service of the point to multipoint type must be able to provide several forms of communication services including such a communication service of the composite type wherein unidirectional communication opposite in direction to that of the communication service form of the broadcast type (one to multiple communication: unidirectional communication) is performed as shown in FIG. 104(*a*), such a communication service of the merge type wherein communication (one to multiple communication: unidirectional communication) is performed gathering a plurality of data from different user terminals 203 to 205 into one data as shown in FIG. 104(*b*) and such a communication service of the multipoint type wherein communication (multiple to multiple communication: bidirectional communication) is performed between pluralities of user terminals (206 to 211) as shown in FIG. 104(*c*).

It is to be noted that, also in this instance, the service forms shown in FIGS. 104(*a*) to 104(*c*) are examined for both of the PVC service and the SVC service.

Therefore, the ATM exchange 201 requires flexible software or hardware which is not aware of such service forms as shown in FIGS. 102 to 104 and must allow operation on a private line (PVC service) or a public network (SVC serve) in accordance with each service form. Further, it is forecast that service forms can be varied readily in the future.

However, since point to multipoint control by the ATM exchange 201 examined in the current stage is aware only of such a service form of the broadcast type as shown in FIG. 103(*b*), where applications to various service forms of various types such as the composite type, the merge type and the multipoint type as shown in FIGS. 104(*a*) to 104(*c*) are intended, new software or hardware must be prepared for each of the types, and there is a subject in that a very high cost is required.

Further, since, in the current stage, the ATM exchange 201 or any other existing exchange does not have a type changing control function from the broadcast type to the composite type or from the composite type to the merge type in the point to multipoint service form, if it is tried to effect such type changing, then it is required to delete all paths set already between user terminals once, register a different type newly and re-set all paths.

Furthermore, since the ATM exchange 201 or any other existing exchange does not have a changing function of the service form between the point to point service and the point to multipoint service, if it is tried to effect such form changing, then it is required, also in this instance, to delete all paths set already in the point to point service form or in the point to multipoint service form and then re-set all paths for a different service form.

Further, since the ATM exchange 201 or any other existing exchange neither have a changing function of the service form (line) between operation of a service by a private line (a PVC service) and operation of a service by a public network (an SVC service) in the current stage, if it is tried to effect changing between such service forms, then it still is required to delete all paths set already in the PVC service or in the SVC service and then re-set all paths for a different service form.

Accordingly, in any case, in order for a maintenance engineer to perform such procedures as stopping of services to all users, deletion of paths, type changing and re-setting of paths of a different form, services in operation for all users must be stopped for a fixed period of time. Thus, there is a subject in that this results in degradation of the service performance.

The present invention has been made in view of such subjects as described above, and it is an object of the present invention to allow a plurality of types of forms of communication services to be provided to a plurality of user terminals by means of a single communication service controlling exchange apparatus such as an ATM exchange.

DISCLOSURE OF THE INVENTION

To this end, a communication service controlling exchange apparatus of the present invention which accommodates a plurality of user terminals and can effect desired exchanging control of packet data from any of the user terminals having a transfer destination information part and a data part to control a condition of a communication service to be provided to the user terminals is characterized in that it comprises means capable of providing communication services of a plurality of kinds of forms.

Accordingly, with the communication service controlling exchange apparatus of the present invention, a communication service of a desired form can be provided very readily and rapidly in response to a request of a user, and consequently, there is an advantage that various requests of users such as changing to a communication service of any of various forms can be satisfied with certainty.

Another communication service controlling exchange apparatus of the present invention which accommodates a plurality of user terminals via private lines and can control a condition of a communication service to be provided to the user terminals is characterized in that it comprises call control memories individually provided for paths between the user terminals, that communication service providing means for registering user terminal registration information of those user terminals which can enjoy a communication service of a desired form into the call control memories and linking the call control memories with each other so that a communication service of the desired form can be provided is formed, and that link changing control means for changing the mutually linked condition of the pertinent ones of the call control memories when changing command information to a communication service of a different form is inputted through the maintenance terminal.

Accordingly, with the communication service controlling exchange apparatus of the present invention, since the communication service providing means which can provide a communication service of a desired form is formed in advance by linking the call control memories in which user terminal registration information regarding the user terminals accommodated via the private lines is registered with each other and, when changing command information to a communication service of a different form is inputted, the link changing control means changes the mutually linked condition of pertinent ones of the call control memories to form a mutually linked condition for the communication service of the aimed form, changing to a communication service of any of various forms which make use of the private lines can be performed very readily without individually providing call control memories or the like for the communication service of the aimed form and also the changing processing can be performed rapidly.

A further communication service controlling exchange apparatus of the present invention which accommodates a plurality of user terminals via private lines and can control a condition of a communication service to be provided to the user terminals is characterized in that the plurality of user terminals are divided into a plurality of user terminal groups (n groups), and that, for the individual user terminal groups, the communication service control exchange apparatus comprises call control memories individually provided for paths between the user terminals, and communication service providing means for registering user terminal registration information of those user terminals which can enjoy a communication service of a desired form into the call control memories and linking the call control memories with each other so that a communication service of the desired form can be provided is formed, and further, link changing control means for changing the mutually linked condition of the pertinent ones of the call control memories when changing command information to a communication service of a different form is inputted through the maintenance terminal.

Accordingly, with the communication service controlling exchange apparatus of the present invention, changing to a communication service of any of various forms which make use of the private lines can be performed for each user terminal group, and also this changing processing can be performed rapidly and a communication service of a desired form can be provided with a higher degree of flexibility to each user.

A still further communication service controlling exchange apparatus of the present invention which accommodates a plurality of user terminals via private lines and can control a condition of a communication service to be provided to the user terminals is characterized in that a single user terminal group is formed from the plurality of user terminals accommodated in the communication service controlling exchange apparatus, and that, for each of communication services of a plurality of kinds of forms, call control memories individually provided for paths between the user terminals are provided, and communication service providing means for registering user terminal registration information of those of the user terminals which can enjoy communication services of desired forms into the call control memories and linking the call control memories with each other so that the communication services of the individual forms can be provided is formed.

Accordingly, with the communication service controlling exchange apparatus of the present invention, communication services of a plurality of kinds of forms can be provided very readily without changing the mutually linked condition of the individual control memories.

A yet communication service controlling exchange apparatus of the present invention which accommodates a plurality of user terminals via public lines and can control a condition of a communication service to be provided to the user terminals is characterized in that it comprises call control memories individually provided for paths between the user terminals, and protocol control memories individually provided for the user terminals, that user terminal registration means for registering user terminal registration information of those of the user terminals which can enjoy a communication service of a desired form into the call control memories is provided, that communication service providing means for linking, when a trigger signal is inputted through any of the user terminals, the call control memories and the protocol control memories with each other so that a communication service of a desired form can be provided is formed, and that link changing control means for changing, when changing message information to a communication service of a different form is inputted through any of the user terminals, the mutually linked condition of the pertinent ones of the call control memories and protocol control memories is provided.

Accordingly, with the communication service controlling exchange apparatus of the present invention, also in any communication service which makes use of public lines, changing to a communication service of a different form can be performed very readily, and also this changing processing can be performed rapidly.

A yet further communication service controlling exchange apparatus of the present invention which accommodates a plurality of user terminals via public lines and can control a condition of a communication service to be provided to the user terminals characterized in that the plurality of user terminals are divided into a plurality of user terminal groups (n groups), that, for the individual user terminal groups, the communication service control exchange apparatus comprises call control memories individually provided for paths between the user terminals, and protocol control memories individually provided for the user terminals, that user terminal registration means for registering user terminal registration information of those of the user terminals which can enjoy a communication service of a desired form into the call control memories is provided, that communication service providing means for linking, when a trigger signal is inputted through any of the user terminals, the call control memories and the protocol control memories with each other so that a communication service of a desired form can be provided is formed, and that link changing control means for changing, when changing message information to a communication service of a different form is inputted through any of the user terminals, the mutually linked condition of the pertinent ones of the call control memories and protocol control memories is provided.

Accordingly, with the communication service controlling exchange apparatus of the present invention, also in any communication service which makes use of public lines, changing to a communication service of a different form can be performed very readily for each user terminal group, and also this changing processing can be performed rapidly.

A yet further communication service controlling exchange apparatus of the present invention which accommodates a plurality of user terminals via public lines and can control a condition of a communication service to be provided to the user terminals is characterized in that a single user terminal group is formed from the plurality of user terminals accommodated in the communication service controlling exchange apparatus, that, for each of communication services of a plurality of kinds of forms, the communication service controlling exchange apparatus comprises call control memories individually provided for paths between the user terminals are provided, and protocol control memories individually provided for the user terminals, that user terminal registration means for registering user terminal registration information of those of the user terminals which can enjoy a communication service of a corresponding form into the call control memories is provided, and that communication service providing means for linking, when a trigger signal is inputted through any of the user terminals, the call control memories and the protocol control memories with each other so that a communication service of the corresponding form can be provided is formed.

Accordingly, with the communication service controlling exchange apparatus of the present invention, communication services of a plurality of kinds of forms which make use of the public lines can be provided very readily without changing the mutually linked condition of the individual control memories and protocol control memories.

A yet further communication service controlling exchange apparatus of the present invention which accommodates a plurality of user terminals via private lines or public lines and can control a condition of a communication service to be provided to the user terminals is characterized in that it comprises call control memories individually provided for paths between the user terminals, and protocol control memories individually provided for the user terminals, that private line communication service providing means for registering user terminal registration information of those of the user terminals which can enjoy a communication service of a desired form regarding the private lines into the call control memories and linking the call control memories with each other so that a communication service of a desire form regarding the private lines can be provided is provided, and that user terminal registration means for registering user terminal registration information of those of the user terminals which can enjoy a communication service of a desired form regarding the public lines into the call control memories, and public line communication service providing means for linking, when a trigger signal is inputted through any of the user terminals, the call control memories to and the protocol control memories with each other so that a communication service of a desire form regarding the public lines can be provided are provided.

Accordingly, with the communication service controlling exchange apparatus of the present invention, since a communication service of a desired form can be provided for any of the private lines and the public lines, the number of communication services which can be provided by a single communication service controlling exchange apparatus increases remarkably.

A yet further communication service controlling exchange apparatus of the present invention which accommodates a plurality of user terminals via private lines or public lines and can control a condition of a communication service to be provided to the user terminals is characterized in that the plurality of user terminals are divided into a plurality of user terminal groups, and that, for the individual user terminal groups, the communication service control exchange apparatus comprises call control memories individually provided for paths between the user terminals, and protocol control memories individually provided for the user terminals, that private line communication service providing means for registering user terminal registration information of those of the user terminals which can enjoy a communication service of a desired form regarding the private lines into the call control memories and linking the call control memories with each other so that a communication service of a desire form regarding the private lines can be provided is provided, and that user terminal registration means for registering user terminal registration information of those of the user terminals which can enjoy a communication service of a desired form regarding the public lines into the call control memories and public line communication service providing means for linking, when a trigger signal is inputted through any of the user terminals, the call control memories and the protocol control memories with each other so that a communication service of a desire form regarding the public lines can be provided are provided.

Accordingly, with the communication service controlling exchange apparatus of the present invention, changing to a communication service of any of various forms which make use of the private lines or the public lines can be performed for each user terminal group, and also this changing processing can be performed rapidly and a communication service of a desired form can be provided with a higher degree of flexibility to each user.

A yet further communication service controlling exchange apparatus of the present invention which accommodates a plurality of user terminals via public lines and can control a condition of a communication service to be provided to the user terminals is characterized in that it comprises call control memories individually provided for paths between the user terminals, and protocol control memories individually provided for the user terminals, that user terminal registration means for registering user terminal registration information of those of the user terminals which can enjoy a communication service of a desired form into the call control memories is provided, that communication service providing means for linking the call control memories and the protocol control memories are linked with each other so that a communication service of a desired form can be provided is formed, and that link changing control means for changing, when a trigger signal including changing message information to a communication service of a different form is inputted through any of the user terminals, the mutually linked condition of the pertinent ones of the call control memories and protocol control memories is provided.

Accordingly, with the communication service controlling exchange apparatus of the present invention, for example, even if changing message information to a communication service of a different form is included in an existing trigger signal, since the mutually linked condition of the pertinent call control memories and protocol control memories is changed to provide a communication service of a desired form to each user, this contributes very much to improvement in the universal use of the present apparatus.

A yet further communication service controlling exchange apparatus of the present invention which accommodates a plurality of user terminals via private lines or public lines and can control a condition of a communication service to be provided to the user terminals is characterized in that it comprises call control memories individually provided for paths between the user terminals, and protocol control memories individually provided for the user terminals, that private line communication service providing means for registering user terminal registration information of those of the user terminals which can enjoy a communication service of a desired form regarding the private lines into the call control memories and linking the call control memories with each other so that a communication service of a desire form regarding the private lines can be provided is provided, and that user terminal registration means for registering user terminal registration information of those of the user terminals which can enjoy a communication service of a desired form regarding the public lines into the call control memories, public line communication service providing means for linking the call control memories and the protocol control memories with each other so that a communication service of a desire form regarding the public lines can be provided, and user terminal inputting type line changing control means for changing, when a trigger signal including line changing message information regarding a communication service of an arbitrary form is inputted through any of the user terminals, the mutually linked condition of those of the call control memories and the protocol control memories in which the pertinent user terminal registration information is registered in response to an aimed line kind of changing.

Accordingly, with the communication service controlling exchange apparatus of the present invention, for example, even if changing message information to a communication service of a desired form regarding a different line is included in an existing trigger signal, since the mutually linked condition of the pertinent call control memories and protocol control memories is changed to provide a communication service of a desired form regarding a different line to each user which makes use of a communication service of a desired form regarding a certain line, this contributes very much to improvement in the universal use of the present apparatus.

BRIEF DESCRIPTION OF THE DRAWINGS

FIG. 11 is a diagrammatic view illustrating various communication services which can be provided by the ATM exchange of the present embodiment;

FIG. 18 is a diagrammatic view illustrating an example of mutually linked relationship of the call control memories and protocol control memories constructed in the ATM exchange of the present embodiment;

FIGS. 23(a) and 23(b) are diagrammatic views illustrating the point to multipoint type changing control by the ATM exchange of the present embodiment;

FIGS. 28(*a*) and 28(*b*) are diagrammatic views illustrating form changing control by the ATM exchange of the present embodiment;

FIGS. 43(*a*) and 43(*b*) are diagrammatic views illustrating the form changing control by the ATM exchange of the present embodiment;

FIGS. 50(*a*) and 50(*b*) are diagrammatic views illustrating line changing control by the ATM exchange of the present embodiment;

FIGS. 61(*a*) and 61(*b*) are diagrammatic views illustrating the line changing control by the ATM exchange of the present embodiment;

FIG. 71 is a diagrammatic view illustrating various communication services which can be provided by the ATM exchange of the present embodiment;

FIG. 74 is a diagrammatic view showing an example of format of a form (type) changing signaling message in the present embodiment;

FIGS. 100(a) and 100(b) are diagrammatic views showing examples of format of a header part of an ATM cell;

FIG. 102 is a diagrammatic view illustrating an example of existing communication service form provided by an ATM exchange;

FIGS. 103(a) and 103(b) are diagrammatic views each showing an example of communication service form provided by an ATM exchange;

FIG. 105 is a diagrammatic view showing an example of format of bearer information factors.

BEST FORMS IN EMBODYING THE INVENTION (A) Description of the Basic Constructions of the Communication Service Controlling Exchange Apparatus of the Present Invention.

Basic constructions of a communication service controlling exchange apparatus of the present invention will be described first.

A communication service controlling exchange apparatus of the present invention which accommodates a plurality of user terminals and can effect desired exchanging control of packet data from any of the user terminals having a transfer destination information part and a data part to control a condition of a communication service to be provided to the user terminals is constructed such that it comprises a part capable of providing communication services of a plurality of kinds of forms.

Accordingly, a communication service of a desired form can be provided very readily and rapidly in response to a request of a user, and consequently, there is an advantage that various requests of users such as changing to a communication service of any of various forms can be satisfied with certainty.

In the following, the present communication service controlling exchange apparatus will be described in detail with reference to the drawings.

Figure 1:
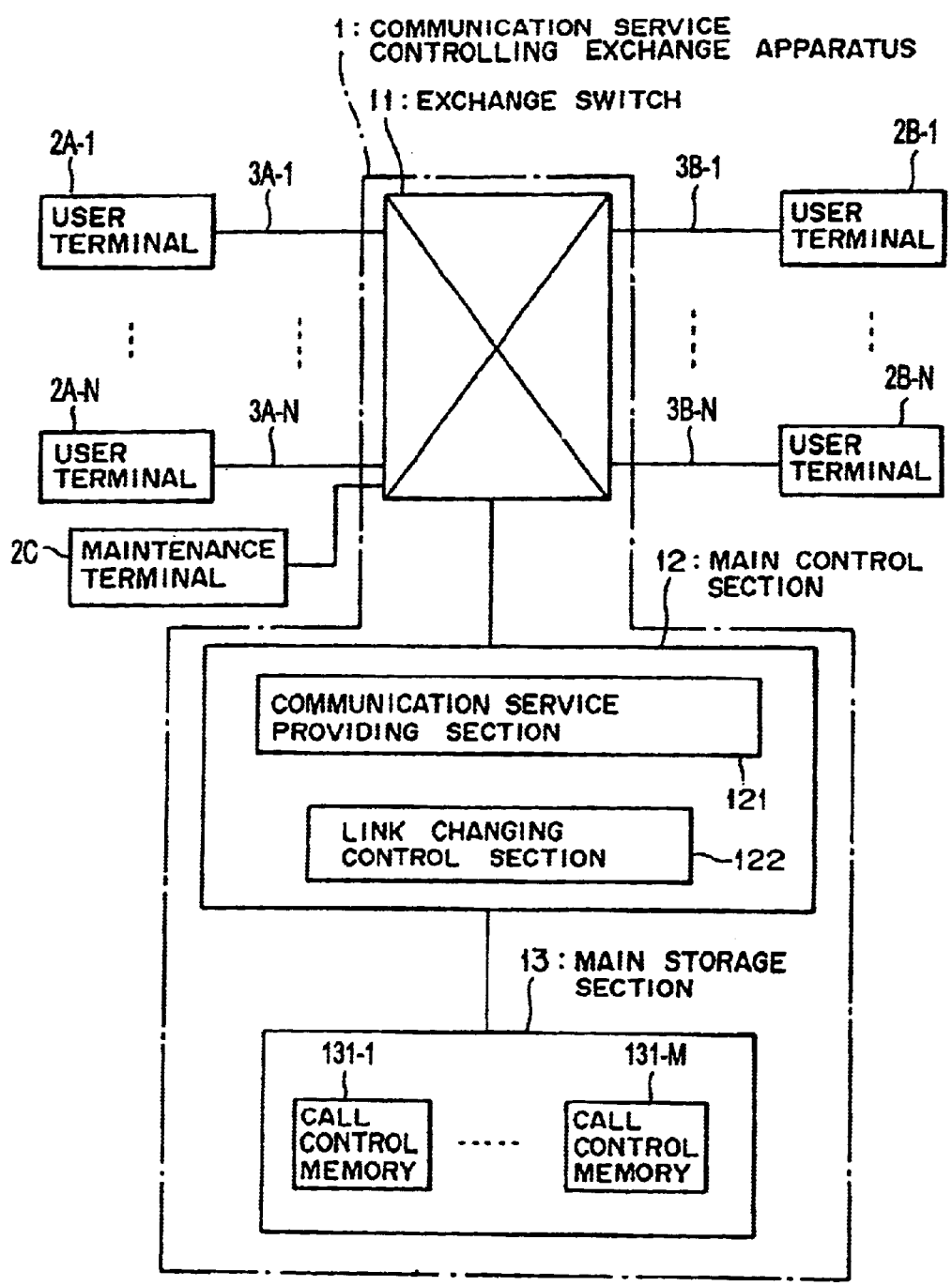
FIGS. 1 to 8 are block diagrams showing basic constructions of a communication service controlling exchange apparatus of the present invention.

FIG. 1 is a block diagram showing a basic construction of the communication service controlling exchange apparatus of the present invention, and the communication service controlling exchange apparatus 1 shown in FIG. 1 accommodates a plurality of user terminals 2A-1 to 2A-N, 2B-1 to 2B-N (where N is a natural number) via private lines 3A-1 to 3A-N, 3B-1 to 3B-N, respectively, and further accommodates a maintenance terminal 2C.

Further, the communication service controlling exchange apparatus 1 includes an exchange switch 11 which accommodates the private lines 3A-1 to 3A-N, 3B-1 to 3B-N, a main control section 12 which controls the exchange switch 11 to control entire communication services to be provided to the user terminals 2A-1 to 2A-N, 2B-1 to 2B-N, and a main storage section 13 for storing various information necessary for the main control section 12 to operate.

Furthermore, the main control section 12 includes a communication service providing section 121 and a link changing control section 122, and the main storage section 13 includes call control memories 131-1 to 131-M (where M is a number of paths between the user terminals) individually provided for paths between the user terminals 2A-1 to 2A-N, 2B-1 to 2B-N.

Here, the communication service providing section 121 can register user terminal registration information which can enjoy a communication service of a desired form into the call control memories 131-j (where j=1 to M) and link the call control memories 131-j with each other to provide a communication service of the desired form.

Meanwhile, the link changing control section 122 changes the mutually linked condition of the pertinent call control memories 131-j when changing command information to a communication service of a different form is inputted through the maintenance terminal 2C.

Consequently, in the communication service controlling exchange apparatus 1, when changing command information to a communication service of a different form is inputted through the maintenance terminal 2C, the communication service of the different form can be provided by the link changing control section 122 changing the mutually linked condition of the pertinent call control memories 131-j.

In this manner, with the communication service controlling exchange apparatus 1 described above, since the link changing control section 122 changes the mutually linked condition of the pertinent call control memories 131-j to form a mutually linked condition for the communication service of the aimed form of the changing, changing to a communication service of any of various forms which make use of the private lines 3A-1 to 3A-N, 3B-1 to 3B-N can be performed very readily without individually providing the call control memories 131-j or the like for the communication service of the different form and also the changing processing can be performed rapidly.

Figure 2:
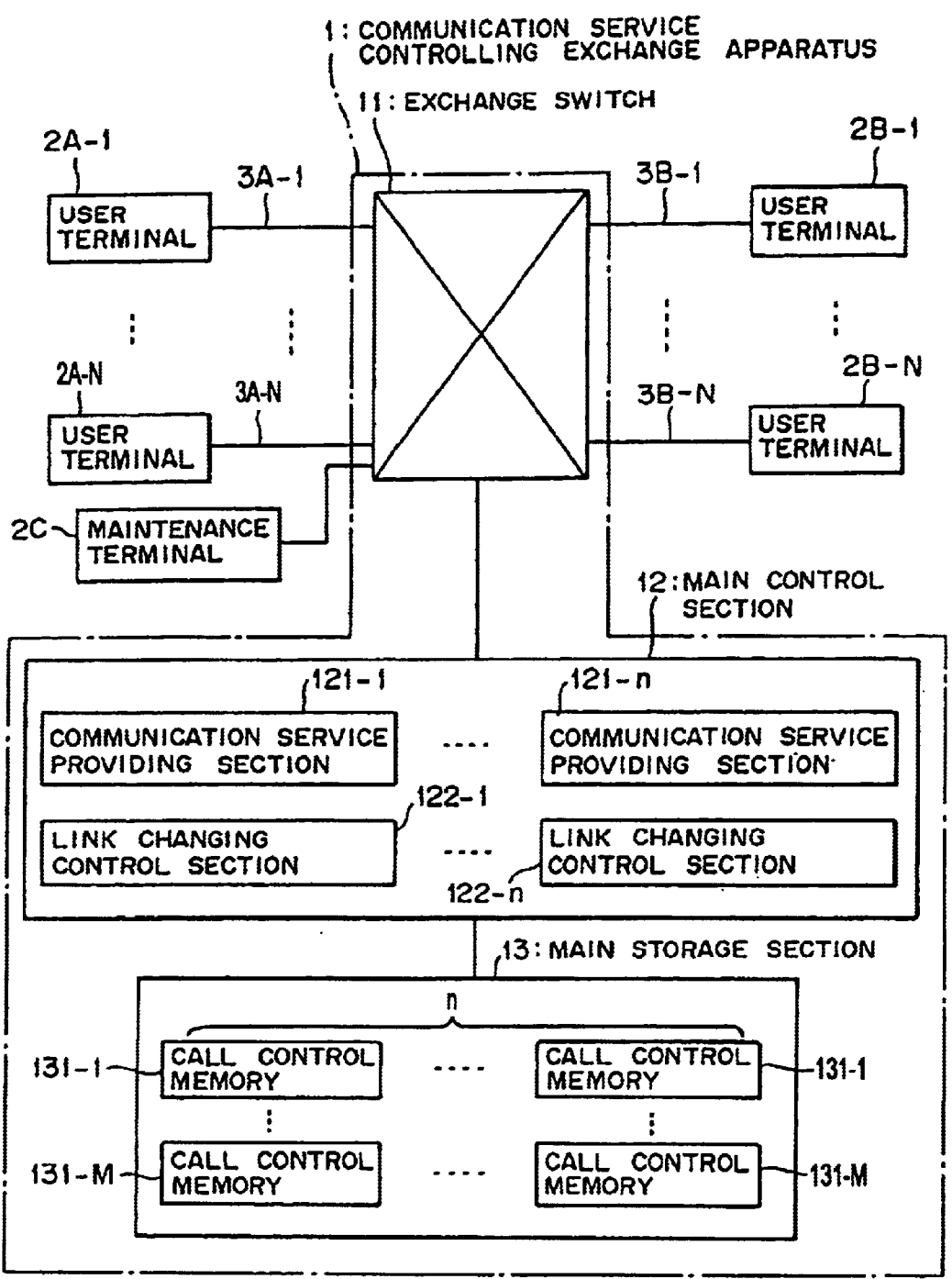

Also FIG. 2 is a block diagram showing another basic construction of the communication service controlling exchange apparatus of the present invention, and also in FIG. 2, reference numeral 1 denotes a communication service controlling exchange apparatus which accommodates user terminals 2A-1 to 2A-N, 2B-1 to 2B-N via private lines 3A-1 to 3A-N, 3B-1 to 3B-N, respectively, 11 denotes an exchange switch, 12 a main control section, and 13 a main storage section. It is to be noted that reference symbol 2C denotes a maintenance terminal.

And, the communication service controlling exchange apparatus 1 shown in FIG. 2 includes, where a plurality of user terminals 2A-1 to 2A-N, 2B-1 to 2B-N are divided into a plurality of user terminal groups (for example, where they are divided into n (n is a natural number) groups such that each opposing ones of the user terminals in FIG. 2 make one group), for the individual user terminal groups, communication service providing sections 121-1 to 121-n, a link changing control section 122-1 and call control memories 131-1 to 131-M (where M is a number of paths between user terminals) similar to those shown in FIG. 1 for the n groups.

Consequently, in the communication service controlling exchange apparatus 1 shown in FIG. 2, when changing command information to a communication service of a different form is inputted through the maintenance terminal 2C, changing to the communication service of the different form can be performed for each user terminal group by the link changing control section 122-k (where k=1 to n) changing the mutually linked condition of the pertinent call control memories 131-j (where j=1 to M).

Accordingly, with the communication service controlling exchange apparatus 1 described above, changing to a communication service of any of various forms which make use of the private lines 3A-1 to 3A-N, 3B-1 to 3B-N can be performed for each user terminal group, and also this changing processing can be performed rapidly. Accordingly, a communication service of a desired form can be provided with a higher degree of flexibility to each user.

It is to be noted that, in this instance, since any of the user terminals 2A-1 to 2A-N, 2B-1 to 2B-N which form the individual user terminal groups is capable of serving also as a component of a different one of the user terminal groups in an overlapping relationship, the number of users which can enjoy communication services of a plurality of kinds of forms can be increased very much, and consequently, various requests of users for form changing of a communication service and so forth can be satisfied with a higher degree of certainty.

Further, each of the link changing control sections 122 and 122-k described hereinabove with reference to FIGS. 1 and 2 includes a registration information condition discrimination section for verifying the call control memories 131-j and the user terminal registration information based on a changing command information inputted through the maintenance terminal 2C to discriminate whether or not changing of the mutually linked condition of the pertinent call control memories 131-j from among the call control memories 131-j is possible.

Consequently, each of the link changing control sections 122 and 122-k performs, when a changing command to a communication service of a different form is inputted through the maintenance terminal 2C, changing to the communication service of the different form only when changing of the mutually linked condition of the pertinent call control memories 131-j from among the call control memories 131-j is possible.

Accordingly, even if a changing command to a communication service of a different form is inputted through the maintenance terminal 2C, only when it is discriminated by the registration information condition discrimination section that changing of the mutually linked condition of the pertinent call control memories 131-j is possible, each of the link changing control sections 122 and 122-k changes the mutually linked condition to establish a mutually linked condition of the call control memories 131-j for the aimed communication service of the changing, and consequently, changing to the communication service of the different form (which makes use of the private lines) can be performed with a higher degree of certainty.

Furthermore, each of the link changing control sections 122 and 122-k may include a service condition discrimination section for discriminating whether or not changing of the mutually linked condition of the pertinent call control memories 131-j is possible in a condition wherein a communication service in operation is continued or in another condition wherein the communication service in operation is temporarily stopped. By this, if it is discriminated that changing of the mutually linked condition of the pertinent call control memories 131-j is possible, then changing to the communication service of the different form can be performed even in a condition wherein a communication service in operation is continued.

Accordingly, since each of the link changing control sections 122 and 122-k described above changes the mutually linked condition of the pertinent call control memories 131-j when it is discriminated by the service condition discrimination section that changing of the mutually linked condition of the pertinent call control memories 131-j is possible in a condition wherein a communication service in operation is continued or in another condition wherein the communication service in operation is temporarily stopped, changing to the communication service of the different form (which utilizes the private lines) can be performed very readily even in a condition wherein a communication service in operation is continued.

Further, each of the link changing control sections 122 and 122-k may be constructed so as to perform changing of the mutually linked condition of those of the pertinent call control memories 131-j for which changing should be performed newly when there is no change in origination and termination accommodation positions but to perform changing of the mutually linked condition of all of the pertinent call control memories 131-j when there is a change in the origination and termination accommodation positions.

Consequently, with the communication service controlling exchange apparatus 1 shown in FIG. 1 or 2, unless there is a change in the origination and termination accommodation positions of the user terminals 2A-1 to 2A-N and 2B-1 to 2B-N, even if the mutually linked condition of all of the call control memories 131-j is not changed, if the mutually linked condition of those of the pertinent call control memories 131-j for which changing should be performed newly is changed, changing to the communication service of the different form can be performed.

Further, even if there is a change in the origination and termination accommodation positions, changing to the communication service of the different form can be performed if the mutually linked condition of all of the pertinent call control memories 131-j is changed.

Further, in each of the link changing control sections 122 and 122-k, if the mutually linked condition of those of the pertinent call control memories 131-j for which changing should be performed newly is changed unless there is any change in the origination and termination accommodation positions, then a mutually linked condition for the communication service of the different form can be formed, and consequently, changing to the communication service of the different form can be performed using the other call control memories 131-j commonly.

Accordingly, changing to a communication service of a different form (which makes use of the private lines) can be performed rapidly while saving the memory amount necessary for the control memories 131-j remarkably. Further, even if there is a change in the origination and termination accommodation positions, since only it is required to change the mutually linked condition of all of the pertinent call control memories 131-j, changing to the communication service of the different form can be performed readily also in this instance.

Furthermore, in the communication service controlling exchange apparatus 1 shown in FIG. 1 or 2, a relief control section may be provided for restoring, if a trouble is detected when the mutually linked condition of the pertinent call control memories 131-j is changed by any of the link changing control sections 122 and 122-k, a condition prior to the changing. By this, if a trouble occurs upon changing to a communication service of a different form, a communication service of a form prior to the changing can be restored.

Accordingly, if a trouble is detected when the mutually linked condition of the pertinent call control memories 131-j is changed by any of the link changing control sections 122 and 122-K in order to perform changing to a communication service of a different from, then since a condition prior to the changing can be restored by the relief control section, even if changing to the communication service of the different form cannot be performed, such degradation in the service performance that a user cannot enjoy a communication service for a long time can be prevented with certainty.

It is to be noted that each of the link changing control sections 122-k shown in FIG. 2 may be constructed so as to change, when simultaneous changing command information for changing a communication service in operation in each of the user terminal groups simultaneously to a communication service of a different form is inputted as the changing command information mentioned above, the mutually linked condition of the pertinent call control memories 131-j of each of the user terminal groups simultaneously for each of the user terminal groups.

Accordingly, in this instance, even when the form of a communication service in operation in a plurality of user terminal groups is to be changed to a communication service of a desired form, a maintenance engineer need not enter a command for form changing for each one user terminal group, and the burden of a form changing operation or the like by the maintenance engineer can be reduced further remarkably.

Figure 3:
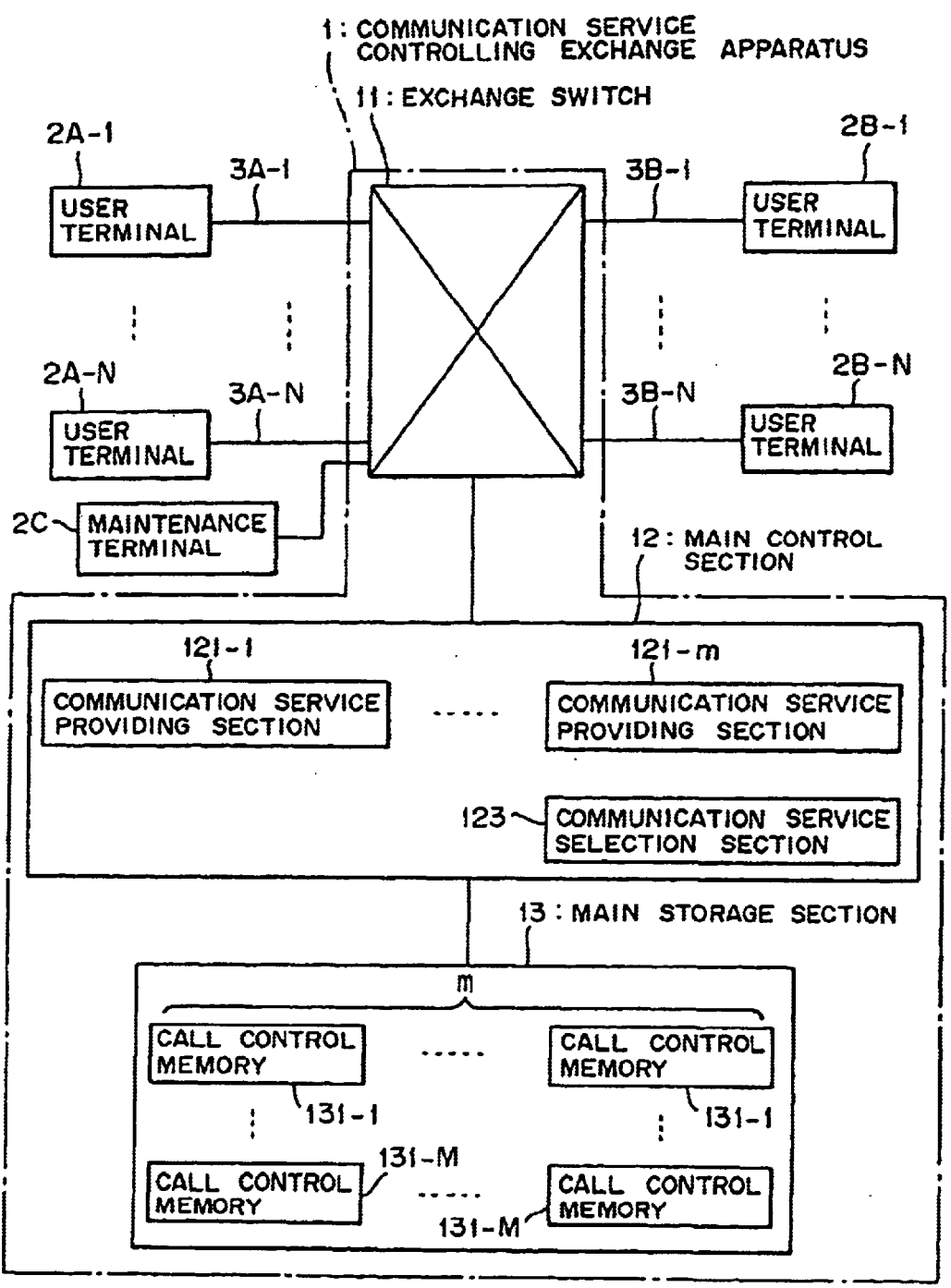

Subsequently, also FIG. 3 is a block diagram showing a further basic construction of the communication service controlling exchange apparatus of the present invention, and also in FIG. 1, reference numeral 1 denotes a communication service controlling exchange apparatus, reference symbols 2A-1 to 2A-N, 2B-1 to 2B-N denote each a user terminal, reference symbol 2C denotes a maintenance terminal, reference symbols 3A-1 to 3A-N, 3B-1 to 3B-N denote each a private line, reference symbol 11 denotes an exchange switch, 12 a main control section, and 13 a main storage section.

And, in the communication service controlling exchange apparatus 1 shown in FIG. 3, a single user terminal group is formed from the plurality of user terminals 2A-1 to 2A-N, 2B-1 to 2B-N, and for each of communication services of a plurality of kinds (for example, m kinds) of forms, call control memories 131-1 to 131-M (M is a number of paths between user terminals) individually provided for paths between the user terminals are provided for the m kinds in the main storage section 13. Further, communication service providing section 121-1 to 121-m for the m kinds are provided in the main control section 12, and besides, a communication service selection section 123 is provided.

Here, each of the communication service providing sections 121-1 to 121-m registers user terminal registration information which can enjoy a communication service of a desired form into the call control memories 131-1 to 131-M and links the call control memories 131-1 to 131-M with each other to provide the communication services of the individual forms.

Accordingly, with the communication service controlling exchange apparatus 1 described above, communication services of a plurality of kinds of forms can be provided very readily without changing the mutually linked condition of the individual control memories 131-1 to 131-M.

Further, the communication service selection section 123 selects, when changing command information to a communication service of a different form is inputted through the maintenance terminal 2C, one of the communication service providing sections 121-1 to 121-m which corresponds to the communication service of the aimed form of the changing.

Consequently, with the communication service controlling exchange apparatus 1 shown in FIG. 3, when changing command information to a communication service of a different form is inputted through the maintenance terminal 2C, the communication service of the desired form is provided without changing the linked condition of the call control memories 131-1 to 131-M only by selecting one of the communication service providing sections 121-1 to 121-m which corresponds to the communication service of the aimed form of the changing as described above. Accordingly, the communication service of the desired form can be provided very rapidly.

Figure 4:
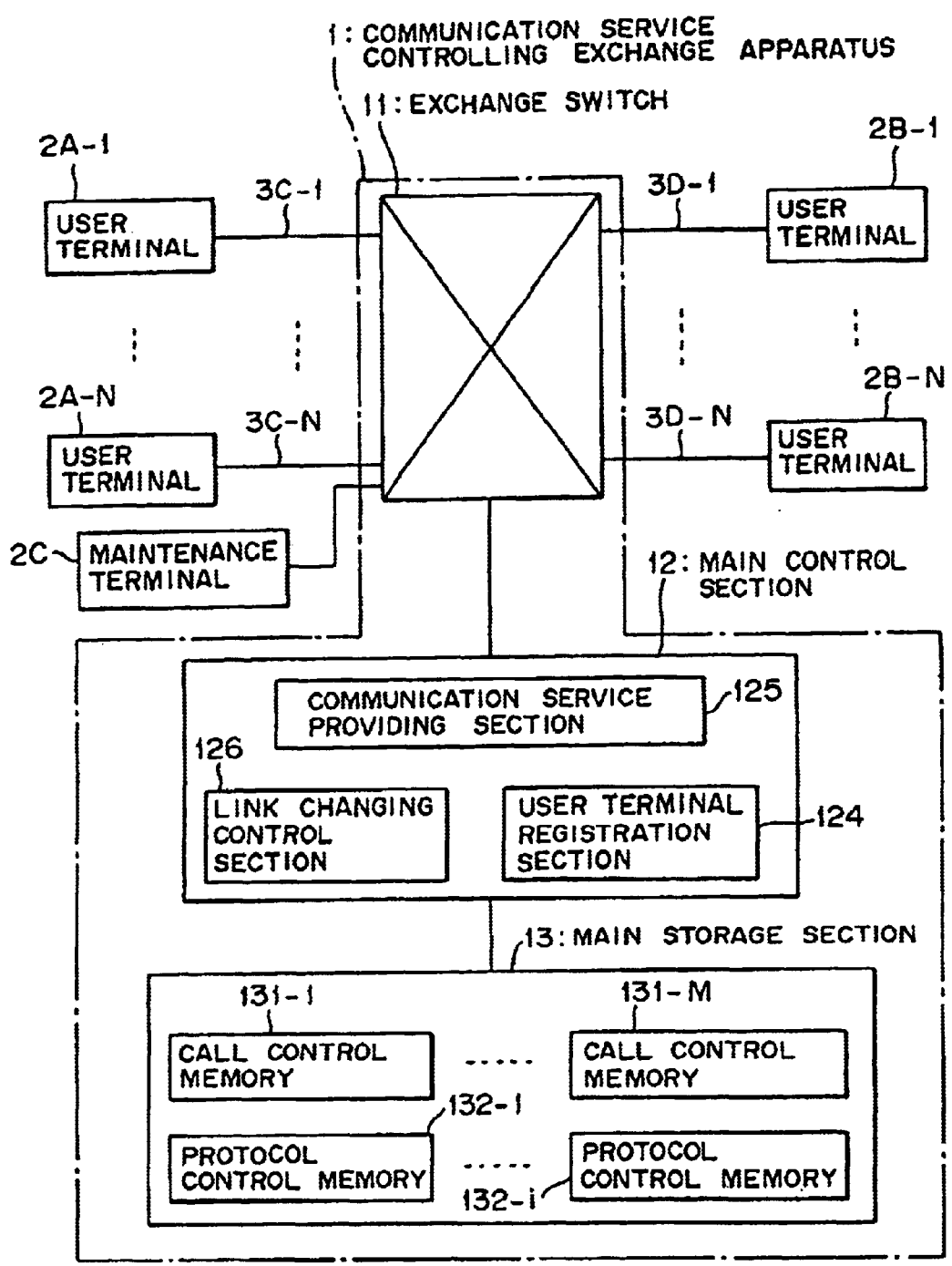

Subsequently, also FIG. 4 is a block diagram showing a still basic construction of the communication service controlling exchange apparatus of the present invention, and also in FIG. 4, a communication service controlling exchange apparatus 1 accommodates a plurality of user terminals 2A-1 to 2A-N, 2B-1 to 2B-N via private lines 3C-1 to 3C-N, 3D-1 to 3D-N, respectively. It is to be noted that, also in this instance, reference symbol 2C denotes a maintenance terminal, 11 an exchange switch, 12 a main control section, and 13 a main storage section.

Thus, the communication service controlling exchange apparatus 1 includes, in the main storage section 13, call control memories 131-1 to 131-M individually provided for paths between the user terminals and protocol control memories 132-1 to 132-i (where i is a natural number which satisfies i>M) individually provided for the user terminals 2A-1 to 2A-N, 2B-1 to 2B-N.

Meanwhile, the main control section 12 includes a user terminal registration section 124, a communication service providing section 125 and a link changing control section 126.

Here, the user terminal registration section 124 registers user terminal registration information which can enjoy a communication service of a desired form into the call control memories 131-j (where j=1 to M), and the communication service providing section 125 can link, when a trigger signal is inputted through any of the user terminals 2A-1 to 2A-N, 2B-1 to 2B-N, the call control memories 131-j and the protocol control memories 132-J (where J=1 to i) with each other to provide a communication service of a desired form.

Meanwhile, the link changing control section 126 changes, when changing message information to a communication service of a different form is inputted through any of the user terminals 2A-1 to 2A-N, 2B-1 to 2B-N, the mutually linked condition of the pertinent call control memories 131-j and protocol control memories 132-J.

Consequently, with the communication service controlling exchange apparatus 1 shown in FIG. 4, when changing message information to a communication service of a different form is inputted, if the link changing control section 126 changes the mutually linked condition of the pertinent call control memories 131-j and protocol control memories 132-J, then the communication service of the different form can be provided.

Accordingly, with the communication service controlling exchange apparatus 1 described above, also in any communication service which makes use of the public lines 3C-1 to 3C-N, 3D-1 to 3D-N, changing to a communication service of a different form can be performed very readily, and also this changing processing can be performed rapidly.

It is to be noted that the link changing control section 126 described above may change the mutually linked condition of the pertinent call control memories 131-j and protocol control memories 132-J when a trigger signal including changing message information to a communication service of a different form is inputted through any of the user terminals 2A-1 to 2A-N, 2B-1 to 2B-N in a condition wherein the communication service providing means 125 described above is formed.

By this, in the communication service controlling exchange apparatus described above, even if changing message information to a communication service of a different form is included, for example, in an existing trigger signal, since the mutually linked condition of the pertinent call control memories 131-j and protocol control memories 132-J is changed and the communication service of the desired form is provided to each user, this contributes very much to improvement in the universal use of the present apparatus.

Figure 5:
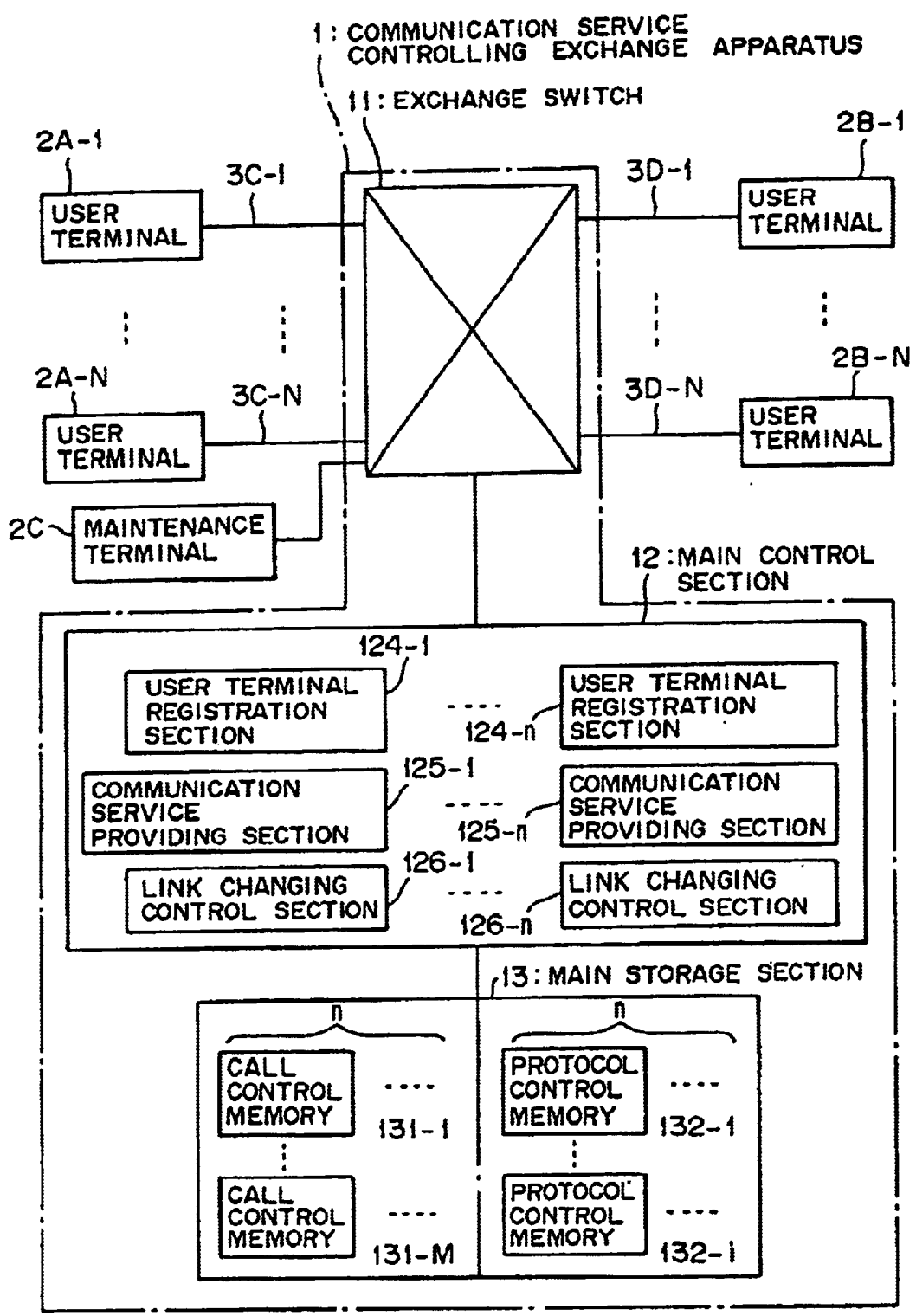

Also FIG. 5 is a block diagram showing a yet further basic construction of the communication service controlling exchange apparatus of the present invention, and also in FIG. 5, reference numeral 1 denotes a communication service controlling exchange apparatus which accommodates a plurality of user terminals 2A-1 to 2A-N, 2B-1 to 2B-N via private lines 3C-1 to 3C-N, 3D-1 to 3D-N, respectively, reference symbol 2C denotes a maintenance terminal, 11 an exchange switch, 12 a main control section, and 13 a main storage section.

And, the communication service controlling exchange apparatus 1 shown in FIG. 5 includes, in the main control section 12, where the plurality of user terminals 2A-1 to 2A-N, 2B-1 to 2B-N are divided into a plurality of user terminal groups (for example, where they are divided into n (n is a natural number) groups such that each opposing ones of the user terminals in FIG. 5 make one group), for the individual user terminal groups, user terminal registration sections 124-1 to 124-n, communication service providing sections 125-1 to 125-n and link changing control sections 126-1 to 126-n similar to those shown in FIG. 4, and includes, in the main storage section 13, call control memories 131-1 to 131-M (M is a number of paths between user terminals for each user terminal group) and protocol control memories 132-1 to 132-i (i is a number of user terminals for each user terminal group).

Consequently, in the communication service controlling exchange apparatus 1 shown in FIG. 5, when changing message information to a communication service of a different form is inputted through any of the plurality of user terminals 2A-1 to 2A-N, 2B-1 to 2B-N, the communication service of the different form can be provided in units of a divided user terminal group by any of the link changing control sections 126-1 to 126-n changing the mutually linked condition of the pertinent call control memories 131-j (where j=1 to M) and protocol control memories 132-J (where J=1 to i).

Accordingly, with the communication service controlling exchange apparatus 1 described above, also in any communication service which makes use of the public lines 3C-1 to 3C-N, 3D-1 to 3D-N, changing to a communication service of any of various kinds of forms can be performed for each user terminal group, and also this changing processing can be performed rapidly.

It is to be noted that, also in this instance, since any of the user terminals which form the individual user terminal groups is capable of serving also as a component of a different one of the user terminal groups in an overlapping relationship, the number of users which can enjoy communication services of a plurality of kinds of forms can be increased very much, and consequently, various requests of users for form changing of a communication service and so forth can be satisfied with a higher degree of certainty.

Further, each of the link changing control sections 126, 126-1 to 126-n described hereinabove with reference to FIGS. 4 and 5 may include registration information condition discrimination section for verifying, based on the changing message information, the call control memories 131-j, the protocol control memories 132-J and the user terminal registration information to discriminate whether or not changing of the mutually linked condition of the pertinent ones of the call control memories 131-j and protocol control memories 132-J is possible.

Consequently, each of the link changing control sections 126, 126-1 to 126-n performs changing of the linked condition only when it is discriminated by the registration information condition discrimination section that changing of the mutually linked condition of the pertinent call control memories 131-j and protocol control memories 132-J is possible.

Accordingly, changing to a communication service of a different form which makes use of the public lines 3C-1 to 3C-N, 3D-1 to 3D-N can be performed with a higher degree of certainty.

Furthermore, each of the link changing control sections 126, 126-1 to 126-n may include a service condition discrimination section for discriminating whether or not changing of the mutually linked condition of the pertinent call control memories 131-j and protocol control memories 132-J is possible in a condition wherein a communication service in operation is continued or in another condition wherein the communication service in operation is temporarily stopped.

By this, if it is discriminated that changing of the mutually linked condition of the pertinent call control memories is possible, then changing to a communication service of a desired form can be performed if each of the link changing control sections 126, 126-1 to 126-n changes, even in a condition wherein a communication service in operation is continued, the mutually linked condition of the pertinent call control memories 131-j and protocol control memories 132-J to establish a mutually linked condition for the communication service of the aimed desired form of the changing.

Accordingly, even in a condition wherein a communication service in operation is continued, changing to a communication service of a different from (which makes use of the public lines) can be performed very readily.

Meanwhile, each of the link changing control sections 126, 126-1 to 126-n may include a reporting section for reporting pertinent changing message information to the other ones of the user terminals.

By this, each of the link changing control sections 126, 126-1 to 126-n can report such changing also to the other user terminals than the user terminal which issued the changing message to the communication service of the different form.

Accordingly, also the other user terminals than the user terminal which issued the changing message information and makes an object of changing to a communication service of a different form can recognize such form changing in advance.

It is to be noted that, particularly if the reporting section includes priority reporting section for reporting, when the changing message information is to be reported to the other user terminals, the changing message information in accordance with a predetermined priority order, then since changing to a communication service of a different form can be reported to the other user terminals in the predetermined order, also the other users can recognize such form changing with certainty.

Furthermore, each of the link changing control section 126, 126-1 to 126-n described above may be constructed so as to perform changing of the mutually linked condition of those of the pertinent call control memories 131-j and protocol control memories 132-J for which changing should be performed newly when there is no change in origination and termination accommodation positions but to perform changing of the mutually linked condition of all of the pertinent call control memories 131-j and protocol control memories 132-J when there is a change in the origination and termination accommodation positions.

By this, unless there is a change in the origination and termination accommodation positions of the user terminals, even if the mutually linked condition of all of the call control memories 131-j and the protocol control memories 132-J is not changed, if each of the link changing control sections 126, 126-1 to 126-n changes the mutually linked condition of those of the pertinent call control memories 131-j and protocol control memories 132-J for which changing should be performed newly, then changing-to the communication service of the different form can be performed.

Further, even if there is a change in the origination and termination accommodation positions, changing to the communication service of the different form can be performed since the mutually linked condition of all of the pertinent call control memories 131-j and protocol control memories 132-J is changed.

In this manner, since each of the link changing control sections 126, 126-1 to 126-n described above can establish a mutually linked condition for a communication service of a different form if the mutually linked condition of those of the pertinent call control memories 131-j and protocol control memories 132-J for which changing should be performed newly is changed, changing to the communication service of the different form (which makes use of the public lines) can be performed using the other call control memories 131-j and protocol control memories 132-J commonly.

Accordingly, changing to a communication service of a different form can be performed rapidly while saving the memory amount necessary for the control memories 131-j remarkably. Further, even if there is a change in the origination and termination accommodation positions, since only it is required to change the mutually linked condition of all of the pertinent call control memories 131-j and protocol control memories 132-J, changing to the communication service of the different form can be performed readily also in this instance.

Furthermore, in the communication service controlling exchange apparatus 1 shown in FIG. 4 or 5, a relief control section may be provided for restoring, if a trouble is detected when the mutually linked condition of the pertinent call control memories 131-j and protocol control memories 132-J is changed by any of the link changing control sections 126, 126-1 to 126-n, a condition prior to the changing. By this, if a trouble occurs upon changing to a communication service of a different form, a communication service of a form prior to the changing can be restored.

Accordingly, even if changing to a communication service of a different form (which makes use of the public lines) cannot be performed, such degradation in the service performance that a user cannot enjoy a communication service for a long time can be prevented with certainty.

And, if the relief control section includes a trouble end reporting section for reporting to that one of the user terminals which sent out the changing message information that the condition prior to the changing has been restored, then the user terminal which sent out the changing message information can recognize whether or not changing to the communication service of the different form has been performed, and consequently, the situation of the form changing can be grasped with certainty.

Furthermore, if the relief control section includes an other user terminal trouble end reporting section for reporting it to the other user terminals that the condition prior to the changing has been restored, then also the other user terminals than the user terminal which sent out the changing message information can recognize whether or not changing to the communication service of the different form has been performed, and consequently, also the other users can grasp the situation of the form changing with certainty.

It is to be noted that, if the other user terminal trouble end reporting section includes a priority reporting section for reporting, when it is to be reported to the other user terminals that the condition prior to the changing has been restored, in accordance with a predetermined priority order, then it can be reported to the other user terminals in the predetermined order that some trouble has occurred in the changing to the communication service of the different form, and consequently, it can be recognized with certainty whether or not changing to the communication service of the different form has been performed.

Further, each of the link changing control sections 126, 126-1 to 126-n described above may include a communication service kind discrimination section for discriminating a kind of a communication service of an aimed form of changing in response to a number of times by which the changing message information to a communication service of a different form is received. By this, changing to the communication service of the desired form can be performed automatically in response to the number of times by which the changing message information is received.

Accordingly, even if the changing message information does not include a kind of a communication service of an aimed form of changing, the form changing can be performed readily.

It is to be noted that each of the link changing control sections 126-1 to 126-n shown in FIG. 5 may be constructed so as to change, when simultaneous changing message information for changing a communication service in operation in each of the user terminal groups simultaneously to a communication service of a different form is inputted as the changing message information, the mutually linked condition of the pertinent call control memories 131-j and protocol control memories 132-J of each of the user terminal groups simultaneously for each of the user terminal groups.

By this, if simultaneous changing message information is inputted, then since each of the link changing control sections 126-1 to 126-n of reach of the user terminal groups described above changes the mutually linked condition of the pertinent call control memories 131-j and protocol control memories 132-J of each of the user terminal groups simultaneously for each of the user terminal groups, the form of a communication service in operation in a plurality of user terminal groups can be changed simultaneously to the communication service of the desired form, and a communication service of a desired form can be provided rapidly in response to a request of a user.

Figure 6:
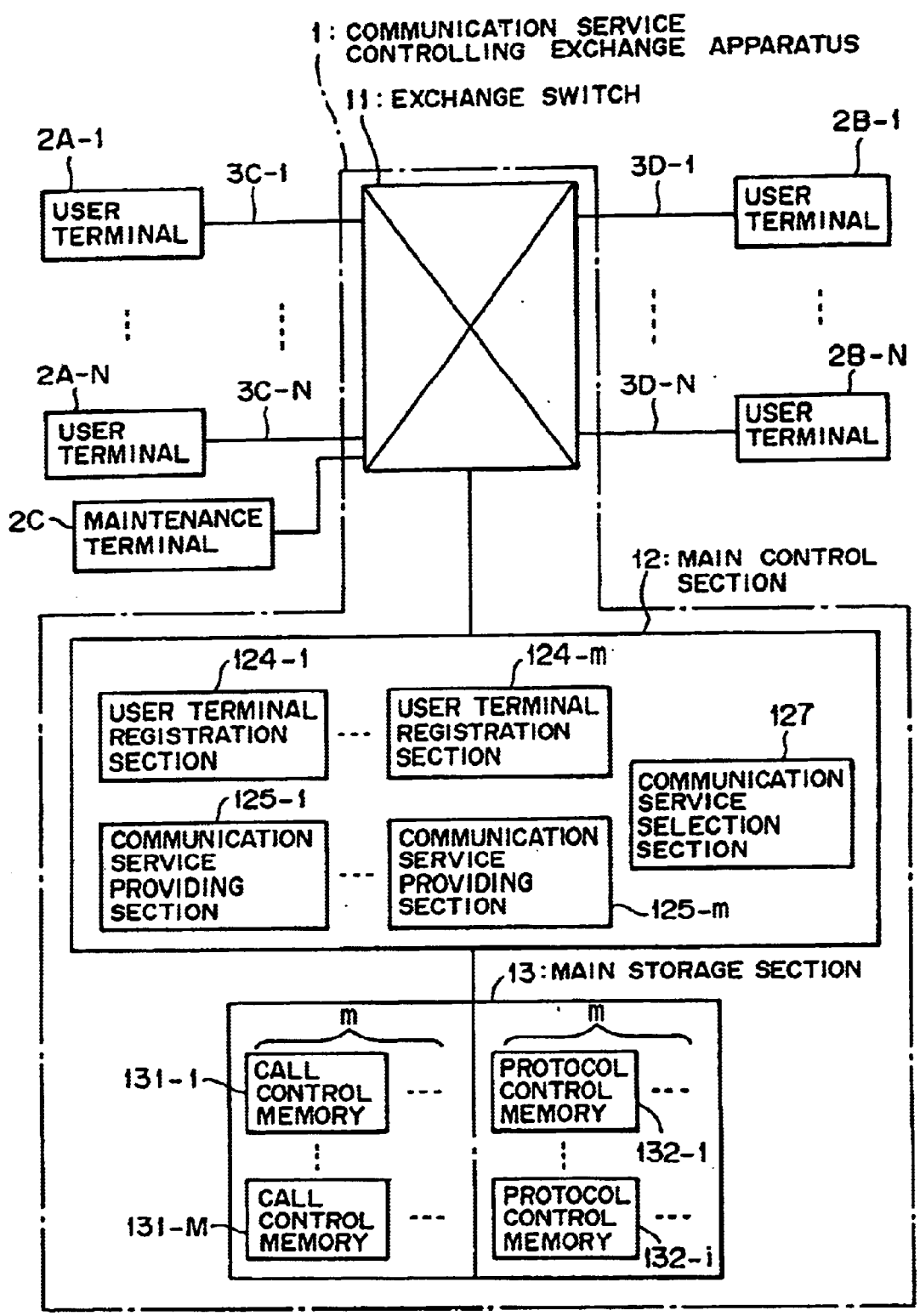

Subsequently, also FIG. 6 is a block diagram showing a yet further basic construction of the communication service controlling exchange apparatus of the present invention, and also a communication service controlling exchange apparatus 1 shown in FIG. 6 accommodates a plurality of user terminals 2A-1 to 2A-N, 2B-1 to 2B-N via private lines 3C-1 to 3C-N, 3D-1 to 3D-N, respectively, and further accommodates a maintenance terminal 2C. It is to be noted that reference numeral 11 denotes an exchange switch, 12 a main control section, and 13 a main storage section.

And, in the present communication service controlling exchange apparatus 1, a single user terminal group is formed from the plurality of user terminals 2A-1 to 2A-N accommodated, and in the main storage section 13, for each of communication services of a plurality of kinds (for example, m kinds) of forms, call control memories 131-1 to 131-M (where M is a number of paths between user terminals) individually provided for paths between the user terminals and protocol control memories 132-1 to 132-i provided for the individual user terminals 2A-1 to 2A-N. 2B-1 to 2B-N (where i is a number of user terminals) are provided.

Further, the main control section 12 includes user terminal registration sections 124-1 to 124-m and communication service providing sections 125-1 to 125-m for m kinds, and further includes a communication service selection section 127.

Here, the user terminal registration sections 124-1 to 124-m register user terminal registration information which can enjoy a communication service of a corresponding form into the corresponding call control memories 131-j (where j=1 to M), and the communication service providing section 125-1 to 125-m link, when a trigger signal is inputted through any of the user terminals 2A-1 to 2A-N, 2B-1 to 2B-N, the call control memories 131-j and the protocol control memories 132-J (where J=1 to i) with each other so that they can provide a communication service of the corresponding form.

Consequently, in the communication service controlling exchange apparatus 1 described above, since the communication service providing sections which can provide a communication service of a corresponding form are formed by linking the communication control memories 131-j and protocol control memories 132-J with each other when a trigger signal is inputted, communication services of a plurality of kinds of forms which make use of the public lines can be provided very readily without changing the mutually linked condition of the communication control memories 131-j and protocol control memories 132-J.

Meanwhile, the communication service selection section 127 selects, when changing message information to a communication service of a different form is inputted through any of the user terminals 2A-1 to 2A-N, 2B-1 to 2B-N, one of the communication service providing section 125-1 to 125-m which corresponds to the communication service of the aimed form of the changing.

Consequently, also in the communication service controlling exchange apparatus 1 which makes use of the public lines 3C-1 to 3C-N, 3D-1 to 3D-N shown in FIG. 6, if changing message information to a communication service of a different form is inputted, the communication service of the desired form is provided only by selecting one of the communication service providing section 125-1 to 125-m which corresponds to the communication service of the aimed form of the changing by means of the communication service selection section 127 without changing the mutually linked condition of the communication control memories 131-j and the protocol control memories 132-J.

Accordingly, with the communication service controlling exchange apparatus 1 described above, a communication service of a desired form which makes use of the public lines 3C-1 to 3C-N, 3D-1 to 3D-N can be provided very rapidly.

Figure 7:
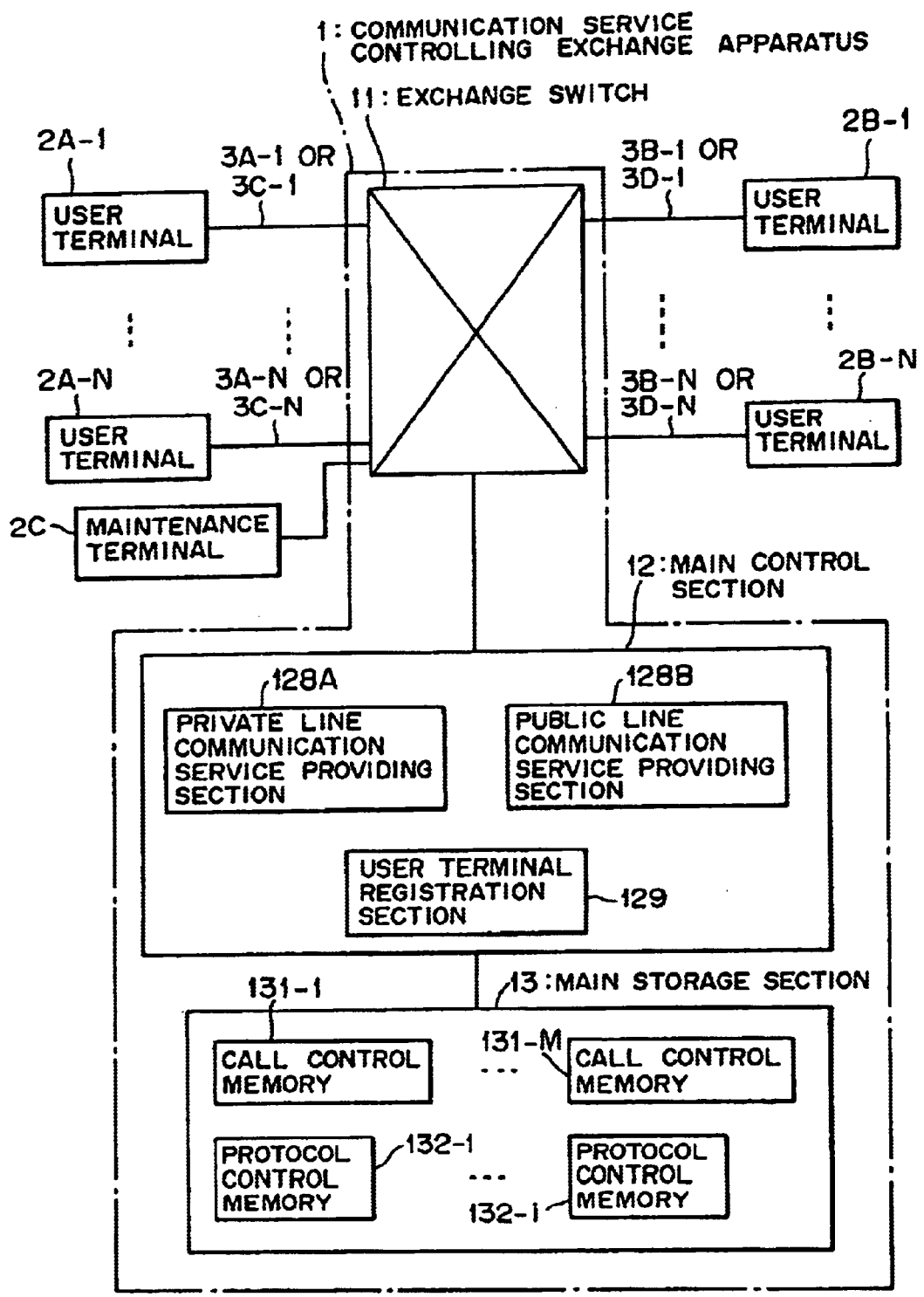

Subsequently, also FIG. 7 is a block diagram showing a yet further basic construction of the communication service controlling exchange apparatus of the present invention, and a communication service controlling exchange apparatus 1 shown in FIG. 7 accommodates a plurality of user terminals 2A-1 to 2A-N, 2B-1 to 2B-N via private lines 3A-1 to 3A-N, 3B-1 to 3B-N or public lines 3C-1 to 3C-N, 3D-1 to 3D-N, respectively, and further accommodates a maintenance terminal 2C.

Further, also in this instance, the communication service controlling exchange apparatus 1 includes an exchange switch 11, a main control section 12, and a main storage section 13, and the main storage section 13 includes call control memories 131-1 to 131-M (where M is a number of paths between user terminals) individually provided for paths between the user terminals 2A-1 to 2A-N, 2B-1 to 2B-N and protocol control memories 132-1 to 132-i provided for the individual user terminals 2A-1 to 2A-N, 2B-1 to 2B-N (where i is a number of user terminals).

Meanwhile, the main control section 12 includes a private line communication service providing section 128A and further includes a user terminal registration section 129 and a public line communication service providing section 128B.

Here, the private line communication service providing section 128A registers user terminal registration information which can enjoy a communication service of a desired form regarding the private lines 3A-1 to 3A-N, 3B-1 to 3B-N into the call control memories 131-j (where j=1 to M) and links the call control memories 131-j with each other so that a communication service of a desired form regarding the private lines 3A-1 to 3A-N, 3B-1 to 3B-N can be provided.

Meanwhile, the user terminal registration section 129 registers user terminal registration information which can enjoy a communication service of a desired form regarding the public lines 3C-1 to 3C-N, 3D-1 to 3D-N into the call control memories 131-j.

Further, the public line communication service providing section 128B links, when a trigger signal is inputted through any of the user terminals 2A-1 to 2A-N, 2B-1 to 2B-N, the call control memories 131-j and the protocol control memories 132-J (where J=1 to i) with each other so that a communication service of a desire form regarding the public lines 3C-1 to 3C-N, 3D-1 to 3D-N can be provided.

Consequently, in the communication service controlling exchange apparatus 1 shown in FIG. 7, a communication service of a desired form can be provided regarding any of the private lines 3A-1 to 3A-N, 3B-1 to 3B-N and the public lines 3C-1 to 3C-N, 3D-1 to 3D-N by the private line communication service providing section 128A and the public line communication service providing section 128B.

Accordingly, with the communication service controlling exchange apparatus 1 described above, since a communication service of a desired form can be provided for any of the private lines 3A-1 to 3A-N, 3B-1 to 3B-N and the public lines 3C-1 to 3C-N, 3D-1 to 3D-N, the number of communication services which can be provided by the single communication service controlling exchange apparatus 1 increases remarkably.

Figure 8:
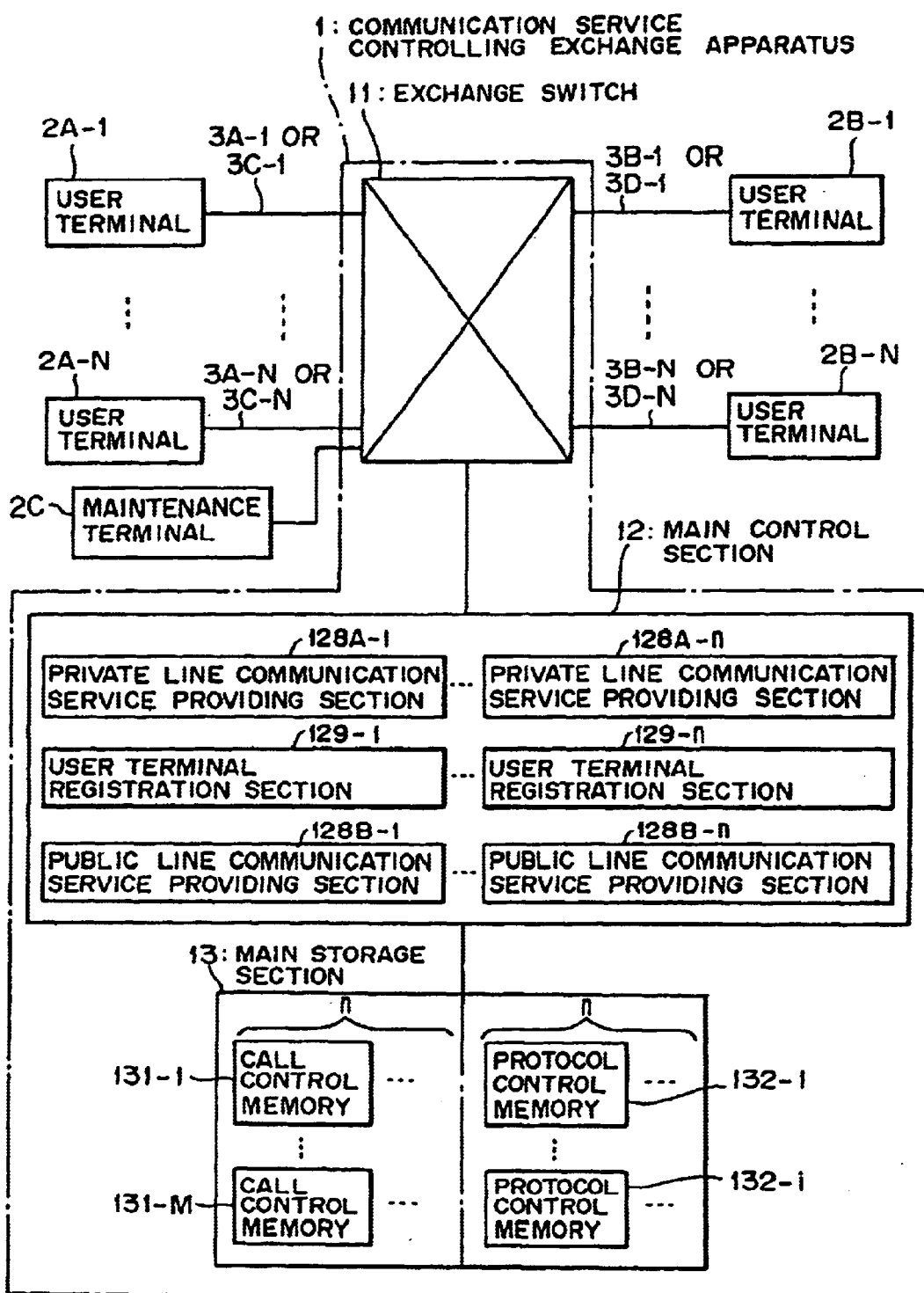

Subsequently, also FIG. 8 is a block diagram showing a yet further basic construction of the communication service controlling exchange apparatus of the present invention, and a communication service controlling exchange apparatus 1 shown in FIG. 8 accommodates a plurality of user terminals 2A-1 to 2A-N, 2B-1 to 2B-N via private lines 3A-1 to 3A-N, 3B-1 to 3B-N or public lines 3C-1 to 3C-N, 3D-1 to 3D-N and further accommodates a maintenance terminal 2C. It is to be noted that, also in this instance, reference numeral 11 denotes an exchange switch, 12 a main control section, and 13 a main storage section.

And, the communication service controlling exchange apparatus 1 shown in FIG. 8 includes, in the main storage section 13, where the plurality of user terminals 2A-1 to 2A-N, 2B-1 to 2B-N are divided into a plurality of user terminal groups (for example, where they are divided into n groups such that each opposing ones of the user terminals with the exchange switch 11 interposed therebetween in FIG. 8 make one group), for the individual user terminal groups, call control memories 131-j and protocol control memories 132-J similar to those shown in FIG. 7 for the n kinds, and further includes private line communication service providing sections 128A-K (where K=1 to n), user terminal registration sections 129-K and public line communication service providing sections 128B-K for the n kinds.

Consequently, in the communication service controlling exchange apparatus 1 shown in FIG. 8, a communication service of a desired form can be provided in units of a divided group regarding any of the private lines 3A-1 to 3A-N, 3B-1 to 3B-N and the public lines 3C-1 to 3C-N, 3D-1 to 3D-N.

Accordingly, with the communication service controlling exchange apparatus 1 described above, changing to a communication service of any of various forms which make use of the private lines 3A-1 to 3A-N, 3B-1 to 3B-N or the public lines 3C-1 to 3C-N, 3D-1 to 3D-N can be performed for each user terminal group, and also this changing processing can be performed band a communication service of a desired form can be provided to each user with a higher degree of flexibility.

Here, the communication service controlling exchange apparatus 1 described above with reference to FIG. 7 or 8 may include a maintenance terminal inputting type line changing control section for changing, when line changing command information regarding a communication service of an arbitrary form is inputted through the maintenance terminal 2C, the mutually linked condition of the pertinent ones call control memories 131-j and protocol control memories 132-J in response to an aimed line kind of changing. By this, changing of a line regarding a communication service of an arbitrary form can be performed in response to line changing command information inputted through the maintenance terminal 2C.

Accordingly, changing of a line regarding a communication service of an arbitrary form can be performed very rapidly.

Further. where the maintenance terminal inputting type line changing control section includes a service condition discrimination section for discriminating whether or not changing of the mutually linked condition of the pertinent call control memories 131-j is possible in a condition wherein a communication service in operation is continued or in another condition wherein the communication service in operation is temporarily stopped, it is possible to change the mutually linked condition of the pertinent call control memories 131-j to change the form of a communication service to be provided even in the condition wherein the communication service in operation is continued or in the condition wherein the communication service in operation is temporarily stopped.

Accordingly, changing of a line regarding a communication service of an arbitrary form can be performed very readily even in a condition wherein a communication service in operation is continued.

Further, the maintenance terminal inputting type line changing control section may include a registration information condition discrimination section for verifying, based on the line changing command information, the call control memories 131-j, the protocol control memories 132-J and the user terminal registration information to discriminate whether or not changing of the mutually linked condition of the pertinent call control memories 131-j or changing of the mutually linked condition of the pertinent call control memories 131-j and protocol control memories 132-J is possible. By this, changing of a linked condition can be performed only when changing of the mutually linked condition of the pertinent call control memories 131-j and protocol control memories 132-J is possible. Accordingly, changing of a line regarding a communication service of an arbitrary form can be performed with a higher degree of certainty.

Further, the maintenance terminal inputting type line changing control section may include a reporting section for reporting line changing message information to the user terminals 2A-1 to 2A-N, 2B-1 to 2B-N. By this, the user terminals 2A-1 to 2A-N, 2B-1 to 2B-N can recognize the line changing. Consequently, the line changing can be recognized in advance by the user terminals 2A-1 to 2A-N, 2B-1 to 2B-N.

It is to be noted that, where the reporting section includes priority reporting section for reporting, when the line changing message information is to be reported to the user terminals 2A-1 to 2A-N, 2B-1 to 2B-N, the line changing message information in accordance with a predetermined priority order, the line changing can be reported to the user terminals 2A-1 to 2A-N, 2B-1 to 2B-N in the predetermined order, and consequently, the users can recognize the line changing with a higher degree of certainty.

Further, the communication service controlling exchange apparatus 1 described hereinabove with reference to FIG. 7 or 8 may include a link changing control section for cooperating with the maintenance terminal inputting type line changing control section described above to perform, when there is a change in origination and termination accommodation positions, changing of the mutually linked condition of all of the pertinent call control memories 131-j and protocol control memories 132-J in response to a line type. By this, even if there is some change in the origination and termination accommodation positions, line changing regarding a communication service of an arbitrary form can be performed.

Accordingly, even if there is a change in origination and termination accommodation positions, line changing regarding a communication service of an arbitrary form can be performed very readily.

Furthermore, the communication service controlling exchange apparatus 1 described hereinabove with reference to FIG. 7 or 8 may include a relief control section for restoring, if a trouble is detected when the mutually linked condition of the pertinent call control memories 131-j is changed by the maintenance terminal inputting type line changing control section described above in accordance with a line type, a condition prior to the changing. By this, even if some trouble is detected upon line changing, a communication service of a line prior to the changing can be restored.

Accordingly, even if changing of a line cannot be performed, such degradation in the service performance that a user cannot enjoy a communication service for a long time can be eliminated with certainty.

Further, where the relief control section includes a maintenance terminal trouble end reporting section for reporting to the maintenance terminal 2C that the condition prior to the changing has been restored, the maintenance terminal 2C can recognize that some trouble has occurred in the line changing, and consequently, the situation of the line changing can be recognized with certainty.

Furthermore, where the relief control section includes a user terminal trouble end reporting section for reporting to the user terminals 2A-1 to 2A-N, 2B-1 to 2B-N that the condition prior to the changing has been restored, also the user terminals 2A-1 to 2A-N, 2B-1 to 2B-N can recognize that some trouble has occurred in the line changing, and consequently, also each user can recognize the situation of the line changing with certainty.

It is to be noted that, where the user terminal trouble end reporting section includes a priority reporting section for reporting, when it is to be reported to the user terminals 2A-1 to 2A-N, 2B-1 to 2B-N that the condition prior to the changing has been restored, in accordance with a predetermined priority order, it can be reported that the condition prior to the changing has been restored, and consequently, the user terminals 2A-1 to 2A-N, 2B-1 to 2B-N can recognize it with a higher degree of certainty that some trouble has occurred in the line changing.

Further, each of the private line communication service providing sections 128A-1 to 128A-N shown in FIG. 8 may be constructed such that, when simultaneous line changing command information for changing a communication service in operation in each of the user terminal groups simultaneously to a communication service of a different line kind is inputted as the line changing command information from the maintenance terminal 2C described above, the mutually linked condition of the pertinent call control memories 131-j and protocol control memories 132-J of each of the user terminal groups is changed in response to the line kind simultaneously for each of the user terminal groups.

By this, if simultaneous line changing command information is inputted, then the maintenance terminal inputting type line changing control section described above changes the mutually linked condition of the pertinent call control memories 131-j and protocol control memories 132-J of each of the user terminal groups simultaneously for each of the user terminal groups.

Accordingly, even when the form (line kind) of a communication service in operation in a plurality of user terminal groups is to be changed to a communication service of a desired form (line kind), a maintenance engineer need not enter a command for form changing for each one user terminal group of an object of the form changing, and the burden of a form changing operation or the like by the maintenance engineer can be reduced further remarkably.

Furthermore, the communication service controlling exchange apparatus 1 shown in FIG. 7 or 8 may include a user terminal inputting type line changing control section for changing, when line changing message information regarding a communication service of an arbitrary form is inputted through any of the user terminals 2A-1 to 2A-N, 2B-1 to 2B-N, the mutually linked condition of the pertinent call control memories 131-j and protocol control memories 132-J in response to an aimed line kind of changing. By this, even when line changing message information is inputted through any of the user terminals 2A-1 to 2A-N, 2B-1 to 2B-N, line changing regarding a communication service of an arbitrary form can be performed.

Accordingly, in response to a line changing request from a user, changing of a line regarding a communication service of an arbitrary form can be performed very rapidly.

Furthermore, where the user terminal inputting type line changing control section includes a service condition discrimination section for discriminating whether or not changing of the mutually linked condition of the pertinent call control memories 131-j and protocol control memories 132-J is possible in a condition wherein a communication service in operation is continued or in another condition wherein the communication service in operation is temporarily stopped, the mutually linked condition of the pertinent call control memories 131-j and protocol control memories 132-J can be changed, even in a condition wherein the communication service in operation is continued or in another condition wherein the communication service in operation is temporarily stopped, to effect changing of a line regarding a communication service of an arbitrary form.

Accordingly, changing of a line regarding a communication service of an arbitrary form can be performed very readily even in a condition wherein the communication service in operation is continued.

Further, where the user terminal inputting type line changing control section includes a registration information condition discrimination section for verifying, based on the line changing message information, the call control memories 131-j, the protocol control memories 132-J and the user terminal registration information to discriminate whether or not changing of the mutually linked condition of the pertinent call control memories 131-j or changing of the mutually linked condition of the pertinent call control memories 131-j and protocol control memories 132-J is possible, the communication service controlling exchange apparatus 1 can perform changing of a line regarding a communication service of an arbitrary form only when changing of the mutually linked condition of the pertinent call control memories 131-j or changing of the mutually linked condition of the pertinent call control memories 131-j and protocol control memories 132-J is possible.

Accordingly, changing of a line regarding a communication service of an arbitrary form can be performed with a higher degree of certainty.

Furthermore, where the user terminal inputting type line changing control section includes a reporting section for reporting, to the other ones of the user terminals than the user terminal which inputted the changing message information, line changing message information corresponding to the changing message information, also the other user terminals can recognize that changing of a line is performed, and consequently, the line changing can be recognized in advance by the other user terminals.

Further, where the reporting section includes a priority reporting section for reporting, when the line changing message information is to be reported to the other user terminals, the line changing message information in accordance with a predetermined priority order, the line changing message information can be reported in the predetermined order to the other user terminals, and consequently, the users can recognize the line changing with a higher degree of certainty.

Furthermore, the communication service controlling exchange apparatus 1 shown in FIG. 7 or 8 may include a link changing control section for cooperating with the user terminal inputting type line changing control section described above to perform, when there is a change in origination and termination accommodation positions, changing of the mutually linked condition of all of the pertinent call control memories 131-j and protocol control memories 132-J in response to a line type. By this, even if there is some change in the origination and termination accommodation positions, line changing can be performed regarding a communication service of an arbitrary form.

Accordingly, even if there is some change in origination and termination accommodation positions, line changing can be performed regarding a communication service of an arbitrary form.

Further, the communication service controlling exchange apparatus 1 shown in FIG. 7 or 8 may include a relief control section for restoring, if a trouble is detected when the mutually linked condition of the pertinent call control memories is changed by the user terminal inputting type line changing control section described above in accordance with a line type, a condition prior to the changing. By this, even if a trouble is detected upon line changing, a communication service regarding a line prior to the changing can be restored.

Accordingly, even when changing of a line cannot be performed, such degradation of the service performance that a user cannot enjoy a communication service for a long time can be eliminated with certainty.

Furthermore, where the relief control section includes a user terminal trouble end reporting section for reporting to that one of the user terminals which transmitted the line changing message information that the condition prior to the changing has been restored, also the user terminal which transmitted the line changing message information can recognize that some trouble has occurred in the line changing, and consequently, the situation of the line changing can be grasped with certainty.

Further, where the relief control section includes an other user terminal trouble end reporting section for reporting to the other user terminals that the condition prior to the changing has been restored, also the other user terminals can recognize that some trouble has occurred in the line changing, and consequently, also the other user terminals can grasp the situation of the line changing with certainty.

It is to be noted that, also in this instance, where the other user terminal trouble end reporting section described above includes a priority reporting section for reporting, when it is to be reported to the other user terminals that the condition prior to the changing has been restored, in accordance with a predetermined priority order, it can be reported to the other user terminals in the predetermined order that the condition prior to the changing has been restored, and consequently, the user terminals can recognize with certainty that some trouble has occurred in the line changing.

Further, the user terminal inputting type line changing control section may be constructed so as to change, when simultaneous line changing message information for changing a communication service in operation in each of the user terminal groups simultaneously to a communication service of a different line kind is inputted as the line changing message information described above, the mutually linked condition of the pertinent call control memories 131-j and protocol control memories 132-J of each of the user terminal groups in response to the aimed line kind of the changing simultaneously for each of the user terminal groups.

By this, if simultaneous line changing message information is inputted, then the user terminal inputting type line changing control section described above can change the mutually linked condition of the pertinent call control memories 131-j and protocol control memories 132-J of each of the user terminal groups in response to the aimed line kind of the changing simultaneously for each of the user terminal groups.

Accordingly, a form (line kind) of a communication service in operation in a plurality of user terminal groups can be changed simultaneously to a communication service of a desired form (line kind) by a user, and the communication service of the desired form can be provided rapidly in response to the request of the user.

Further, the user terminal inputting type line changing control section shown in FIG. 7 may change the mutually link condition of the pertinent control memories 131-j and protocol control memories 132-J in response to an aimed line kind of changing when a trigger signal including line changing message information regarding a communication service of an arbitrary form is inputted through any of the user terminals 2A-1 to 2A-N, 2B-1 to 2B-N.

By this, even if changing message information to a communication service of a desired form regarding a different line is included, for example, in an existing trigger signal, since the mutually linked condition of the pertinent call control memories 131-j and protocol control memories 132-J is changed to provide a communication service of a desired form regarding a different line to each user which makes use of a communication service of a desired form regarding a certain line, this contributes very much to improvement in the universal use of the present apparatus.

Figure 9:
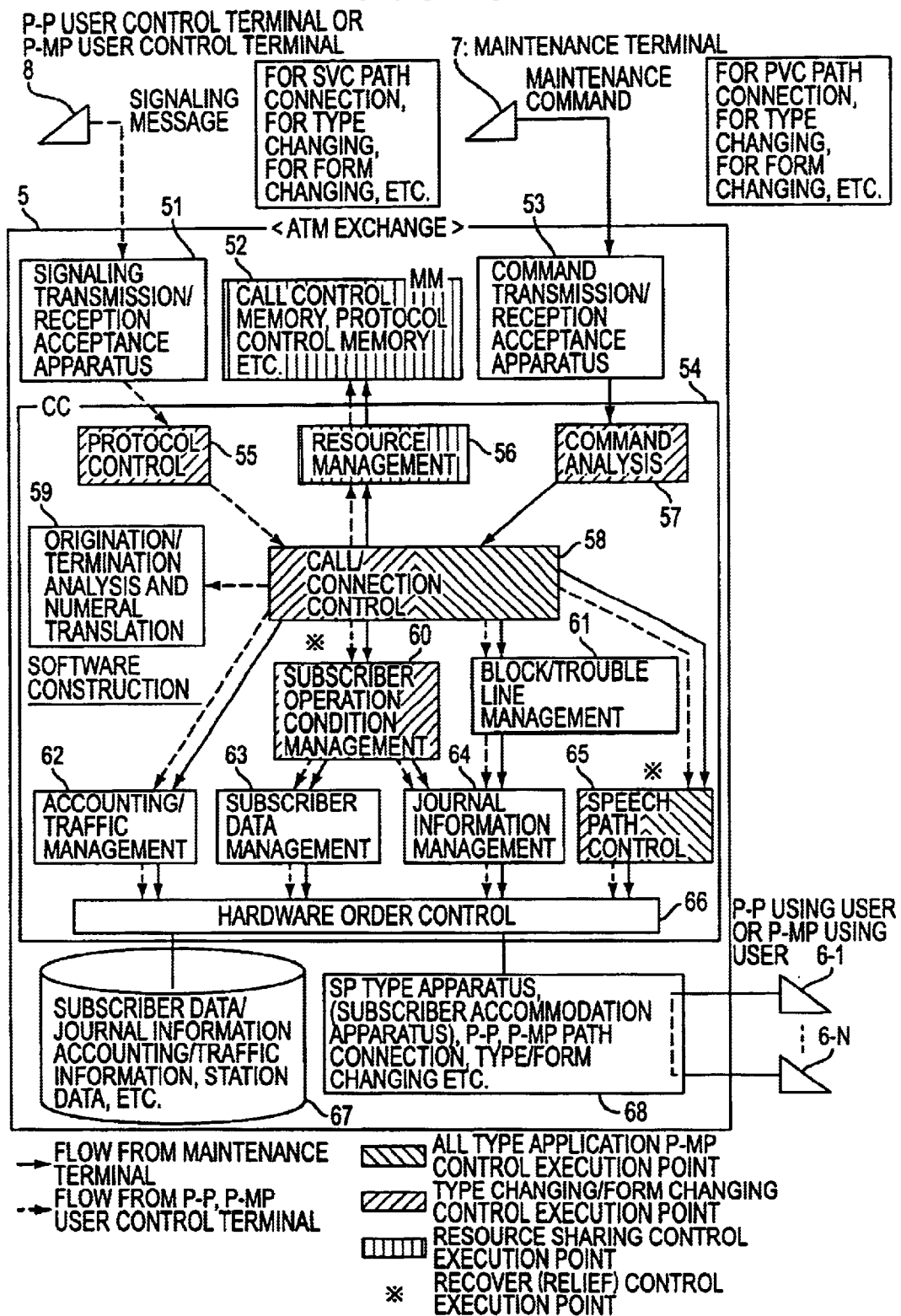
FIG. 9 is a block diagram showing a construction of an ATM exchange as a communication service controlling exchange apparatus according to an embodiment of the present invention.

(B) Description of an Outline of an ATM Exchange as a Communication Service Controlling Exchange Apparatus FIG. 9 is a block diagram showing the construction of an ATM exchange as a communication service controlling exchange apparatus according to an embodiment of the present invention. Referring to FIG. 9, reference numeral 5 denotes an ATM (Asynchronous Transfer Mode: asynchronous transfer mode) exchange which accommodates a plurality of user terminals 6-1 to 6-N (where N is a natural number) via private lines or a public network, and reference numerals 7 and 8 denote a maintenance terminal and a user control terminal accommodated in the ATM exchange 5, respectively. It is to be noted that it is presumed that each of the user terminals 6-1 to 6-N can be used in any service form of the point to point (P-P) service and the point to multipoint (P-MP) service and of the PVC service and the SVC service.

Figure 99:
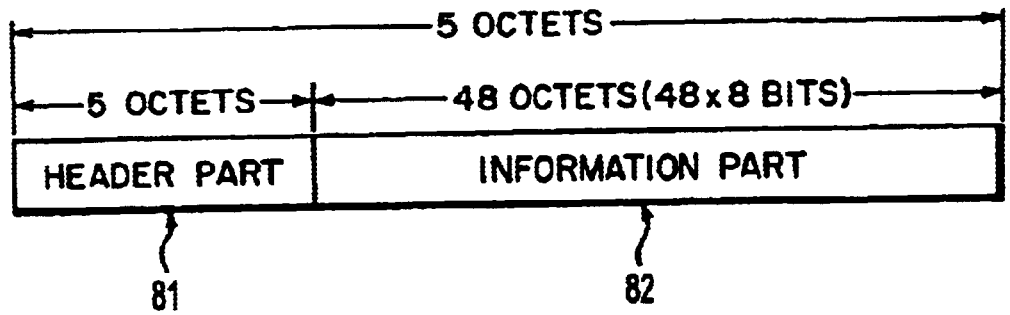
FIG. 99 is a diagrammatic view showing an example of format of an ATM cell.

Here, the ATM exchange (communication service controlling exchange apparatus) 5 is an exchange which can control the condition of a communication service to be provided to each of the user terminals 6-1 to 6-N accommodated therein by effecting switching control by an ATM switch for data called ATM cell of 53 bytes wherein, as shown in FIG. 99, a control information part (header part) 81 of 5 bytes (octets) designating a transfer destination and so forth is added to an information (data part) 82 wherein digital information to be communicated between the user terminals 6-1 to 6-N is delimited into sections of a fixed length of 48 bytes (48 octets: 1 octet is 8 bits), and by designating transfer destinations in all sections of 48 bytes delimited from the digital information, data (ATM cells) can be communicated continuously and asynchronously.

It is to be noted that the header part 81 mentioned above has, in a user-network interface (UNI), the following informations (1) to (7) designated therein as shown in FIG. 100(a), but in an intranetwork-internetwork interface (NNI), the following informations (2) to (7) designated therein as shown in FIG. 100(b).

(1) GFC (Generic Flow Control): flow controlling bits between a network and a terminal (2) VPI (Virtual Path Identifier): identifier for identification of a bundle (VP) of virtual channels (3) VCI (Virtual Channel Identifier): identifier for identification of a virtual channel corresponding to a logic channel (4) PT (Payload Type): bit representing a type of information accommodated in the data part 82 (user information/for network internal use, etc)

(5) CLP (Cell Loss Priority): bit indicating a priority degree of loss of the cell (discard allowed/discard inhibited)

(6) HEC (Header Error Control): bits for detection of a transmission error (error correction of 1 bit is performed)

(7) Res (Reserved): reserved bits

Meanwhile, the maintenance terminal 7 inputs to the ATM exchange 5 various maintenance commands for instruction for setting of a path between the user terminals 6-1 to 6-N, changing to a type such as the broadcast type, the composite type or the multipoint type, changing of the service form between the point to point service and the point to multipoint service or changing of the form (line) between the PVC service and the SVC service as described hereinabove.

Further, the user control terminal 8 delivers an instruction similar to a maintenance command inputted from the maintenance terminal 7 to the ATM exchange 5 using a signaling message for exclusive use or another signaling message wherein a changing instruction is incorporated in a bearer (Bearer) information element included in an existing "SETUP" signal or "ADD PARTY" signal or a like signal via a public network. It is to be noted that one of the user terminals 6-1 to 6-N may have the function of the user control terminal 8.

By the way, the "SETUP" signal mentioned above is a signal which has various information elements ("Protocol discriminator", "Call reference", "Called party number", "Endpoint reference" and so forth) including the bearer information element, and it is divided for each 48 octets and sent out as an ATM cell to the ATM exchange 5.

Particularly, the bearer information element (Broadband bearer capability) included in the "SETUP" signal has such a format as shown in FIG. 105 as defined in "ATM Forum V3.0", and indicates with the first to eighth bits ("01111010") of the first octet thereof that it itself is a bearer information element. Further, with the first and second bits ("User plane connection configuration") of the sixth octet, two kinds of forms of communication services (point to point: "00", and point to multipoint: "01") are indicated at the current point of time.

Then, in the present embodiment, in addition to the first and second bits of the sixth octet of the bearer information element, the succeeding third to fifth bits (reserved bits: refer to a portion with slanting lines of FIG. 105) are used such that, by designating a form (type) of a communication service to which the service should be changed and sending out it a "SETUP" signal to the ATM exchange 5 as hereinafter described, changing control to various forms of communication services can be executed.

It is to be noted that also the bearer information element in the "ADD PARTY" signal has a format basically similar to the format described above and can designate a form (type) of a communication service to which the communication service should be changed as hereinafter described using reserved bits thereof.

Subsequently, in the ATM exchange 5 described hereinabove, reference numeral 51 denotes a signaling transmission/reception acceptance apparatus, 52 a main storage section (MM), 53 a command transmission/reception acceptance apparatus, and 54 a central control apparatus (CC).

Here, the signaling transmission/reception acceptance apparatus 51 accepts a signaling message for type changing or for form changing to be transmitted from or received by the user control terminal 8 and delivers, by a signaling message, a report of a change of a type or a change of a form or a report representing that some trouble has occurred. The main storage section 52 stores software for causing the central control apparatus 54, which will be hereinafter described, to control the entire ATM exchange 5 and stores call control memories provided for individual paths set between the user terminals 6-1 to 6-N (including also the user control terminal 8). protocol control memories provided individually for the user terminals 6-1 to 6-N (including also the user control terminal 8).

It is to be noted that the call control memories mentioned above are provided irrespective of whether the service form is the PVC service or the SVC service while the protocol control memories are provided where the service form is the SVC service. Details of the call control memories and the protocol control memories will be hereinafter described.

Further, the command transmission/reception acceptance apparatus 53 accepts command information such as a maintenance command transmitted to or received from the maintenance terminal 7. The central control apparatus 54 performs control of the entire ATM exchange 5 such as operation of various service forms and maintenance.

To this end, the central control apparatus 54 includes a protocol control section 55, a resource management section 56, a maintenance command analysis section 57, a call-connection control section 58, a origination/termination analysis-numeral translation section 59, a subscriber operation condition management section 60, a block-trouble line management section 61, an accounting/traffic management section 62, a subscriber data management section 63, a journal information management section 64, a speech path control section 65, a hardware order control section 66, a data base 67 and a subscriber accommodation apparatus 68 [SP type apparatus such as a speech path control apparatus (Speech Path controller)].

Here, the protocol control section 55 performs an analysis of a signaling message (connection of a path in the SVC service, changing of the type such as changing from the broadcast type to the composite type, changing of the form between the point to point form and the point to multipoint form or changing of a line between the SVC service and the PVC service) received from the user control terminal 8, a status analysis of a protocol, instruction of acquisition/release of aprotocol control memory, editing of a signaling message for response to the user control terminal 8 and so forth.

Meanwhile, the resource management section 56 effects resource sharing control such as resource sharing management and existing resource re-utilization of resources (call control memories, protocol control memories and so forth) which are produced in events such as control for conformity with service forms of all types of the point to multipoint service [registration, path setting and so forth of the user terminals 6-1 to 6-N (including also the user control terminal 8) which receive services form of various types], type changing control, and form changing control.

Further, the maintenance command analysis section 57 performs an analysis of various maintenance commands (path connection in the PVC service, type changing, form changing or the like) thrown in from the maintenance terminal 7, editing of messages for the maintenance terminal 7 in response to various maintenance commands, and so forth. The call/connection control section 58 performs general management regarding calls and connections such as a call scenario group/connection scenario group indicating control procedures for the individual types of services of the point to multipoint service, a scenario group/connection scenario group indicating control procedures regarding type changing/form changing, management of a call condition, instruction of acquisition/release of a call control memory, instruction of setting/changing of a speech path, instruction of setting/changing of subscriber data and instruction of an analysis of an originating or terminating subscriber.

The origination/termination analysis and numeral translation section 59 performs, in response to a request from the call/connection control section 58, an analysis (numerical translation) of a telephone number of an originating source and a terminating destination based on, for example, a signaling message from the user control terminal 8. The subscriber operation condition management section 60 performs management of operation conditions/types/forms of the individual user terminals 6-1 to 6-N (including also the user control terminal 8), subscriber data upon type changing/form changing, setting/changing/change history management of journal information (history information of command information, changing information and so forth), data relief of subscriber data/journal information upon form changing/form change trouble, and so forth.

Furthermore, the block/trouble line management section 61 supervises a blocking (congestion) condition or a trouble of a line and performs switching of the line in response to this. The accounting/traffic management section 62 supervises and manages charge information to a user which enjoys a service or a communication amount (traffic) of services being in operation. The subscriber data management section 63 and the journal information management section 64 store subscriber data, journal information and so forth received from the subscriber operation condition management section 60 into the data base 67 via the hardware order control section 66.

Further, the speech path control section 65 performs management of speech path information [band to be used (transmission rate), VPI/VCI or the like] necessary for path connection/changing for each of the user terminals 6-1 to 6-N, setting/changing/change history management of a speech path upon type changing/form changing, speech path relief upon type changing/form changing trouble and so forth.

Furthermore, the hardware order control section 66 totally controls hardware connected to the central control apparatus 54 such as the data base 67 and the subscriber accommodation apparatus 68. The data base 67 stores various data such as subscriber data, journal information, accounting information, traffic data and station data. The subscriber accommodation apparatus 68 accommodates the user terminals 6-1 to 6-N and performs various processes such as path connection in the point to point or point to multipoint service form and changing of the type/form of a service for the user terminals 6-1 to 6-N under the control of the central control apparatus 54.

Figure 72:
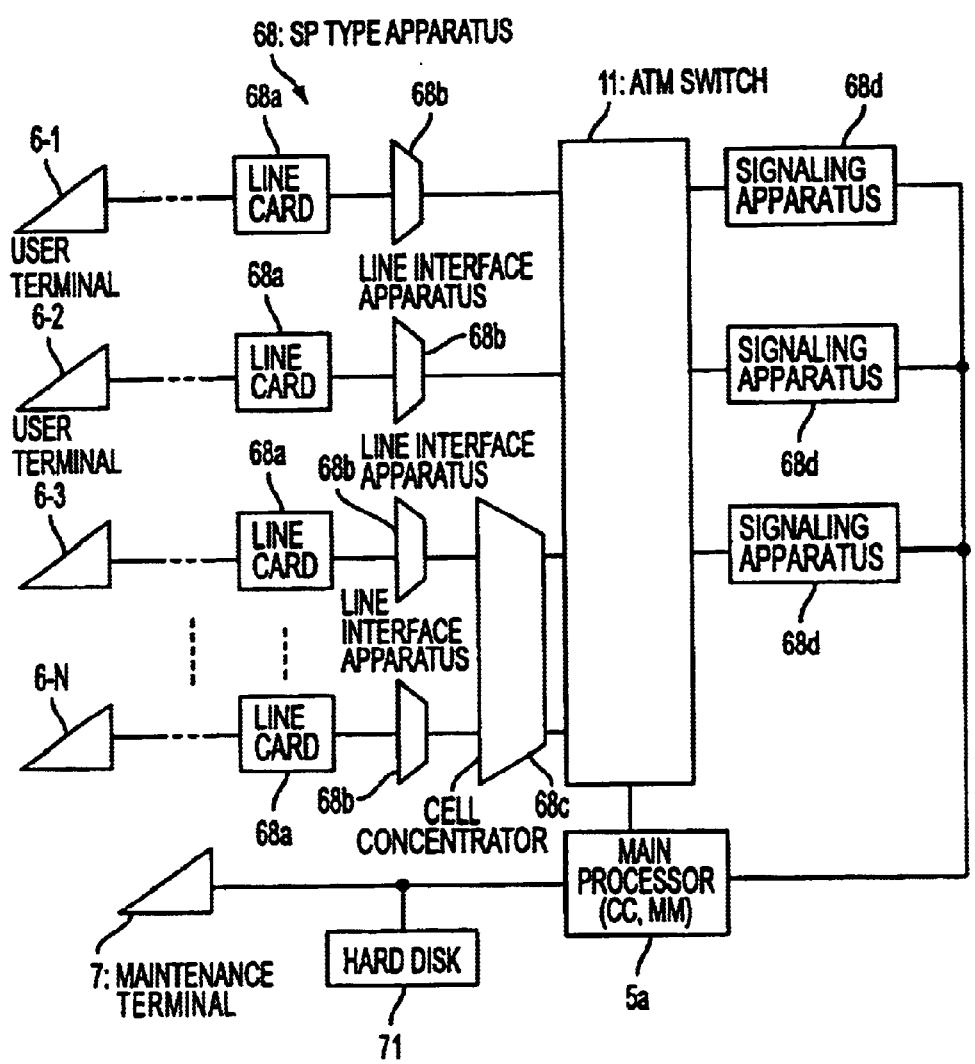
FIG. 72 is a block diagram showing an example of hardware construction of the ATM exchange of the present embodiment.

It is to be noted that FIG. 72 is a block diagram showing an example of hardware construction of the ATM exchange 5 described above. As shown in FIG. 72, the ATM exchange 5 includes, as hardware thereof, an ATM switch (exchange switch) 11, and a main processor 5a which includes the main storage section (MM) 52 and the central control apparatus (CC) 54 mentioned hereinabove. The ATM exchange 5 further includes, as the subscriber accommodation apparatus 68 mentioned hereinabove, line cards 68a, line interfaces 68b and a cell concentrator 68c, as well as signaling apparatus 68d and a hard disk 71 for the maintenance terminal 7.

Here, in the subscriber accommodation apparatus 68, the line cards 68a individually accommodate at least a plurality of user terminals 6-1 to 6-N. The line interfaces 68b accommodate a plurality of lines from the line cards 68a and perform accounting control for ATM cells communicated between the ATM exchange 5 and the user terminals 6-1 to 6-N, alarm generation control when a trouble occurs and some other control. The cell concentrator 68c accommodates a plurality of ones of the line interfaces 68b. Each of the signaling apparatus 68d performs signal processing in response to an instruction from the main processor 5a.

Figure 10:
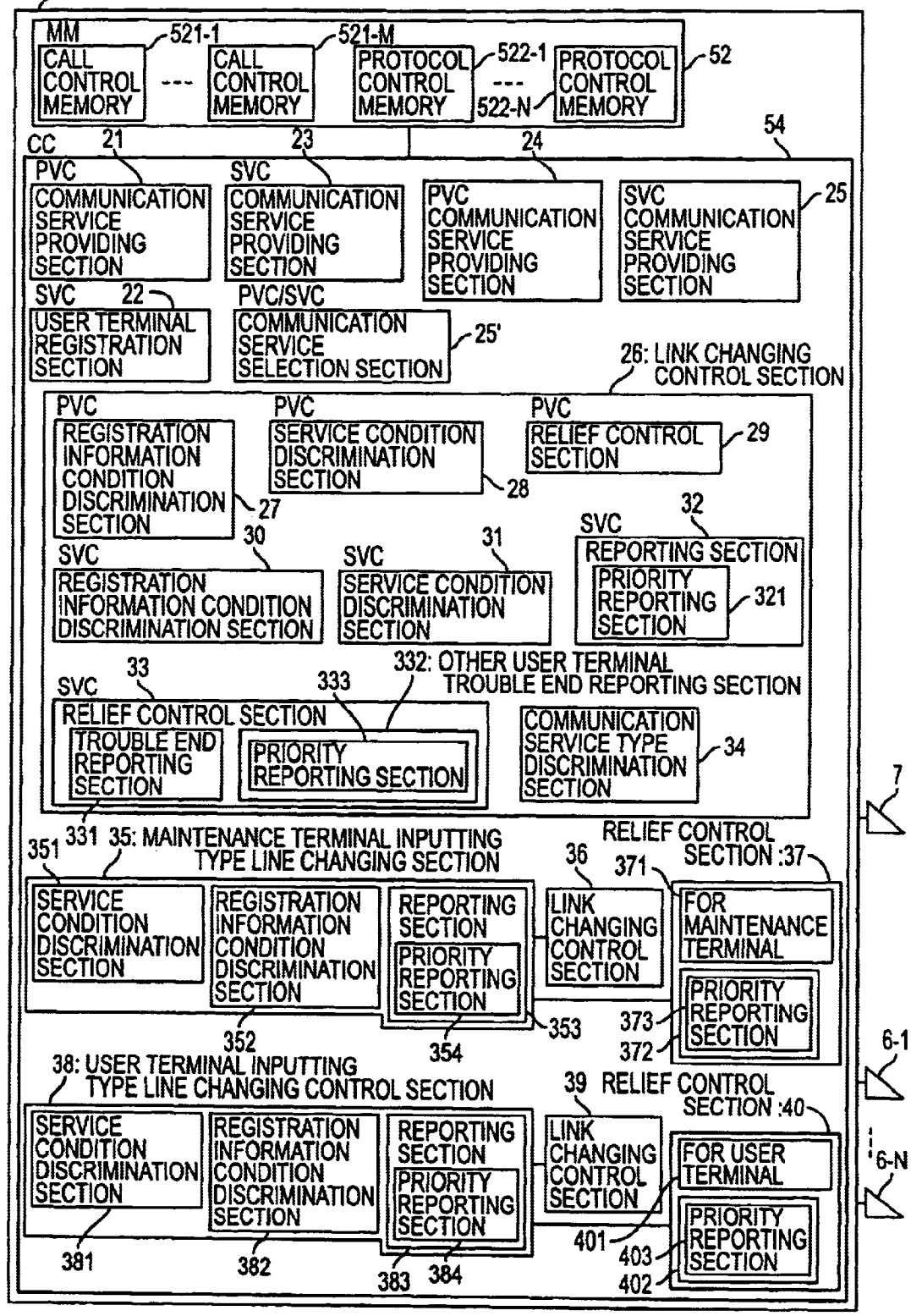
FIG. 10 is a block diagram schematically illustrating various functions of the ATM exchange as the embodiment of the present invention.

FIG. 10 is a block diagram schematically indicating various functions of the ATM exchange 5. Referring to FIG. 10, reference symbols 521-1 to 521-M (where M is a natural number) denote call control memories provided individually for paths between user terminals, 522-1 to 522-N (where N is a natural number which satisfies N>M) denote protocol control memories provided for the user terminals 6-1 to 6-N, respectively, reference numerals 21 and 23 denote each a communication service providing section, reference symbol 22 denotes a user terminal registration section, 24 a communication service providing section for a private line (for the PVC service), 25 a communication service providing section for a public network (for the SVC service), 25' a communication service selection section, and 26 a link changing control section.

Here, the communication service providing section 21 registers, where the user terminals 6-1 to 6-N are accommodated in it via private lines (where the PVC service is to be provided to the user terminals 6-1 to 6-N), user terminal registration information of those user terminals which can enjoy a desired form of communication service into the call control memories 521-i (where i=1 to M) and links the call control memories 521-i to each other so that it can provide the desired form of communication service.

The link changing control section 26 changes, when changing command information to another form of communication service is inputted thereto via the maintenance terminal 7, the mutually linked condition of the pertinent call control memories 521-i.

Thus, in the ATM exchange 5, when the changing command information to another form of communication service is inputted via the maintenance terminal 7, the link changing control section 26 changes the mutually linked condition of the pertinent call control memories 521-i so that the another form of communication service can be provided.

It is to be noted that, in this ATM exchange 5, the user terminals 6-1 to 6-N may be divided into a plurality of user terminal groups, for each of which a communication service providing section 21, a link changing control section 26 and call control memories 521-i are provided. In this instance, when a maintenance command for changing to another form of communication service is inputted via the maintenance terminal 7, since the link changing control section 26 changes the mutually linked condition of the pertinent call control memories 521-i in units of a user terminal group, changing to another form of communication service can be performed for a limited user terminal group.

Further, in this instance, the user terminals 6-1 to 6-N which construct each user terminal group may serve also as components of a different user terminal group in an overlapping relationship.

By the way, where the user terminals 6-1 to 6-N are accommodated in the ATM exchange 5 via private lines and enjoy the PVC service in this manner, the link changing control section 26 includes a registration information condition discrimination section 27, a service condition discrimination section 28 and a relief control section 29.

Here, the registration information condition discrimination section 27 verifies the call control memories 521-i and user terminal registration information based on changing command information inputted thereto via the maintenance terminal 7 to discriminate whether or not it is possible to change the mutually linked condition of the pertinent call control memories 521-i from among the call control memories 521-i. Even if a changing command to another form of communication service is inputted via the maintenance terminal 7, changing to another form of communication service is performed only when changing of the mutually linked condition of the pertinent call control memories 521-i from among the call control memories 521-i is possible by the registration information condition discrimination section 27.

Meanwhile, the service condition discrimination section 28 discriminates, in a condition wherein a communication service in operation is continued, or in another condition wherein a communication service in operation is stopped temporarily, whether or not it is possible to change the mutually linked condition of the pertinent call control memories 521-i from among the call control memories 521-i. If it is discriminated by the service condition discrimination section 28 that it is possible to change the mutually linked condition of the corresponding call control memories 521-i, then even in a condition wherein a communication service in operation is continued, changing to another form of communication service is performed.

Further, the relief control section (portion for restoration to a condition prior to a change) 29 returns, if a trouble is detected when the mutually linked condition of the pertinent call control memories 521-i is changed by the link changing control section 26, all information involved in the change such as the changed call control memories 521-i to that of a condition prior to the change. Consequently, when there is a trouble upon changing to another form of communication service, the communication service in the condition prior to the change can be restored.

It is to be noted that, when there is no change in origination and termination accommodation positions of the user terminals 6-1 to 6-N, the link changing control section 26 executes changing of the mutually linked condition of those of the pertinent call control memories 521-i which are to be changed newly, but when there is a change in origination and termination accommodation positions, the link changing control section 26 executes changing of the mutually linked condition of all of the pertinent call control memories 521-i.

Accordingly, unless there is a change in origination and termination accommodation positions of the user terminals 6-1 to 6-N, changing to another form of communication service can be performed by changing the mutually linked condition of some of the corresponding call control memories 521-i without the necessity for changing the mutually linked condition of all of the call control memories 521-i, and even where there is a change in origination and termination accommodation positions of the user terminals 6-1 to 6-N, changing to another form of communication service can be performed by changing the mutually linked condition of all of the corresponding call control memories 521-i.

Further, as hereinafter described, when a simultaneous changing command for changing a communication service in operation in each of the user terminal groups simultaneously to another form of communication service is inputted as a changing command from the maintenance terminal 7 mentioned hereinabove, the link changing control section 26 repetitively changes the mutually linked condition of the pertinent call control memories 521-i of each of the user terminal groups for each user terminal group to simultaneously change the mutually linked conditions.

It is to be noted that the ATM exchange 5 described above may be constructed such that a single user terminal group is constructed from the user terminals 6-1 to 6-N and the call control memories 521-i are provided and the communication service providing section 21 is formed individually for a plurality of kinds of forms of communication services such that, when a changing signaling message to another form of communication service is inputted via one of the user terminals 6-1 to 6-N, one of the communication service providing sections 23 which corresponds to the communication service of the form to which the communication service is to be changed is selected by the communication service selection section 25'.

In short, where resources such as the call control memories 521-i are prepared individually for a plurality of kinds of communication services, the ATM exchange 5 can provide a desired form of communication service only by selecting one of the communication service providing sections 23 which corresponds to a communication service of a form to which the communication service should be changed by means of the communication service selection section 25' without changing the linked condition of the call control memories 521-i.

The user terminal registration section 22 registers, where the user terminals 6-1 to 6-N are accommodated in the ATM exchange 5 via a public network (that is, where the SVC service is to be provided to the user terminals 6-1 to 6-N), user terminal registration information which can enjoy a desired form of communication service into the call control memories 521-i.

Meanwhile, the service condition discrimination section 28 can mutually link, when a trigger signal such as the "SETUP" signal or "ADD PART" signal is inputted as hereinafter described via any of the user terminals 6-1 to 6-N, the call control memories 521-i and the protocol control memories 522-j (where j=1 to N) to provide a desired form of communication service.

To this end, in this instance, the link changing control section 26 is constructed such that, when a signaling message (changing message information) for changing to another form of communication service as hereinafter described via any of the user terminals 6-1 to 6-N, it changes the mutually linked condition of the pertinent call control memories 521-i and protocol control memories 522-j. Consequently, when a changing signaling message is inputted via any of the user terminals 6-1 to 6-N, if the link changing control section 26 changes the mutually linked condition of the pertinent call control memories 521-i and protocol control memories 522-j, then another form of communication service can be provided.

It is to be noted that the changing signaling message mentioned above may be included otherwise in a bearer information element of the "SETUP" signal or "ADD PARTY" signal as hereinafter described. Also in this instance, the link changing control section 26 provides another form of communication service by changing the mutually linked condition of the pertinent call control memory 521-i and protocol control memories 522-j.

Further, also in this instance, if the ATM exchange 5 is constructed such that the the user terminals 6-1 to 6-N are divided into a plurality of user terminal groups, for each of which call control memories 521-i and protocol control memories 522-j are provided and it includes such a user terminal registration section 22, a communication service providing section 23 and a link changing control section 26 as described above, then when a signaling message for changing to another form of communication service is inputted via the user terminals 6-1 to 6-N, the link changing control section 26 can perform changing to another form of communication service for a limited user terminal group by changing the mutually linked condition of the pertinent call control memories 521-i and protocol control memories 522-j.

Also in this instance, the user terminals-6-1 to 6-N which construct each of the user terminal groups mentioned above may serve in an overlapping relationship as components of a different user terminal group.

Further, where the user terminals 6-1 to 6-N are accommodated via a public network (where the SVC service is to be provided) as described above, the link changing control section 26 includes a registration information condition discrimination section 30, a service condition discrimination section 31, a reporting section 32, a relief control section 33 and a communication service type discrimination section 34.

Here, the registration information condition discrimination section 30 verifies, based on a changing signaling message inputted thereto via one of the user terminals 6-1 to 6-N, the call control memories 521-i, the protocol control memories 522-j and user terminal registration information to discriminate whether it is possible to change the mutually linked condition of the pertinent call control memories 521-i and protocol control memories 522-j. Only when it is discriminated by the registration information condition discrimination section 30 that it is possible to change the mutually linked condition of the corresponding call control memories 521-i and protocol control memories 522-j, changing of the mutually linked condition of the pertinent call control memories 521-i and protocol control memories 522-j can be performed.

The service condition discrimination section 31 discriminates whether or not it is possible to change the mutually linked condition of the pertinent call control memories 521-i and protocol control memories 522-j in a condition wherein a communication service in operation is continued or in another condition wherein a communication service in operation is temporarily stopped. If it is discriminated by the service condition discrimination section 31 that it is possible to change the mutually linked condition of the pertinent call control memories 521-i and protocol control memories 522-j, then changing to a desired form of communication service can be performed even in a condition wherein the communication service in operation is continued.

Further, the reporting section 32 reports changing message information corresponding, to a changing signaling message to the user terminals other than a user terminal which has originated the changing signaling message. Thus, by the reporting section 32, changing of a communication service can be reported also to the other user terminals.

It is to be noted that the reporting section 32 particularly includes a priority reporting section 321 such that, when changing message information is to be reported to the other user terminals, it is reported in a predetermined priority order such as a responding order of a changing signaling message by the priority reporting section 321.

Meanwhile, the relief control section (portion for restoration of a condition prior to a change) 33 returns, if a trouble is detected when the mutually linked condition of the corresponding call control memories 521-i and protocol control memories 522-j is changed by the link changing control section 26, all information involved in such changing of the communication service to that prior to the changing. Consequently, if a trouble is detected upon changing to another form of communication service by the relief control section 33, the communication service prior to the changing is restored.

Then, the relief control section 33 includes a trouble end reporting section 331 and an other user terminal trouble end reporting section 332. Here, the trouble end reporting section 331 reports to a user terminal which has sent out changing message information that a condition prior to the changing has been restored. Thus, by this trouble end reporting section 331, it can be recognized by the user terminal which has sent out the changing message information whether or not changing to another form of communication service has been performed.

Further, the other user terminal trouble end reporting section 332 reports also to the other user terminals mentioned above that the condition prior to the changing has been restored. Thus, by this other user terminal trouble end reporting section 332, it can be recognized also by the user terminals other than the user terminal which has sent out the changing message information that changing to another form of communication service has been performed.

It is to be noted that the other user terminal trouble end reporting section 332 includes a priority reporting section 333 which reports, when to report changing message information to the other user terminals, the changing message information in accordance with a predetermined priority order. Thus, by this priority reporting section 333, it can be reported to the other user terminals in a predetermined order that some trouble has occurred in changing to another form of communication service.

Further, the communication service type discrimination section 34 discriminates a type of a communication service of a form to which the communication service should be changed in response to a number of times by which changing message information to another form of communication service is received. Consequently, changing to a desired form of communication service can be performed automatically in response to a number of times by which changing message information is received as hereinafter described.

It is to be noted that, also in this instance, when there is no change in origination and termination positions of the user terminals 6-1 to 6-N, the link changing control section 26 executes changing of the mutually linked condition of those of the pertinent call control memories 521-i and protocol control memories 522-j which are to be newly changed from among the call control memories 521-i and protocol control memories 522-j, but when there is a change in origination and termination positions of the user terminals 6-1 to 6-N, the link changing control section 26 executes changing of the mutually linked condition of all of the pertinent call control memories 521-i and protocol control memories 522-j.

Consequently, unless there is a change in origination and termination accommodation positions of the user terminals 6-1 to 6-N, the link changing control section 26 can perform changing to another form of communication service by changing the mutually linked condition of those of the pertinent call control memories 521-i and protocol control memories 522-j which are to be changed newly without changing the mutually linked condition of all of the call control memories 521-i and protocol control memories 522-j.

On the other hand, also when there is a change in origination and termination accommodation positions of the user terminals 6-1 to 6-N, changing to another form of communication terminal is performed if the mutually linked condition of all of the pertinent call control memories 521-i and protocol control memories 522-j is changed.

It is to be noted that, if a simultaneous changing signaling message for changing a communication service in operation in each user terminal group simultaneously to another form of communication service is inputted as the changing signaling message described hereinabove, then the link changing control section 26 described above repetitively changes, for each user terminal group, the mutually linked condition of the pertinent call control memories 521-i and protocol control memories 522-j of each user terminal group to simultaneously change the same as hereinafter described.

Further, also in this instance (where the user terminals 6-1 to 6-N are accommodated in the ATM exchange 5 described hereinabove via a public network), the ATM exchange 5 may be constructed such that a single user terminal group is constructed from the user terminals 6-1 to 6-N and the call control memories 521-i and protocol control memories 522-j are provided and the user terminal registration section 22 and the communication service providing section 23 are provided individually for a plurality of types of forms of communication services.

Then, in this instance, if a changing signaling message for changing to another form of communication service is inputted via one of the user terminals 6-1 to 6-N, one of the communication service providing sections 23 which corresponds to the communication service of the form to which the communication service is to be changed is selected by the communication service selection section 25'.

In short, where resources such as the call control memories 521-i and the protocol control memories 522-j are prepared individually for a plurality of kinds of communication services, the ATM exchange 5 can provide a desired form of communication service only by selecting one of the communication service providing sections 23 which corresponds to a communication service of a form to which the communication service should be changed by means of the communication service selection section 25' without changing the mutually linked condition of each of the call control memories 521-i and the protocol control memories 522-j.

The communication service providing section 24 for a private line can register, where the user terminals 6-1 to 6-N are accommodated via private lines or a public network (that is, where the PVC service or the SVC service is to be provided to the user terminals 6-1 to 6-N), registration information of user terminals which can enjoy a desired form of communication service regarding the private lines into the call control memories 521-i and can link the call control memories 521-i to each other to provide a desired form of communication service regarding the private lines (PVC service).

Further, the communication service providing section 25 for a public line (network) can link, when a form changing signaling message (trigger signal) mentioned hereinabove is inputted via any of the user terminals 6-1 to 6-N, the call control memories 521-i and the protocol control memories 522-j to each other to provide a desired form of communication service regarding the public network (SVC service).

Consequently, the ATM exchange 5 in this instance can provide a desired form of communication service in regard to both of the PVC service and the SVC service by means of the communication service providing section 24 for a private line and the communication service providing section 25 for a public network.

It is to be noted that, also in this instance (where the PVC service or the SVC service is to be provided to the user terminals 6-1 to 6-N), the ATM exchange 5 may be constructed such that the user terminals 6-1 to 6-N are divided into a plurality of user terminal groups, for each of which call control memories 521-i, protocol control memories 522-j and a communication service providing section 24 for a private line are provided and it includes a user terminal registration section 22 and a communication service providing section 25, and by this, for both of the PVC service and the SVC service, a desired form of communication service can be provided to a limited user terminal group from among the user terminal groups divided.

In this instance, the ATM exchange 5 includes, as shown in FIG. 10, a maintenance terminal inputting type line changing control section 35, a link changing control section 36 and a relief control section 37 which operate in association with the maintenance terminal inputting type line changing control section 35, a user terminal inputting type line changing control section 38, and a link changing control section 39 and a relief control section 40 which operate in association with the user terminal inputting type line changing control section 38.

Here, the maintenance terminal inputting type line changing control section 35 changes the mutually linked condition of the pertinent call control memories 521-i and protocol control memories 522-j in response to a type of a line to be changed when a form changing (changing of a type of a line) command of an arbitrary from of communication service from the PVC service to the SVC service or from the SVC service to the PVC service is inputted via the maintenance terminal 7, and includes a service condition discrimination section 351, a registration information condition discrimination section 352 and a reporting section 353. Further, the reporting section 353 includes a priority reporting section 354.

The service condition discrimination section 351 discriminates whether or not it is possible to change the mutually linked condition of the pertinent call control memories 521-i and protocol control memories 522-j from among the call control memories 521-i and the protocol control memories 522-j in a condition wherein a communication service in operation is continued or in another condition wherein a communication service in operation is stopped temporarily. If it is discriminated by the service condition discrimination section 351 that it is possible to change the mutually linked condition, then the service condition discrimination section 351 can perform changing of a line of an arbitrary form of communication service even in a condition wherein the communication service in operation is continued.

Meanwhile, the registration information condition discrimination section 352 verifies, based on a line changing command inputted thereto via the maintenance terminal 7, the call control memories 521-i, the protocol control memories 522-j and user terminal registration information to discriminate whether it is possible to change the mutually linked condition of the pertinent call control memories 521-i or to change the mutually linked condition of the pertinent call control memories 521-i and protocol control memories 522-j. Only when it is discriminated by the registration information condition discrimination section 352 that it is possible to change the mutually linked condition of the pertinent call control memories 521-i and protocol control memories 522-j, changing of the mutually linked condition of the pertinent call control memories 521-i or changing of the mutually linked condition of the pertinent call control memories 521-i and protocol control memories 522-j is performed to effect changing of a line type.

Further, the reporting section 353 reports a line changing message to those of the user terminals 6-1 to 6-N which make an object of line changing so that changing of a line inputted via the maintenance terminal 7 can be recognized also by the user terminals 6-1 to 6-N.

It is to be noted that the priority reporting section 354 provided in the reporting section 353 reports, when a line changing message is to be reported to the user terminals 6-1 to 6-N, in a predetermined priority order as described above.

The link changing control section 36 cooperates with the maintenance terminal inputting type line changing control section 35 to execute, when there is a change in origination and terminal accommodation positions of the user terminals 6-1 to 6-N, changing of the mutually linked condition of all of the pertinent call control memories 521-i and protocol control memories 522-j from among the call control memories 521-i and protocol control memories 522-j in response to a line type. Consequently, even if there is a change in origination and termination accommodation positions of the user terminals 6-1 to 6-N, changing of a line can be performed for an arbitrary form of communication service.

Further, the relief control section (portion for restoration of a condition prior to a change) 37 returns, if a trouble is detected when the mutually linked condition of the corresponding 521-i is changed in response to a line type by the maintenance terminal inputting type line changing control section 35, all information involved in the line changing to that in a condition prior to the changing, and includes a maintenance terminal trouble end reporting section 371 and a user terminal trouble end reporting section 372. The user terminal trouble end reporting section 372 includes a priority reporting section 373.

Here, the maintenance terminal trouble end reporting section 371 reports to the maintenance terminal 7 that all information involved in line changing has been returned to a condition prior to the changing. By this, it can be recognized by the maintenance terminal 7 that some trouble has occurred with the line change.

Meanwhile, the user terminal trouble end reporting section 372 reports to those of the user terminals 6-1 to 6-N which have been an object of line changing that all information involved in the line changing has been returned to that in the condition prior to the changing. The priority reporting section 373 reports, when line changing message information is to be reported to the user terminals 6-1 to 6-N, the line changing message information in accordance with a predetermined priority order so that it can be recognized also by the user terminals 6-1 to 6-N in accordance with a predetermined order that some trouble has occurred with the line changing.

It is to be noted that, if simultaneous line changing command information for changing a communication service in operation in each user terminal group simultaneously to another line type of communication service is inputted as the line changing command described hereinabove, then the maintenance terminal inputting type line changing control section 35 described above repetitively changes, for each user terminal group, the mutually linked condition of the pertinent call control memories 521-i and protocol control memories 522-j of each user terminal group to simultaneously change the same.

Meanwhile, the user terminal inputting type line changing control section 38 changes, when line changing message information of an arbitrary form of communication service is inputted via any of the user terminals 6-1 to 6-N, the mutually linked condition of the pertinent call control memories 521-i and protocol control memories 522-j from among of the call control memories 521-i and the protocol control memories 522-j in response to a line type for changing, and includes, as shown in FIG. 10, a service condition discrimination section 381, a registration information condition discrimination section 382 and a reporting section 383. The reporting section 383 includes a priority reporting section 384.

The service condition discrimination section 381 discriminates whether or not it is possible to change the mutually linked condition of the pertinent call control memories 521-i and protocol control memories 522-j for which changing is required upon line changing in a condition wherein a communication service in operation is continued or in another condition wherein a communication service in operation is stopped temporarily. If it is discriminated by the service condition discrimination section 381 that it is possible to change the mutually linked condition of the pertinent call control memories 521-i and protocol control memories 522-j, then the service condition discrimination section 381 can perform line changing regarding an arbitrary form of communication service even in a condition wherein the communication service in operation is continued.

Meanwhile, the registration information condition discrimination section 382 verifies, based on line changing message information inputted thereto from any of the user terminals 6-1 to 6-N, the call control memories 521-i, the protocol control memories 522-j and user terminal registration information to discriminate whether it is possible to change the mutually linked condition of the pertinent call control memories 521-i or to change the mutually linked condition of the pertinent call control memories 521-i and protocol control memories 522-j. Only when it is discriminated by the registration information condition discrimination section 382 that it is possible to change the mutually linked condition of the pertinent call control memories 521-i or to change the mutually linked condition of the pertinent call control memories 521-i and protocol control memories 522-j, changing of a line of an arbitrary form of communication service is performed.

Further, the reporting section 383 reports, to those of the user terminals 6-1 to 6-N other than a user terminal via which a changing signaling message has been inputted, line changing message information corresponding to the signaling message so that changing of a line can be recognized also by those of the user terminals other than the user terminal via which the changing signaling message has been inputted.

It is to be noted that the priority reporting section 384 provided in the reporting section 383 reports, when line changing message information is to be reported to the other user terminals as described above, the line changing message information in a predetermined priority order.

Further, the link changing control section 39 cooperates with the user terminal inputting type line changing control section 38 described hereinabove to execute, when there is a change in origination and terminal accommodation positions of the user terminals 6-1 to 6-N, changing of the mutually linked condition of all of the pertinent call control memories 521-i and protocol control memories 522-j from among the call control memories 521-i and the protocol control memories 522-j in response to a line type. Consequently, even if there is a change in origination and termination accommodation positions of the user terminals 6-1 to 6-N, line changing can be performed for an arbitrary form of communication service.

Further, the relief control section (portion for restoration of a condition prior to a change) 40 returns, if a trouble is detected when the mutually linked condition of the pertinent call control memories 521-i is changed in response to a line type by the user terminal inputting type line changing control section 38, all information involved in the line changing to that in a condition prior to the changing so that, even if some trouble is detected upon line changing, the communication service of the line prior to the changing can be restored.

The relief control section 40 includes a user terminal trouble end reporting section 401 and an other user terminal trouble end reporting section 402. Further, the other user terminal trouble end reporting section 402 also in this instance includes a priority reporting section 403.

Here, the user terminal trouble end reporting section 401 reports to a user terminal which has transmitted line changing message information that some trouble has been detected in the line changing and all information involved has been returned to that in a condition prior to the changing. The other user terminal trouble end reporting section 402 similarly reports, to those users other than the user terminal which has transmitted the line changing message information, that the condition prior to the changing has been restored. Consequently, it can be recognized by all user terminals which have been an object of line changing that some trouble has occurred in the line changing.

It is to be noted that the priority reporting section 403 also in this instance reports, when to report the line changing message information to the user terminals other than the user terminal which has transmitted the line changing message information, the line changing message information in accordance with a predetermined priority order.

Also in this instance, if a simultaneous line changing signaling message for changing a communication service in operation in each user terminal group simultaneously to another line type of communication service is inputted as the line changing signaling message described hereinabove, then the user terminal inputting type line changing control section 38 described above repetitively changes, for each user terminal group, the mutually linked condition of the pertinent call control memories 521-i and protocol control memories 522-j of each user terminal group in response to a line type for changing to simultaneously change the same.

Further, since the line changing signaling message described hereinabove may be included in a bearer information element of the "SETUP" signal (or "ADD PARTY" signal), even if the "SETUP" signal ("ADD PARTY" signal) is inputted, the user terminal inputting type line changing control section 38 changes the mutually linked condition of the pertinent call control memories 521-i and protocol control memories 522-j in response to a line type for changing.

Since the ATM exchange 5 in the present embodiment has such a construction as described above, it can provide a plurality of types of forms of communications to the user terminals 6-1 to 6-N. Particularly, it allows-changing for all 10 communication service forms which are available in the current stage as shown in FIG. 71, and as shown in FIG. 11, also changing of the PVC service and the SVC service in regard to arbitrary communication service forms of the point to multipoint service is allowed.

Figure 12:
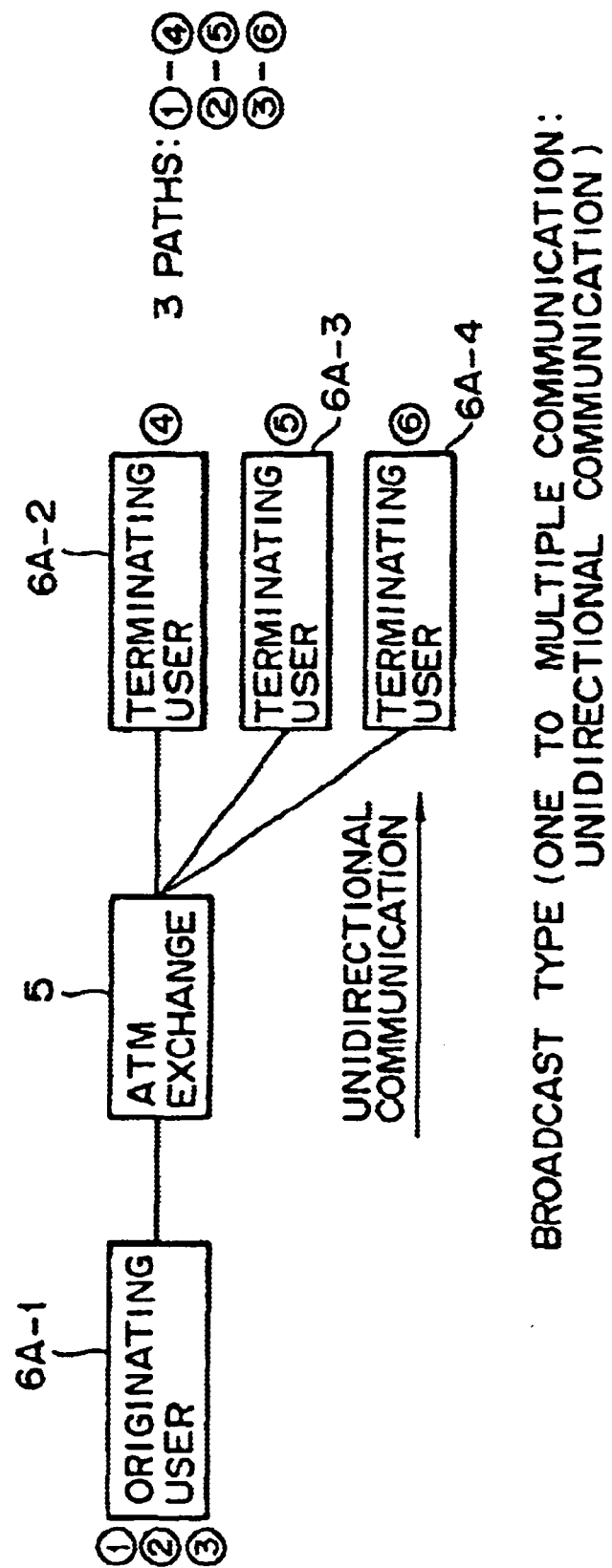
FIG. 12 is a diagrammatic view illustrating all type application point to multipoint control by the ATM exchange of the present embodiment.

In the following, various controls by the ATM exchange 5 will be described in detail item after item of (C) All Type Application Point to Multipoint Control, (D) Point to Multipoint Type Changing Control, (E) Form Changing Control between Point to Point and Point to Multipoint Forms and (F) Line Changing Control between PVC and SVC Services.
(C) Description of All Type Application Point to Multipoint Control Here, all type application point to multipoint control for providing a plurality of communication services by means of the ATM exchange 5 will first be described below by way of an example wherein such point to multipoint PVC/SVC services of the broadcast (Broadcast) type as shown in FIG. 12 are provided.

It is to be noted that, in FIG. 12, reference symbol 6A-1 denotes a user group on the originating side (hereinafter referred to as originating user group), reference symbols 6A-2 to 6A-4 denote each a user group on the terminating side (hereinafter referred to as terminating user group). For example, the user terminal 6-1 shown in FIG. 9 is employed as a user terminal which constructs the originating user group 6A-1, and the user terminals 6-4 to 6-6 are employed as user terminals which construct the terminating user groups 6A-2 to 6A-4, respectively. Further, subscriber information ① of the originating user group 6A-1 is registered already in the ATM exchange 5.
(C-1) Provision of the Broadcast Type PVC Service First, in order to realize such a point to multipoint communication service of the broadcast type as shown in FIG. 12 making use of a private line, in short, in order to provide the broadcast type PVC service by accommodating the originating user group 6A-1 and the terminating user groups 6A-2 to 6A-4 via private lines, the ATM exchange 5 must perform the following setting.

In particular, the ATM exchange 5 must newly and additionally register subscriber information ② and ③ of the originating user group 6A-1, subscriber information ④ of the terminating user group 6A-2, subscriber information ⑤ of the terminating user group 6A-3 and subscriber information ⑥ of the terminating user group 6A-4 and must newly perform setting of three paths between the subscriber information ① and ④, the subscriber information ② and ⑤ and the subscriber information ③ and ⑥.

Figure 13:
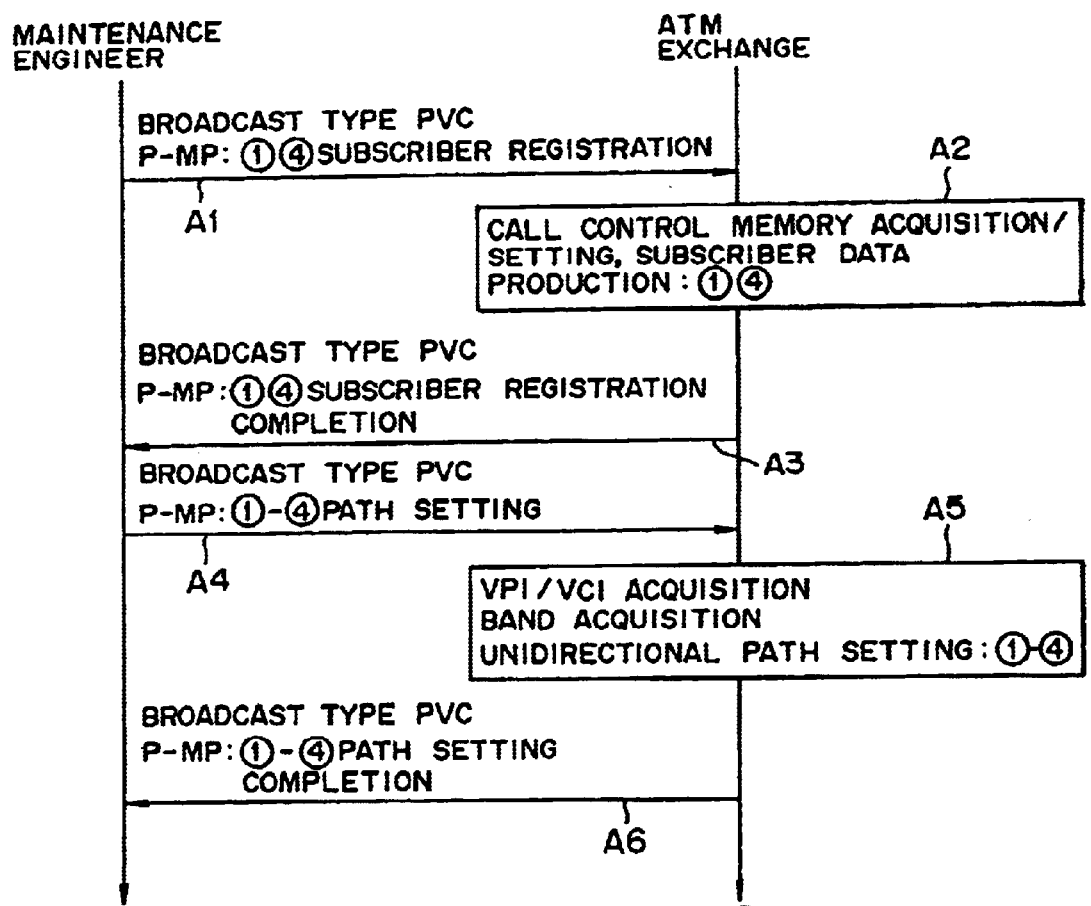
FIG. 13 is a sequence diagram illustrating all type application point to multipoint control by the ATM exchange of the present embodiment.

To this end, a maintenance engineer for the ATM exchange 5 first enters a maintenance command including user terminal registration information (subscriber data of originating and terminating telephone numbers and so forth) and user terminal path setting information (VPI/VCI, use band information and so forth) as shown in FIG. 13 into the ATM exchange 5 through the maintenance terminal 7 in order to register the subscriber information ① of the user terminal 6-1 which forms the originating user group 6A-1 and the subscriber information ④ of the user terminal 6-4 which forms the terminating user group 6A-2 as information of subscribers which can enjoy the broadcast type PVC service (step A1).

Figure 15:
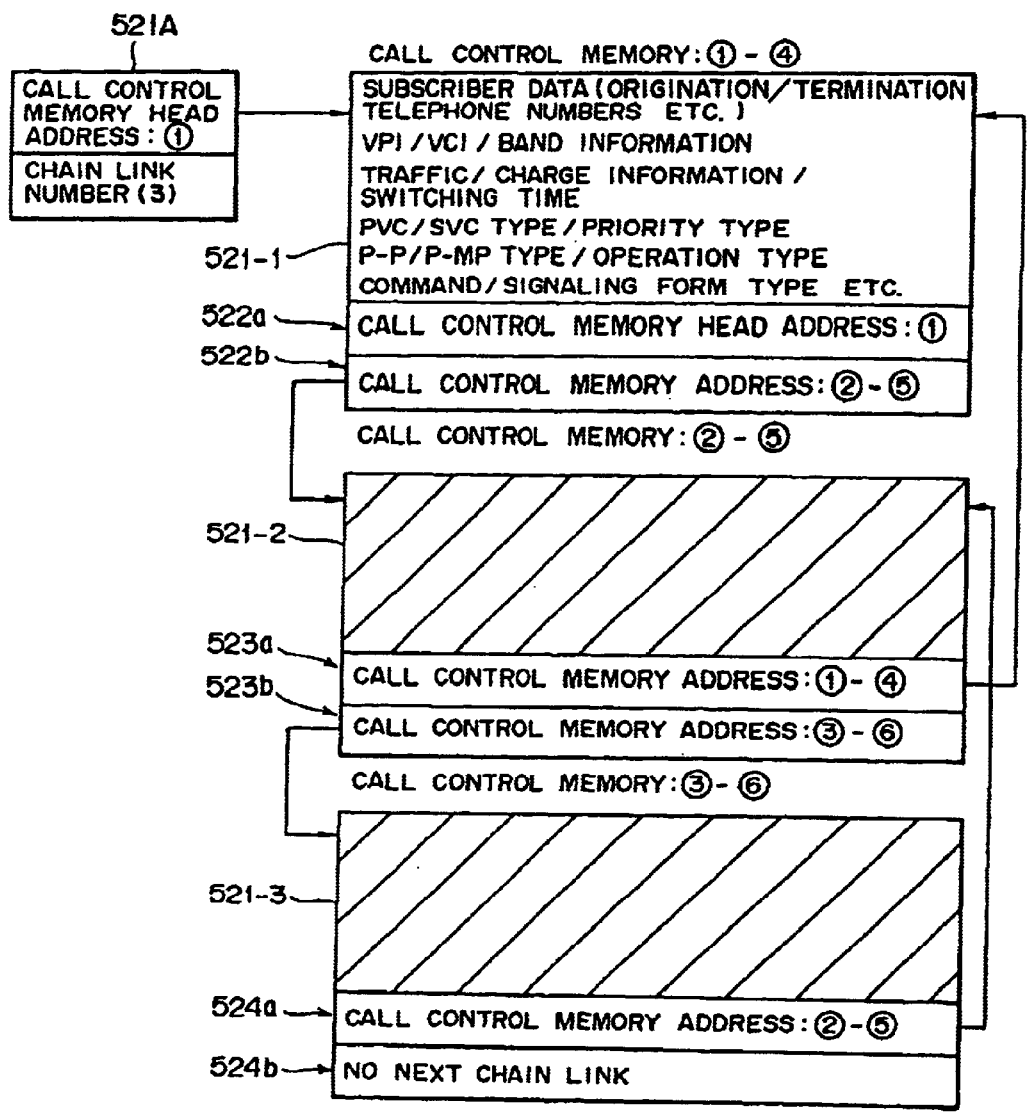
FIG. 15 is a diagrammatic view illustrating an example of mutually linked relationship of call control memories constructed in the ATM exchange of the present embodiment.

Then, in the ATM exchange 5, when the maintenance command is accepted by the command transmission/reception acceptance apparatus 53 and is recognized by the maintenance command analysis section 57 that this is a registration command for subscribers which can enjoy the broadcast type PVC service, such a call control memory 521-1 corresponding to the path between the subscriber information ① and ④ as shown in FIG. 15 is newly acquired/set in the main storage section 52 and subscriber data and so forth are produced based on various information inputted from the maintenance terminal 7 and stored into the call control memory 521-1 by the resource management section 56 (step A2).

It is to be noted that, in FIG. 15, reference symbol 521A denotes a head address part which holds a storage position of the call control memory 521-1 in the main storage section 52 and a number of call control memories to be mutually linked to the call control memory 521-1 (chain link number), and an address of the head address part 521A is stored into a call control memory address part 522a of the call control memory 521-1.

Then, after registration of the subscriber information ① and ④ is completed in this manner, a registration completion report to the maintenance terminal 7 is edited by the maintenance command analysis section 57 and transmitted to the maintenance terminal 7 (maintenance engineer) (step A3). Receiving the registration completion report, the maintenance terminal 7 requests the ATM exchange 5 with a maintenance command to set the registered path (speech path) between the subscriber information ① and ④ (step A4).

Further, in the ATM exchange 5, when this path setting request is recognized by the maintenance command analysis section 57, acquisition of the VPI/VCI and the use band is performed by the call/connection control section 58, and based on this, a unidirectional path (user terminal 6-1 to user terminal 6-4) is set between the subscriber information ① and ④ by the speech path control section 65 (step A5). After completion of the path setting, this is reported to the maintenance terminal 7 (step A6).

Upon reception of this report, the maintenance engineer subsequently requests the ATM exchange 5 for registration of the subscriber information ⑤ of the user terminal 6-3 which constructs the terminating user group 6A-3 via the maintenance terminal 7 (step A7). Upon reception of this request, the ATM exchange 5 performs acquisition/setting of such a call control memory 521-2 as shown in FIG. 15, produces subscriber data and so forth based on various information inputted from the maintenance terminal 7 and stores the subscriber data into the call control memory 521-2 (step A8) similarly as upon the registration (step A2) of the subscriber information ① and ④.

Then, in this instance, the resource management section 56 stores a head address of the call control memory 521-2 into a call control memory address part 522b of the call control memory 521-1 acquired/set already and stores a top address of the call control memory 521-1 into a call control memory address part 523a of the call control memory 521-2 as shown in FIG. 15 to link the call control memories 521-1 and 521-2 with each other.

Further, after the registration of the subscriber information ⑤ is completed in this manner, the ATM exchange 5 reports this to the maintenance terminal 7 (step A9). Upon reception of this report, the maintenance engineer requests the ATM exchange 5 with a maintenance command via the maintenance terminal 7 to newly and additionally set a unidirectional (user terminal 6-1 to user terminal 6-5) path between the subscriber information ② and ⑤ (step A10).

Consequently, in the ATM exchange 5, acquisition of the VPI/VCI and the use band is performed by the call/connection control section 58, and based on this, a unidirectional path between the subscriber information ② and ⑤ is additionally set by the speech path control section 65 (step A11). After the setting is completed, this is reported to the maintenance engineer via the maintenance terminal 7 (step A12).

Further, upon reception of the report, the maintenance engineer inputs user terminal registration information and user terminal path setting information regarding the subscriber information ⑥ of the user terminal 6-6 which constructs the remaining terminating user group 6A-4 to the ATM exchange 5 (step A13). Consequently, in the ATM exchange 5, such a call control memory 521-3 as shown in FIG. 15 is acquired/set and subscriber data regarding the subscriber information ⑥ is produced and stored into the call control memory 521-3 by the resource management section 56 similarly as upon the registration of the subscriber information ④ and ⑤ to effect registration of the subscriber information ⑥ (step A14).

Also in this instance, the resource management section 56 stores a top address of the call control memory 521-3 additionally acquired/set newly into a call control memory head address part 523b of the call control memory 521-2 and stores a top address of the call control memory 521-2 into a call control memory address part 524a of the call control memory 521-3 as shown in FIG. 15 to link the call control memories 521-2 and 521-3 with each other.

In short, the resource management section 56 links all of the call control memories 521-1 to 521-3 acquired/set newly with each other to construct a condition wherein, if the head address and the chain link number of the call control memory 521-1 stored in the head address part 521A are referred to, then information regarding all of the call control memories 521-1 to 521-3 can be referred to, thereby forming the communication service providing section 21 described hereinabove with reference to FIG. 10.

It is to be noted that each portion indicated by slanting lines in FIG. 15 represents that information similar to that of the call control memory 521-1 (subscriber data, VPI/VCI, band information, traffic, charge information and so forth) is stored in each of the call control memories 521-2 and 521-3. Further, in the present embodiment, since the call control memories to be newly and additionally acquired/set are for three paths (call control memories 521-1 to 521-3) between the subscriber information ① and ④, the subscriber information ② and ⑤ and the subscriber information ③ and ⑥, information representing that there remains no call control memory to be linked is stored next in a call control memory address part 524b of the call control memory 521-3.

Further, after the registration of the subscriber information ⑥ is completed in this manner, this is reported to the maintenance engineer via the maintenance terminal 7 (step A15). Upon reception of this, the maintenance engineer requests the ATM exchange 5 with a maintenance command via the maintenance terminal 7 to additionally set a path (user terminal 6-1 to user terminal 6-6) between the newly registered subscriber information ⑥ and the existing subscriber information ③ (step A16). In the ATM exchange 5, acquisition of the VPI/VCI and the use band is performed similarly by the call/connection control section 58, and based on this, a unidirectional path between the subscriber information ③ and ⑥ is additionally set by the speech path control section 65 (step A17).

Then, after this setting is completed, this is reported to the maintenance engineer via the maintenance terminal 7, thereby ending the processing. As a result, such a PVC service of the broadcast type as shown in FIG. 12 is provided (step A18).

As a result, one VPI/VCI is allocated between the originating user group 6A-1 and the ATM exchange 5, and another VPI/VCI is allocated between the ATM exchange 5 and each of the terminating user groups 6A-2 to 6A-4. Then, a cell from the originating user group 6A-1 is copied by the ATM exchange 5 and sent to the individual terminating user groups 6A-2 to 6A-4.

As an example, for example, such VPI/VCI/band information as given in (1) to (4) below is allocated between the subscriber information ① to ⑥ of the user groups 6A-1 to 6A-4.

(1) Between ① (or ② or ③) and the ATM exchange 5: VPI=0, VCI=32, band=10 Mbps
(2) Between the ATM exchange 5 and ④: VPI=0, VCI=32, band=10 Mbps
(3) Between the ATM exchange 5 and ⑤: VPI=0, VCI=33, band=10 Mbps
(4) Between the ATM exchange 5 and ⑥: VPI=0, VCI=34, band=10 Mbps It is to be noted that, also for the various types (composite type, merge type and multipoint type) of PVC service other than the broadcast type, desired communication services can be provided by a similarly procedure.

In short, the ATM exchange 5 described above includes the call control memories 521-1 to 521-3 provided for the individual user terminal paths between the subscriber information ① and ④, between the subscriber information ② and ⑤ and between the subscriber information ③ and ⑥, and the communication service providing section 21 (refer to FIG. 10) which registers, when user terminal registration information and user terminal path setting information are inputted to the ATM exchange 5 via the maintenance terminal 7, the user terminal registration information into the call control memories 521-1 to 521-3 and links the call control memories 521-1 to 521-3 with each other so that it can provide a communication service of the broadcast type is formed by software or the like.

Accordingly, with the ATM exchange 5 of the present embodiment, a desired form of communication service can be provided very readily and rapidly in response to a request of a user, and consequently, the ATM exchange 5 can cope with certainty with various requests from users such as a request for changing to a communication service of a certain type/form.

(C-2) Provision of the Broadcast Type SVC Service

Subsequently, control by the ATM exchange 5 when such a point to multipoint service of the broadcast type as shown in FIG. 12 is realized on a public network (SVC) will be described in detail below.

Figure 16:
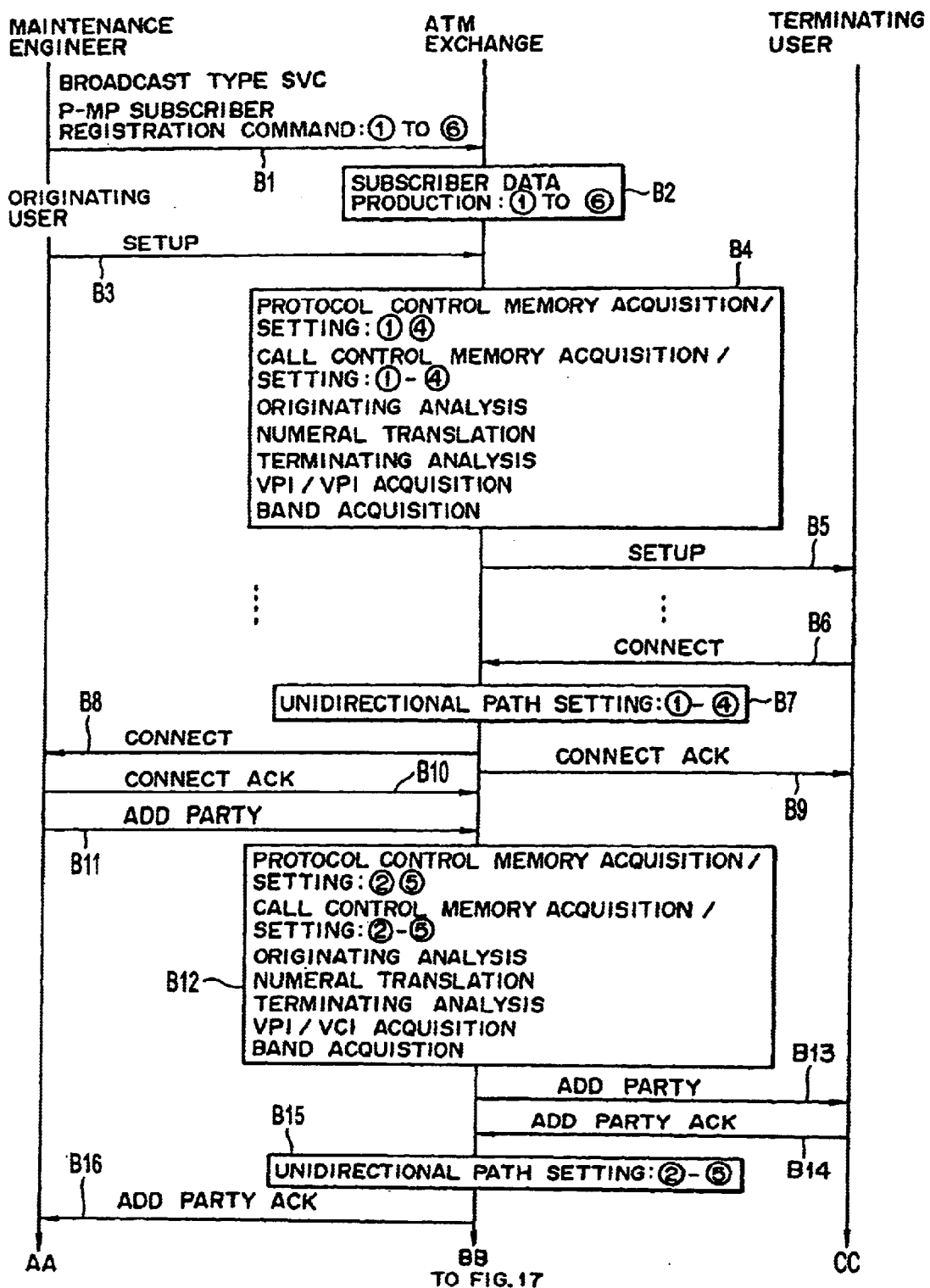
FIG. 16 is a sequence diagram illustrating the all type application point to multipoint control by the ATM exchange of the present embodiment.

First, as shown in FIG. 16, a maintenance engineer of the ATM exchange 5 first requests the ATM exchange 5 for registration of the subscriber information ① to ⑥ with a subscriber registration command (maintenance command) for the point to multipoint form via the maintenance terminal 7 (step B1). In the ATM exchange 5. this request is recognized by the maintenance command analysis section 57, and subscriber data regarding the subscriber information ① to ⑥ are produced by the call/connection control section 58, subscriber operation condition management section 60 and so forth (step B2).

Thereafter, when the ATM exchange 5 receives a "SETUP" signal from the user terminal 6-1 which forms the originating user 6A-1 (step B3), the resource management section 56 in the ATM exchange 5 first acquires/sets such protocol control memories 522-1 and 522-4 corresponding to the subscriber information ① and ④ as shown in FIG. 18 and acquires/sets a call control memory 521-1 corresponding to a path between the subscriber information ① and ④ (step B4).

It is to be noted that, thereupon, an origination analysis, numeral (telephone number) translation, a termination analysis and so forth are performed by the origination/termination analysis and numeral translation section 59 and also processing of acquisition of the VPI/VCI and the use band and so forth is performed simultaneously by the call/connection control section 58.

Then, from the ATM exchange 5, a "SETUP" signal is transmitted to the user terminal 6-4 which forms the terminating user 6A-2 (step B5), and a "CONNECT (connection request)" signal is transmitted back from the terminating user 6A-2 to the ATM exchange 5 (step B6).

In the ATM exchange 5, when this "CONNECT" signal is received via the signaling transmission/reception acceptance apparatus 51 and the protocol control section 55, the speech path control section 65 is controlled by the call/connection control section 58 to set a unidirectional path between the subscriber information ① and ④ (step B7) and transmit a "CONNECT" signal to the originating user 6A-1 (step B8).

Further, the ATM exchange 5 transmits, as a response to the "CONNECT" signal received from the terminating user group 6A-2 in step B6 described above, a "CONNECT ACK" signal, which is a connection completion report, to the terminating user 6A-2 to actually establish a path to the terminating user 6A-2 (step B9), and receives a "CONNECT ACT" signal from the originating user 6A-1 to actually establish a path to the originating user 6A-1 (step B10).

Thereafter, when an "ADD PARTY" signal which requests for addition of a subscriber is inputted from the originating user 6A-1 (step B11), in order to additionally set a path between the subscriber information ② and ⑤, the resource management section 56 in the ATM exchange 5 acquires/sets such protocol control memories 522-2 and 522-5 corresponding to the subscriber information ② and ⑤ as shown in FIG. 18 and acquires/sets a call control memory 521-2 regarding the path between the subscriber information ② and ⑤ (step B12)

Then, in this instance, the resource management section 56 stores a memory address of the call control memory 521-2 additionally acquired/set in such a manner as described above into a memory address part 522c of the call control memory 521-1 and stores memory addresses of the additionally acquired/set protocol control memories 522-2 and 522-5 into memory address parts 531c and 534c of the protocol control memories 522-1 and 522-4, respectively, as shown in FIG. 18.

Further, simultaneously, the resource management section 56 stores the memory addresses of the protocol control memories 522-2 and 522-5 and the memory address of the call control memory 521-1 into a memory address part 523c of the call control memory 521-2 and stores the memory address of the call control memory 521-2 into memory address parts 532a and 535a of the protocol control memories 522-1 and 522-4 and the memory addresses of the protocol control memories 522-1 and 522-4 into memory address parts 532b and 535b, respectively.

As a result, a mutually linked condition between the call control memories 521-1 and 521-2 and the protocol control memories 522-1, 522-2, 522-4 and 522-5 is established.

Thereafter, the ATM exchange 5 transmits the "ADD PARTY" signal received from the originating user 6A-1 to the terminating user 6A-3 (step B13). Then, when the ATM exchange 5 receives an "ADD PARTY ACK" signal representing a response of acknowledgment to the "ADD PARTY" signal (step B14), a unidirectional path between the subscriber information ② and ⑤ is set by the call/connection control section 58, speech path control section 65 and so forth (step B15), and an "ADD PARTY ACK" signal representing completion of additional registration-path setting of the subscriber information ② and ⑤ is transmitted to the originating user 6A-1 (step B16).

Figure 17:
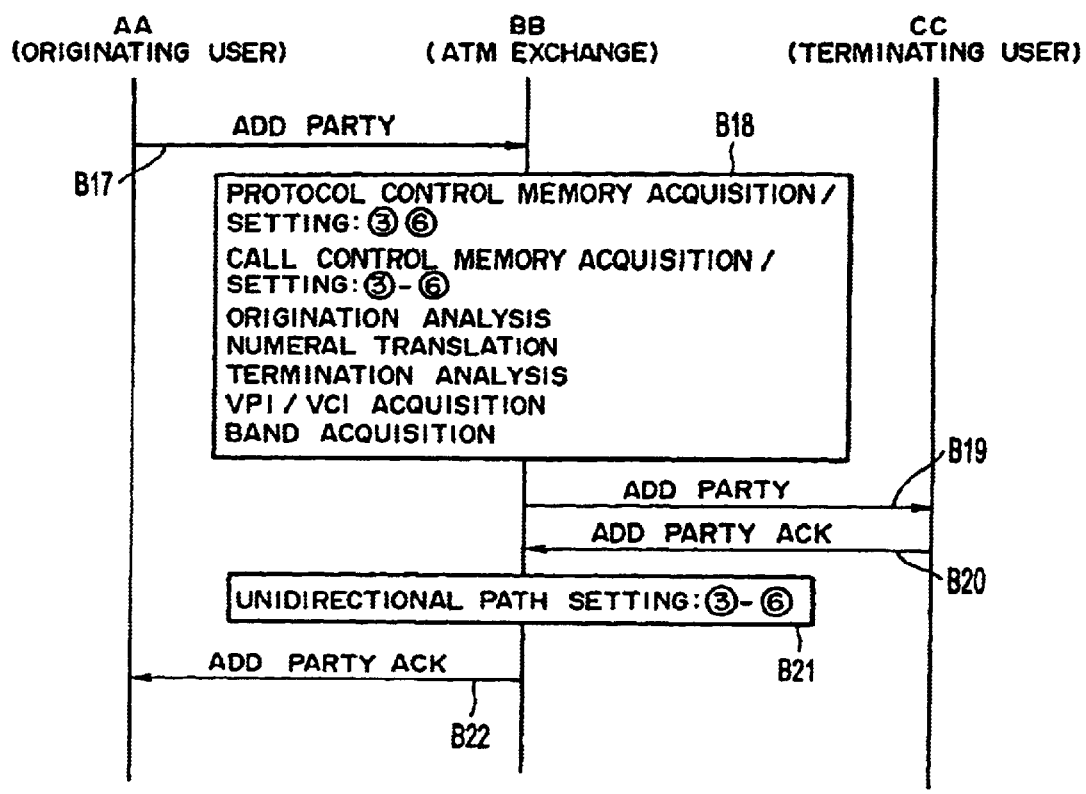
FIG. 17 is a sequence diagram illustrating the all type application point to multipoint control by the ATM exchange of the present embodiment.

When this "ADD PARTY ACT" signal is received, the originating user 6A-1 transmits another "ADD PARTY" signal to the ATM exchange 5 as shown in FIG. 17 in order to additionally register the subscriber information ③ and ⑥ (step B17). In the ATM exchange 5, the resource management section 56 acquires/sets such protocol control memories 522-3 and 522-6 corresponding to the subscriber information ③ and ⑥ as shown in FIG. 18 and additionally acquires/sets a call control memory 521-3 regarding a path between the subscriber information ③ and ⑥ (step B18).

Then, in this instance, the resource management section 56 additionally acquires/sets the call control memory 521-3 corresponding to the path between the subscriber information ③ and ⑥ and the protocol control memories 522-3 and 522-6 for the subscribers ③ and ⑥ in the main storage section 52 as shown in FIG. 18. Further, the resource management section 56 stores a memory address of the additionally acquired/set call control memory 521-3 into a memory address part 523c of the call control memory 521-2 and stores memory addresses of the additionally acquired/set protocol control memories 522-3 and 522-6 into memory address parts 532c and 535c of the protocol control memories 522-2 and 522-5, respectively.

Further, simultaneously, the resource management section 56 stores the memory addresses of the protocol control memories 522-3 and 522-6 and the memory address of the call control memory 521-2 into a memory address part 524c of the call control memory 521-3, and stores the memory address of the call control memory 521-3 into memory address parts 533a and 536a of the protocol control memories 522-3 and 522-6 and the memory addresses of the protocol control memories 522-2 and 522-5 into memory address parts 533b and 536b, respectively.

As a result, all of the call control memories 521-1 to 521-3 and the protocol control memories 522-1 to 522-6 are linked with each other so that, from any of the call control memories 521-1 to 521-3 and the protocol control memories 522-1 to 522-6, information stored in any other one of the call control memories 521-1 to 521-3 and the protocol control memories 522-1 to 522-6 can be referred to.

It is to be noted that, also in this instance, each of the call control memories 521-1 to 521-3 described above stores subscriber data (origination and termination telephone numbers and so forth), VPI/VCI, band information, traffic, charge information and so forth, and each of the protocol control memories 522-1 to 522-6 holds a protocol state number necessary for each of the subscriber information ① to ⑥ and the ATM exchange 5, necessary information with a user ("Call reference", "Endpoint reference" and so forth. In FIG. 18, each of portions of the call control memories 521-2 and 521-3 indicated by slanting lines represents that various information is set under the same condition as that of the call control memory 521-1, and each of portions of the protocol control memories 522-2 to 522-6 indicated by a net represents that information of a protocol state number, "Call reference", "Endpoint reference" and so forth is set under the same condition as that of the protocol control memory 522-1.

On the other hand, where any of the call control memories 521-1 to 521-3 and the protocol control memories 522-1 to 522-6 has no link with a next call control memory or protocol control memory, this (absence of a next chain link) is stored into a corresponding one of the memory address parts 522c to 524c and 531c to 536c.

Thereafter, the ATM exchange 5 sets a unidirectional path between the subscriber information ③ and ⑥ (steps B17 to B22) similarly as in the additional registration of the subscriber information ② and ⑤ and the setting of the unidirectional path between the subscriber information ② and ⑤ (steps B13 to B16). Consequently, such an SVC service of the broadcast type as shown in FIG. 12 is provided.

In short, the ATM exchange 5 described above includes the call control memories 521-1 to 521-3 provided for the individual user terminal paths between the subscriber information ① and ④, between the subscriber information ② and ⑤ and between the subscriber information ③ and ⑥ and the protocol control memories 522-1 to 522-6 provided for the individual subscriber information ① to ⑥, and has the user terminal registration section 22 (refer to FIG. 10) provided therein which registers, when registration information of those user terminals which can enjoy the broadcast type SVC service is inputted via the maintenance terminal 7, the user terminal registration information into the call control memories 521-1 to 521-3 has and the communication service providing section 23 (refer to FIG. 10) formed therein which can link, when a trigger signal such as a "SETUP" signal or an "ADD PARTY" signal is inputted via one of the user terminals 6-1 to 6-N, the call control memories 521-1 to 521-3 and the protocol control memories 522-1 to 522-6 with each other so that a desired form of communication service can be provided.

It is to be noted that, also when an SVC service of any other type than the broadcast type is to be provided, a similar control procedure is performed except the path setting conditions, and also management of control data of the call control memories 521-1 to 521-3, protocol control memories 522-1 to 522-6 and so forth is performed similarly.

Accordingly, also the ATM exchange 5 described above can provided a desired form of communication service very readily and rapidly in response to a request of a user and consequently can cope with certainty with various requests of users such as changing to any of various types/forms of communication services.

As described above, the ATM exchange 5 described above can cope with all of various types of point to multipoint service such as the broadcast type, the composite type, the merge type and the multipoint type and can anticipate expansion of user needs for the point to multipoint service in the PVC service/SVC service.

(D) Description of Point to Multipoint Type Changing Control

Figure 19A:
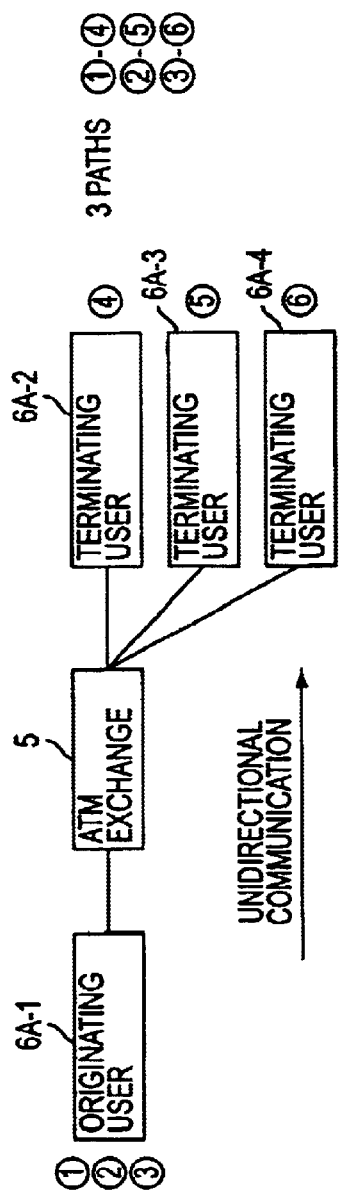
FIGS. 19(a) and 19(b) are diagrammatic views illustrating point to multipoint type changing control by the ATM exchange of the present embodiment.
Figure 19B:
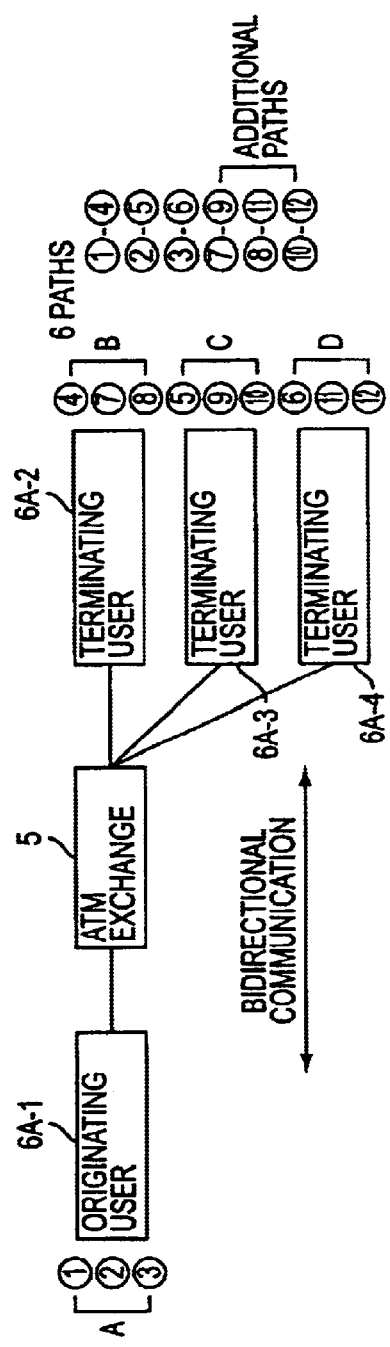

Subsequently, type changing control to any of various types of the point to multipoint by the ATM exchange 5 will be hereinafter described in detail by way of an example wherein the type is changed from such a PVC/SVC service of the broadcast type (one to multiple communication: unidirectional communication) as shown in FIG. 19(a) to such a PVC/SVC service of the multipoint type (multiple to multiple communication: bidirectional communication) as shown in FIG. 19(b).

It is to be noted that, in FIG. 19(a), reference character 6A-1 denotes an originating user formed from the user terminal 6-1, and reference characters 6A-2 to 6A-4 denote termination user groups formed from the user terminals 6-4 to 6-6, respectively. Also in this instance, the subscriber information ① of the originating user 6A-1 is registered already in the ATM exchange 5.

And, in order for the ATM exchange 5 to effect type changing from the PVC/SVC service of the broadcast type to the PVC/SVC service of the multipoint type, the ATM exchange 5 must additionally register subscriber information ⑦ to ⑫ of the user terminals 6-4 to 6-6 into the terminating user groups 6A-2 to 6A-4 and additionally set three paths between the user terminals 6-4 and 6-5, between the user terminals 6-4 and 6-6 and between the user terminals 6-5 and 6-6 as shown in FIG. 19(b).

In the following, the type changing control will be described in connection with two cases of changing of the type from the PVC service of the broadcast type to the PVC service of the multipoint type by a maintenance engineer and changing of the type from the PVC service of the broadcast type to the PVC service of the multipoint type by a user. It is to be noted that, in this instance, it is assumed that the call control memories 522 to 524 linked with each other as shown in FIG. 15 are formed for individual paths between the subscriber information ① and ④, between the subscriber information ② and ⑤ and between the subscriber information ③ and ⑥ in the main storage section 52 by such all type application point to multipoint control as described hereinabove with reference to FIGS. 12 to 15.

Figure 20:
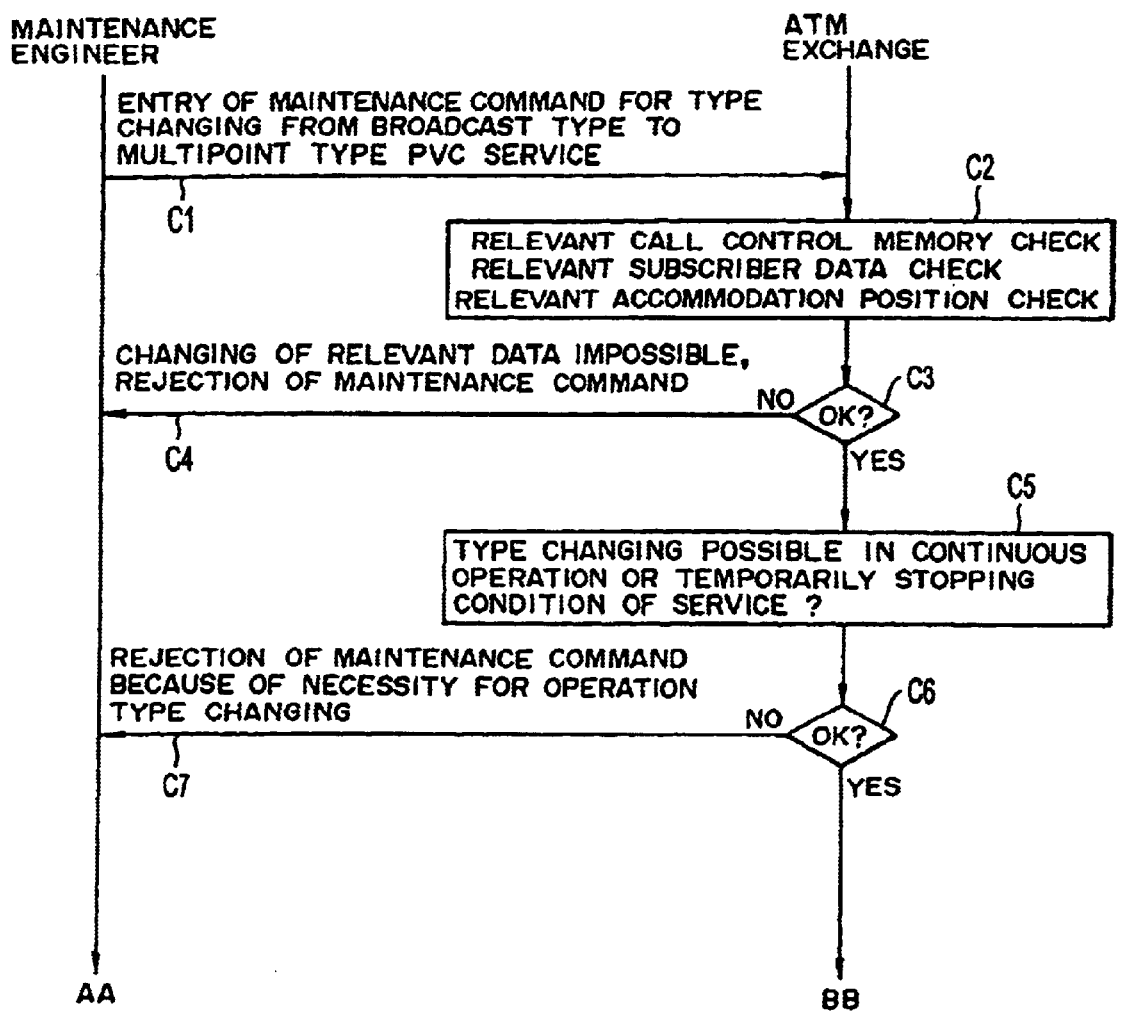
FIG. 20 is a sequence diagram illustrating the point to multipoint type changing control by the ATM exchange of the present embodiment.

(D-1) Type Changing Control to the Multipoint Type PVC Service by a Maintenance Engineer First, as shown in FIG. 20, a maintenance engineer of the ATM exchange 5 enters a maintenance command (changing command information) for performing changing of the type from the PVC service of the broadcast type to the PVC service of the multipoint type through the maintenance terminal 7 (step C1).

Figure 73:
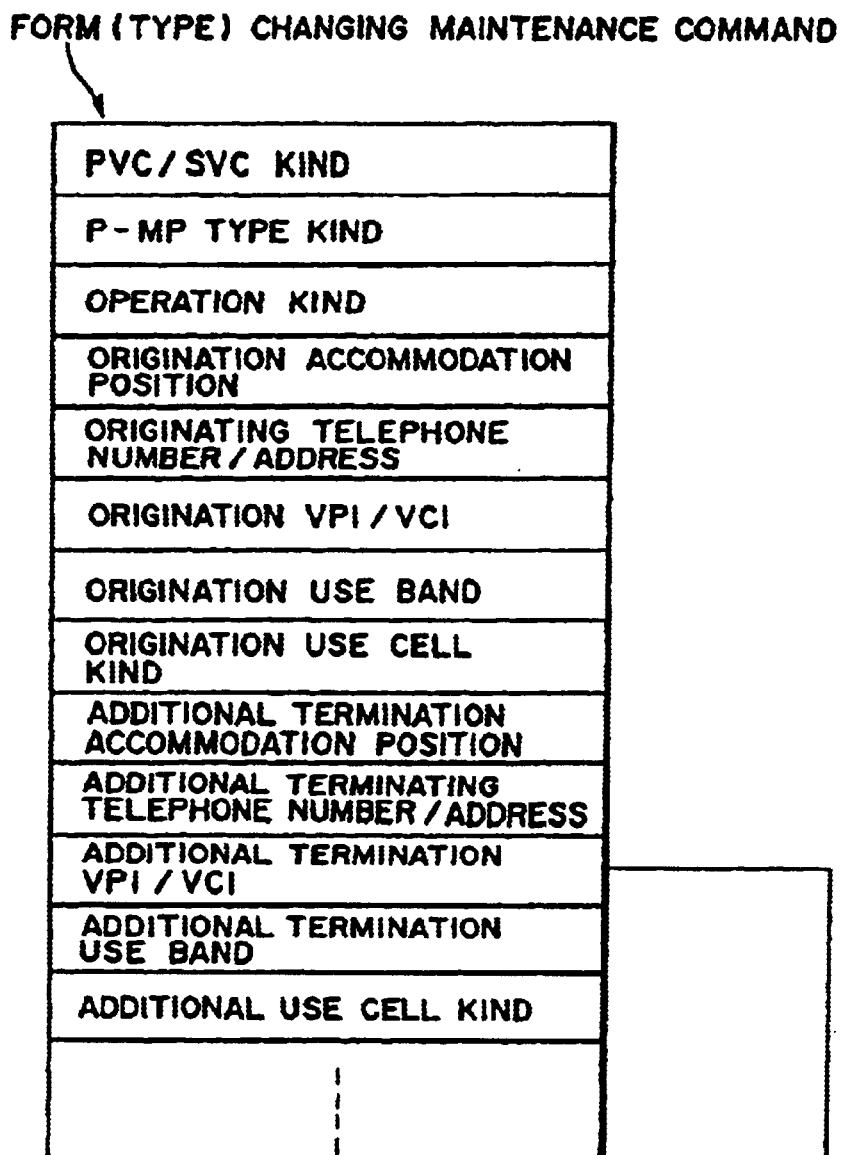
FIG. 73 is a diagrammatic view showing an example of format of a form (type) changing maintenance command in the present embodiment.

It is to be noted that this maintenance command has such a format as shown, for example, in FIG. 73, and in this instance, "PVC: P-MP" is designated for the PVC/SVC kind: "broadcast type to multipoint type" is designated for the P-MP type kind; and "continuous operation/temporary stopping operation" is designated for the operation kind. Further, upon such type changing, the additional termination accommodation position, the additional termination telephone number/address, the additional termination VPI/VCI, the addition termination use band and the additional use cell type (priority/non-priority cell and so forth) are designated each by a number corresponding to the subscriber information ⑦ to ⑫ to be additionally registered.

And, in the ATM exchange 5, checking (verification) of the call control memories 521-i which make an object of type changing, subscriber data (user terminal registration information), user terminal accommodation positions and so forth is performed based on such a maintenance command as described above, and it is discriminated by the registration information condition discrimination section 27 whether or not it is possible to change the mutually linked condition of the pertinent call control memories 521-i (steps C2 and C3).

Accordingly, in this ATM exchange 5, even if a changing command to another form of communication service is inputted through the maintenance terminal 7, only when it is discriminated by the registration information condition discrimination section 27 that it is possible to change the mutually linked condition of the pertinent call control memories 521-i, the mutually linked condition of the pertinent call control memories 521-i can be changed to construct a mutually linked condition of the call control memories 521-i for a communication service for changing, and changing to the multipoint type PVC service can be performed with a higher degree of certainty.

And, if a result of the discrimination by the registration information condition discrimination section 27 indicates that it is impossible to change the pertinent data (changing of the mutually linked condition) (when the discrimination in step C3 is NO), the inputted maintenance command is rejected (rejected) (step C4). However, if the changing is possible (when the discrimination in step C3 is YES), it is further discriminated by the service condition discrimination section 28 whether or not it is possible to change the mutually linked condition of the pertinent call control memories 521-i to change the type while the service in operation (broadcast type PVC service) is continued or in a condition wherein the service in operation is temporarily stopped (steps C5 and C6).

If a result of the discrimination by the service condition discrimination section 28 indicates that it is impossible to change the type because it is necessary to change the operation kind, that is, when it is impossible to change the mutually linked condition of the call control memories 521-i (when the discrimination in step C6 is NO), the inputted maintenance command is rejected also in this instance (step C7).

Figure 21:
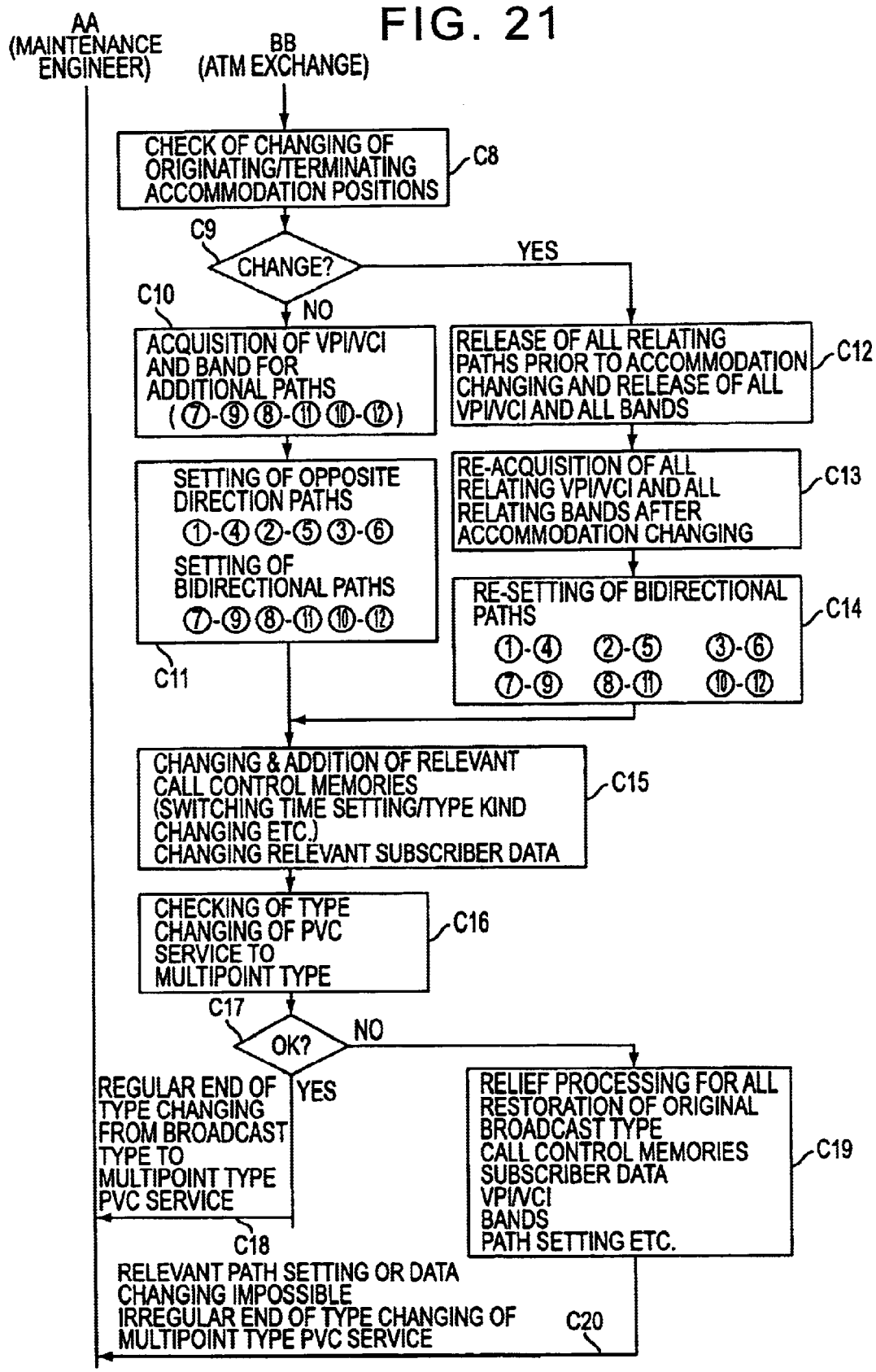
FIG. 21 is a sequence diagram illustrating the point to multipoint type changing control by the ATM exchange of the present embodiment.

On the other hand, when it is possible to change the type (when the discrimination in step C6 is YES), it is further checked whether or not the origination and termination accommodation positions of the user terminals 6-1 and 6-4 to 6-6 have been changed as shown in FIG. 21 (steps C8 and C9).

In short, in the present ATM exchange 5, if it is discriminated by the service condition discrimination section 28 that it is possible to change the pertinent call control memories 521-i, then even in a condition wherein the communication service in operation is kept continued, it is possible to perform changing to another form of communication service (multipoint type SVC service).

Then, when the origination and termination accommodation positions of the user terminals 6-1 and 6-4 to 6-6 exhibit no change (when the discrimination in step C9 is NO), acquisition of VPI/VCI and use bands corresponding to the additional paths (between the subscriber information ⑦ and ⑨, between the subscriber information ⑧ and ⑪ and between the subscriber information ⑩ and ⑪ is performed (step C10). Then, between the subscriber information ① and ④, between the subscriber information ② and ⑤ and between the subscriber information ③ and ⑥, only paths for the reverse directions are additionally set, but between the subscriber information ⑦ and ⑨, between the subscriber information ⑧ and ⑪ and between the subscriber information ⑩ and ⑫), bidirectional paths are set (step C11).

On the other hand, if it is discriminated in step C9 that the origination and termination accommodation positions have been changed (when the discrimination in step C9 is YES), release of all of the associated paths prior to the change of the accommodation positions and release of all of the VPI/VCI and all of the bands are performed (step C12). Then, acquisition of all VPI/VCI and all of bands associated after the change of the accommodation positions is performed (step C13), and bidirectional paths are re-set for all of the paths (step C14).

Figure 22:
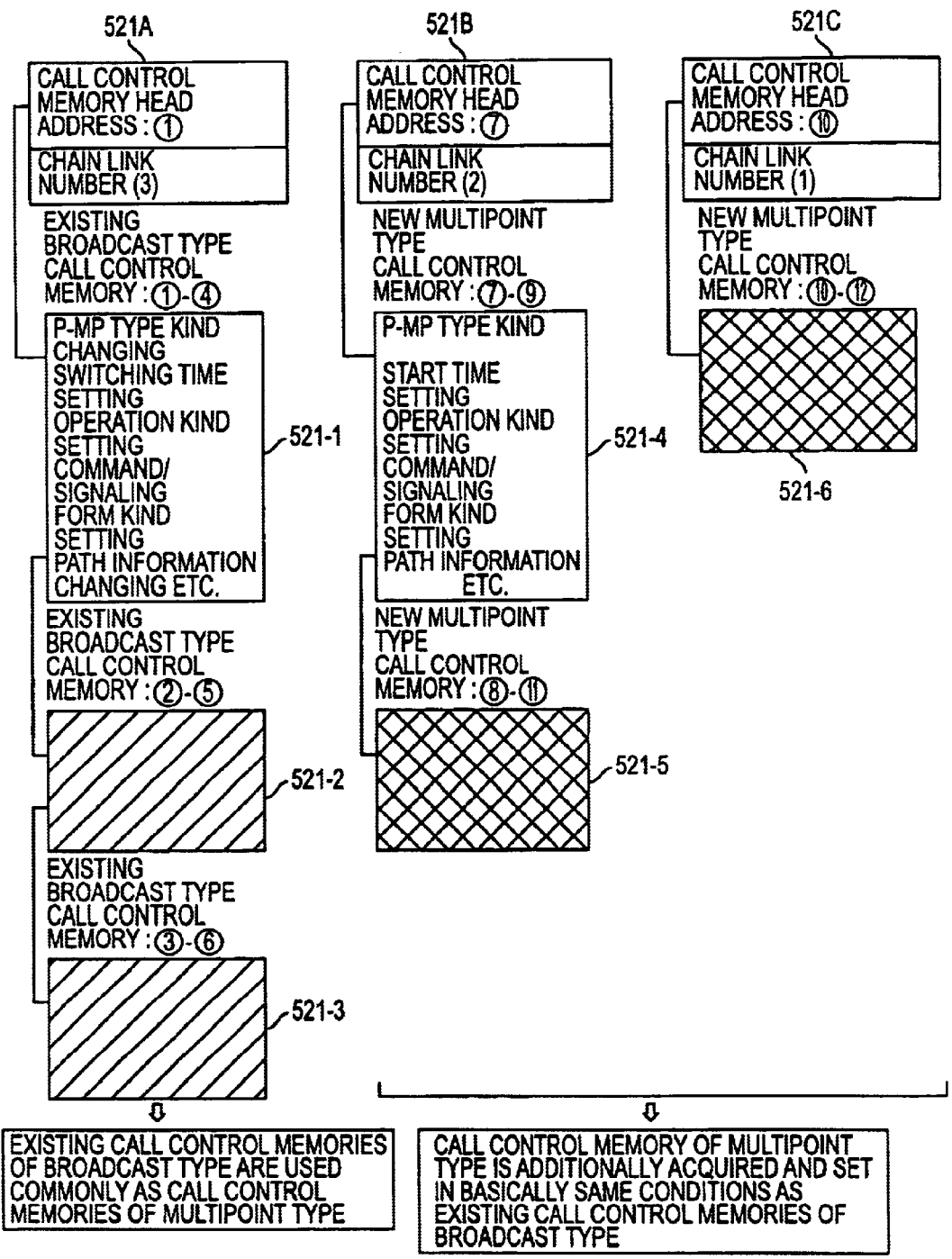
FIG. 22 is a diagrammatic view illustrating an example of mutually linked relationship of the call control memories constructed in the ATM exchange of the present embodiment.

Further, in the ATM exchange 5, changing of information [switching time setting, point to multipoint (P-MP) type kind changing and so forth] in the pertinent call control memories (existing call control memories for the broadcast type) 521-1 to 521-3 provided for the individual paths between the subscriber information ① and ④, between the subscriber information ② and ⑤ and between the subscriber information ③ and ⑥ which make an object of type changing is performed by the resource management section 56 as shown in FIG. 22 while the call control memories (call control memories for the multipoint type) 521-4 to 521-6 corresponding to the individual paths between the subscriber information ⑦ and ⑨, between the subscriber information ⑧ and ⑪ and the subscriber information ⑩ and ⑫ are additionally acquired/set in the main storage section 52, and various information is set in basically similar conditions to those of the existing call control memories 521-1 to 521-3 for the broadcast type except setting of the P-MP type kind, the start time and so forth (step C15).

For example, if it is assumed that the VPI/VCI/band information of the paths between the originating user 6A-1, ATM exchange 5 and terminating user groups 6A-2 to 6A-4 in the broadcast type service [refer to FIG. 19(a)] is presumably allocated in such a manner as given in items (1) to (4) below, then the VPI/VCI/band information of the additional paths is allocated, for example, in such a manner as given in items (5) to (12) below by the form changing processing described above. Consequently, the allocation in the multipoint type is finally such as given in the items (1) to (12) below.

It is to be noted, however, that, in this instance, a single accommodation position is used for the originating user 6A-1 and another single accommodation position is used for the terminating user groups 6A-2 to 6A-4.

(1) Between ① and ATM exchange: VPI=0, VCI=32, band=10 Mbps
(2) Between ATM exchange and ④: VPI=0, VCI=32, band=10 Mbps
(3) Between ATM exchange and ⑤: VPI=0, VCI=33, band=10 Mbps
(4) Between ATM exchange and ⑥: VPI=0, VCI=34, band=10 Mbps
(5) Between ② and ATM exchange: VPI=0, VCI=33, band=10 Mbps
(6) Between ATM exchange and ⑦: VPI=0, VCI=35, band=10 Mbps
(7) Between ATM exchange and ⑨: VPI=0, VCI=36, band=10 Mbps
(8) Between ATM exchange and ⑪: VPI=0, VCI=37, band=10 Mbps
(9) Between ③ and ATM exchange: VPI=0, VCI=34, band=10 Mbps
(10) Between ATM exchange and ⑧: VPI=0, VCI=38, band=10 Mbps
(11) Between ATM exchange and ⑩: VPI=0, VCI=39, band=10 Mbps
(12) Between ATM exchange and ⑫: VPI=0, VCI=40, band=10 Mbps As a result, VPI/VCI/band information is finally set as given below on the call control memories 521-1 to 521-6 after the form changing.

call control memory 521-1 on the ①–④ path: VPI/VCI/band information recited in the items (1) and (2)
call control memory 521-2 on the ②–⑤ path: VPI/VCI/band information recited in the items (3) and (5)
call control memory 521-3 on the ③–⑥ path: VPI/VCI/band information recited in the items (4) and (9)
call control memory 521-4 on the ⑦–⑨ path: VPI/VCI/band information recited in the items (6) and (7)
call control memory 521-5 on the ⑧–⑪ path: VPJ/VCJ/band information recited in the items (8) and (10)
call control memory 521-6 on the ⑩–⑫ path: VPI/VCI/band information recited in the items (10) and (12)

It is to be noted that, also in FIG. 22, reference symbols 521A to 521C denote head address parts which hold memory addresses of the call control memories 521-1, 521-4 and 521-6 linked with them and the numbers of links (chain link numbers), respectively. Further, portions of the call control memories 521-3 and 521-3 indicated by slanting lines represent that various kinds of information are individually set under the same condition as that of the call control memory 521-1, and portions of the call control memories 521-5 and 521-6 indicated by nets represent that various kinds of information are individually set under the same condition as that of the call control memory 521-4.

Consequently, even if type changing to the multipoint type is performed, the existing call control memories 521-1 to 521-3 for the broadcast type are used commonly as resources as the call control memories 521-1 to 521-3 for the multipoint type.

In short, in this instance, unless some change occurs with the origination and termination accommodation positions of the user terminals 6-1 and 6-4 to 6-6, the resource management section 56 (link changing control section 26) sets and/or changes the mutually linked condition of those of the pertinent ones of the call control memories 521-4 to 521-6 which are to be changed newly to establish a mutually linked condition of the call control memories 521-1 to 521-6 for the multipoint type and uses the existing call control memories 521-1 to 521-3 commonly to effect changing to the PVC service of the multipoint type.

Accordingly, while the memory amount necessary for the call control memories 521-1 to 521-6 in the main storage section 52 can be saved to a great extent, changing to the PVC service of the multipoint type can be performed rapidly. Further, even when some change occurs in the origination and termination accommodation positions of the user terminals 6-1 and 6-4 to 6-6, since it is only required to establish a mutually linked condition of all of the pertinent ones of the call control memories 521-1 to 521-6 as shown in FIG. 22, also in this instance, changing to the PVC service of the multipoint type can be performed readily.

Thereafter, it is checked by the ATM exchange 5 whether or not type changing to the multipoint type PVC service has been performed regularly as shown in FIG. 21 (steps C16 and C17), and if the type changing has been performed regularly (when the determination in step C17 is YES), this is reported to the maintenance engineer through the maintenance terminal 7, thereby ending the type changing control (step C18).

On the other hand, if it is detected that some trouble has occurred in the type changing (when the discrimination in step C17 is NO), all setting such as the call control memories 521-1 to 521-6, subscriber data, VPI/VCI, use band and path setting is returned to that of the original broadcast type by the resource management section 56 (relief control section 29) (step C19), and the fact that the type changing from the PVC service of the broadcast type to the PVC service of the multipoint type has not been performed successfully is reported to the maintenance engineer through the maintenance terminal 7, thereby ending the processing irregularly (step C20).

Accordingly, even if changing to the multipoint type PVC service has not been performed successfully, such degradation in service that a user cannot enjoy a communication service over a long time can be prevented with certainty.

As described above, with the present ATM exchange 5, when changing command information to the multipoint type PVC service is inputted through the maintenance terminal 7, since the resource management section 56 (link changing control section 26) sets and/or changes a mutually linked condition of the pertinent ones of the call control memories 521-1 to 521-6, a mutually linked condition for the multipoint type PVC service for changing as shown in FIG. 22 is established, and consequently, changing to the multipoint type PVC service can be performed very readily without individual provision of call control memories for the multipoint type PVC service for the subscriber information ① to ⑫ and also the changing processing can be performed rapidly.

(D-2) Type Changing Control to the Multipoint Type SVC Service by a User

Subsequently, type changing control from such a merge (Merge) type (one to multiple communication: unidirectional communication) SVC service as shown in FIG. 23(a) to such a multipoint type SVC service as shown in FIG. 23(b) will be described as an example of type changing control to a multipoint type SVC service by a user.

It is to be noted that, while, in FIGS. 23(a) and 23(b), elements denoted by like reference symbols to those shown in FIGS. 19(a) and 19(b) are similar to those described hereinabove with reference to FIGS. 19(a) and 19(b), the user terminals 6-1 and 6-4 to 6-6 which construct the user groups 6A-1 to 6A-4 shown in FIGS. 23(a) and 23(b) are accommodated in the ATM exchange 5 via public lines.

Further, it is assumed that the merge type SVC service illustrated in FIG. 23(a) is, by such a control procedure as described hereinabove with reference to FIGS. 16 and 17, such that such call control memories 521-1 to 521-3 provided for individual paths between the subscriber information ① and ④, between the subscriber information ② and ⑤ and between the subscriber information ③ and ⑥ and protocol control memories 522-1 to 522-6 for the subscriber information ① to ⑥ as shown in FIG. 18 are provided in the main storage section 52 and they are in a mutually linked condition (the communication service providing section 23 which can provide a desired form of a communication service).

And, when the type is to be changed from such a merge type SVC service as shown in FIG. 23(a) to such a multipoint type SVC service as shown in FIG. 23(b), the ATM exchange 5 must register the subscriber information ⑦ to ⑫ as subscribers who can enjoy the multipoint type SVC service, additionally set three paths between the subscriber information ⑦ and ⑨, between the subscriber information ⑧ and ⑪ and between the subscriber information ⑩ and ⑫, and perform changing so that bidirectional communication is possible for all of the paths.

In the following, the type changing control will be described in detail with reference to the sequence diagrams (steps D1 to D28) shown in FIGS. 24 to 26. It is to be noted that, in the following description, the originating user 6A-1 is referred to as user A and the terminating user groups 6A-2 to 6A-4 are referred to as users B to D, respectively.

Figure 24:
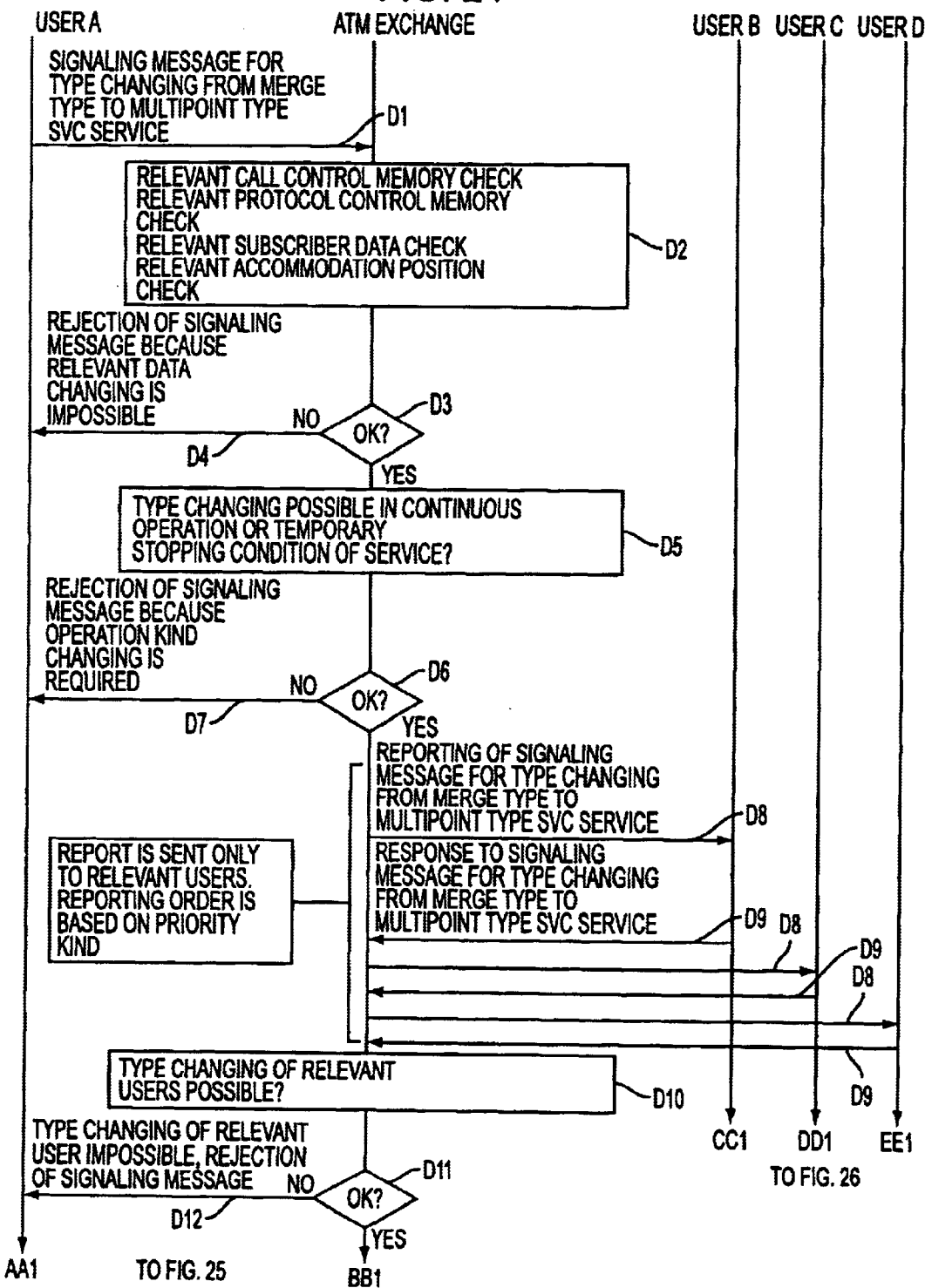
FIG. 24 is a sequence diagram illustrating the point to multipoint type changing control by the ATM exchange of the present embodiment.

First, as shown in FIG. 24, the user A transmits a request to change the type from the merge type SVC service to the SVC service of the multipoint type to the ATM exchange 5 through a user terminal (for example, the user terminal 6-1) using a signaling message (changing message information) having, for example, such a format as shown in FIG. 74 (step D1).

It is to be noted that, as the signaling message described above, various kinds of data similar to the maintenance commands illustrated in FIG. 73 can be designated, and also "Call reference". "Endpoint reference" and so forth on the origination side can be designated. Further, also in this instance, similarly to the maintenance commands, as a type changes, the "Call reference", an adding termination accommodation position, an adding termination telephone number/address, an adding termination VPI/VCI, an adding termination use band, an adding use cell type (priority/non-priority cell or the like), "Endpoint reference" and so forth are designated corresponding to the subscriber information ⑦ to ⑫ of the user terminals 6-4 to 6-6 to be additionally registered.

Then, when the signaling message is received, the ATM exchange 5 checks the call control memories 521-1 to 521-3 and the protocol control memories 522-1 to 522-6 in the corresponding main storage section 52 by means of the resource management section 56 (registration information condition discrimination section 30) and checks subscriber data and the accommodation positions of the subscribers by means of the subscriber operation condition management section 60 (steps D2 and D3).

As a result, when the pertinent data cannot be changed (when the discrimination in step D3 is NO), the type changing signaling message from the user A is rejected (step D4).

On the other hand, when the pertinent data can be changed (when the discrimination in step D3 is YES), the ATM exchange 5 discriminates by the service condition discrimination section 31 whether or not type changing can be performed in a continued operation condition of the service or a temporarily stopped condition of the service (steps D5 and D6). As a result, if type changing is impossible because changing of the operation type is necessary (when the discrimination in step D6 is NO), then also in this instance, the type changing signaling message from the user A is rejected (step D7).

In short, in the present ATM exchange 5, only when it is discriminated by the registration information condition discrimination section 30 that the mutually linked condition can be changed, the mutually linked condition of the pertinent ones of the call control memories 521-1 to 521-3 and protocol control memories 522-1 to 522-6 is changed to construct a mutually lined condition for the multipoint type SVC service so that changing to the multipoint type SVC service can be performed with certainty as hereinafter described.

Further, if it is discriminated by the service condition discrimination section 31 that the mutually linked condition of the pertinent ones of the call control memories 521-1 to 521-3 and protocol control memories 522-1 to 522-6 can be changed (if the discrimination in step D6 is YES), then the following control is performed continuously so that, even if the merge type SVC service in operation is continued, type changing to the multipoint type SVC service can be performed.

In particular, the ATM exchange 5 reports, to pertinent ones of the users B to D which make an object of type changing, a signaling message (changing message information) corresponding to the type changing signaling message inputted through a user terminal constructing the user A and representing that a request to change the type from the merge type SVC service to the multipoint type SVC service has been received (step D8), and those users B to D which receive the report return a response to the report to the ATM exchange 5 using a signaling message (step D9). It is to be noted that the reporting of the changing signaling message to the users B to D by the reporting section 32 is performed in accordance with a predetermined priority order set in advance by means of the priority reporting section 321.

Accordingly, also the users B to D other than the user A which has issued the type changing signaling message from the merge type SVC service to the multipoint type SVC service can recognize the charging prior to actual changing. Further, since this reporting is performed in accordance with the predetermined priority order set in advance by the priority reporting section 321, the type changing can be recognized with certainty by the users B to D.

Thereafter, the ATM exchange 5 further checks whether or not type changing of the pertinent users (all or some of the users A to D) is possible (steps D10 and D11), and when type changing is impossible (when the discrimination in step D11 is NO), the ATM exchange 5 rejects the type changing signaling message from the user A (step D12).

Figure 25:
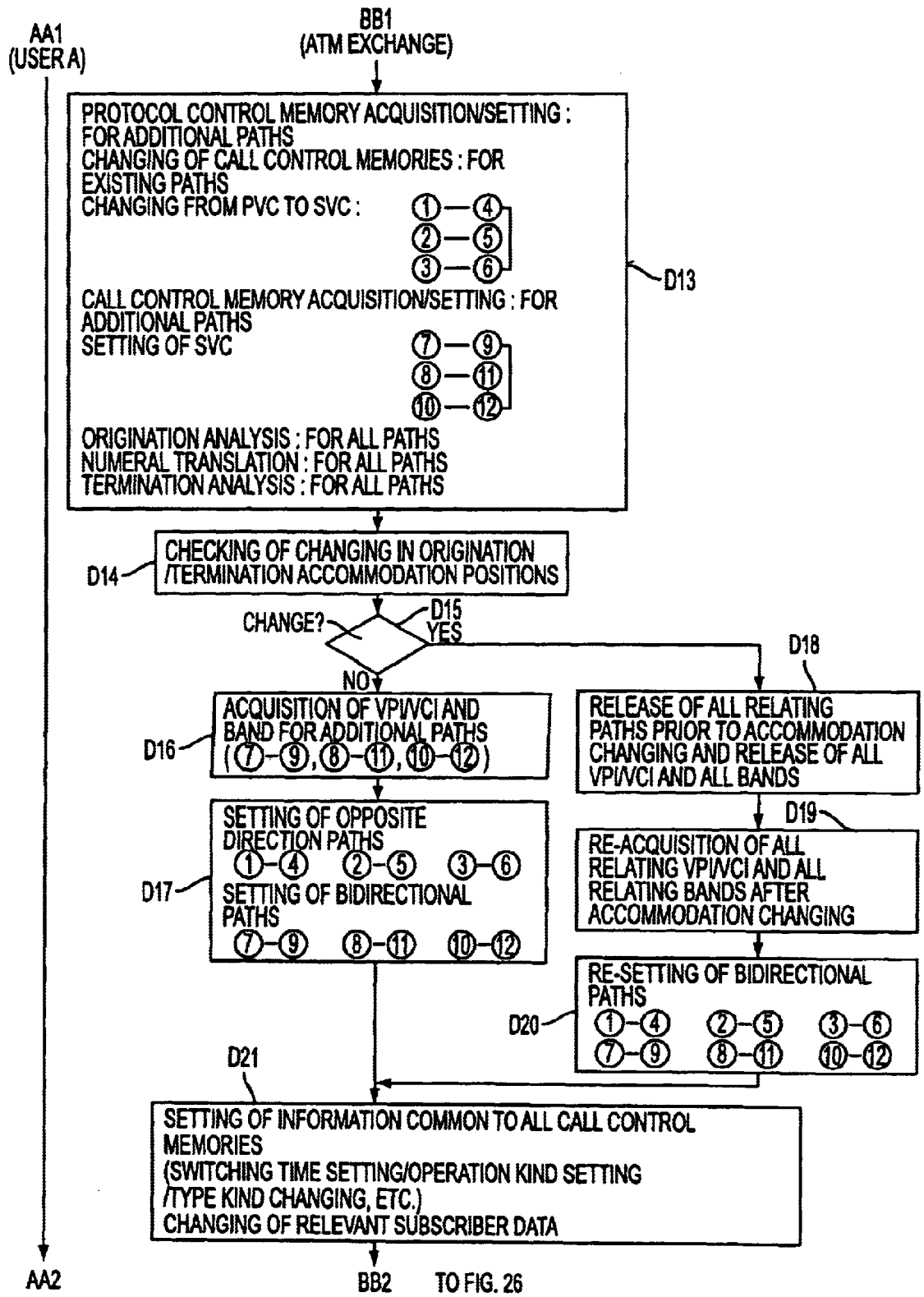
FIG. 25 is a sequence diagram illustrating the point to multipoint type changing control by the ATM exchange of the present embodiment.
Figure 27:
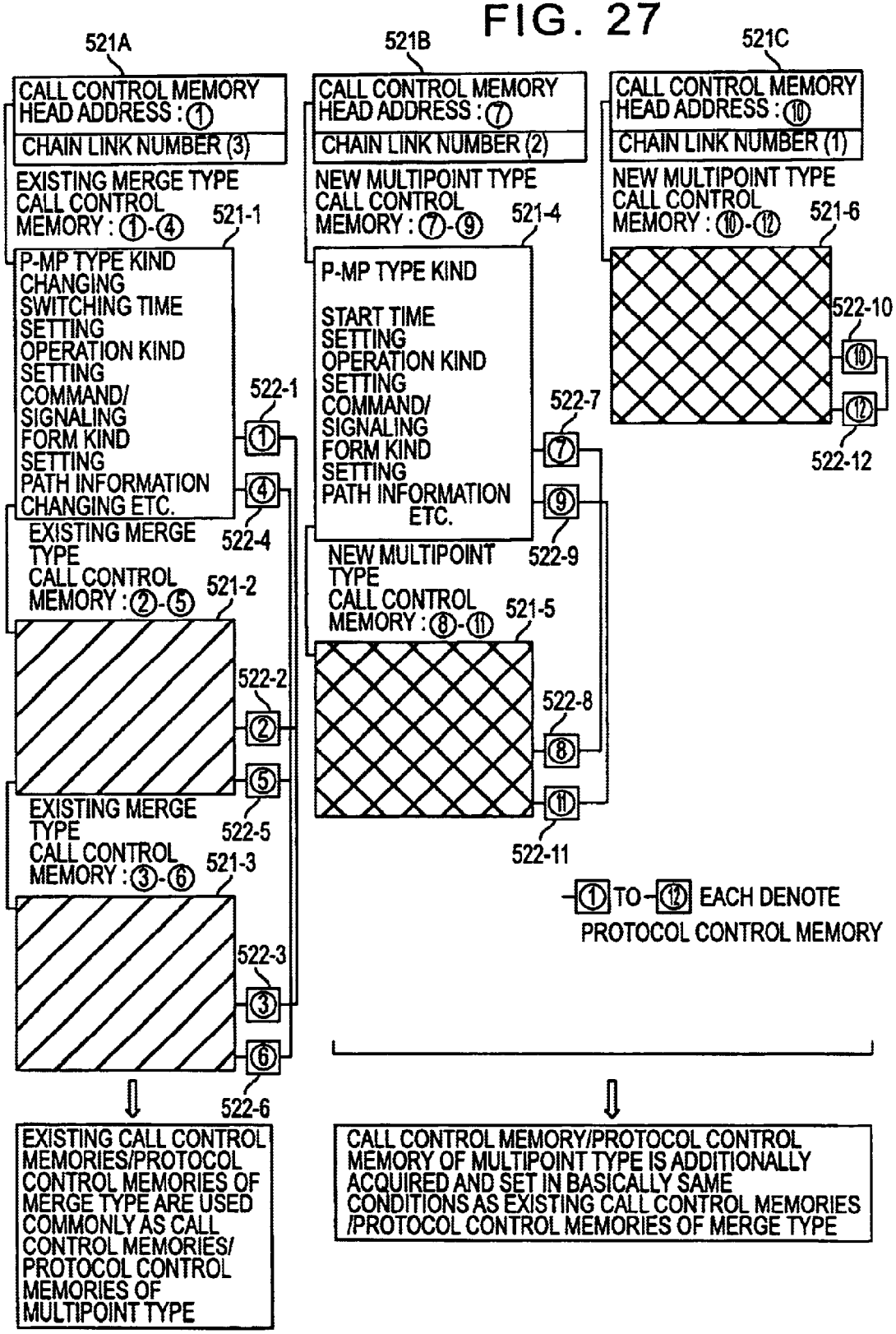
FIG. 27 is a diagrammatic view illustrating an example of mutually linked relationship of the call control memories and the protocol control memories constructed in the ATM exchange of the present embodiment.

On the other hand, when type changing is possible (when the discrimination in step D11 is YES), the ATM exchange 5 effects. as shown in FIGS. 25 and 27, such processing as acquisition/setting of the call control memories 521-4 to 521-6 for additional paths (paths between the subscriber information ⑦ and ⑨, between the subscriber information ⑧ and ⑪ and between the subscriber information between ⑩ and ⑫), changing of information in the existing call control memories 521-1 to 521-3, acquisition/setting of the protocol control memories 522-7 to 522-12 to be added newly, origination analysis for all paths, numeral translation, termination analysis processing (step D13).

Further, the ATM exchange 5 checks whether or not the accommodation positions of the users A to D have been changed (steps D14 and D15). If the accommodation positions have not been changed (when the discrimination in step D15 is NO), the ATM exchange 5 performs acquisition of VPI/VCI and bands for the additional paths (paths between the subscriber information ⑦ and ⑨, between the subscriber information ⑧ and ⑪ and between the subscriber information between ⑩ and ⑫) (step D16). Then, the ATM exchange 5 sets paths of the opposite directions for the existing paths (paths between the subscriber information ① and ④, between the subscriber information ② and ⑤ and between the subscriber information ③ and ⑥) and sets bidirectional paths for the additional paths (step D17).

On the other hand, if the accommodation positions of the users A to D have been changed (when the discrimination in step D15 is YES), then the ATM exchange 5 performs release of all paths involved prior to the changing and release of all VPI/VCI and all bands (step D18), and performs acquisition of all VPI/VCI and all bands involved after the change (step D19). Thereafter, the ATM exchange 5 re-sets bidirectional paths for all paths (step D20).

In short, the present ATM exchange 5 is constructed such that, unless there is a change in the origination and termination accommodation positions of the users A to D, by setting and changing the mutually linked condition of the pertinent ones of the call control memories 521-4 to 521-6 and protocol control memories 522-7 to 522-12 to be changed newly to construct a mutually linked condition for the multipoint type SVC service, the existing call control memories 521-1 to 521-3 and protocol control memories 522-1 to 522-6 can be used commonly to effect changing to the multipoint type SVC service. It is to be noted that the protocol conditions are all in an active condition.

Accordingly, changing from the merge type SVC service to the multipoint type SVC service can be performed rapidly while saving the memory amount of the main storage section 52 necessary for the call control memories 521-1 to 521-6 and the protocol control memories 522-1 to 522-12 by a large amount.

Further, even if there is a change in the origination and termination accommodation positions of the users A to D, changing to the multipoint type SVC service can be performed readily if a mutually linked condition of all of the pertinent ones of the call control memories 521-1 to 521-6 and protocol control memories 522-1 to 522-12 is constructed as shown, for example, in FIG. 27.

It is to be noted that, in FIG. 27, slanting line portions of the call control memories 521-2 and 521-3 indicate that various kinds of information (P-MP type kind changing, switching time, operation kind and so forth) are set under similar conditions as those of the call control memory 521-1, and netted portions of the call control memories 521-5 and 521-6 indicate that various kinds of information (P-MP type kind, start time, operation kind and so forth) are set under similar conditions to those of the call control memory 521-4.

Thereafter, when bidirectional paths are set to the individual paths as described above, the ATM exchange 5 performs setting of common information (setting of a switching time, setting of an operation type, changing of a type kind and so forth) for all of the call control memories 521-1 to 521-3 and performs changing of the pertinent subscriber data (step D21).

Figure 26:
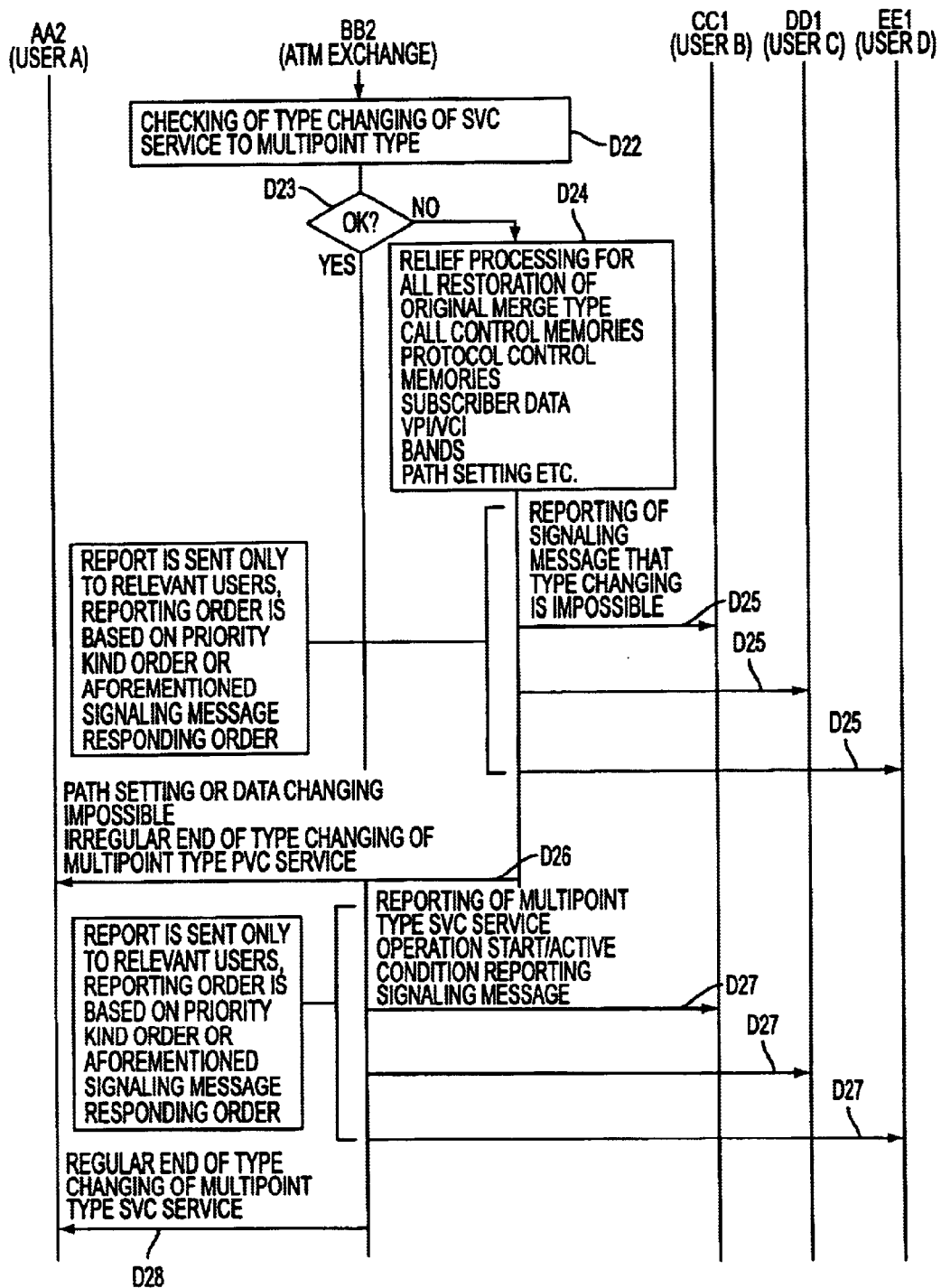
FIG. 26 is a sequence diagram illustrating the point to multipoint type changing control by the ATM exchange of the present embodiment.

Further, the ATM exchange 5 checks whether or not the changing of the SVC service type to the multipoint type has been performed regularly as shown in FIG. 26 (steps D22 and D23). If the type changing has been performed regularly (when the discrimination in step D23 is YES), the ATM exchange 5 reports, by the reporting section 32, to the pertinent ones of the users B to D that the type changing to the multipoint type SVC service has been performed to prepare for starting of operation (step D27), and reports to the user A which has requested type changing that the type changing to the multipoint type SVC service has been performed regularly, thereby ending the processing (step D28).

On the other hand, if there is a trouble in the type changing (when the discrimination in step D23 is NO), the ATM exchange 5 performs, by the resource management section 56 (relief control section 33), relief processing to return all information involved in the type changing such as the call control memories 521-1 to 521-6, protocol control memories 522-1 to 522-12, subscriber data, VPI/VCI, bands and path setting to that prior to the changing (step D24).

In short, in the present ATM exchange 5, if a trouble is detected when a mutually linked condition of the pertinent call control memories 521-1 to 521-6 and protocol control memories 522-1 to 522-12 is set or changed by the resource management section 56 in order to effect type changing from the merge type SVC service to the multipoint type SVC service, then all information involved in the type changing is returned to that in a condition prior to the changing by the relief control section 33 to restore the merge type SVC service prior to the changing.

Accordingly, even if changing from the merge type SVC service to the multipoint type SVC service is not performed regularly, such degradation in service performance that the users A to D cannot enjoy a communication service over a long period of time can be eliminated with certainty.

Further, the ATM exchange 5 reports, by the other user trouble end reporting section 332 (refer to FIG. 10), to pertinent ones of the users B to D by a signaling message that type changing from the merge type SVC service to the multipoint type SVC service is impossible and the merge type SVC service prior to the changing has been restored (step D25). Further, the ATM exchange 5 reports, by the trouble end reporting section 331, also to the user A which has sent out the type changing signaling message that the merge type SVC service prior to the changing has been restored, thereby ending the processing (step D26).

Accordingly, in this instance, it can be recognized by all of the users A to D which make an object of the type changing whether or not changing from the merge type SVC service to the multipoint type SVC service has been performed, and the situation of the type changing can be grasped with certainty.

It is to be noted that the reporting by the other user terminal trouble end reporting section 332 described is performed in accordance with a predetermined priority type (priority order) set in advance by the priority reporting section 333 or a responding order to the signaling message described above (refer to step D9 in FIG. 24).

As described above, with the present ATM exchange 5, when a changing signaling message (changing message information) from the merge type SVC service to the multipoint type SVC service is inputted through the user A, since the resource management section 52 (link changing control section 26) sets and changes the mutually linked condition of the pertinent ones of the call control memories 521-1 to 521-6 and protocol control memories 522-1 to 522-12 to construct a mutually linked condition for the multipoint type SVC service, even in a communication service (SVC service) which makes use of public lines, changing to another form of communication service can be performed very readily and also this changing processing can be performed rapidly.

Accordingly, the user A can change from a communication service of an arbitrary form (type) to a communication service of another type readily, and consequently, simplification in maintenance operation can be achieved and an influence upon a busy user upon type changing can be reduced.

(D-3) Simultaneous Type Changing Control to the Multipoint Type Service by a Maintenance Engineer In the following, a case wherein the type changing control from the broadcast type PVC service to the multipoint type PVC service by a maintenance engineer described in the paragraph (D-1) above is performed simultaneously for a plurality of user groups will be described.

Figure 75:
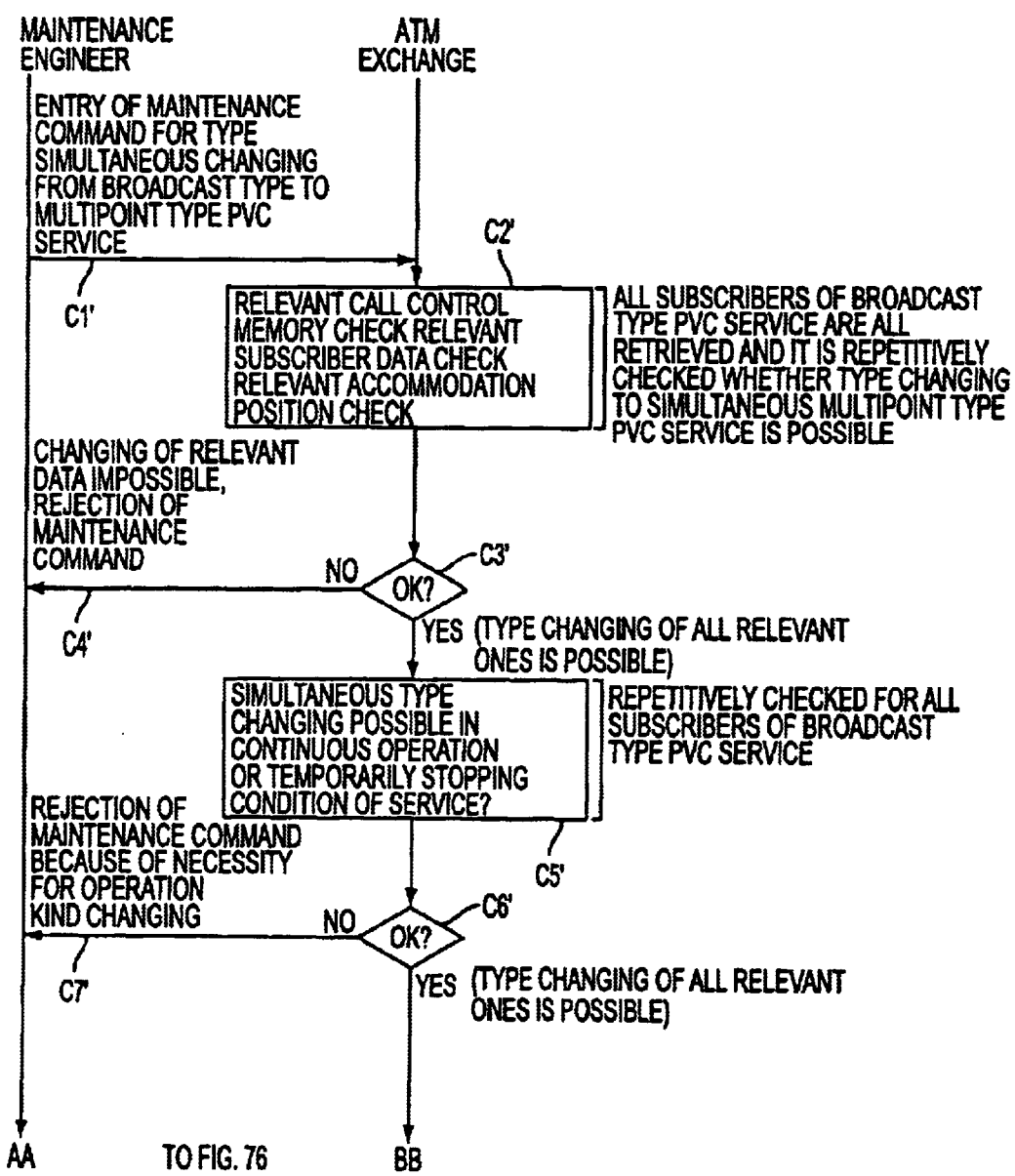
FIG. 75 is a sequence diagram illustrating point to multipoint simultaneous type changing control by the ATM exchange of the present embodiment.

First, as shown in FIG. 75, a maintenance engineer of the ATM exchange 5 first enters a simultaneous type changing maintenance command (simultaneous changing command information) for performing simultaneous type changing from the broadcast type PVC service to the multipoint type PVC service through the maintenance terminal 7 (step C1'). It is to be noted that, while the simultaneous type changing maintenance command has a format basically similar to the format shown in FIG. 73, in this instance, it designates, for individual user groups, in various data designation regions, information (PVC/SVC kind, P-MP type kind and so forth) of the user groups for which type changing should be performed.

Then, the ATM exchange 5 retrieves, based on the simultaneous type changing maintenance command, by the registration information condition discrimination section 27, all subscribers of the broadcast type PVC service which make an object of the type changing and repetitively performs, for each of the user groups, checking (verification) of the call control memories 521-i, the subscriber data (user terminal registration information), the user terminal accommodation positions and so forth of the user group to repetitively discriminate whether or not the mutually linked condition of the pertinent call control memories 521-i of the user group can all be performed (step C2').

Then, when it is discriminated as a result of the discrimination that changing of even at least one of the pertinent data (changing of the mutually linked condition) cannot be performed (when the discrimination in step C3' is NO), the simultaneous type changing changing maintenance command from the maintenance terminal 7 is rejected (step C4'), but when changing of the pertinent data of all of the user groups is possible (when the discrimination in step C3' is YES), the discrimination whether it is possible to change the mutually linked condition of the pertinent call control memories 521-i to change the type while a service in operation (the broadcast type PVC service) is continued or in a condition wherein a service in operation is temporarily stopped is performed repetitively for all of the pertinent user groups by the service condition discrimination section 28 (step C5').

Figure 76:
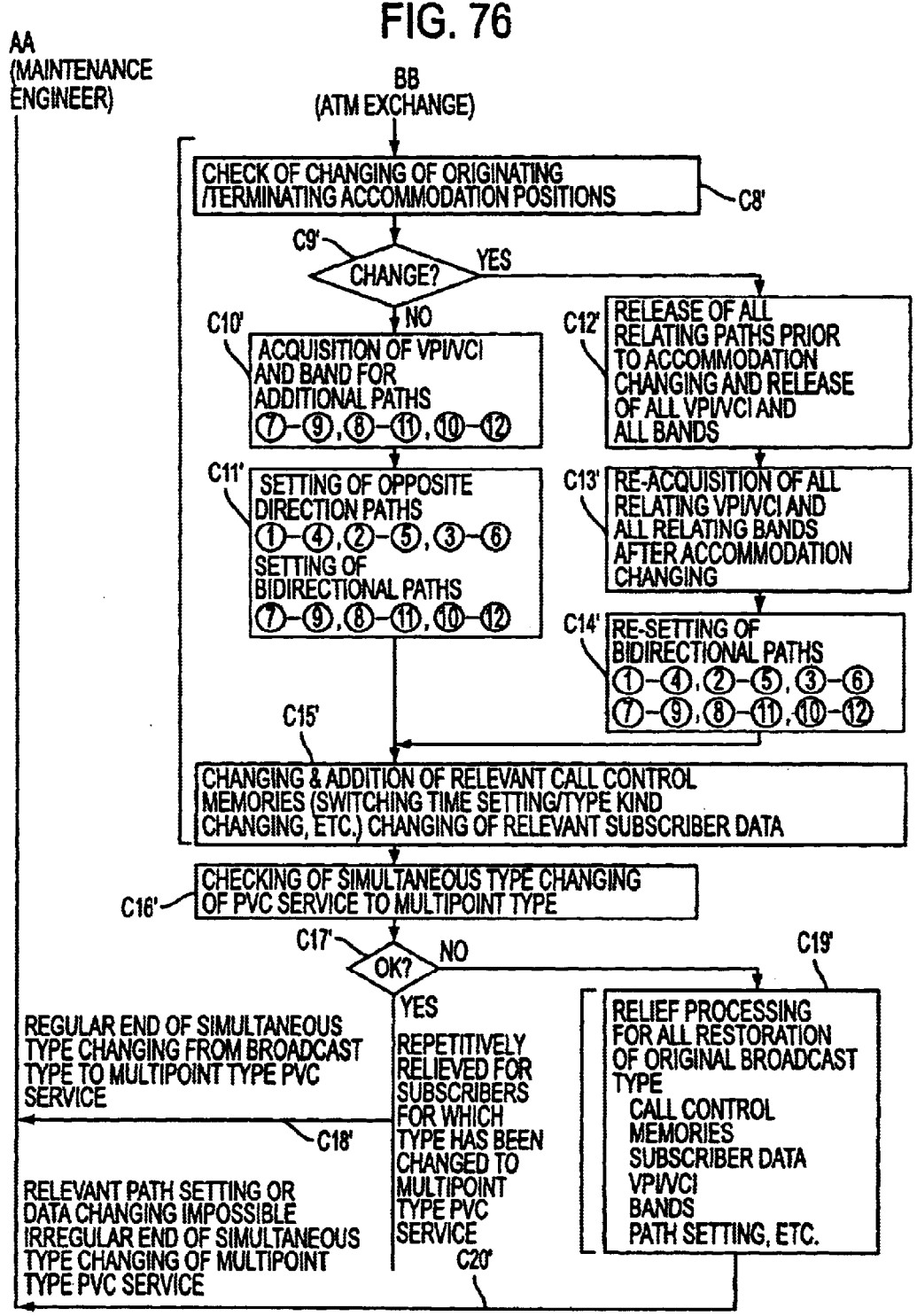
FIG. 76 is a sequence diagram illustrating the point to multipoint simultaneous type changing control by the ATM exchange of the present embodiment.

As a result, if there is at least one user group with which the type changing is impossible because changing of the operation kind is required, that is, if there is at least one group with which changing of the mutually linked condition of the call control memories 521-i is impossible (when the discrimination in step C6' is NO), also in this instance, the inputted simultaneous type changing maintenance command is rejected (step C7'). However, if the type changing is possible with all of the pertinent user groups (when the discrimination in step C6' is YES), checking of the origination and termination accommodation positions (steps C8' and C9'), path setting processing (steps C10' to C14') and updating processing (step C15') for various data in the pertinent call control memories 521-i and subscriber data are repetitively performed for all subscribers of the broadcast type PVC service as shown in FIG. 76.

It is to be noted that the processes in steps C8' to C15' described above are performed similarly to the processes described hereinabove in connection with steps C8 to C15 shown in FIG. 21, respectively. In particular, when there is no change in the origination and termination accommodation positions of the user terminals 6-1 and 6-4 to 6-6 (when the discrimination in step C9' is NO), the ATM exchange 5 acquires only VPI/VCI and use bands corresponding to additional paths (step C10'), and sets paths only for the reverse direction between the subscriber information ① and ④, between the subscriber information ② and ⑤ and between the subscriber information ③ and ⑥ for which the unidirectional paths have already been set in the broadcast type PVC service, but sets bidirectional paths to paths for which setting is required newly (between the subscriber information ⑦ and ⑨, between the subscriber information ⑧ and ⑪ and between the subscriber information ⑩ and ⑫) (step C11').

On the other hand, if the origination or accommodation position of some user has been changed in step C9' described above (when the discrimination in step C9' is YES), the ATM exchange 5 performs release of all relating paths prior to the changing of the accommodation positions and release of all of the VPI/VCI and all of the bands (step C12'), and then re-acquires all involved VPI/VCI and all involved bands after the changing of the accommodation positions (step C13'), whereafter it re-sets bidirectional paths for all paths (step C14').

Then, the ATM exchange 5 performs changing of the information [setting of the switching time, changing of the point to multipoint (P-MP) type kind and so forth] in the pertinent ones of the call control memories 521-1 to 521-3 (existing call control memories for the broadcast type) provided for the individual paths between the subscriber information ① and ④, between the subscriber information ② and ⑤ and between the subscriber information ③ and ⑥ which make an object of the type changing. Further, the ATM exchange 5 additionally acquires/sets the call control memories 521-4 to 521-6 (call control memories for the multipoint type) corresponding to new paths between the subscriber information ⑦ and ⑨, between the subscriber information ⑧ and ⑪ and between the subscriber information ⑩ and ⑫ in the main storage section 52 and sets various informations basically under similar conditions to those of the existing call control memories 521-1 to 521-3 for the broadcast type other than setting of the P-MP type kind and the start time (step C15').

Subsequently, the ATM exchange 5 checks whether or not the simultaneous type changing to the multipoint type PVC service has been performed regularly (steps C16' and C17'), and when the simultaneous type changing has been performed regularly (when the discrimination in step C17' is YES), this is reported to the maintenance engineer through the maintenance terminal 7, thereby ending the simultaneous type changing control (step C18').

On the other hand, when it is detected that some trouble has occurred in the simultaneous type changing (when the discrimination in step C17' is NO), the ATM exchange 5 repeats, by the resource management section 56 (relief control section 29), all setting of the pertinent user groups such as the call control memories 521-1 to 521-6, subscriber data, VPI/VCI, use bands and path setting for each user group to restore the original broadcast type PVC service (step C19'), and reports to the maintenance engineer through the maintenance terminal 7 that simultaneous type changing of the PVC service from the broadcast type to the multipoint type has not been performed successfully, thereby ending the processing (step C20').

Accordingly, also in this instance, even if simultaneous type changing to the multipoint type PVC service has not successfully been performed regularly, such degradation in service performance that the users cannot enjoy a communication service over a long period of time can be eliminated with certainty.

As described above, with the present ATM exchange 5, if a simultaneous changing command to the multipoint type PVC service is inputted through the maintenance terminal 7, then the resource management section 56 (link changing control section 26) repetitively sets and changes, for each user group, the mutually linked condition of the pertinent ones of the call control memories 521-1 to 521-6 of the user group so that a mutually linked condition for the multipoint type PVC service for changing is constructed simultaneously for the individual user groups.

Accordingly, also when the broadcast type PVC service which is in operation in a plurality of user terminal groups is to be changed to the multipoint type PVC service, the maintenance engineer need not enter a command for type changing for each one user group, and the burden of a form changing operation by the maintenance operation can be reduced further remarkably.

It is to be noted that the simultaneous type changing control described above is performed similarly also upon simultaneous changing from the PVC (or SVC) service of any other type than the broadcast type to the PVC (or SVC) service of any type other type than the multipoint type.

(D-4) Simultaneous Type Changing Control to the Multipoint Type SVC Service by a User In the following, a case wherein the type changing control from the merge type SVC service to the multipoint type SVC service by a user described in the paragraph (D-2) above is performed simultaneously for a plurality of user groups will be described.

Figure 77:
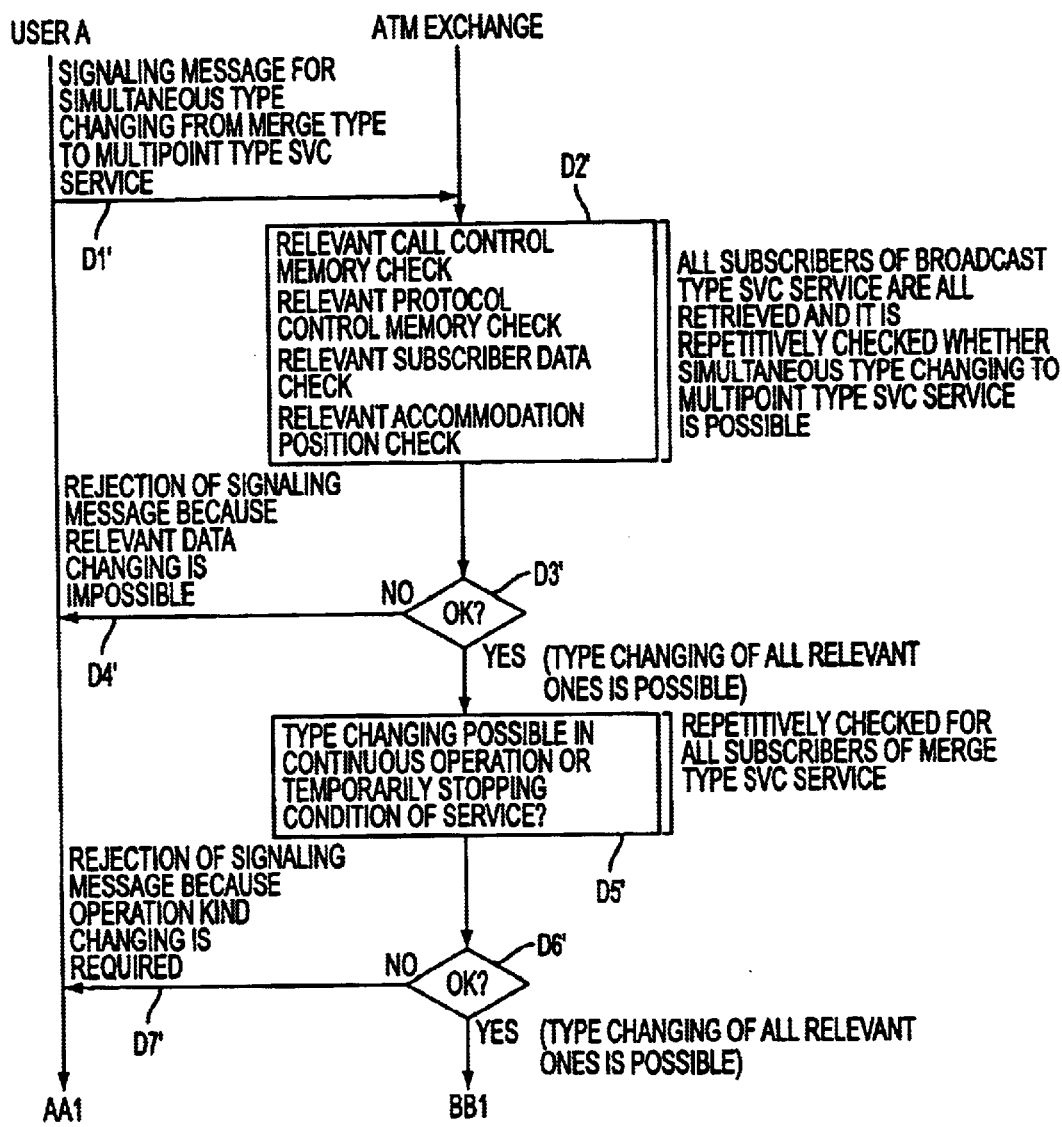
FIG. 77 is a sequence diagram illustrating the point to multipoint simultaneous type changing control by the ATM exchange of the present embodiment.

First, as shown in FIG. 77, the user A originates a request for simultaneous type changing from the merge type SVC service to the multipoint type SVC service by means of a signaling message (simultaneous changing message information) to the ATM exchange 5 through a user terminal (for example, user terminal 6-1) (step D1').

It is to be noted that, while this signaling message has a format basically similar to the format shown in FIG. 74, in this instance, information (PVC/SVC kind, P-MP type kind and so forth) regarding those user groups with which the type changing should be performed is designated in various data designation regions for the user groups.

Then, upon reception of the signaling message, the ATM exchange 5 checks, by the resource management section 56 (registration information condition discrimination section 30), the pertinent ones of the call control memories 521-1 to 521-3 and protocol control memories 522-1 to 522-6 in the main storage section 52 and repetitively checks, by the subscriber operation condition management section 60, the subscriber data, the accommodation positions of the subscribers and so forth for all subscribers of the merge type SVC service (step D2').

As a result, when it is impossible to change the pertinent data (when the discrimination in step D3' is NO), the simultaneous type changing signaling message from the user A is rejected (step D4').

On the other hand, when it is possible to change all of the pertinent data (when the discrimination in step D3' is YES), the ATM exchange 5 discriminates, by the service condition discrimination section 31, whether or not type changing is possible in a continued operation of the service or in a temporarily stopping condition of the service (step D5'). As a result, if type changing is impossible because changing of the operation kind is required (when the discrimination in step D6' is NO), also in this instance, the type changing signaling message from the user A is rejected (step D7').

In short, in the present ATM exchange 5, only when it is discriminated by the registration information condition discrimination section 30 that changing of the mutually linked condition is possible, the mutually linked condition of the pertinent ones of the call control memories 521-1 to 521-3 and protocol control memories 522-1 to 522-6 is repetitively changed to construct a mutually linked condition for the multipoint type SVC service so that simultaneous changing to the multipoint type SVC service can be performed with certainty.

Further, if it is discriminated by the service condition discrimination section 31 that changing of the mutually linked condition of the pertinent ones of the call control memories 521-1 to 521-3 and protocol control memories 522-1 to 522-6 (when the discrimination in step D6' is YES), then the following control is performed continuously so that, even in a condition wherein the merge type SVC service in operation continues, simultaneous type changing to the multipoint type SVC service can be performed.

Figure 78:
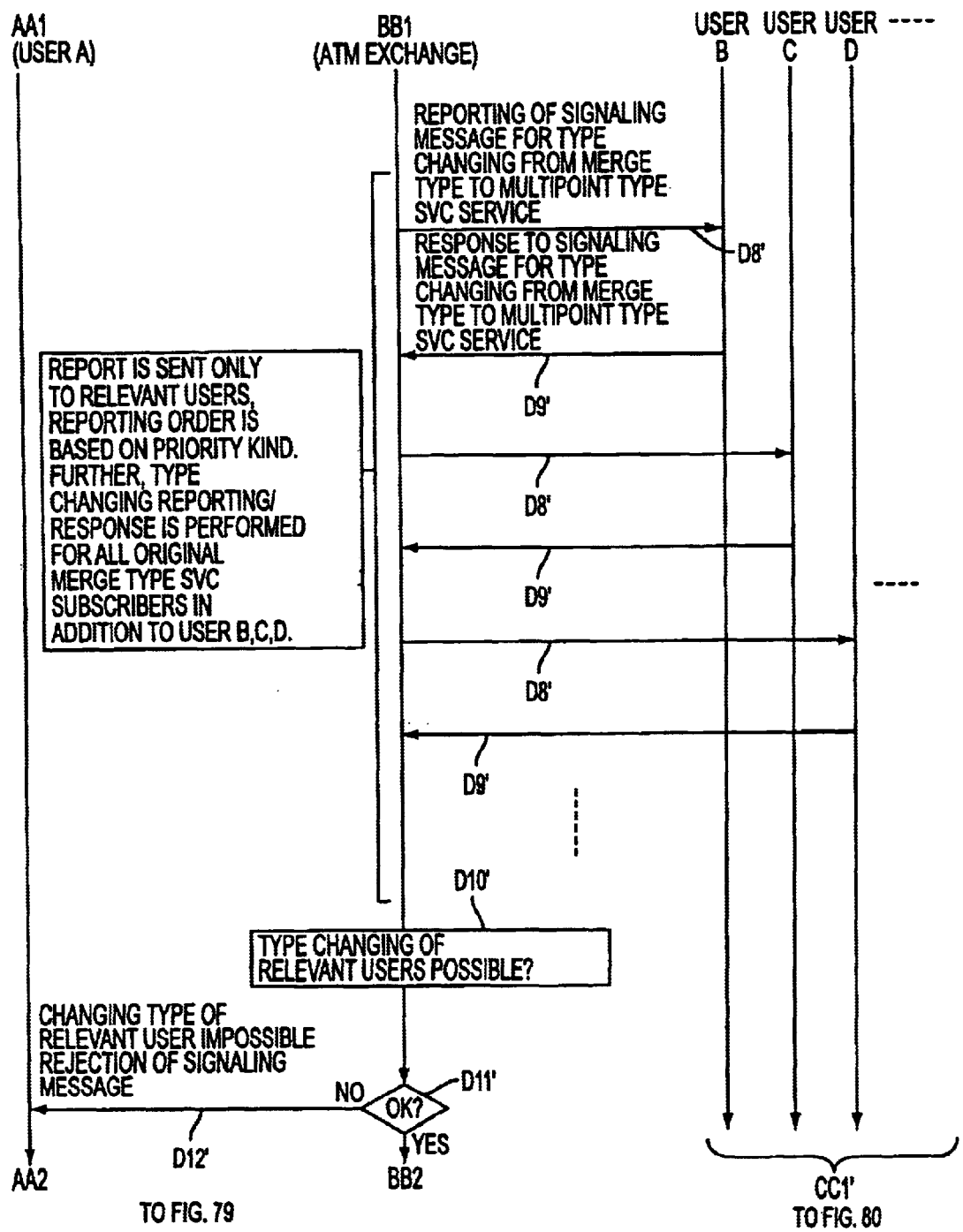
FIG. 78 is a sequence diagram illustrating the point to multipoint simultaneous type changing control by the ATM exchange of the present embodiment.

In particular, as shown in FIG. 78, the ATM exchange 5 repetitively reports, by the reporting section 32, a signaling message (changing message information) inputted through the user A and corresponding to the simultaneous type changing signaling message described above to all of the pertinent ones of the users B to D, . . . that a simultaneous type changing request from the merge type SVC service to the multipoint type SVC service has been received (step D8'). Each of the users B to D, . . . having received this report returns a response to the report by a signaling message to the ATM exchange 5 (step D9'). It is to be noted that the reporting of the changing signaling message to the users B to D, . . . by the reporting section 321 is performed, also in this instance, in accordance with a predetermined priority order set in advance.

Accordingly, also the users B to D, . . . other than the user A which has originated the simultaneous type changing signaling message from the merge type SVC service to the multipoint type SVC service can recognize the simultaneous type changing in advance. Further, since this reporting is performed by the priority reporting section 321 in accordance with a predetermined priority order set in advance, the simultaneous type changing can be recognized with certainty by the users B to D, . . .

Figure 79:
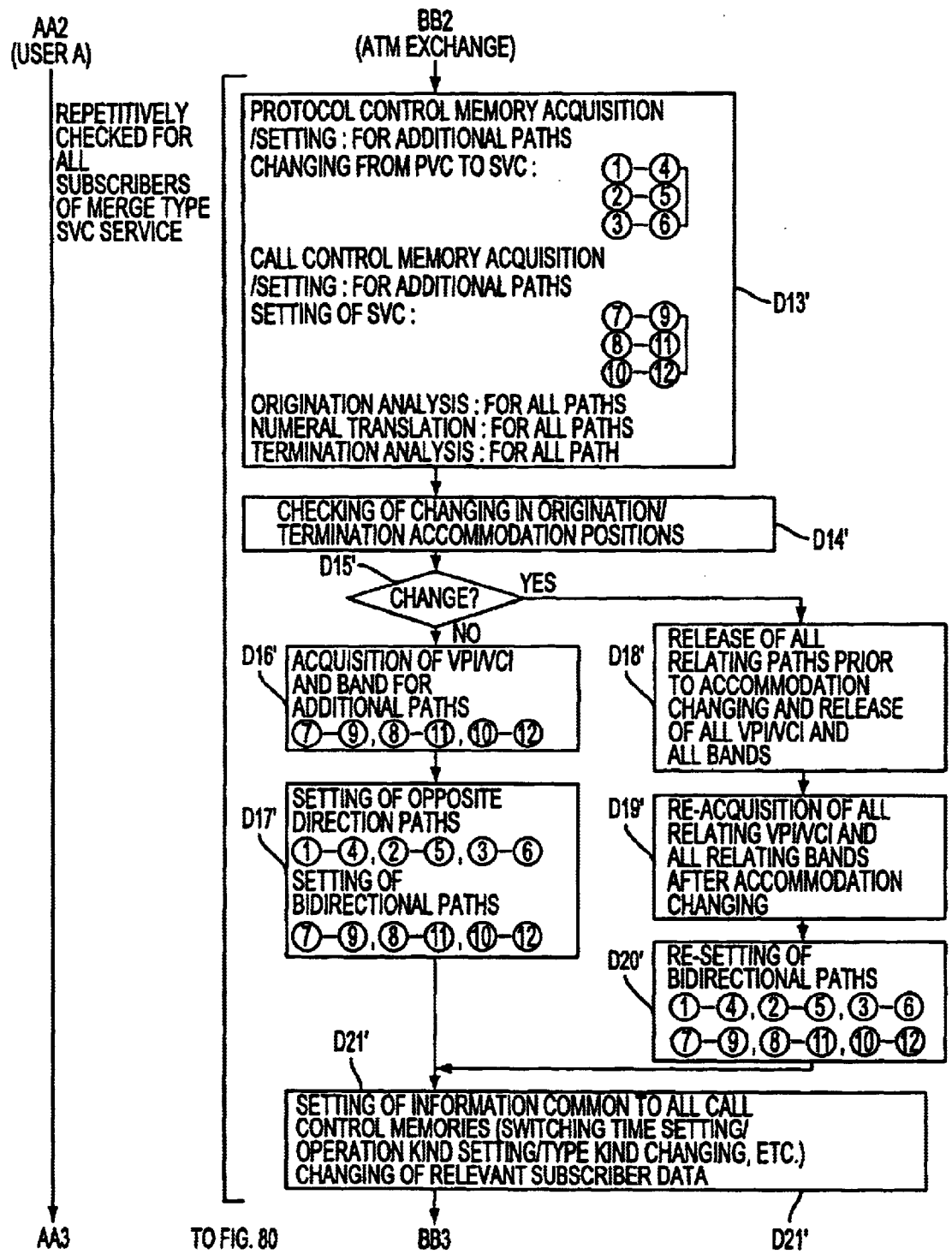
FIG. 79 is a sequence diagram illustrating the point to multipoint simultaneous type changing control by the ATM exchange of the present embodiment.

Thereafter, the ATM exchange 5 further checks whether or not the simultaneous type changing of the pertinent users is possible (steps D10' and D11'), and when the changing is impossible (when the discrimination in step D11' is NO), the ATM exchange 5 rejects the simultaneous type changing signaling message from the user A (step D12'). However, when the changing is possible (when the discrimination in step D11' is YES), acquisition setting of the protocol control memories (step D13'), checking of the origination and termination accommodation positions (steps D14' and D15') path setting processing (steps D16' to D20') and updating processing (step C21') for various data in the pertinent call control memories and the subscriber data are repetitively performed for all subscribers of the merge type SVC service as shown in FIG. 79.

It is to be noted that the processes in steps D13' to D21' described above are performed similarly to the processes described hereinabove in connection with steps D13 to D21 shown in FIG. 25, respectively. In particular, the ATM exchange 5 checks whether or not the accommodation positions of the users A to D, . . . have been changed (step D14'), and when the accommodation positions have not been changed (when the discrimination in step D15' is NO), the ATM exchange 5 performs acquisition of VPI/VCI and a band for the additional paths (for the paths between the subscriber information ⑦ and ⑨, between the subscriber information ⑧ and ⑪ and between the subscriber information ⑩ and ⑫) (step D16'). Then, the ATM exchange 5 sets reverse direction paths to the existing paths (three paths between ① and ④, ② and ⑤, and ③ and ⑥), but sets bidirectional paths to the additional paths (step D17').

On the other hand, when the accommodation positions of the users A to D. . . . have been changed (when the discrimination in step D15' is YES), the ATM exchange 5 performs release of all relating paths prior to the changing and release of all VPI/VCI and all bands (step D18') and then acquires all relating VPI/VCI and all relating bands after the changing (step D19'), whereafter it re-sets bidirectional paths to all paths (step D20').

Consequently, the existing call control memories 521-1 to 521-3 and protocol control memories 522-1 to 522-6 are used as call control memories and protocol control memories for the multipoint type SVC service after the type changing to achieve common use of resources (memory amount). Accordingly, the ATM exchange 5 can perform changing from the merge type SVC service to the multipoint type SVC service rapidly while saving the memory amount of the main storage section 52 necessary for the type changing by a large amount.

Further, even when the origination and termination accommodation positions of the users A to D, . . . have been changed, if the mutually linked condition of all of the pertinent ones of the call control memories 521-1 to 521-6 and protocol control memories 522-1 to 522-12 is constructed for the individual pertinent user groups as shown, for example, in FIG. 27, then changing to the multipoint type SVC service can be performed readily.

Then, after the bidirectional paths are set to the individual paths as described above, the ATM exchange 5 performs setting of common information (setting of the switching time, setting of the operation kind, changing of the type kind and so forth) for all of the call control memories 521-1 to 521-3 and performs changing of the pertinent subscriber data (step D21').

Figure 80:
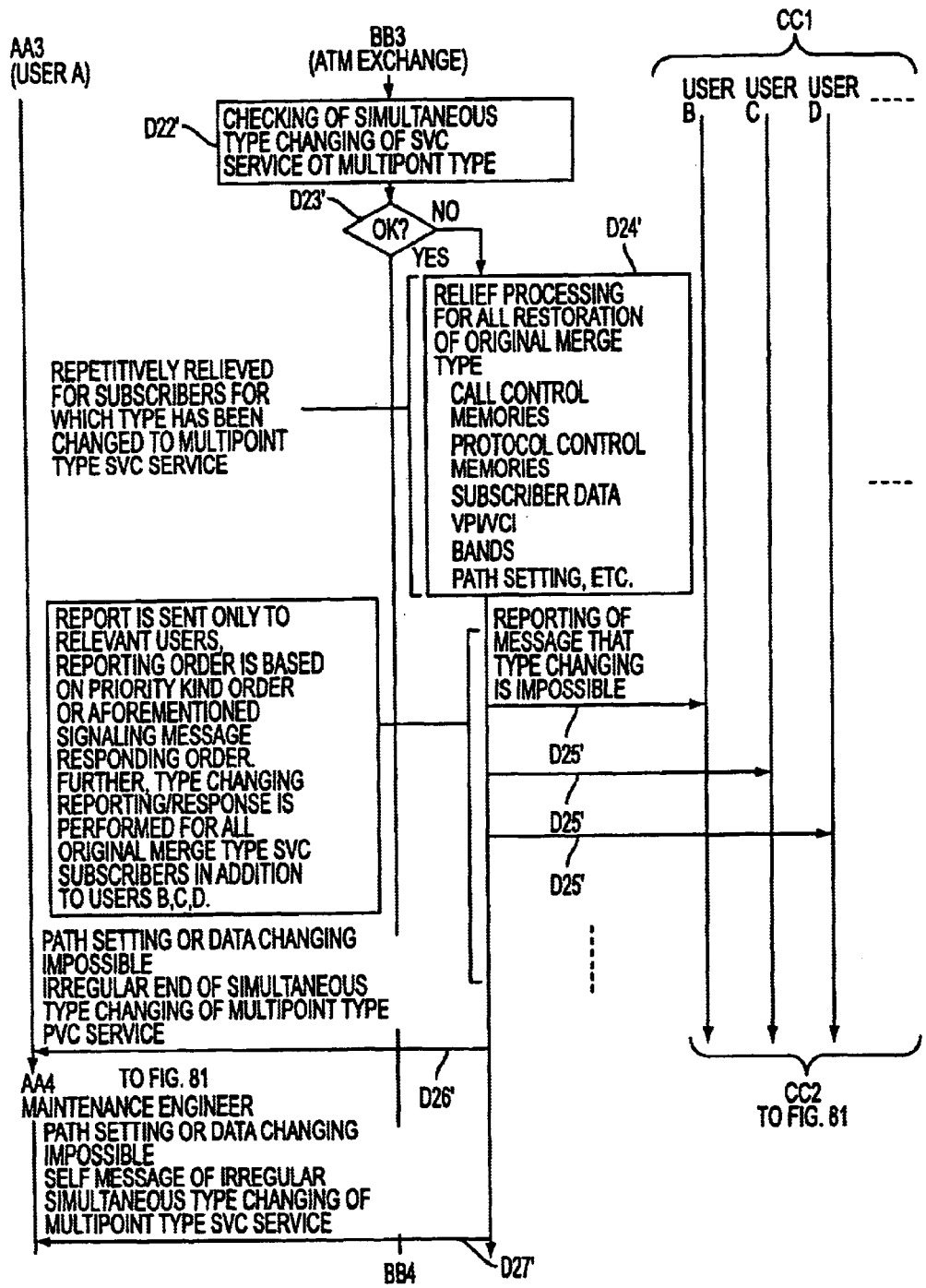
FIG. 80 is a sequence diagram illustrating the point to multipoint simultaneous type changing control by the ATM exchange of the present embodiment.

Further, the ATM exchange 5 checks whether or not simultaneous type changing to the multipoint type SVC service has been performed regularly as shown in FIG. 80 (steps D22' and D23'). When some trouble has been occurred in the simultaneous type changing (when the discrimination in step D23' is NO), the ATM exchange 5 performs, by the resource management section 56 (relief control section 33), for each of the pertinent user groups, relief processing for repetitively returning all information involved in the simultaneous type changing such as the call control memories 521-1 to 521-6, protocol control memories 522-1 to 522-12, subscriber data, VPI/VCI, bands and path setting to that in the condition prior to the changing (step D24').

In short, in the ATM exchange 5, if a trouble is detected when the mutually linked condition of the pertinent ones of the call control memories 521-1 to 521-6 and protocol control memories 522-1 to 522-12 is set and changed simultaneously for the individual pertinent user groups by the resource management section 56 in order to effect simultaneous type changing from the merge type SVC service to the multipoint type SVC service, then all information involved upon the type changing is returned to that of a condition prior to the changing by the relief control section 33 so that the communication service to be provided to all of the pertinent-user groups may be returned to the merge type SVC service prior to the changing.

Accordingly, even when the simultaneous changing from the merge type SVC service to the multipoint type SVC service has not successfully been performed regularly, such degradation of the service performance that the users A to D, . . . cannot enjoy a communication service over a long period of time can be eliminated with certainty.

Further, the ATM exchange 5 reports by a signaling message from the other user trouble end reporting section 332 to the pertinent ones of the users B to D, . . . that simultaneous type changing from the merge type SVC service to the multipoint type SVC service is impossible and the merge type SVC service prior to the changing has been restored (step D25'), and reports, by the trouble end reporting section 331, also to the user A which has sent out the simultaneous type changing signaling message and the maintenance engineer that the merge type SVC service prior to the changing has been restored, thereby ending the processing (steps D26' and D27').

Accordingly, in this instance, whether or not simultaneous changing from the merge type SVC service to the multipoint type SVC service has been performed can be recognized by all of the users A to D, . . . which make an object of the simultaneous type changing and the maintenance engineer, and the situation of the type changing can be grasped with certainty.

It is to be noted that the reporting by the other user terminal trouble end reporting section 332 described above is performed by the priority reporting section 333 in accordance with a predetermined priority kind (priority order) set in advance or with a responding order to the signaling message described above.

Figure 81:
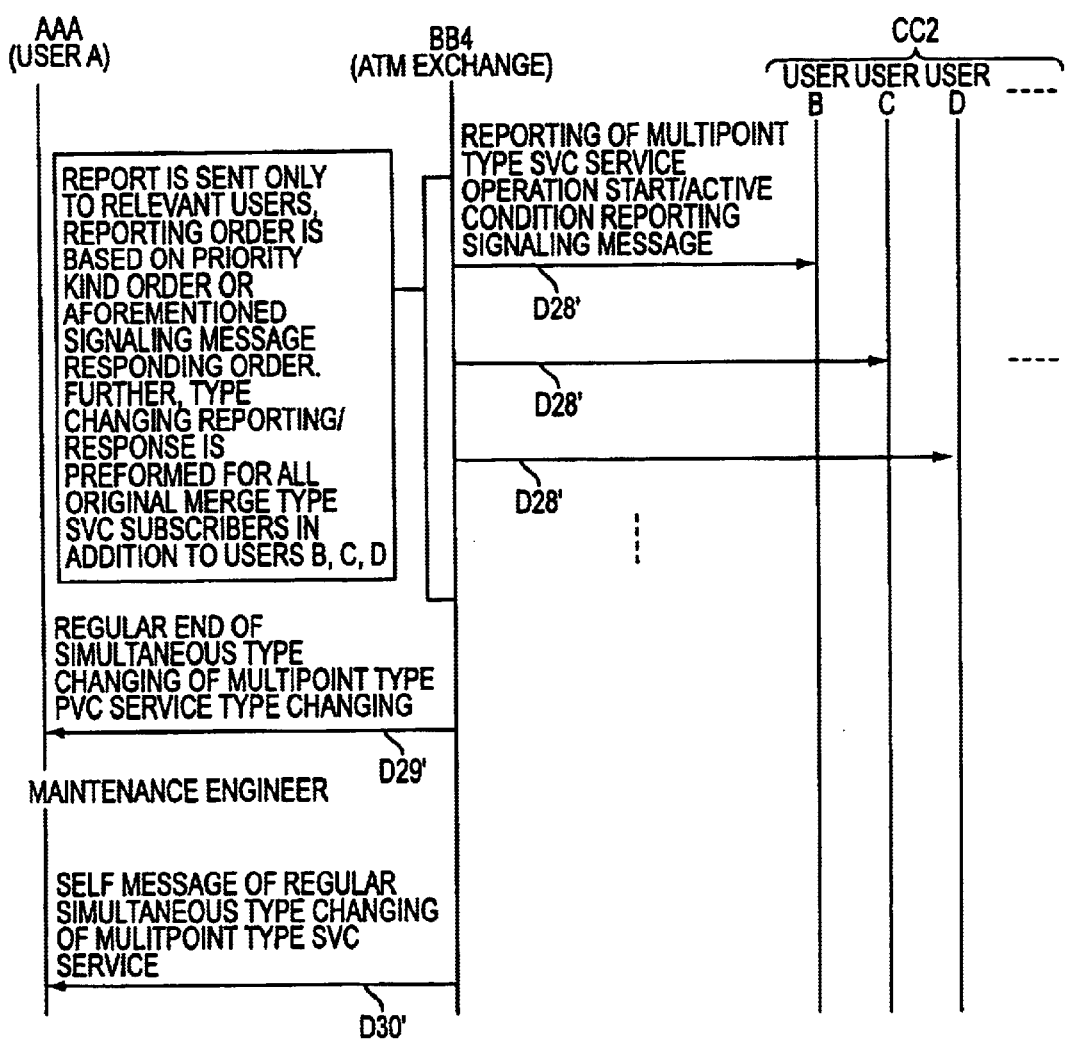
FIG. 81 is a sequence diagram illustrating the point to multipoint simultaneous type changing control by the ATM exchange of the present embodiment.

On the other hand, if the simultaneous type changing has been performed regularly in step D23' described above (when the discrimination in step D23' is YES), it is reported to the users B to D, . . . by the reporting section 32 that simultaneous type changing to the multipoint type SVC service has been performed and a condition wherein operation can be started is established as shown in FIG. 81 (step D28'), and it is reported to the user A which has requested for simultaneous type changing that simultaneous type changing to the multipoint type SVC service has been performed regularly and this is reported also to the maintenance engineer, thereby ending the processing (steps D29' and D30').

As described above, with the present ATM exchange 5, if a simultaneous changing signaling message from the merge type SVC service to the multipoint type SVC service is inputted from the user A, then the resource management section 56 (link changing control section 26) changes mutually linked condition of the pertinent ones of the call control memories 521-1 to 521-6 and protocol control memories 522-1 to 522-12 of the individual user groups simultaneously for the pertinent user groups which make an object of the simultaneous type changing to construct a mutually linked condition for the multipoint type SVC service for changing for each of the pertinent user groups.

Accordingly, even when the merge type SVC service which are in operation in a plurality of user groups is to be changed individually to the multipoint type SVC service, the user A need not enter a command for type changing for each one user group but is required only to enter a simultaneous type changing signaling message, and consequently, the burden in such a type changing operation as described above can be reduced remarkably.

It is to be noted that, also in this instance, the simultaneous type changing control described above is performed similarly also upon simultaneous changing from the SVC (or PVC) service of any type other than the merge type to the SVC (or PVC) service of any type other than the multipoint type.

(E) Description of Form Changing Control Between the Point to Point and the Point to Multipoint In the following description, form changing control of a communication control between the point to point and the point to multipoint will be described in detail.

(E-1) Form Changing Control from the Point to Point to the Point to Multipoint by a Maintenance Engineer Here, as an example of form changing control from the point to point to the point to multipoint by a maintenance engineer, form changing of a communication service from such a point to point PVC service (one to one communication: bidirectional communication) as shown in FIG. 28(*a*) to such a composite type point to multipoint PVC service (one to multiple communication: unidirectional communication) as shown in FIG. 28(*b*) will first be described.

It is to be noted that, also in this FIG. 28(*a*), reference symbol 6A-1 denotes an originating user group composed of the user terminal 6-1, and 6A-2 denotes a terminating user group composed of the user terminal 6-4.

Figure 31:
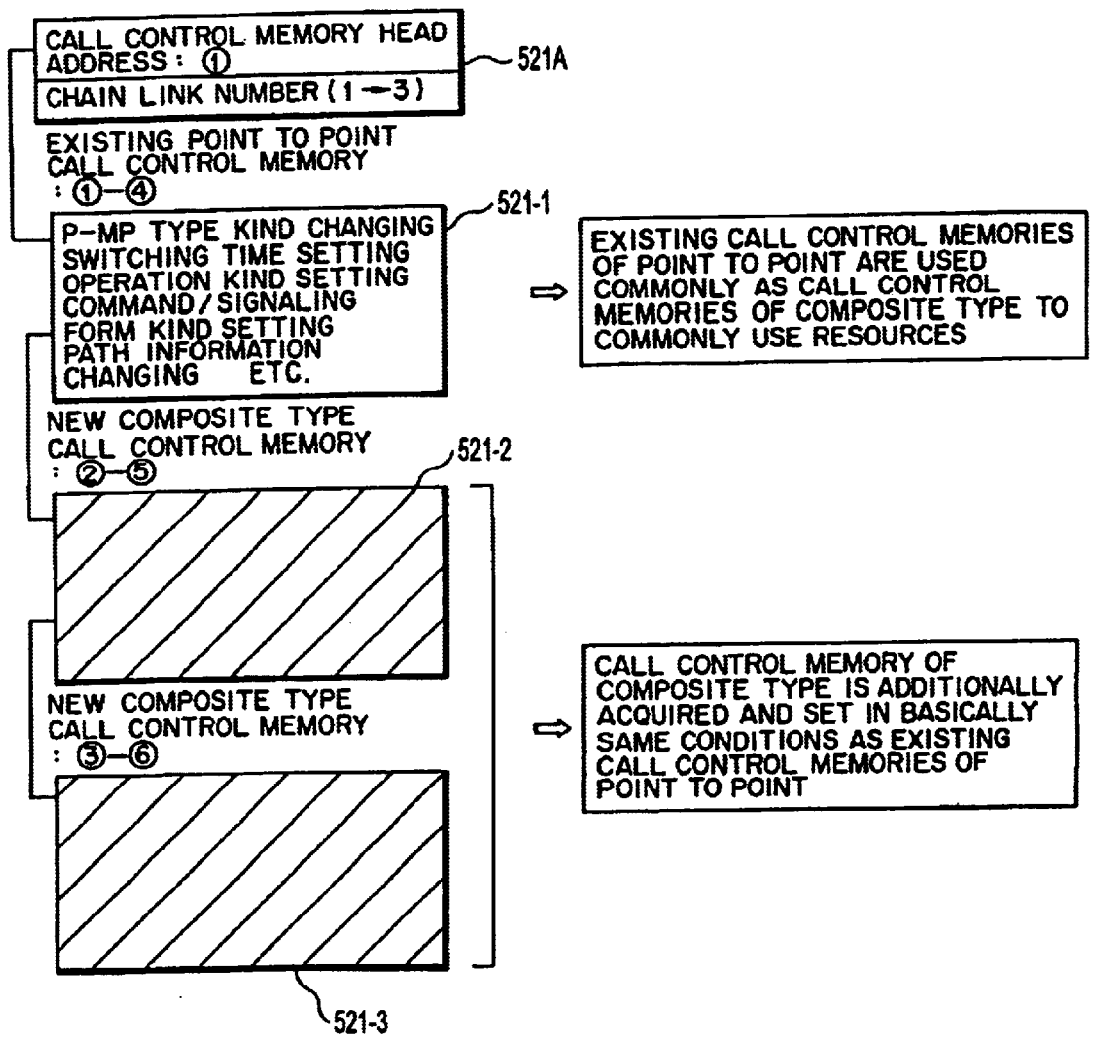
FIG. 31 is a diagrammatic view illustrating an example of mutually linked relationship of the call control memories constructed in the ATM exchange of the present embodiment.

Further, also in this instance, it is assumed that subscriber information ① of the originating user group 6A-1 is registered in the ATM exchange 5 already, and such a call control memory 521-1 corresponding between the subscriber information ① and ④ as shown in FIG. 31 is acquired/set in the main storage section 52 already.

In order to realize form changing of a communication service from such a point to point PVC service as shown in FIG. 28(*a*) to such a composite type point to multipoint PVC service (hereinafter referred to as composite type PVC service) as shown in FIG. 28(*b*), it is necessary for the ATM exchange 5 to additionally register subscriber information ② and ③ of the user terminal 6-1 to the originating user group 6A-1 and to additionally register, for example, subscriber information ⑤ of the user terminal 6-5 of the terminating user group 6A-3 and subscriber information ⑥ of the user terminal 6-6 of the terminating user group 6A-4 and additionally set two paths between the subscriber information ② and ⑤ and between the subscriber information ③ and ⑥ as shown in FIG. 28(b).

Figure 29:
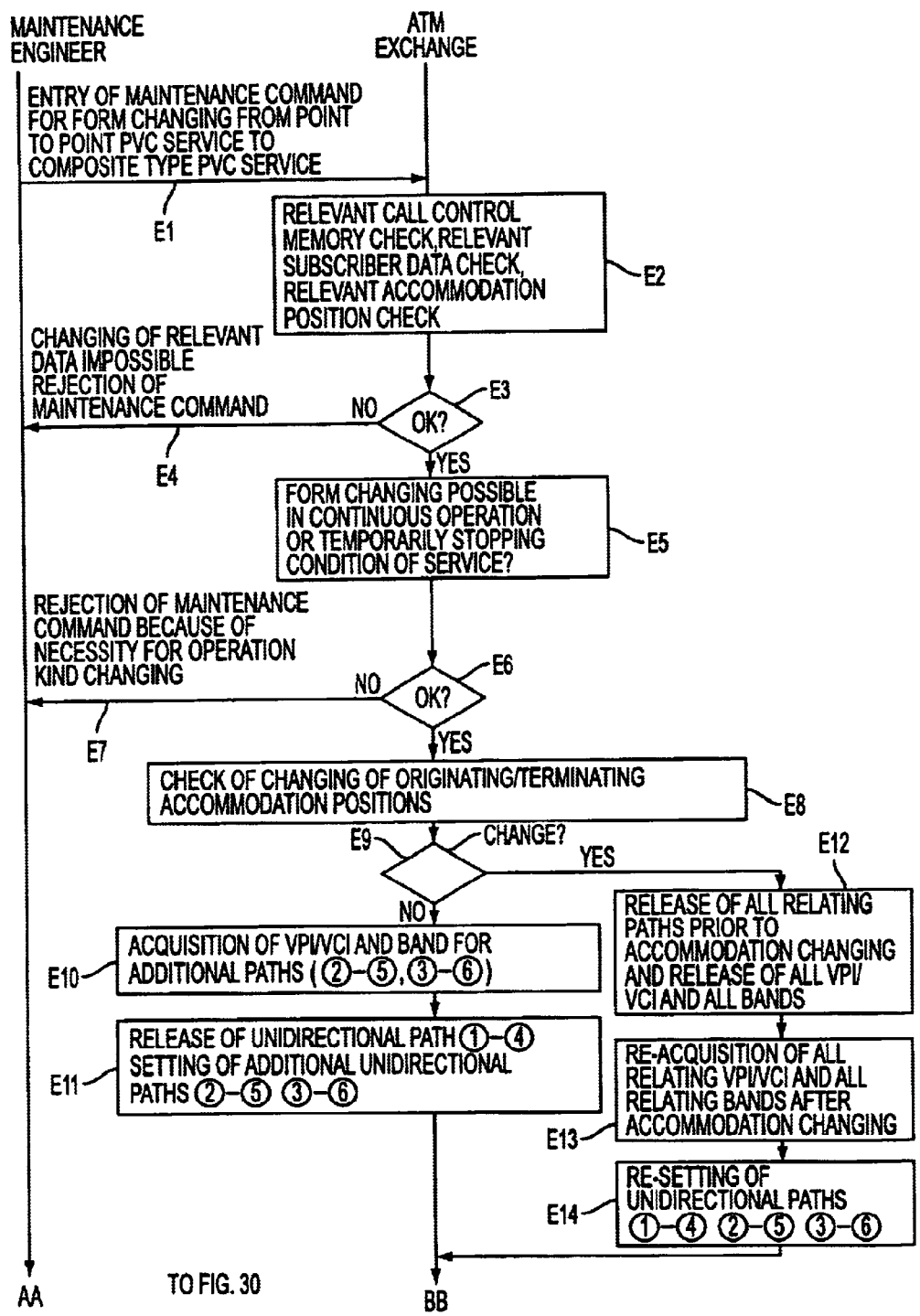
FIG. 29 is a sequence diagram illustrating the form changing control by the ATM exchange of the present embodiment.

Thus, a maintenance engineer of the ATM exchange 5 first enters a form changing maintenance command from the point to point PVC service to the composite type PVC service through the maintenance terminal 7, for example, as shown in FIG. 29 (step E1).

Consequently, the ATM exchange 5 performs checking (verification) of the pertinent ones of the call control memory 521-1, subscriber data and the accommodation position by means of the registration information condition discrimination section 27 (steps E2 and E3). When changing of the pertinent data is impossible (when the discrimination in step E3 is NO), the ATM exchange 5 rejects the maintenance command entered by the maintenance engineer (step E4). However, when changing of the pertinent data is possible (when the discrimination in step E3 is YES), it is further discriminated by the service condition discrimination section 28 whether or not changing of the service form to the composite type PVC service can be performed in a condition wherein the communication service in operation (point to point PVC service) is continued or in a condition wherein the communication service in operation is temporarily stopped (steps E5 and E6).

As a result, when the changing cannot be performed because changing of the operation kind is required (when the discrimination in step E6 is NO), also in this instance, the maintenance command inputted through the maintenance terminal 7 is rejected (step E7). However, when it is discriminated by the service condition discrimination section 28 that the changing of the communication service form is possible (when the discrimination in step E6 is YES), it is further discriminated whether or not the accommodation positions of the user terminal positions of the originating user and the termination user have been changed in order to effect form changing to the composite type PVC service even in a condition wherein the communication service in operation is continued (steps, E8 and E9).

Then, when the origination and termination accommodation positions of the user terminals 6-1 and 6-4 to 6-6 have not been changed (when the discrimination in step E9 is NO), VPI/VCI and use paths for the additional paths (between ② and ⑤ and between ③ and ⑥) and such call control memories 521-2 and 521-3 as shown in FIG. 31 are acquired (step E10).

Then, the unidirectional path (① to ④) between the subscriber information ① and ④ is released and unidirectional paths (from ⑤ to ② and from ⑥ to ③) are set only for the additional paths by the speech path control section 65 (step E11).

On the other hand, if the origination and termination accommodation positions of the user terminals 6-1 and 6-4 to 6-6 have been changed (when the discrimination in step E9 is YES), the ATM exchange 5 releases all of the paths involved prior to the changing of the origination and termination accommodation positions once and releases all of the VPI/VCI and all of the use bands (step E12). Then, the ATM exchange 5 re-acquires all VPI/VCI and all of bands involved after the changing of the origination and termination accommodation positions (step E13), and then sets new unidirectional paths for all of the paths (between ① and ④, between ② and ⑤, and between ③ and ⑥) (step E14).

Figure 30:
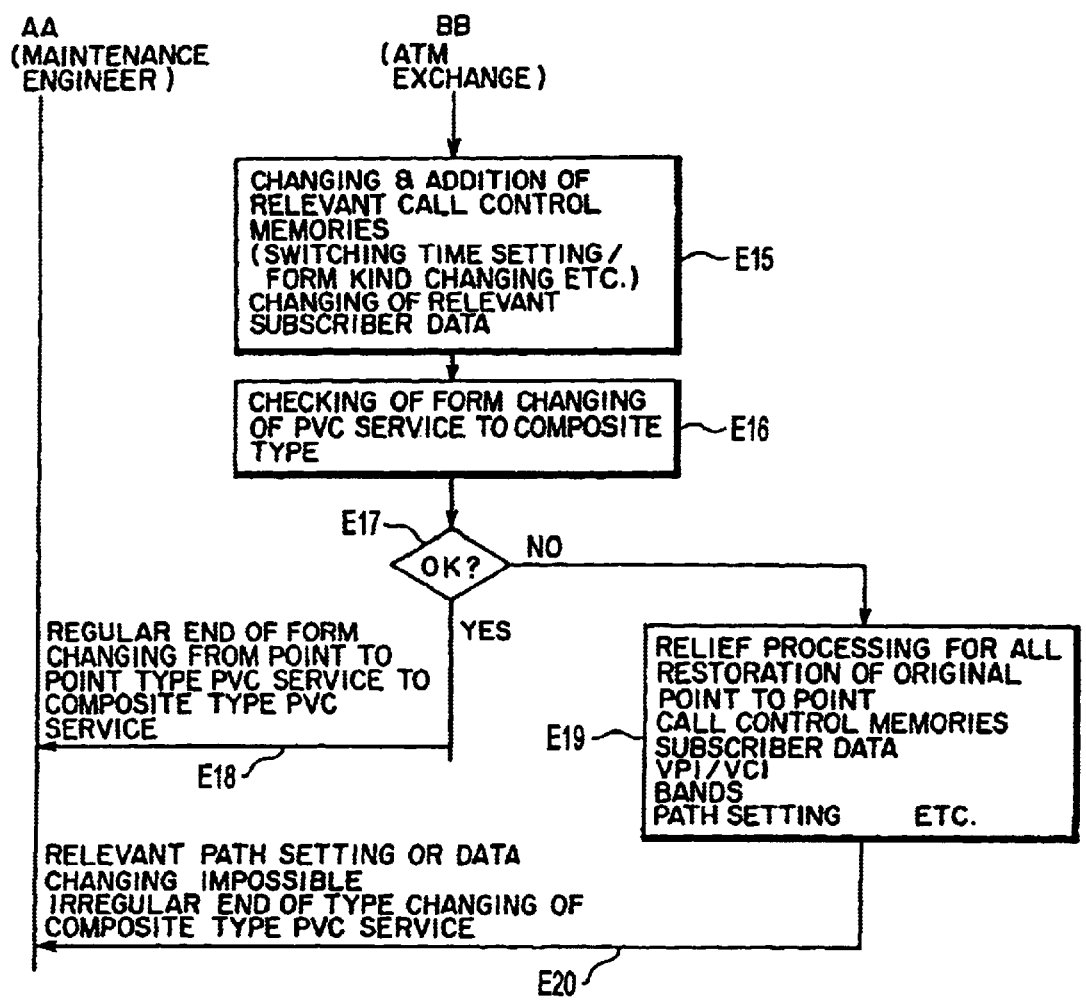
FIG. 30 is a sequence diagram illustrating the form changing control by the ATM exchange of the present embodiment.

Then, after the unidirectional paths are set for the individual paths in this manner, as shown in FIG. 30, the ATM exchange 5 performs, by the link changing control section 26, for the pertinent ones of the call control memories 521-1 to 521-3 (refer to FIG. 31), such changing or addition as changing of the setting of the time at which the form changing was performed (switching time setting) or the form kind (in this instance, the composite type PVC service) and performs changing of the pertinent subscriber data (step E15).

It is to be noted that, also in this instance, portions of the call control memories 521-2 and 521-3 indicated by slanting lines represent that various kinds of information (P-MP type kind, switching time and so forth) is set under the same conditions as those of the call control memory 521-1.

Further, the ATM exchange 5 checks whether or not the form changing (changing to the composite type PVC service) has been performed regularly (steps E16 and E17), and if the form changing has been performed regularly (when the determination in step E17 is YES), the ATM exchange 5 reports to the maintenance engineer that the form changing has been performed regularly, thereby ending the processing (step E18).

On the other hand, if some trouble has occurred in the form changing (when the discrimination in step E17 is NO), the ATM exchange 5 performs, by the relief control section 29 (refer to FIG. 10), relief processing to return all of the linked condition of the call control memories, subscriber data, VPI/VCI, bands, path setting and so forth to those in the condition for the communication service of the original form (point to point PVC service) (step E19), and reports to the maintenance engineer that the form changing has not successfully been performed regularly, thereby ending the processing (step E20).

In this manner, with the present ATM exchange 5, since the call control memories 521-i in which user terminal registration information of the point to point PVC service is registered are mutually linked with each other to form the communication service providing section 21 which can provide the point to point PVC service so that, when changing command information to the composite type PVC service is inputted through the maintenance terminal 7 by a maintenance engineer, the resource management section 56 (link changing control section 26) changes the mutually linked condition of the pertinent ones of the call control memories 521-1 to 521-3 to construct a mutually linked condition for the communication service of the aimed form of the changing, the form changing can be performed very readily without individual provision of call control memories for the composite type PVC service and also the changing processing can be performed rapidly.

Further, in this instance, even if changing command information to the composite type PVC service is inputted through the maintenance terminal 7, only when it is discriminated by the registration information condition discrimination section 27 that changing of the mutually linked condition of the pertinent ones of the call control memories 521-1 to 521-3 is possible as described hereinabove in connection with steps E2 and E3 of FIG. 29, the link changing control section 26 changes the mutually linked condition to construct a mutually linked condition of the call control memories 521-1 to 521-3 for the aimed composite type PVC service of the changing, and consequently, this changing can be performed with a higher degree of certainty.

Further, if it is discriminated by the service condition discrimination section 28 that the changing of the mutually linked condition of the pertinent ones of the call control memories 521-1 to 521-3 is possible as described hereinabove in connection with steps E5 and E6 of FIG. 29, then the link changing control section 26 described above can perform this changing very readily even in a condition wherein the communication service in operation (point to point PVC service) is continued, and consequently, this contributes very much to improvement in service performance.

Further, since a mutually linked condition of the call control memories 521-1 to 521-3 for the aimed composite type PVC service of the changing is constructed if the mutually linked condition of those of the pertinent ones of the call control memories 521-2 and 521-3 for which the changing should be performed newly from among the call control memories 521-i is changed only if there is no change in the origination and termination accommodation positions of the user terminals 6-1 and 6-4 to 6-6 as described hereinabove in connection with step E8 of FIG. 29, the link changing control section 26 can commonly use the existing call control memory 521-1 to effect changing to the composite type PVC service.

Accordingly, this changing can be performed rapidly while saving the memory amount necessary for the call control memories 521-1 to 521-3 remarkably. Further, even when the origination and termination accommodation positions of the user terminals 6-1 and 6-4 to 6-6 exhibit some change, since a mutually linked condition of the call control memories 521-1 to 521-3 for the composite type PVC service is constructed if the mutually linked condition of all of the pertinent ones of the call control memories 521-1 to 521-3 is changed, also in this instance, the changing to the composite type PVC service can be performed readily.

Further, as described hereinabove in connection with step E16 of FIG. 30, if some trouble is detected when the mutually linked condition of the pertinent ones of the call control memories 521-1 to 521-3 is changed by the link changing control section 26, then the original point to point PVC service can be restored by the relief control section 29, and accordingly, even if such changing of the communication service cannot be performed, such degradation of the service performance that a desired form of communication service cannot be enjoyed over a long period of time can be eliminated with certainty.

It is to be noted that, while form changing from the point to point PVC service to the composite type PVC service has been described here, form changing from the point to point PVC service to the PVC service of any other type such as the broadcast type, merge type and multipoint type is performed similarly.

Figure 32A:
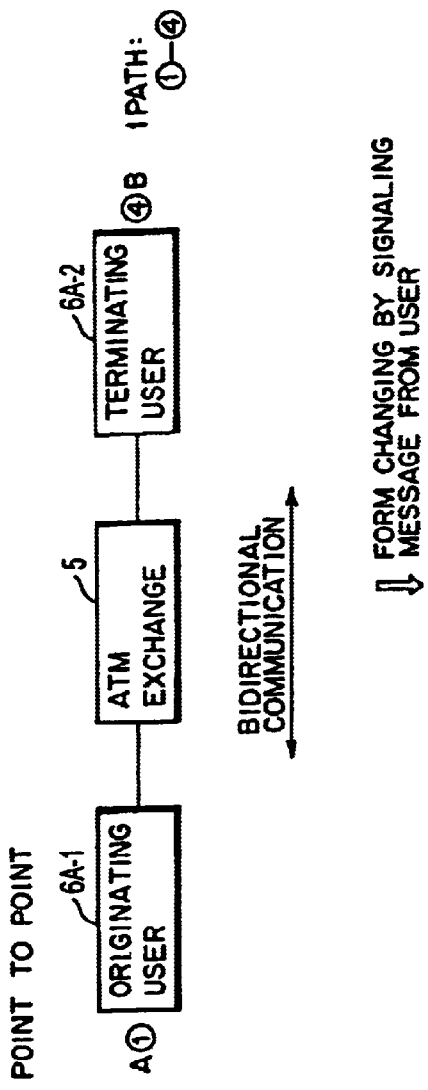
FIGS. 32(*a*) and 32(*b*) are diagrammatic views illustrating the form changing control by the ATM exchange of the present embodiment.
Figure 32B:
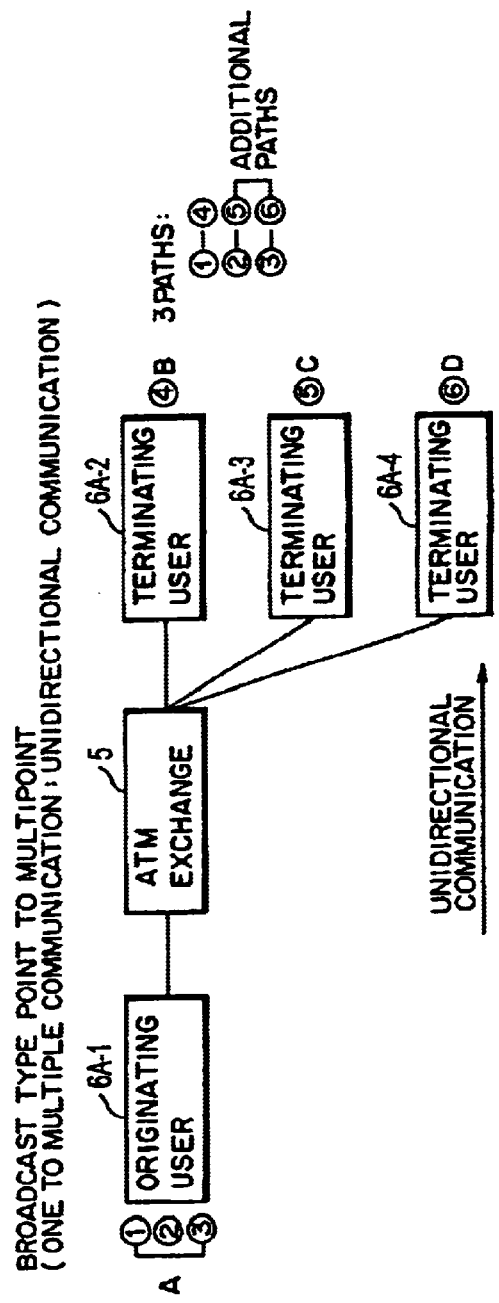

(E-2) Form Changing Control from the Point to Point to the Point to Multipoint by a User Subsequently, as an example of form changing control from the point to point to the point to multipoint by a user, form changing control from such a point to point SVC service (one to one communication: bidirectional communication) as shown in FIG. 32(*a*) to such a broadcast type point to multipoint SVC service (one to multiple communication: unidirectional communication) as shown in FIG. 32(*b*) will be described here.

It is to be noted that the point to point SVC service shown in FIG. 32(*a*) is similar in operation terms and so forth to that shown in FIG. 28(*a*) except that the originating user group 6A-1 and the terminating user group 6A-2 are accommodated not via a private line but via public lines, and it is assumed that, prior to the form changing, the call control memory 521-1 and protocol control memories 522-1 and 522-4 similar to those shown in FIG. 18 are set corresponding to the path between the subscriber information ① and ④ and the subscriber information ① and ④.

And, in order for the ATM exchange 5 to effect form changing from such a point to point SVC service as shown in FIG. 32(*a*) to such a broadcast type point to multipoint SVC service (hereinafter referred to as broadcast type SVC service) as shown in FIG. 32(*b*), also in this instance, the ATM exchange 5 must additionally register subscriber information ② and ③ of the originating user group 6A-1, newly register subscriber information ⑤ of the user terminal 6-5 of the terminating user group 6A-3 and subscriber information ⑥ of the user terminal 6-6 of the terminating user group 6A-4, and additionally set two paths (unidirectional paths) between the subscriber information ② and ⑤ and between the subscriber information ③ and ⑥ as shown in FIG. 32(*b*).

In the following, such control processing will be described in detail with reference to the sequence diagrams (steps F1 to F60) shown in FIGS. 33 to 37. It is to be noted that, in the following description, the originating user group 6A-1 is referred to as user A, and the terminating user groups 6A-2 to 6A-4 are referred to as users B to D, respectively.

Figure 33:
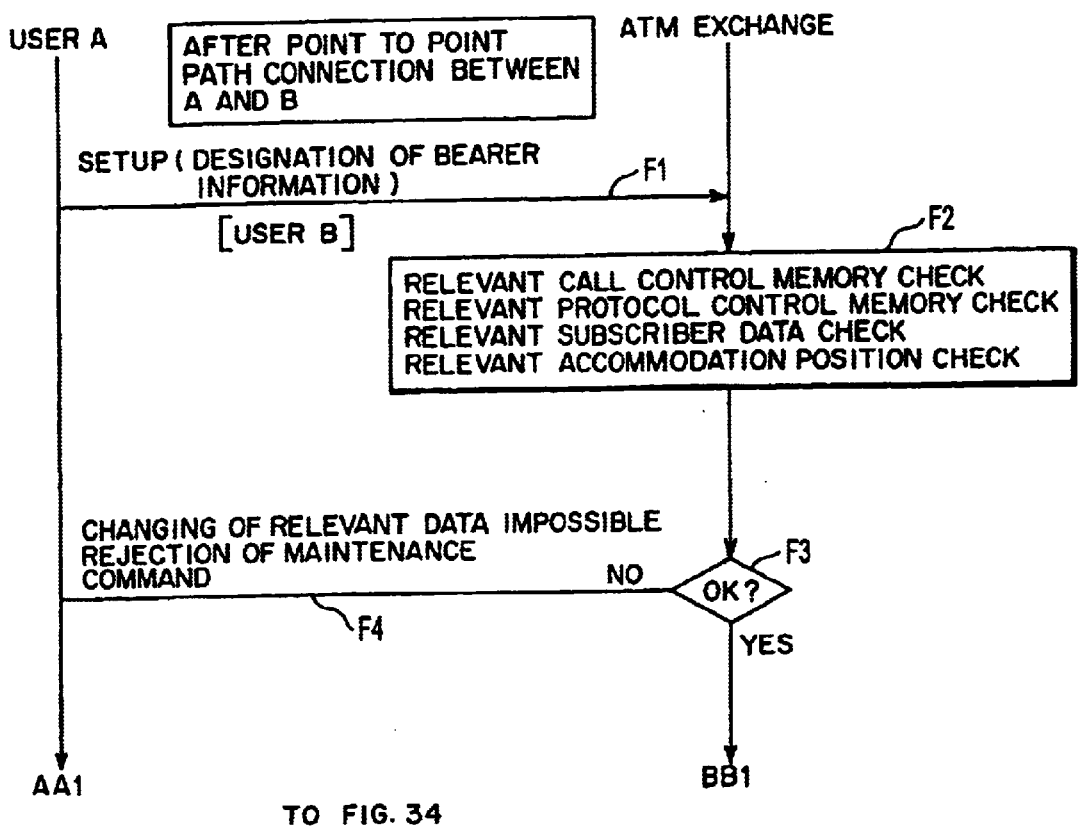
FIG. 33 is a sequence diagram illustrating the form changing control by the ATM exchange of the present embodiment.

First, for example, as shown in FIG. 33, in a condition wherein a path is connected between the user A and the user B and the point to point SVC service is provided, a "SETUP" signal (trigger signal) which has information designating the broadcast type SVC service in the bearer information factor as described hereinabove with reference to FIG. 105 is transmitted as a form changing signaling message to the ATM exchange 5 (step F1).

Consequently, in the ATM exchange 5, checking of the pertinent ones of the call control memory 521-1, protocol control memories 522-1 and 522-4, subscriber data and accommodation positions and so forth is performed by the registration information condition discrimination section 30 (refer to FIG. 10) (steps F2 and F3).

Then, when the pertinent data cannot be changed, that is, when it is discriminated by the registration information condition discrimination section 30 that the mutually linked condition of the pertinent ones of the call control memory 521-1 and protocol control memories 522-1 and 522-4 cannot be changed (when the discrimination in step F3 is NO), the form changing signaling message from the user A is rejected (step F4).

Figure 34:
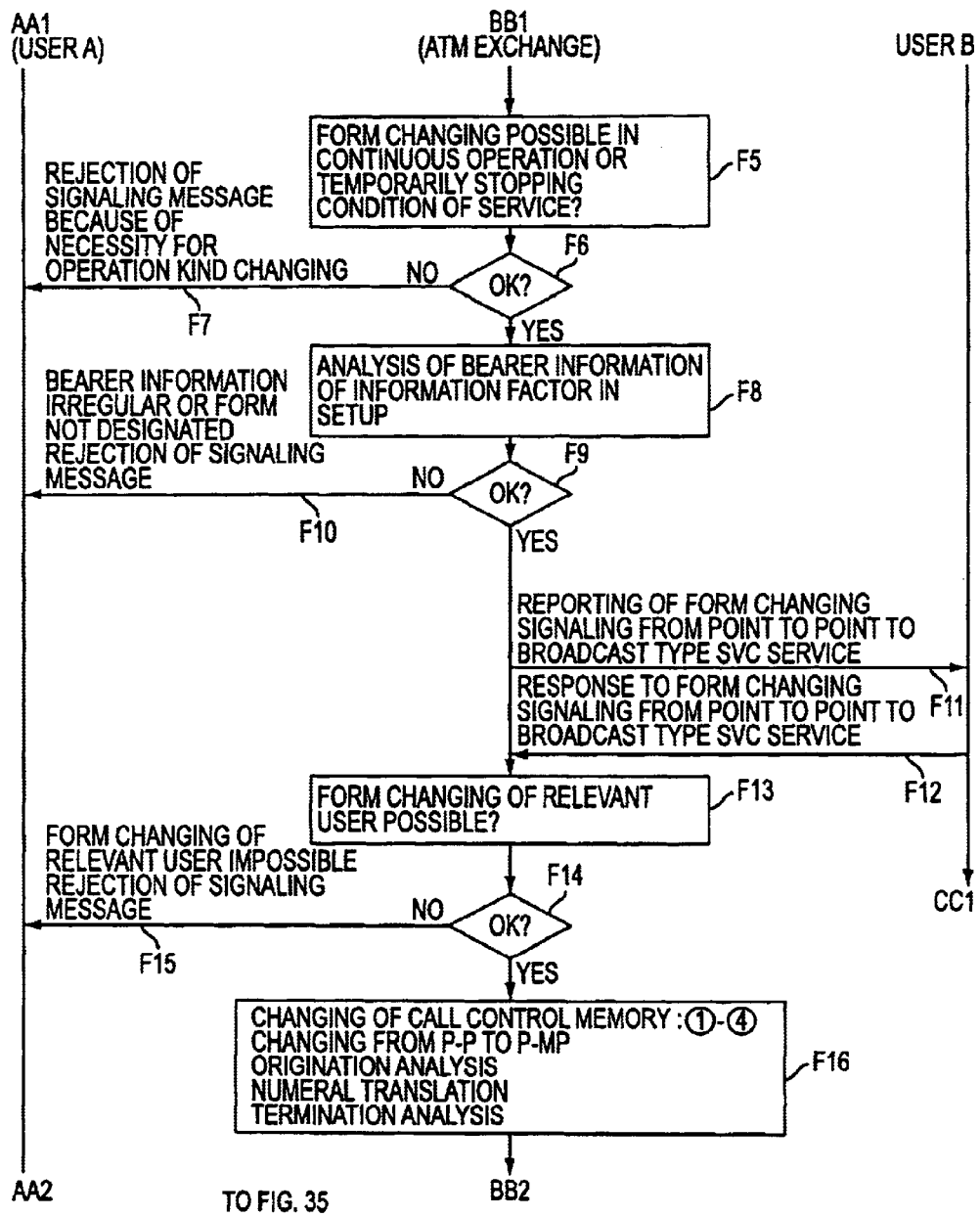
FIG. 34 is a sequence diagram illustrating the form changing control by the ATM exchange of the present embodiment.

On the other hand, when the pertinent data can be changed (when the discrimination in step F3 is YES), as shown in FIG. 34, the ATM exchange 5 further discriminates, by the service condition discrimination section 31 (refer to FIG. 10). whether or not changing to the broadcast type SVC service can be performed in a condition wherein the service in operation (point to point SVC service) is continued or in a condition wherein the service in operation is temporarily stopped (steps F5 and F6).

As a result, if it is discriminated by the service condition discrimination section 31 that the changing cannot be performed because changing of the operation kind is required (when the discrimination in step F6 is NO), the form changing signaling message ("SETUP" signal) from the user A is rejected also in this instance (step F7). However, if it is discriminated that the form changing is possible (when the discrimination in step F6 is YES), analysis of the bearer information of an information factor in the "SETUP" signal (refer to FIG. 105) is performed (steps F8 and F9).

If, as a result of the analysis, the "SETUP" signal has some trouble in that there is some trouble in the bearer information or the aimed form of changing is not designated as yet (when the discrimination in step F9 is NO), the form changing signaling message is rejected similarly (step F10). However, if there is no trouble (when the discrimination in step F9 is YES), a signaling message that form changing from the point to point SVC service to the broadcast type SVC service is performed is transmitted to the other user B (step F11).

Then, if a response to the signaling message is received from the user B (step F12), then the ATM exchange 5 discriminates whether or not form changing of the users A and B which make an object of the form changing (pertinent) is possible (steps F13 and F14).

As a result, if the form changing of the users A and B is impossible (when the discrimination in step F14 is NO), the form changing signaling message received from the user A is rejected also in this instance (step F15). However, when the changing is possible (when the discrimination in step F14 is YES), the call control memory 521-1 corresponding to the existing path between the subscriber information ① and ④ is changed from that for the point to point to that for the point to multipoint, and such processing as origination analysis, numeral translation and termination analysis is performed (step F16).

Figure 35:
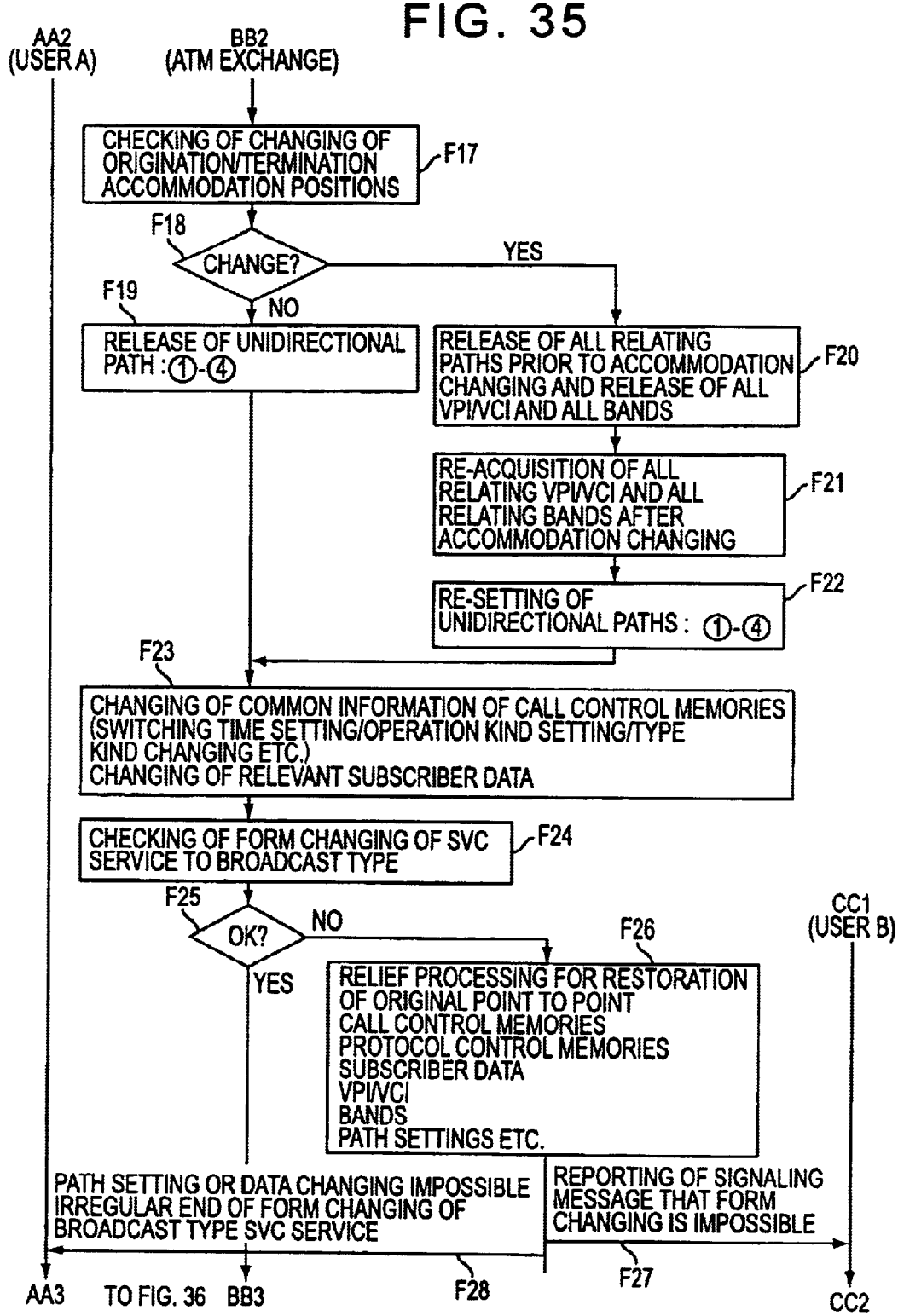
FIG. 35 is a sequence diagram illustrating the form changing control by the ATM exchange of the present embodiment.

Thereafter, the ATM exchange 5 discriminates, as shown in FIG. 35, whether or not there is some change in the accommodation positions of the users A and B (steps F17 and F18). When there is no change (when the discrimination in step F18 is NO), a unidirectional path is released for the path between the subscriber information ① and ④ to which the bidirectional path has been set to effect changing from the bidirectional communication to the unidirectional communication (step F19).

On the other hand, if there is some change in the accommodation positions of the users A and B (when the discrimination in step F18 is YES), then all of the paths involved prior to the changing of the origination and termination accommodation positions are released and all of the VPI/VCI and the use bands are released by the resource management section 56 (link changing control section 26) (step F20). Thereafter, all of VPI/VCI and use bands involved after the changing of the origination and termination accommodation positions are re-acquired newly (step F21), and a unidirectional path is re-set for the path between the subscriber information ① and ④ (step F22).

Figure 38:
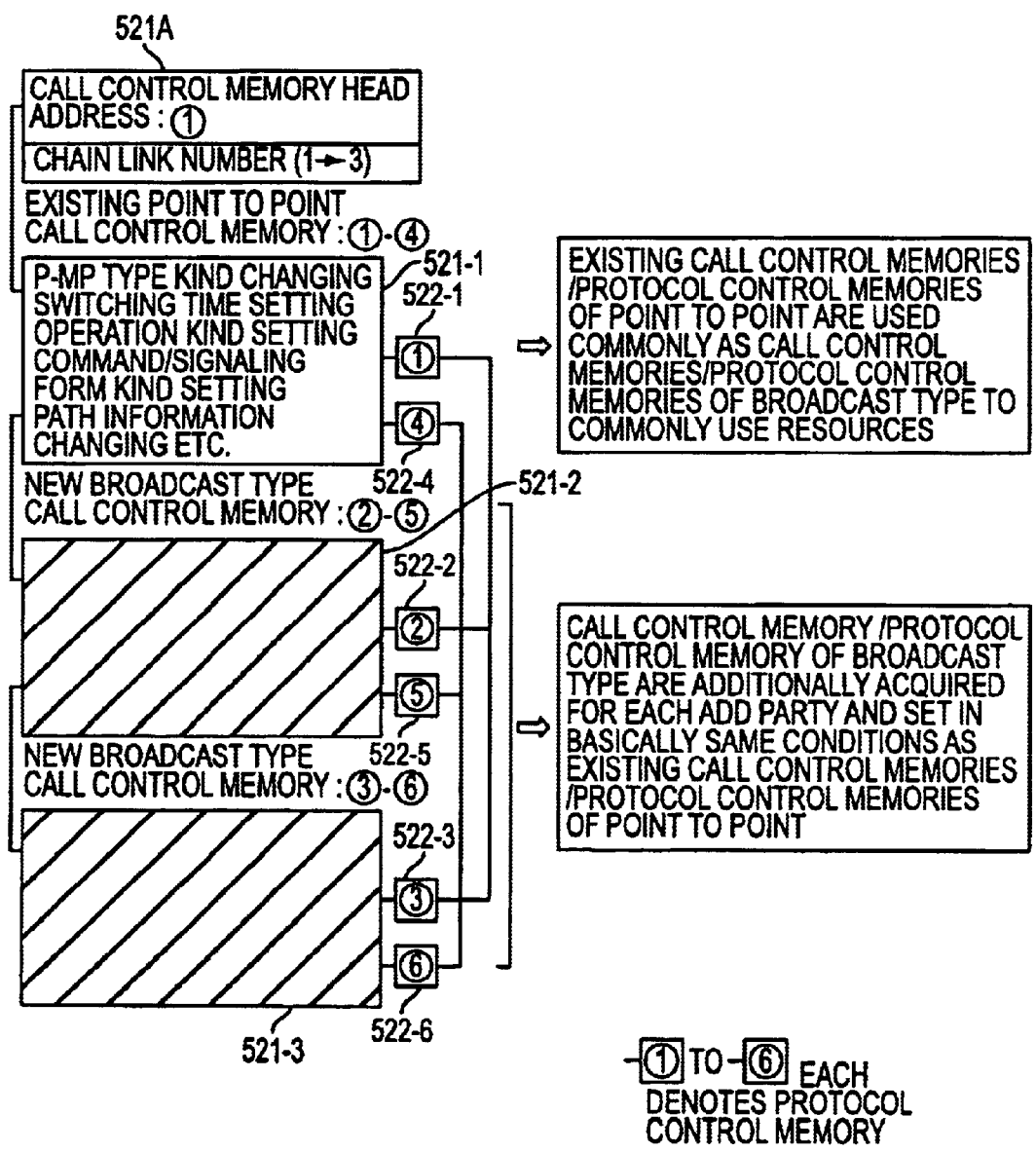
FIG. 38 is a diagrammatic view illustrating an example of mutually linked relationship of the call control memories and the protocol control memories constructed in the ATM exchange of the present embodiment.

Then, after a unidirectional path is set between the user terminals 6-1 and 6-4 in step F19 or step F22, the ATM exchange 5 effects, as shown in FIG. 38, by the resource management section 56, setting of common information with the call control memories 521-2 and 521-3 to be additionally acquired and set for the broadcast type SVC service after the form changing as hereinafter described regarding the switching time setting, operation kind setting, type kind setting and so forth into the existing call control memory 521-1 to effect changing of the pertinent subscriber data while the existing resource of the call control memory 521-1 is kept used (common use of the resources) also after the form changing (step F23).

It is to be noted that, since the changing is the form changing between the SVC services, also after the form changing, the existing protocol control memories 522-1 and 522-4 are used as they are without effecting special changing for them (the resources are used commonly). Further, also in this instance, slanting line portions of the call control memories 521-2 and 521-3 represent that various information is set in the same conditions as those of the call control memory 521-1.

Thereafter, the ATM exchange 5 effects discrimination of whether or not the form changing from the point to point SVC service to the broadcast type SVC service has been performed regularly (steps F24 and F25), and if the form changing has not been performed regularly (when the discrimination in step F25 is NO), relief processing to return the information involved in the changing (the call control memories 521-1 to 521-3, protocol control memories 522-1 to 522-6, subscriber data, VPI/VCI, bands, path setting and so forth) to that of the original form (point to point) is performed by the relief control section 33 (step F26).

Then, it is reported to the user B by the other user terminal trouble end reporting section 332 using a signaling message that the form changing from the point to point SVC service to the broadcast type SVC service has not been performed successfully (step F27), and to the user A from which the form changing signaling message was inputted, it is reported similarly by the trouble end reporting section 331 that the form changing has not been performed successfully (step F28).

Figure 36:
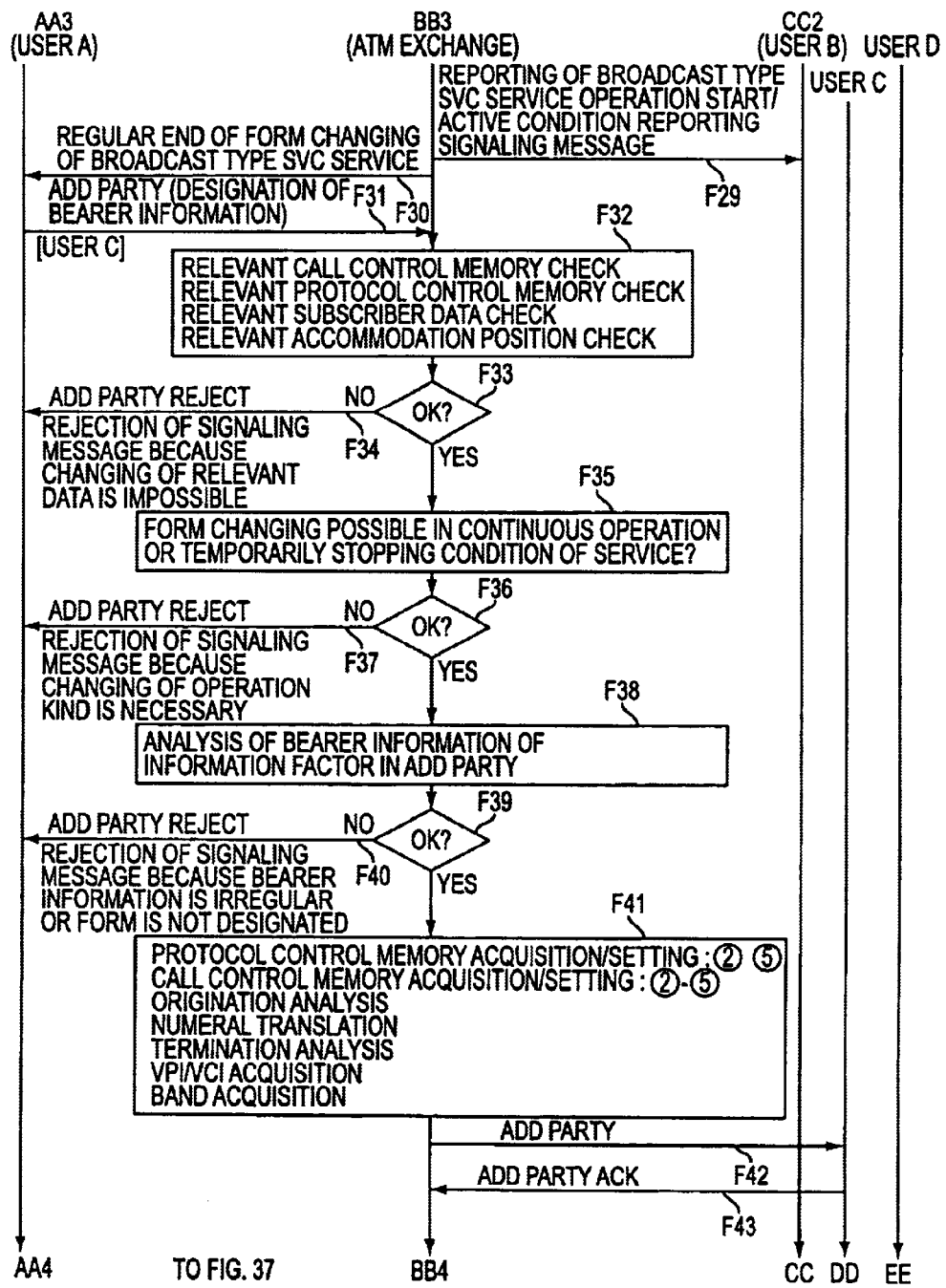
FIG. 36 is a sequence diagram illustrating the form changing control by the ATM exchange of the present embodiment.

On the other hand, if the form changing to the broadcast type SVC service has been performed regularly (when the discrimination in step F25 is YES), then as shown in FIG. 36, operation of the broadcast type SVC service for the user B is started and it is reported to the user B using a signaling message that the protocol condition is in an active state (step F29). Further, also to the user A, it is reported that the form changing has been performed regularly (step F30).

Further, when the ATM exchange 5 thereafter receives from the user A, an "ADD PARTY" signal which designates, in the bearer information factor (refer to FIG. 105), a signaling message for adding the user C as a user which is to enjoy the broadcast type SVC service (step F31), checking of the call control memory, protocol control memories, subscriber data and accommodation position regarding the subscriber information ⑤ which forms the pertinent user C is first performed by the registration information condition discrimination section 30 (steps F32 and F33).

Then, if it is discriminated by the registration information condition discrimination section 30 that the changing of the pertinent data (data for which changing is required as a result of the form changing) cannot be performed (when the discrimination in step F33 is NO), the "ADD PARTY" signal from the user A is rejected (step F34). However, if it is discriminated that the changing can be performed (when the discrimination in step F33 is YES), it is discriminated by the service condition discrimination section 31 whether or not the changing to the broadcast type SVC service is possible in a condition wherein the communication service in operation is continued or in another condition wherein the communication service is temporarily stopped (steps F35 and F36).

As a result, if it is discriminated by the service condition discrimination section 31 that the form changing is impossible because changing of the operation kind is required (when the discrimination in step F36 is NO), the "ADD PARTY" from the user A is rejected and this is reported to the user A (step F37). However, if it is discriminated by the service condition discrimination section 31 that the form changing is possible (when the discrimination in step F36 is YES), analysis of the bearer information of the information factor of the "ADD PARTY" signal is further performed (steps F38 and F39).

Then, if the bearer information has some trouble, or if the form of the aimed communication service of changing is not designated as yet (when the discrimination in step F39 is NO), the "ADD PARTY" signal from the user A is rejected also in this instance (step F40).

On the other hand, if the "ADD PARTY" is accepted regularly (when the discrimination in step F39 is YES), as shown in FIG. 38, the protocol control memories 522-2 and 522-5 for the subscriber information ② and ⑤ and the call control memory 521-2 corresponding to the path between the subscriber information ② and ⑤ are additionally acquired/set (setting of mutual links with the existing call control memory 521-1 and protocol control memories 522-1 and 522-4) and origination analysis, numeral translation, termination analysis, VPI/VCI acquisition and band acquisition are performed by the resource management section 56 (link changing control section 26) (step F41).

Thereafter, the ATM exchange 5 transmits the "ADD PARTY" signal received from the user A to the user C to report that the user C has been registered and set as a subscriber to enjoy the broadcast type SVC service (step F42).

Figure 37:
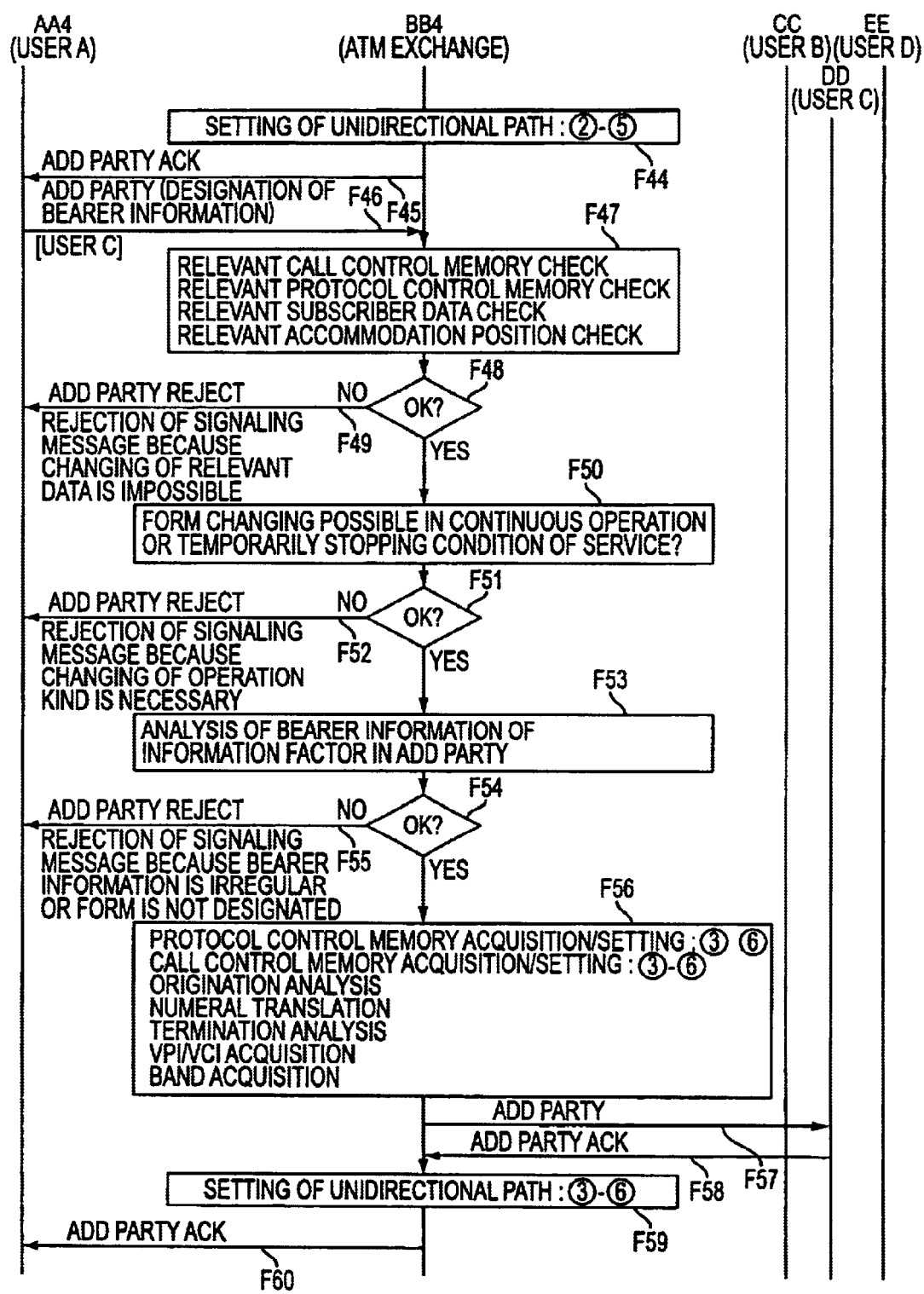
FIG. 37 is a sequence diagram illustrating the form changing control by the ATM exchange of the present embodiment.

Then, the ATM exchange 5 sets, when an acknowledge response ("ADD PARTY ACK" signal) to the "ADD PARTY" signal is received from the user C (step F43), a unidirectional path between the user A and the user C (subscriber information ② to subscriber information ⑤) as shown in FIG. 37 (step F44), and transmits the "ADD PARTY ACK" signal to the user A to report to the user A that the user C has been added as a user to enjoy the broadcast type SVC service (step F45).

Thereafter, when an "ADD PARTY signal" for adding the subscriber information ⑥ of the user D as a user to enjoy the broadcast type SVC service similarly is further received from the user A (step F46), the ATM exchange 5 additionally acquires and sets, similarly as in steps F32 to F45 described hereinabove, the protocol control memories 522-3 and 522-6 and the call control memory 521-3 by means of the resource management section 56 (link changing control section 26) to establish a mutually linked condition with the call control memories 521-1 and 521-2 and protocol control memories 522-1, 522-2, 522-4 and 522-5 and sets a unidirectional path between the subscriber information ③ and ⑥, thereby ending the form changing from the point to point SVC service to the broadcast type SVC service (steps F47 to F60).

In short, the ATM exchange 5 described above uses, as shown in FIG. 38, the protocol control memories 522-1 and 522-4, which have already been present in the point to point SVC service, as they are also after the form changing while it uses the call control memory 521-1 changing, in response to the form changing, the type kind, operation kind, switching time, path information and so forth to commonly use the resources in the main storage section 52, and each time an "ADD PARTY" signal is received, the ATM exchange 5 additionally acquires and sets only the protocol control memories 522-2, 522-3, 522-5 and 522-6 and call control memories 521-2 and 521-3 regarding those paths which become newly required as a result of the form changing.

As described above, according to the present ATM exchange 5, since a mutually linked condition for a communication service of a different form (broadcast type SVC service) is established by changing the mutually linked condition of the pertinent ones of the call control memories 521-1 to 521-3 and protocol control memories 522-1 to 522-6 by means of the resource management section 56 (link changing control section 26), also in the communication service which utilizes public lines (SVC service), changing to a communication service of the different form can be performed very readily, and also the changing processing can be performed rapidly.

Further, since, in this instance, the link changing control section 26 described above verifies, by the registration information condition discrimination section 30, the call control memories 521-1 to 521-3, the protocol control memories 522-1 to 522-6 and the user terminal registration information based on the changing message information described above and establishes a mutually linked condition for the aimed communication service of the changing only when it is discriminated that changing of the mutually linked condition of the pertinent ones of the call control memories 521-1 to 521-3 and protocol control memories 522-1 to 522-6 is possible, changing to a communication service of the different form can be performed with a higher degree of certainty.

Furthermore, if it is discriminated by the service condition discrimination section 31 that the changing of the mutually linked condition of the pertinent ones of the call control memories 521-1 to 521-3 and protocol control memories 522-1 to 522-6 is possible, then the link changing control section 26 can perform changing to a communication service of the different form very readily even in a condition wherein the communication service in operation (point to point SVC service) is continued.

Further, since the link changing control section 26 can report, by the reporting section 32, such changing also to the other users B to D than the user A which issued the changing message information to the communication service of the different form, all of the users A to D involved in the form changing can recognize the form changing.

Furthermore, since the link changing control section 26 described above can establish, as described in connection with step F17 of FIG. 35, a mutually linked condition for the communication service of the different form if the mutually linked condition of those of the pertinent ones of the call control memories 521-2 and 521-3 and protocol control memories 522-2, 522-3, 522-5 and 522-6 for which the changing should be performed newly is changed unless there is no change in the origination and termination accommodation positions of the user terminals 6-1 and 6-4 to 6-6, the call control memory 521-1 and the protocol control memories 522-1 and 522-4 can be used commonly to effect changing to the communication service of the different from.

Accordingly, the changing to the communication service of the different form can be performed rapidly while saving the memory amount necessary for the call control memories 521-1 to 521-3 and 522-1 to 522-6 remarkably. Further, even when there is a change in the origination and termination accommodation positions of the user terminals 6-1 and 6-4 to 6-6, since only it is required to change the mutually linked condition of all of the pertinent ones of the call control memories 521-1 to 521-3 and protocol control memories 522-1 to 522-6, the changing to the communication service of the different form also in this instance can be performed readily.

Furthermore, if some trouble is detected when the mutually linked condition of the pertinent ones of the call control memories 521-1 to 521-3 and protocol control memories 522-1 to 522-6 is changed by the link changing control section 26 in order to effect changing to a different communication service, then since the communication service prior to the changing can be restored by the relief control section 33, even if the changing to the SVC service of the different form has not been performed successfully, degradation of the service performance such that a service cannot be enjoyed over a long period of time can be eliminated with certainty.

And, since the relief control section 33 reports, by the trouble end reporting section 331, to the user A which sent out the changing message information that the condition prior to the changing has been restored as shown in step F28 of FIG. 35, the user A which sent out the changing message information can recognize whether or not the changing to the communication service of the different form has been performed, and the situation of the form changing can be grasped with certainty.

Furthermore, since the relief control section 33 performs, by the other user terminal trouble end reporting section 333, reporting to the different user B that the condition prior to the changing has been restored as shown in step F27 of FIG. 35, also the user B can grasp the situation of the form changing with certainty.

Further, in the ATM exchange 5 described above, even if a changing signaling message is included in the bearer information factor (reserved bits) of the existing "SETUP" signal (or "ADD PARTY" signal), the mutually linked condition of the pertinent ones of the call control memories 521-1 to 521-3 and protocol control memories 522-1 to 522-6 is changed by the link changing control section 26 and a communication service of a desired form is provided to the users A to D, and consequently, this contributes very much to improvement in universality of the present ATM exchange 5.

It is to be noted that, upon form changing between different forms (types) or upon form changing between PVC/SVC services which will be hereinafter described, a changing signaling message corresponding to the form changing is designated in the bearer information factor (reserved bits) of the "SETUP" signal (or "ADD PARTY" signal) mentioned above.

Figure 39A:
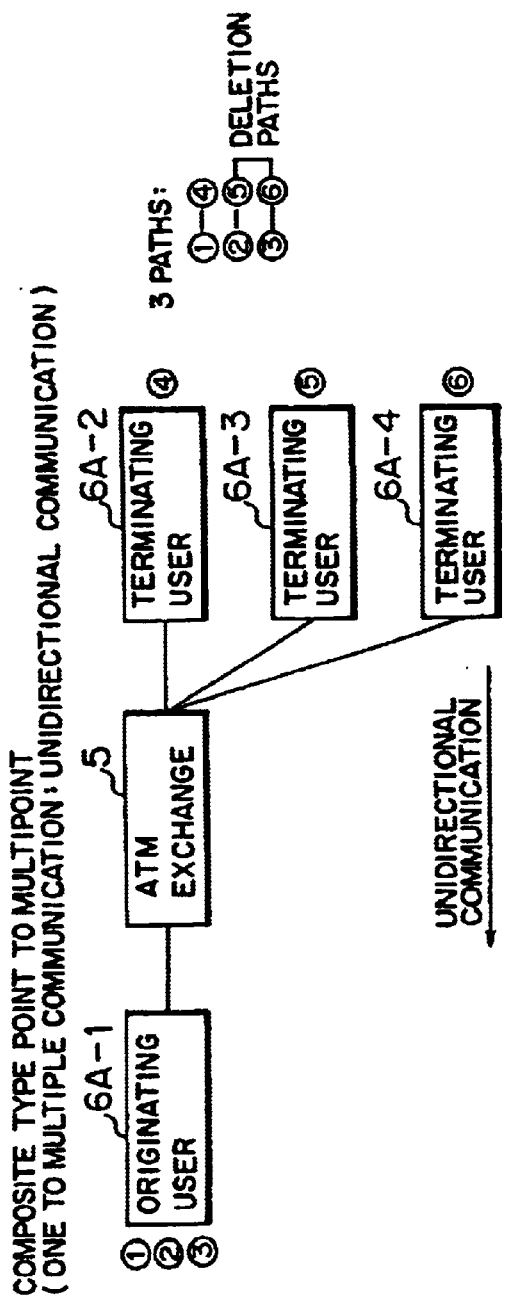
FIGS. 39(*a*) and 39(*b*) are diagrammatic views illustrating the form changing control by the ATM exchange of the present embodiment.
Figure 39B:
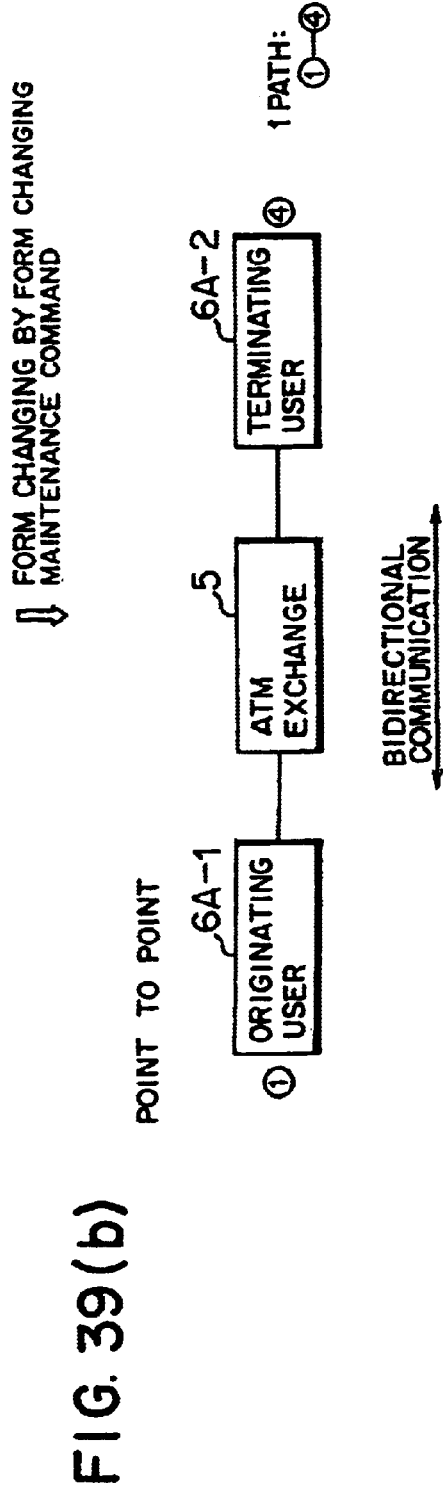

(E-3) Form Changing Control from the Point to Multipoint to the Point to Point by a Maintenance Engineer Subsequently, here, as an example of form changing control from the point to multipoint to the point to point by a maintenance engineer, form changing control, for example, from such a composite type point to multipoint PVC service (one to multiple communication: unidirectional communication) as shown in FIG. 39(*a*) to such a point to point PVC service (one to one communication: bidirectional communication) as shown in FIG. 39(*b*) will be described.

Figure 42:
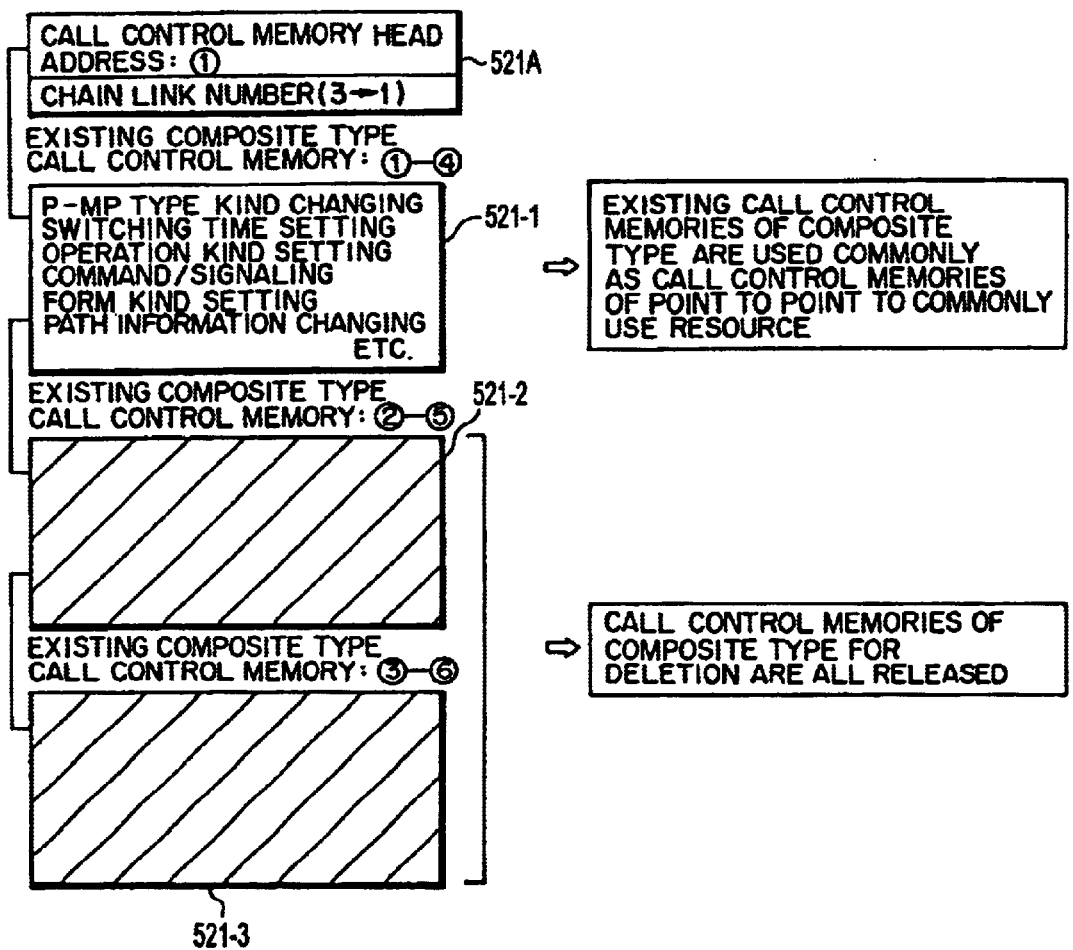
FIG. 42 is a diagrammatic view illustrating an example of mutually linked relationship of the call control memories constructed in the ATM exchange of the present embodiment.

It is to be noted that, in the composite type PVC service shown in FIG. 39(*a*), it is assumed that call control memories 521-1 to 521-3 similar to those shown in FIG. 15 are set corresponding to three paths between the subscriber information ① and ④, between the subscriber information ② and ⑤ and between the subscriber information ③ and ⑥ as shown in FIG. 42 so that they are linked with each other (also in this instance, slanting line portions of the call control memories 521-2 and 521-3 represent that various information is set under the same conditions as those of the call control memory 521-1).

And, in order for the ATM exchange 5 to perform form changing from such a composite type PVC service as shown in FIG. 39(*a*) to such a point to point PVC service as shown in FIG. 39(*b*), the two paths between the subscriber information ② and ⑤ and between the subscriber information ③ and ⑥ shown in FIG. 39(*b*) must be deleted.

Figure 40:
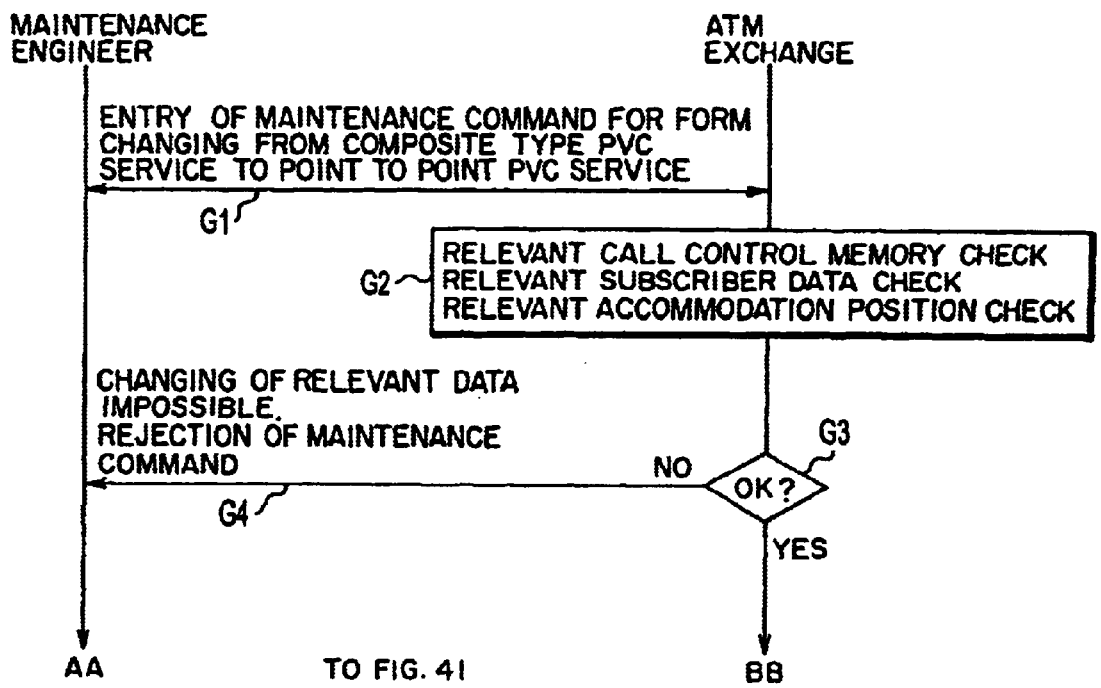
FIG. 40 is a sequence diagram illustrating the form changing control by the ATM exchange of the present embodiment.

In the following, processing when such form changing control is performed through a maintenance engineer (maintenance terminal 7) will be described in detail with reference to the sequence diagrams (steps G1 to G20) shown in FIGS. 40 to 41.

First, if the maintenance engineer enters a form changing maintenance command from the composite type PVC service to the point to point PVC service through the maintenance terminal 7 (step G1), then the ATM exchange 5 performs, by the registration information condition discrimination section 27, checking of the call control memories 521-1 to 521-3, subscriber data, accommodation positions and so forth which make an object of the changing upon the form changing (steps G2 and G3).

Then, if it is discriminated by the registration information condition discrimination section 27 that the changing of the pertinent data such as the mutual links of the call control memories 521-1 to 521-3 cannot be performed (when the discrimination in step G3 is NO), the maintenance command inputted through the maintenance terminal 7 is rejected (step G4).

Figure 41:
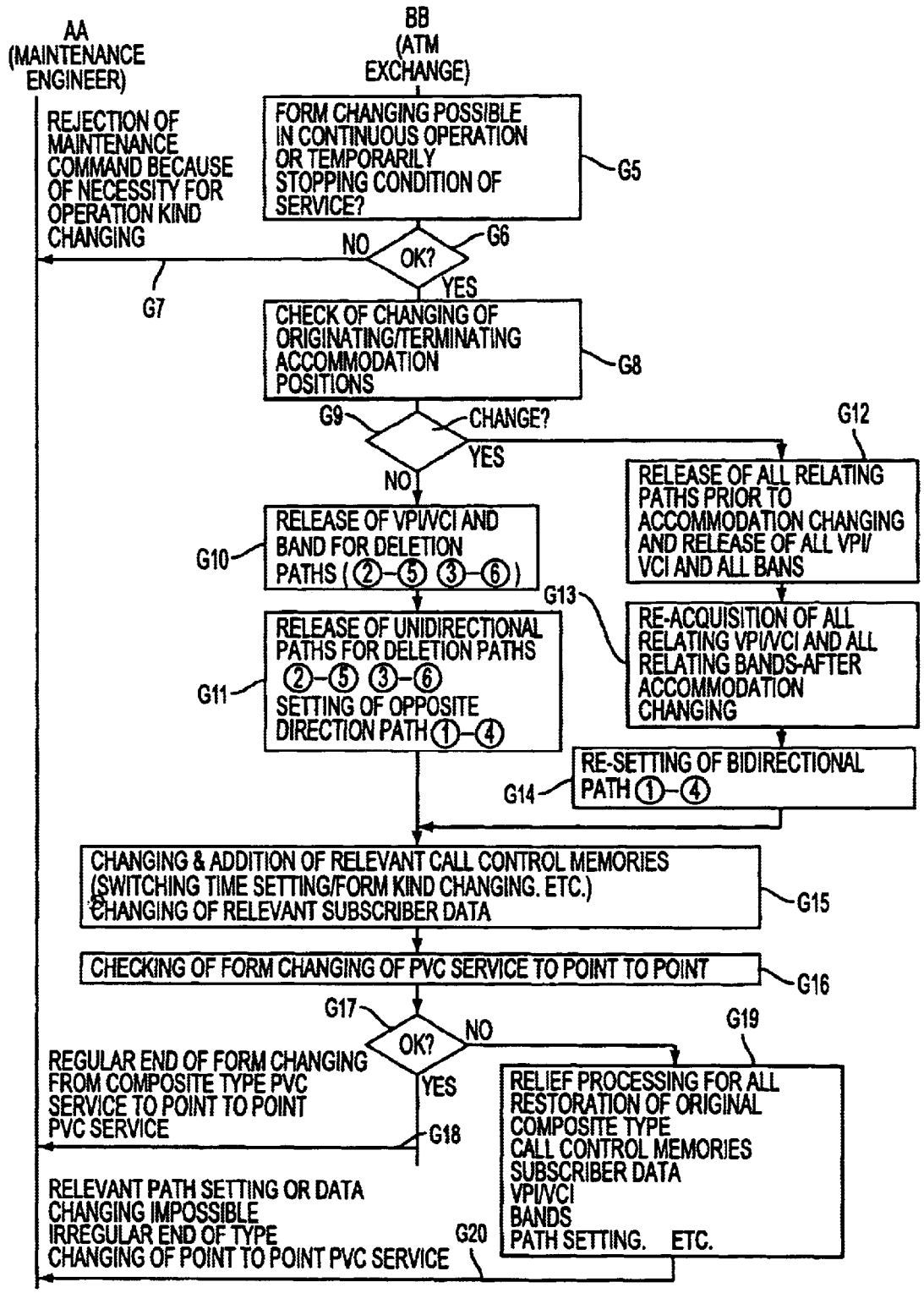
FIG. 41 is a sequence diagram illustrating the form changing control by the ATM exchange of the present embodiment.

On the other hand, if it is discriminated that then changing of the pertinent data can be performed (when the discrimination in step G3 is YES), it is further discriminated by the service condition discrimination section 28 whether or not the form changing to the point to point PVC service is possible in a condition wherein the service in operation (composite type PVC service) is continued or in another condition wherein the service in operation is temporarily stopped as shown in FIG. 41 (steps G5 and G6).

As a result, if it is discriminated by the service condition discrimination section 28 that the form changing is impossible because changing of the operation kind is necessary (when the discrimination in step G6 is NO), the maintenance command inputted through the maintenance terminal 7 is rejected also in this instance (step G7). However, if it is discriminated by the service condition discrimination section 28 that the form changing is possible (when the discrimination in step G6 is YES), it is checked whether or not the origination and termination accommodation positions of the user terminals 6-1 and 6-4 to 6-6 (subscriber information ① to ⑥) have been changed (steps G8 and G9)

Then, if there is no change in the origination and termination accommodation positions of the user terminals 6-1 and 6-4 to 6-6 (when the discrimination in step G9 is NO), the ATM exchange 5 releases the VPI-VCI and the use bands of the paths between the subscriber information ② and ⑤ and between the subscriber information ③ and ⑥ to be deleted by means of the speech path control section 65 (step G10) and releases the unidirectional paths (⑤ to ② and ⑥ to ③) set to those paths, and then sets an opposite direction ((④ to ①) path between the subscriber information ① and ④ (step G11).

On the other hand, if the origination and termination accommodation positions of the user terminals 6-1 and 6-4 to 6-6 have been changed (when the discrimination in step G9 is YES), the ATM exchange 5 first releases all paths, all VPI/VCI and all bands involved in the form changing prior to the origination and termination accommodation position changing (step G12) and then re-acquires all VPI/VCI and all bands involved in the form changing after the accommodation position changing (step G13), whereafter it sets a bidirectional path only to the path between the subscriber information ① and ④ (step G14).

Then, after a bidirectional path is set between the subscriber information ① and ④ in step G11 or G14 as described above, the ATM exchange 5 performs, by the resource management section 56, changing and addition (switching time setting, form kind changing and so forth) of information in the call control memory 521-1 (refer to FIG. 42) provided corresponding to the path between the subscriber information ① and ④ and effects changing of the subscriber data by the subscriber operation condition management section 60 (step G15).

Thereafter, the ATM exchange 5 discriminates whether or not the form changing from the composite type PVC service to the point to point PVC service has been performed regularly (steps G16 and G17), and if the form changing has been performed regularly (when the discrimination in step G17 is YES), this is reported to the maintenance engineer through the maintenance terminal 7 (step G18).

On the other hand, if some trouble has occurred in the form changing (when the discrimination in step G17 is NO), then relieve processing to return all of the call control memory 521-1, subscriber data, VPI/VCI, use band, path setting and so forth which have been changed upon the form changing to the original ones for the composite time PVC service is performed by the relief control section 29 (call/connection control section 58, subscriber operation condition management section 60, speech path control section 65 and so forth) (step G19), and this is reported to the maintenance engineer, thereby ending the processing (step G20).

In short, in the present ATM exchange 5, by making it possible in advance for the call control memories 521-1 to 521-3, which have been present already in the composite type PVC service, to commonly use the resources by changing the type kind, operation kind, switching time, path information and so forth and then releasing all of the call control memories 521-2 and 521-3 which become unnecessary as a result of the form changing to the point to point PVC service, a linked condition of the call control memory 521-1 for the point to point PVC service is established.

Accordingly, also in the present ATM exchange 5, similar advantages or effects to those described above in the item (E-1) are achieved.

It is to be noted that, while, in the ATM exchange 5 described above, form changing control from the point to multipoint PVC service of the composite type to the point to point PVC service is described, also in form changing control from the point to multipoint PVC service of any other type (broadcast type, merge type, multipoint type or the like) to the point to point PVC service, form changing to a communication service of a different form can be performed readily by a similar control procedure to that described above.

(E-4) Form Changing Control from the Point to Multipoint to the Point to Point by a User Subsequently, here, as an example of form changing control from the point to multipoint to the point to point by a user, form changing control, for example, from such a broadcast type SVC service (one to multiple communication: unidirectional communication) as shown in FIG. 43(a) to such a point to point SVC service (one to one communication: bidirectional communication) as shown in FIG. 43(b) will be described.

Figure 49:
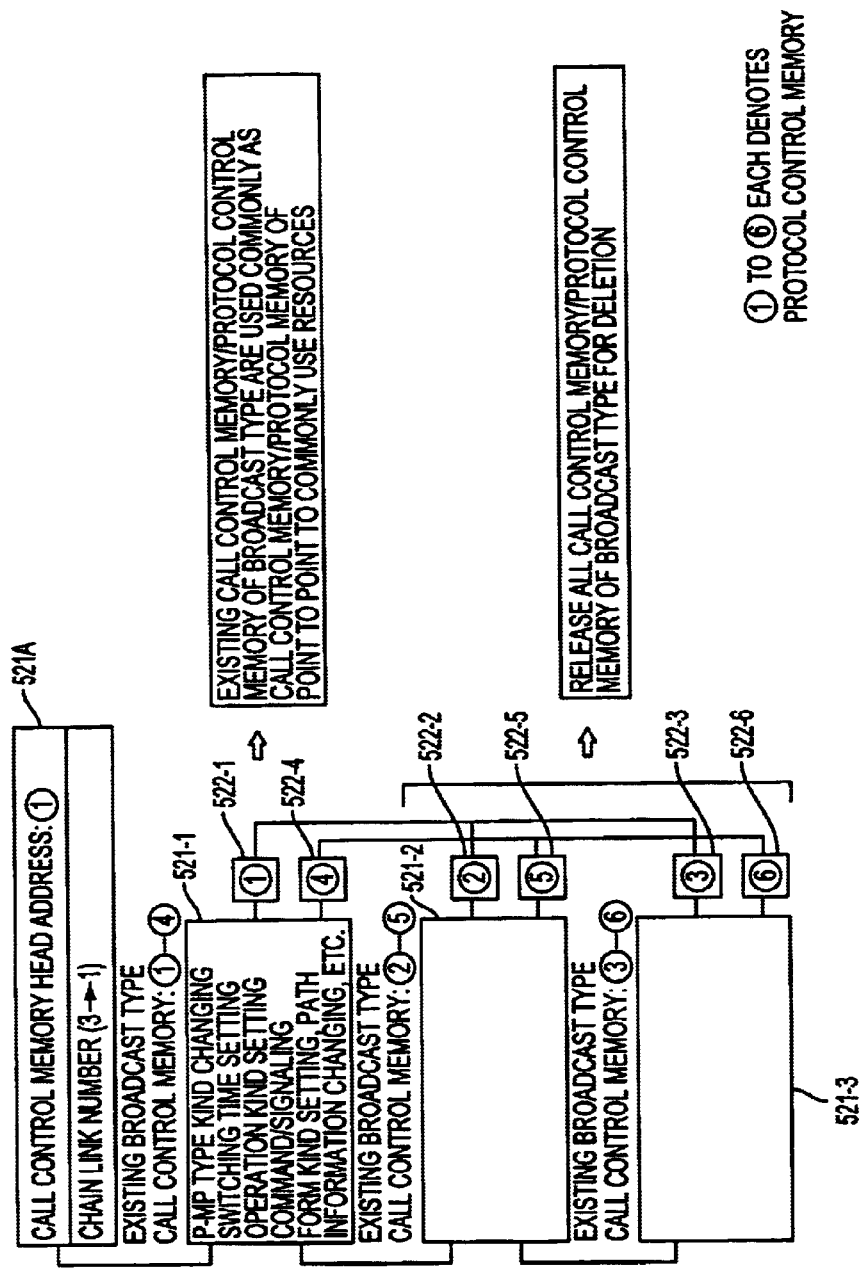
FIG. 49 is a diagrammatic view illustrating an example of mutually linked relationship of the call control memories and protocol control memories constructed in the ATM exchange of the present embodiment.

It is to be noted that, in the broadcast type SVC service shown in FIG. 43(a), it is assumed that call control memories 521-1 to 521-3 and protocol control memories 522-1 to 522-6 similar to those shown in FIG. 18 are set corresponding to the three paths between the subscriber information ① and ④, between the subscriber information ② and ⑤ and between the subscriber information ③ and ⑥ and the subscriber information ① to ⑥ as shown in FIG. 49, respectively, and they are linked with each other to form the communication service providing section 23 (refer to FIG. 10).

And, in order for the ATM exchange 5 to perform form changing from such a broadcast type SVC service as shown in FIG. 43(a) to such a point to point SVC service as shown in FIG. 43(b), the two paths between the subscriber information ② and ⑤ and between the subscriber information ③ and ⑥ shown in FIG. 43(b) must be deleted and a bidirectional path must be set between the subscriber information ① and ④.

In the following, such form changing control will be described in detail with reference to the sequence diagrams (steps H1 to H35) shown in FIGS. 44 to 48. It is to be noted that, also in this instance, the originating user 6A-1 will be referred to as user A and the terminating user groups 6A-2 to 6A-4 will be referred to as users B to D, respectively.

Figure 44:
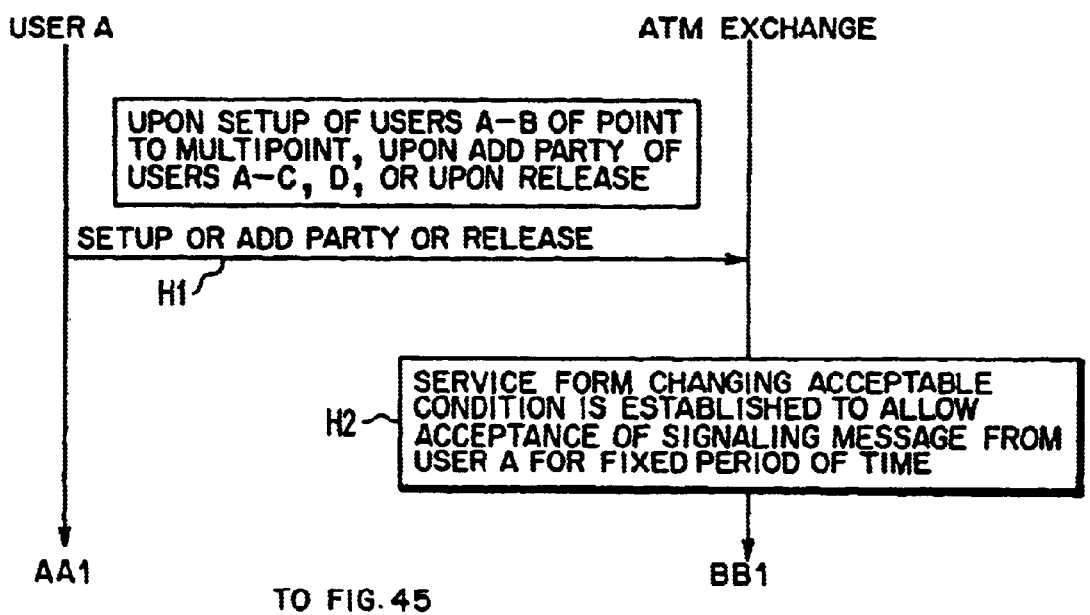
FIG. 44 is a sequence diagram illustrating the form changing control by the ATM exchange of the present embodiment.
Figure 45:
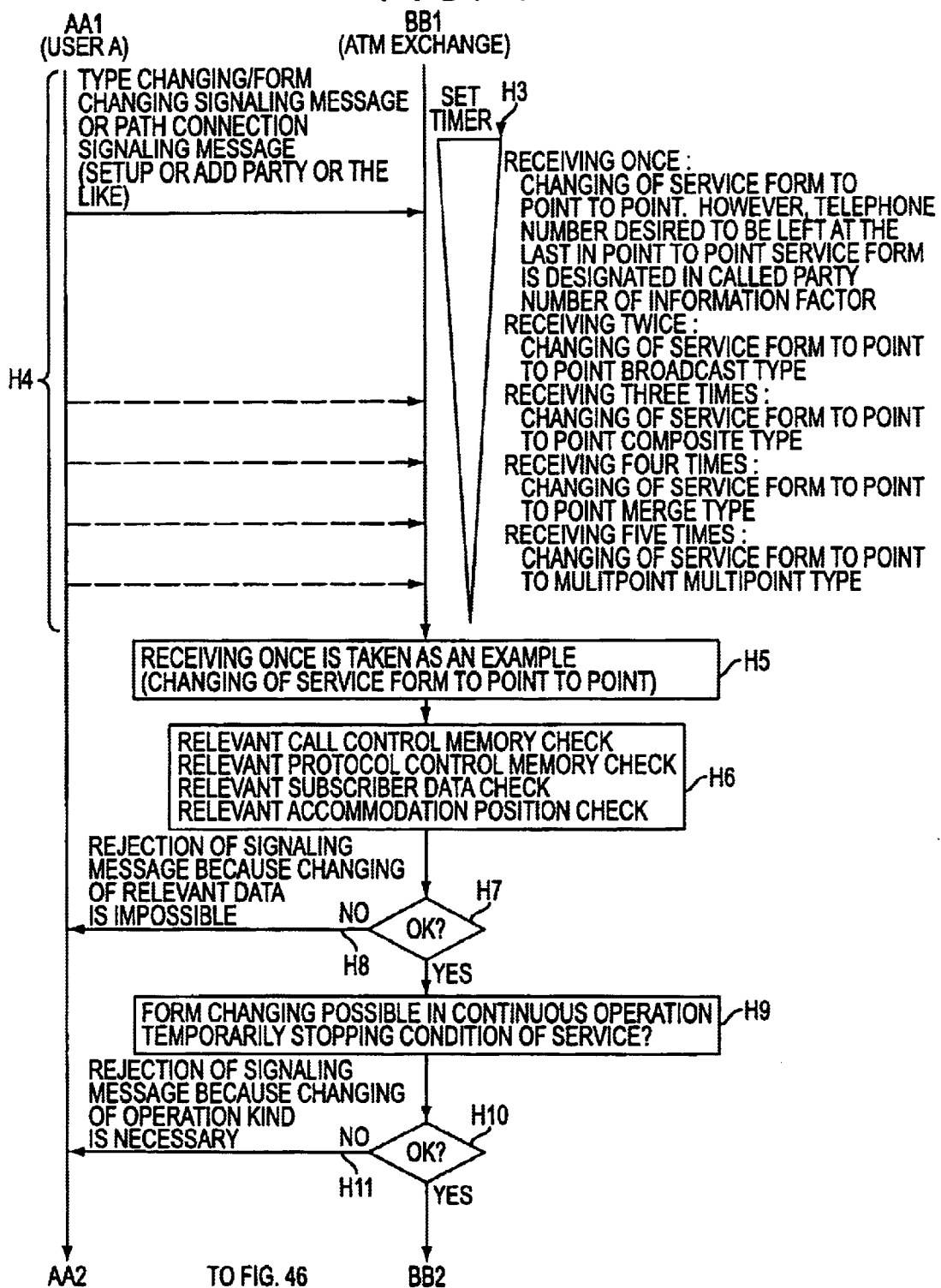
FIG. 45 is a sequence diagram illustrating the form changing control by the ATM exchange of the present embodiment.

First, as shown in FIG. 44, if one of a "SETUP" signal, an "ADD PARTY" signal and a "RELEASE" signal is inputted from the user A to the ATM exchange 5 (step H1), then the ATM exchange 5 sets a service form changing acceptable condition and sets a timer to establish a condition wherein a signaling message from the user group A can be accepted for a fixed period of time as shown in FIG. 45 (steps H2 and H3).

Then, in this instance, the ATM exchange 5 discriminates, by the communication service kind discrimination section 34 (refer to FIG. 10), an aimed communication service of changing in response to a number of times of reception of a type changing/form changing signaling message or a path connecting signaling message ("SETUP" signal, "ADD PARTY" signal or the like) and effects changing to the communication service of the desired form.

In particular, changing of the service form is performed such that, for example, if a signaling message is received once from the user A within the time set to the timer in step H3 as shown in FIG. 45, then service form changing to the point to point is performed, but when it is received twice, service form changing to the broadcast type of the point to point is performed.

By the way, in the present embodiment, since the changing is form changing from the broadcast type SVC service to the point to point SVC service, it is assumed here that a signaling message is received only once from the user A within the time set to the timer in step H3 (steps H4 and H5).

Thus, the ATM exchange 5 effects, by means of the registration information condition discrimination section 30, checking of the (pertinent) call control memories 521-1 to 521-3, protocol control memories 522-1 to 522-6, subscriber data, accommodation positions and so forth which make an object of the form changing (steps H6 and H7), and if it is discriminated by the registration information condition discrimination section 30 that the changing of the pertinent data cannot be performed (the mutually linked condition of the call control memories 521-1 to 521-3 and protocol control memories 522-1 to 522-6 cannot be changed) (when the discrimination in step H7 is NO), the signaling message received from the user A is rejected (step H8).

On the other hand, if it is discriminated by the registration information condition discrimination section 30 that the changing of the pertinent data is possible (when the discrimination in step H7 is YES), it is further discriminated by the service condition discrimination section 31 whether the form changing to the point to point SVC service can be performed in a condition wherein the service in operation (broadcast type SVC service) is continued or in another condition wherein the service in operation is temporarily stopped (steps H9 and H10).

Figure 46:
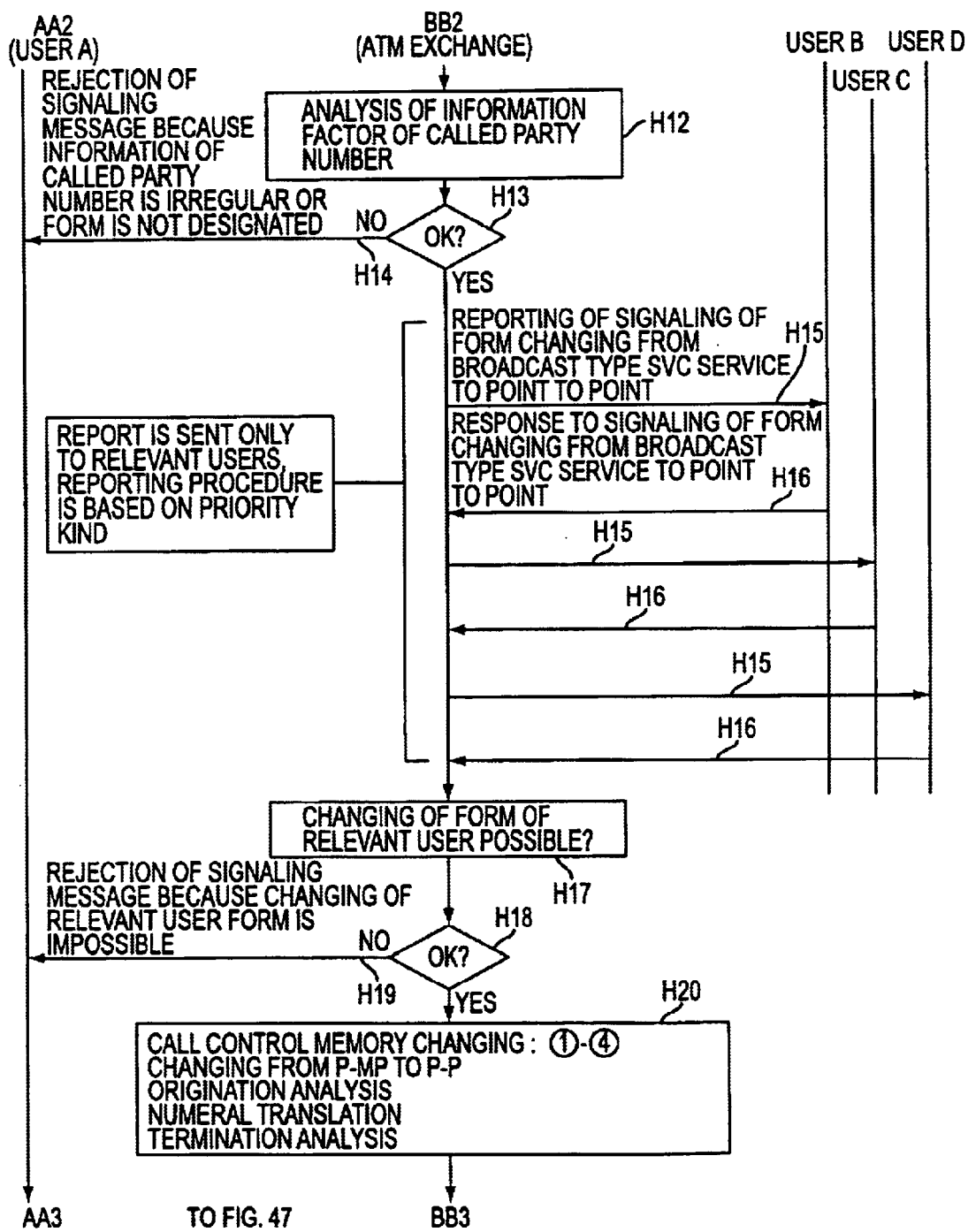
FIG. 46 is a sequence diagram illustrating the form changing control by the ATM exchange of the present embodiment.

As a result, if it is discriminated by the service condition discrimination section 31 that the form changing cannot be performed because changing of the operation kind is required (when the discrimination in step H10 is NO), the signaling message received from the user A is rejected also in this instance (step H1). However, if it is discriminated by the service condition discrimination section 31 that the form changing is possible (when the discrimination in step H10 is YES), analysis of telephone number information ("called party number" information factor) of the user A and so forth is performed as shown in FIG. 46 (steps H12 and H13).

If, as a result of the analysis, there is some trouble in the "called party number" information factor or the form is not designated as yet (when the discrimination in step H13 is NO), the signaling message received from the user A is rejected (step H14). However, if there is no trouble (when the discrimination in step H13 is YES), it is reported to the pertinent ones of the subscribers of the users B to D which make an object of the form changing by the reporting section 32 that form changing from the broadcast type SVC service to the point to point SVC service is performed (step H15). It is to be noted that this reporting is performed by the priority reporting section 321 in accordance with priority kinds set in advance.

Then, when responding signaling messages to the report are received from the users B to D (step H16), the ATM exchange 5 discriminates whether or not the form changing of the pertinent ones of the user terminals 6-1 and 6-4 to 6-6 is possible (steps H17 and H18). If the form changing is impossible (when the discrimination in step H18 is NO), the ATM exchange 5 rejects the form changing signaling message received from the user A and reports this to the user A (step H19).

On the other hand, if the form changing of the pertinent users is possible (when the discrimination in step H18 is YES), the linked condition of the call control memory 521-1 for the subscriber information ① and ④ is changed from that for the broadcast type SVC service to that for the point to point SVC service by the resource management section 56 (link changing control section 26) and origination analysis, numeral translation, termination analysis and so forth are performed by the origination/termination analysis and numeral translation section 59 (step H20).

Figure 47:
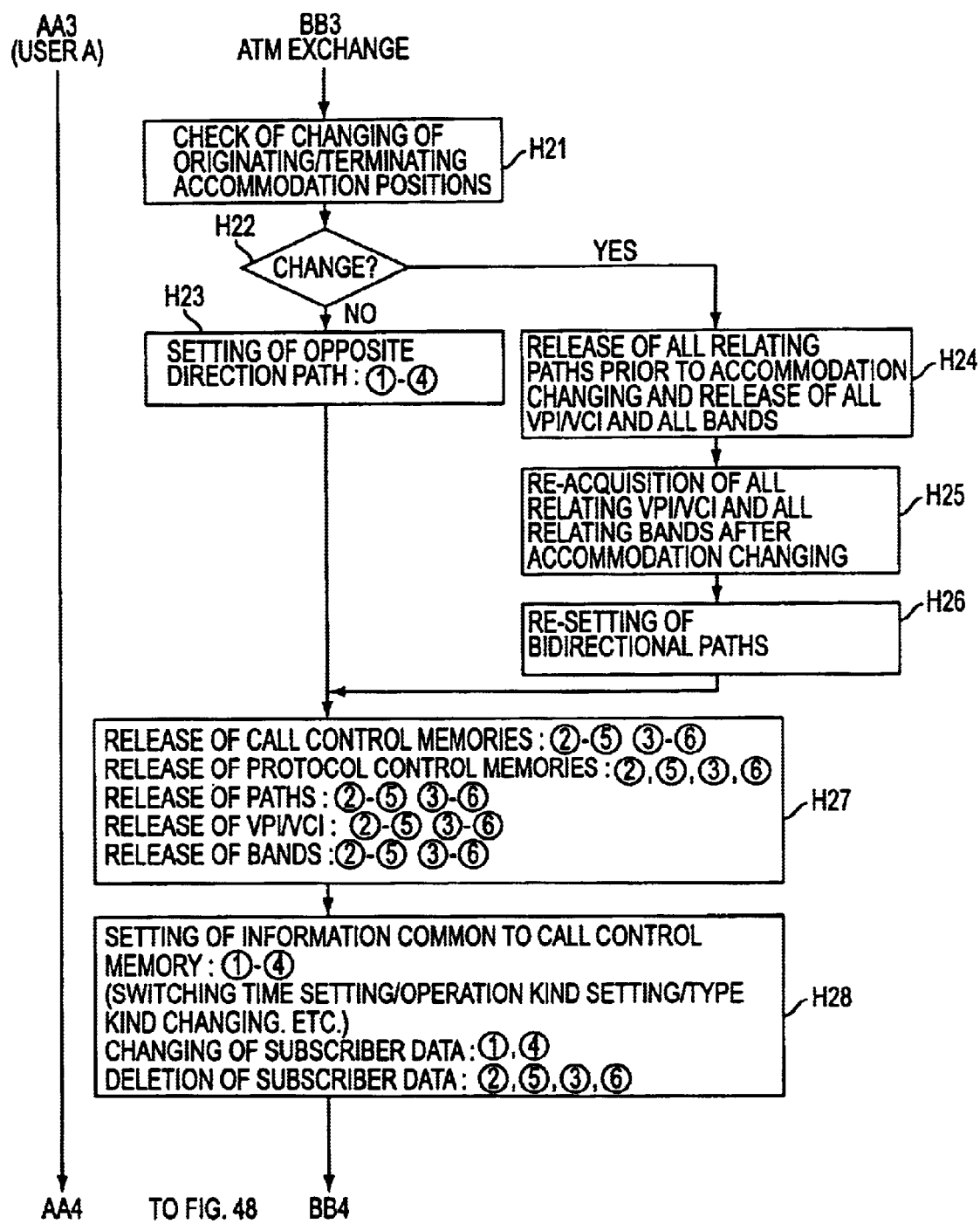
FIG. 47 is a sequence diagram illustrating the form changing control by the ATM exchange of the present embodiment.
Figure 48:
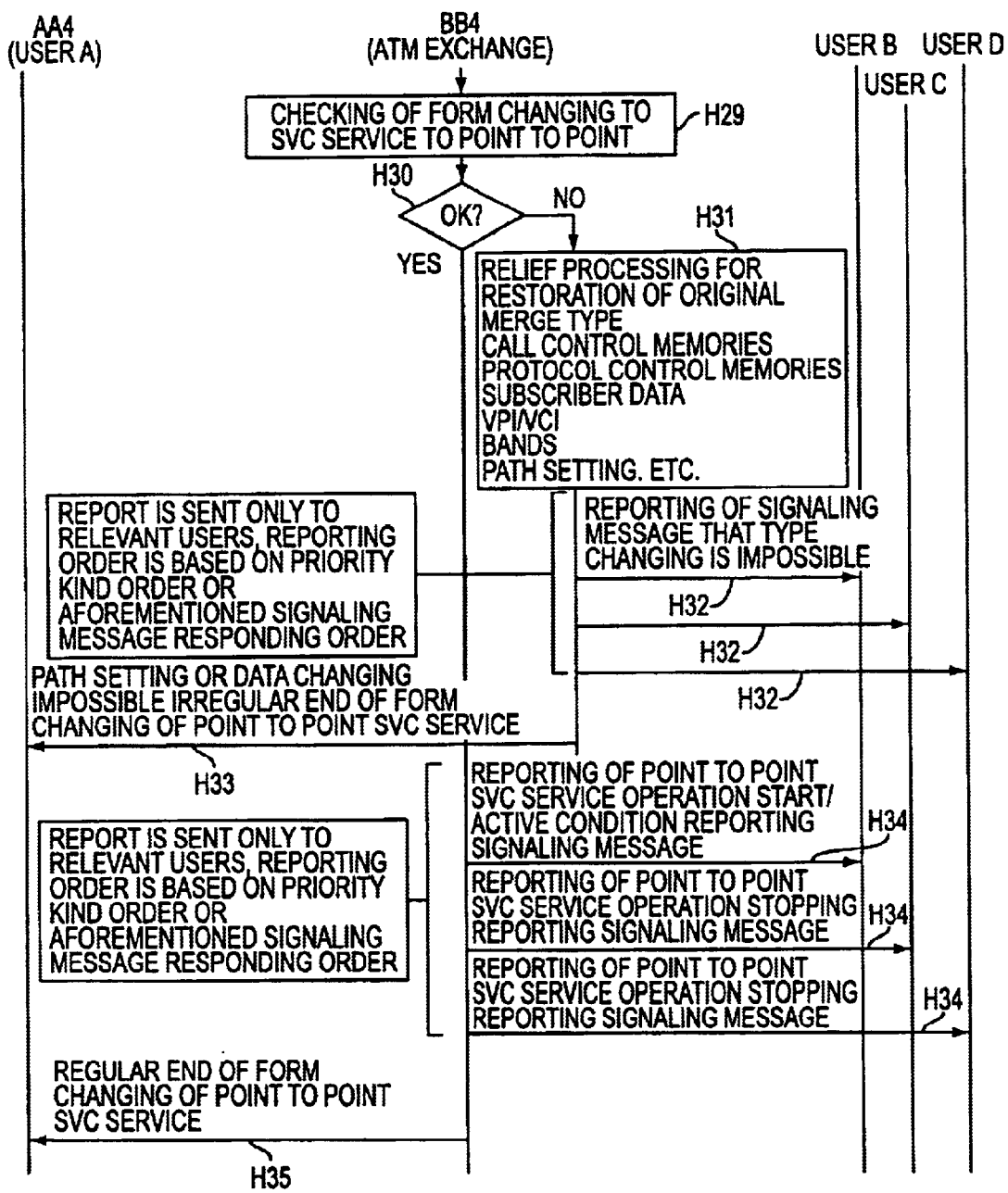
FIG. 48 is a sequence diagram illustrating the form changing control by the ATM exchange of the present embodiment.

Thereafter, in the ATM exchange 5, it is further checked by the-subscriber operation condition management section 60 whether or not the origination and termination accommodation positions of the user terminals 6-1 and 6-4 to 6-6 have been changed as shown in FIG. 47 (steps H21 and H22). If there is no change (when the discrimination in step H22 is NO), an opposite direction path is additionally set between the subscriber information ① and ④ by the speech path control section 65 so that a bidirectional path is set between the subscriber information ① and ④ (step H23).

On the other hand, if a change is detected in the origination and termination accommodation positions of the user terminals 6-1 and 6-4 to 6-6 (when the discrimination in step H22 is YES), releasing of all paths, all VPI/VCI and all use bands involved prior to the changing of the origination and termination accommodation positions is performed once (step H24), and then all VPI/VCI and all use bands involved after the changing of the origination and termination accommodation positions are re-acquired (step H25) and a bidirectional path is set newly between the subscriber information ① and ④ (step H26).

Then, after a bidirectional path is set between the subscriber information ① and ④ in step H23 or H26 in this manner, in the ATM exchange 5, the call control memories 521-2 and 521-3, the protocol control memories 522-2, 522-5, 522-3 and 522-6, the paths (between ② and ⑤, between ③ and ⑥) and the bands (between ② and ⑤, between ③ and ⑥) which become unnecessary as a result of the form changing to the point to point SVC service are released by the resource management section 56 (link changing control section 26) (step H27).

Thereafter, the ATM exchange 5 further sets, by the resource management section 56, common information such as switching time setting, operation time setting and type kind changing to the call control memory 521-1 and changes the subscriber data of the subscriber information ① and ④ and besides deletes the subscriber data of the subscriber information ②, ③, ⑤ and ⑥ (step H28).

Then, the ATM exchange 5 checks whether or not the form changing from the broadcast type SVC service to the point to point SVC service has been performed regularly (steps H29 and H30), and if the form changing has not been performed regularly (when the discrimination in step H30 is NO), then relief processing of restoring the broadcast type SVC service prior to the changing is performed by the relief control section 33 (step H31), and it is reported to the users A to D by the trouble end reporting section 331 and the other user terminal trouble end reporting section 332 that the form changing has not successfully been performed regularly (steps H32 and H33).

On the other hand, if the form changing has been performed regularly (when the discrimination in step H30 is YES), then starting of operation (protocol active condition) of the point to point SVC service is reported to the user B and stopping of operation of the broadcast type SVC service is reported to the users C and D by the user reporting section 32 (step H34), and it is reported to the user A that the form changing to the point to point SVC service has been performed regularly, thereby ending the form changing control (step H35).

In short, in the present ATM exchange 5, the resources of the protocol control memories 522-1 and 522-4 which have been present already for the broadcast type SVC service are used commonly (the protocol conditions are in an all active condition) while the resources of the call control memory 521-1 which has been present already for the broadcast type SVC service are used commonly after the type kind, operation kind, switching time, path information and so forth are changed, but the protocol control memories 522-2, 522-5, 522-3 and 522-6 and the call control memories 521-2 and 521-3 which become unnecessary as a result of the form changing to the point to point SVC service are all released by the resource management section 56.

Accordingly, also in the present ATM exchange 5, since changing from the broadcast type SVC service to the point to point SVC service can be performed very readily, and besides, as described hereinabove in connection with steps H3 and H4 of FIG. 45, changing to a communication service of a desired form can be performed automatically by the communication service kind discrimination section 34 in accordance with a number of times by which a signaling message (changing message information) to another form of communication service is received, even where a kind of a communication service of an aimed form of changing is included in a signaling message, form changing can be performed by a very simple procedure.

It is to be noted that, while form changing control from the broadcast type SVC service to the point to point SVC service is described in the ATM exchange 5 described above, also in form changing control from the point to multipoint SVC service of any other type (composite type, merge type, multipoint type or the like) to the point to point SVC service, form changing to a communication service of the different form can be performed readily by a similar procedure to that described above.

As described above, with the ATM exchange 5 described above in the items (E-1) to (E-4) given above, form changing to a communication service of an arbitrary form of the point to point or the point to multipoint can be performed readily, and consequently, simplification in maintenance operation and significant reduction in influence upon a user which is using a service upon form changing can be achieved.

(E-5) Simultaneous Form Changing Control from the Point to Point to the Point to Multipoint by a Maintenance Engineer In the following, a case wherein form changing control from the point to point PVC service to the point to multipoint PVC service (composite type PVC service) described hereinabove in the item (E-1) is performed simultaneously for a plurality of user groups from a maintenance engineer will be described-with reference to the sequence diagrams (steps E1' to E20') shown in FIGS. 82 and 83.

Figure 82:
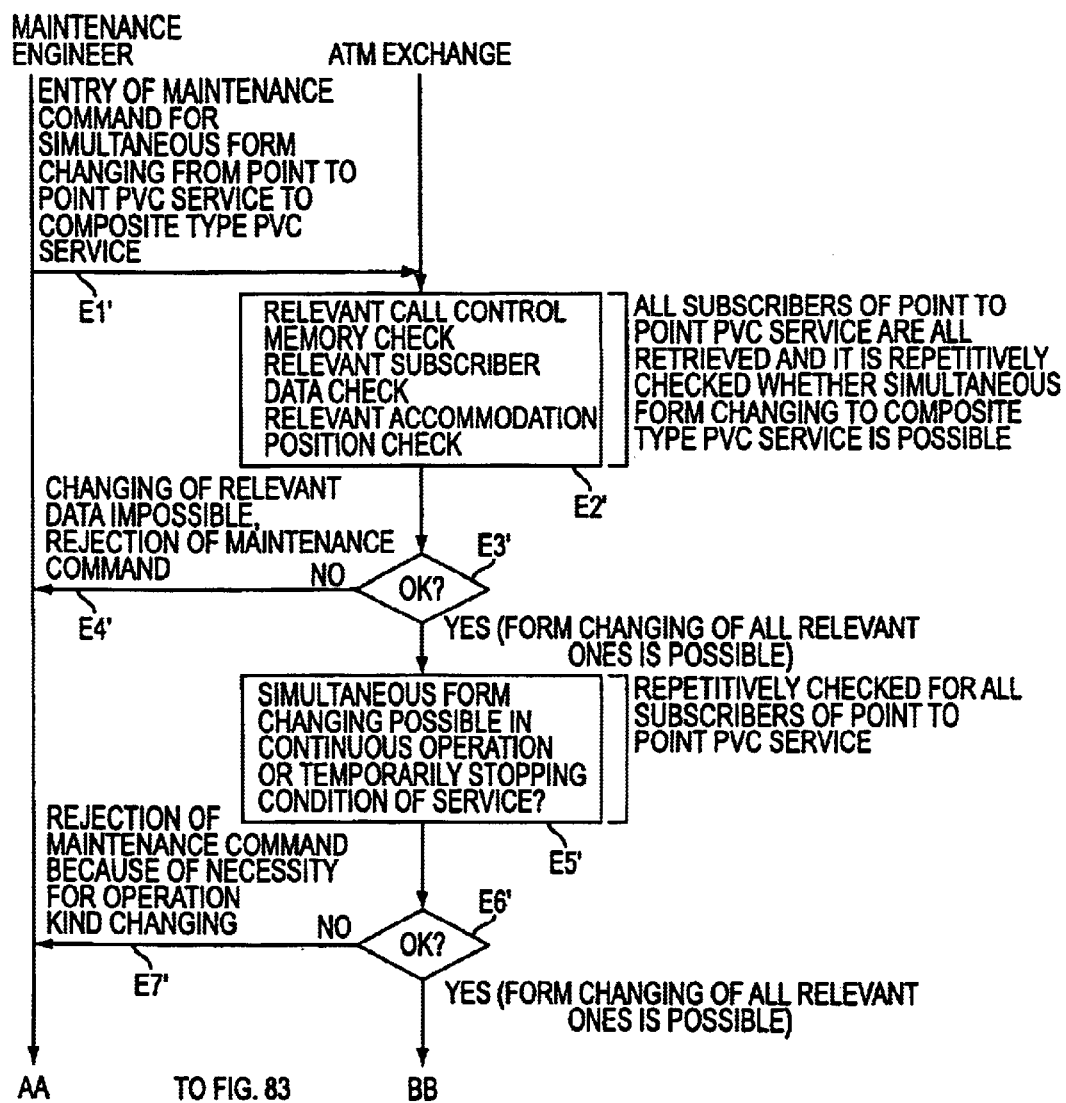
FIG. 82 is a sequence diagram illustrating the simultaneous form changing control by the ATM exchange of the present embodiment.
Figure 83:
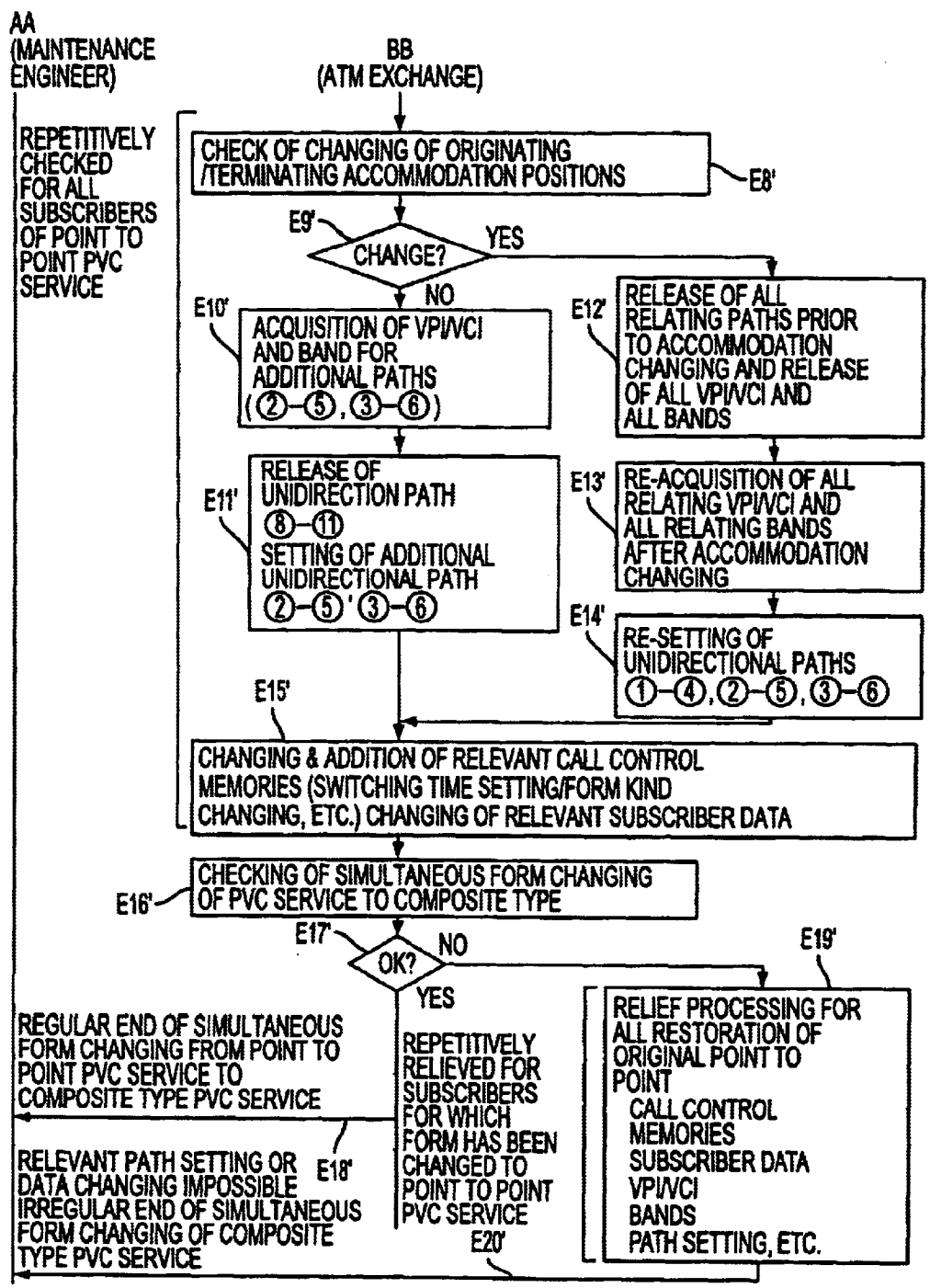
FIG. 83 is a sequence diagram illustrating the simultaneous form changing control by the ATM exchange of the present embodiment.

First, a maintenance engineer of the ATM exchange 5 enters a simultaneous form changing maintenance command from the point to point PVC service to the composite type PVC service through the maintenance terminal 7 as shown in FIG. 82 (step E1'). It is to be noted that also the simultaneous form changing maintenance command has a basically similar format to the format shown in FIG. 73, and information (PVC/SVC kind, P-MP type kind and so forth) regarding user groups for which type changing is to be performed is designated for the user groups of an object of the form changing into various data designation regions.

Then, when the simultaneous form changing maintenance command is received, the ATM exchange 5 performs checking (verification) of the pertinent call control memory 521-1, subscriber data and the accommodation position by the registration information condition discrimination section 27 repetitively for the user groups of the object of the form changing (for all subscribers of the point to point PVC service) (step E2').

As a result, When the changing of the pertinent data is impossible (when the discrimination in step E3' is NO), the ATM exchange 5 rejects the simultaneous form changing maintenance command entered by the maintenance engineer (step E4'). However, when the changing is possible (when the discrimination in step E3' is YES), it is further discriminated by the service condition discrimination section 28 whether or not the changing of the service form to the composite type PVC service can be performed in a condition wherein the communication service in operation (point to point PVC service) is continued or in another condition wherein the communication service in operation is temporarily stopped (step E5').

Then, when the simultaneous changing cannot be performed because changing of the operation kind is required (when the discrimination in step E6' is NO), the maintenance command inputted through the maintenance terminal 7 is rejected also in this instance (step E7'). However, if it is discriminated that the changing is possible with all of the pertinent user groups (subscribers) (when the discrimination in step E6' is YES), then even in a condition wherein the communication service in operation is continued, checking of the origination and termination accommodation positions (steps E8' and E9'), path setting processing (steps E10' to E14') and updating processing for the various data and the subscriber data in the pertinent call control memories 521-i (step E15') are repetitively performed for all of the pertinent subscribers as shown in FIG. 83.

It is to be noted that the processing in steps E8' to E15' mentioned above is performed in a similar manner as in steps E8 to E15 shown in FIGS. 29 and 30. In particular, when the origination and termination accommodation positions of the user terminals 6-1 and 6-4 to 6-6 have not been changed (when the discrimination in step E9' is NO). VPI/VCI, use bands and such call control memories 521-2 and 521-3 as shown in FIG. 31 for the additional paths (between ② and ⑤ and between ③ and ⑥) are acquired (step E10').

Then, the unidirectional path (① to ④) between the subscriber information ① and ④ is released and unidirectional paths (⑤ to ② and ⑥ to ③) are set only for the additional paths by the speech path control section 65 (step E11').

On the other hand, if at least one of the origination and termination accommodation positions of the user terminals 6-1 and 6-4 to 6-6 has been changed (when the discrimination in step E9' is YES), the ATM exchange 5 releases all of the paths involved prior to the changing of the origination and termination accommodation positions once and releases all of the VPI/VCI and all of the use bands (step E12'). Then, the ATM exchange 5 re-acquires all VPI/VCI and all of bands involved after the changing of the origination and termination accommodation positions (step E13'), and then sets new unidirectional paths for all of the paths (between ① and ④, between ② and ⑤, and between ③ and ⑥) (step E14').

Then, after the paths (unidirectional paths) are set for the individual paths in this manner, the ATM exchange 5 performs, by the link changing control section 26, for the pertinent ones of the call control memories 521-1 to 521-3 (refer to FIG. 31), such changing or addition as changing or addition such as changing of the setting of the time at which the form changing was performed (switching time setting) or the form kind (in this instance, the composite type PVC service) and performs changing of the pertinent subscriber data (step E15').

Thereafter, the ATM exchange 5 checks whether or not the simultaneous form changing (changing to the composite type PVC service) has been performed regularly (steps E16' and E17'), and if the type changing has been performed regularly (when the determination in step E17' is YES), the ATM exchange 5 reports to the maintenance engineer that the simultaneous form changing has been performed regularly, thereby ending the processing (step E18').

On the other hand, if some trouble has occurred in the simultaneous form changing (when the discrimination in step E17' is NO), the ATM exchange 5 performs, by the relief control section 29, relief processing to return all of the linked condition of the call control memories 521-1 to 521-3, subscriber data, VPI/VCI, bands and path setting to those in the condition for the communication service of the original form (point to pint PVC service) repetitively for the individual user groups (step E19'), and reports to the maintenance engineer that the simultaneous form changing has not successfully been performed regularly, thereby ending the processing (step E20').

In this manner, with the ATM exchange 5 described above, similar effects to those described in the item (E-1) can be obtained, and besides, since, even when the point to point PVC service being operated by a plurality of user groups is to be changed to the composite type PVC service, the user A need not enter a type changing command for each one user group to the ATM exchange 5 but is required only to enter a simultaneous form changing signaling message, the burden in such a form changing operation as described above can be reduced further remarkably.

It is to be noted that, while simultaneous form changing from the point to point PVC service to the composite type PVC service is described here, also simultaneous form changing from the point to point PVC service to the point to multipoint PVC service of any of various types such as the broad cast type, the merge type and the multipoint type is performed in a similar manner.

(E-6) Simultaneous Form Changing Control from the Point to Point to the Point to Multipoint by a User Subsequently, in the following, a case wherein form changing control from the point to point SVC service to the broadcast type SVC service by a user described hereinabove in the item (E-2) is performed simultaneously for a plurality of user groups (all subscribers of the point to point SVC service) will be described with reference to the sequence diagrams (steps F1' to F30') shown in FIGS. 84 to 88.

Figure 84:
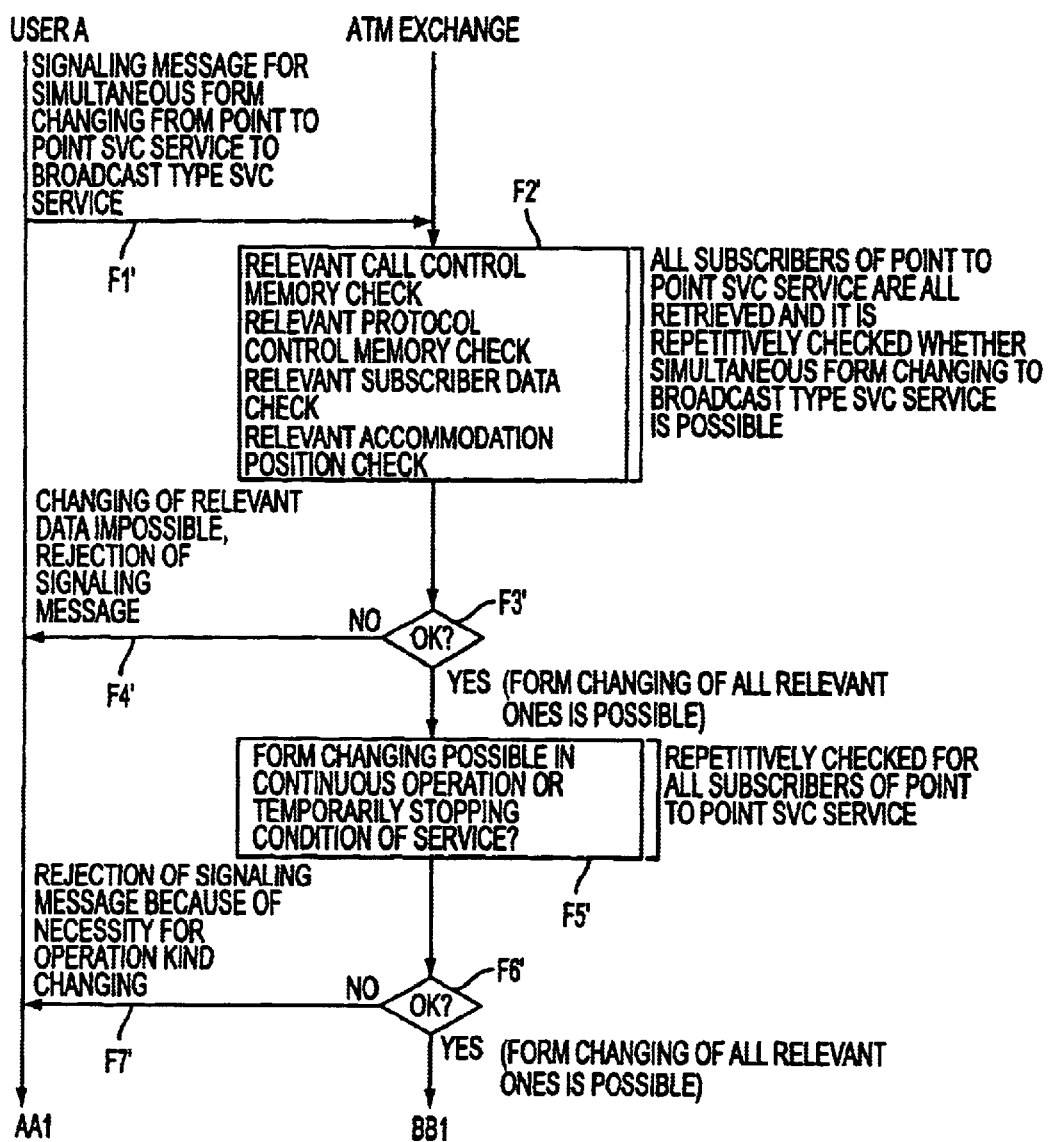
FIG. 84 is a sequence diagram illustrating the simultaneous form changing control by the ATM exchange of the present embodiment.

First, the user A enters a simultaneous form changing signaling message from the point to point SVC service to the broadcast type SVC service into the ATM exchange 5 as shown in FIG. 84 (step F1'). It is to be noted that also the simultaneous form changing signaling message has a basically similar format to the format shown in FIG. 74, and information (PVC/SVC kind, P-MP type kind and so forth) regarding user groups for which type changing is to be performed is designated for the user groups of an object of the form changing (users B to D, . . . shown in FIG. 85) into various data designation regions.

Then, when the simultaneous form changing signaling message is received, the ATM exchange 5 performs checking (verification) of the pertinent call control memory 521-1, subscriber data and the accommodation position by the registration information condition discrimination section 27 repetitively for all of the user groups of the object of the form changing (for all subscribers of the point to point SVC service) (step F2').

As a result, when the changing of the pertinent data is impossible (when the discrimination in step F3' is NO), the ATM exchange 5 rejects the simultaneous form changing signaling message entered by the user A (step F4'). However, when the changing of all of the pertinent data is possible (when the discrimination in step F3' is YES), it is further discriminated by the service condition discrimination section 31 whether or not the form changing to the broadcast type SVC service can be performed in a condition wherein the communication service in operation (point to point SVC service) is continued or in a another condition wherein the communication service in operation is temporarily stopped repetitively for all of the subscribers of the communication service in operation (step F5').

Figure 85:
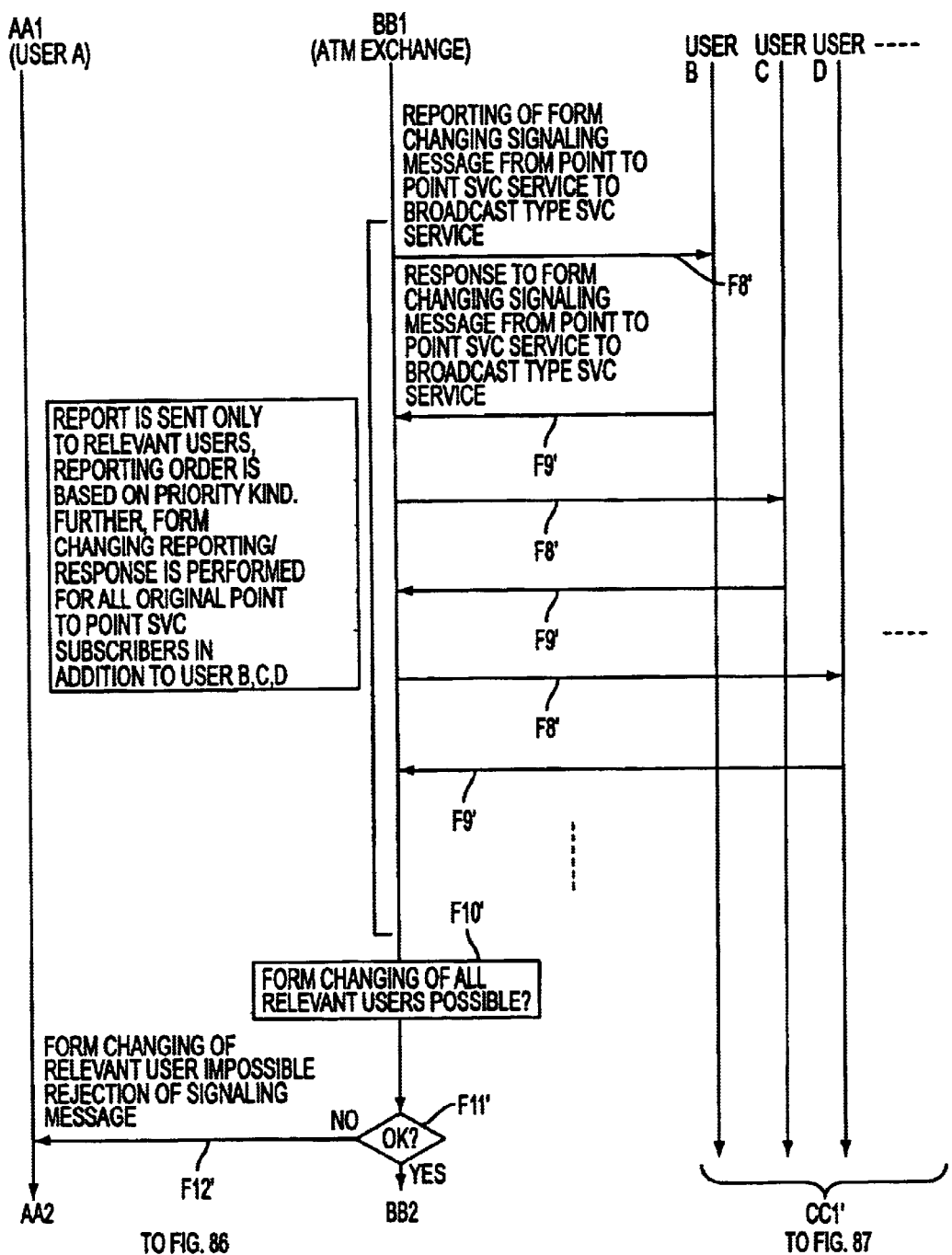
FIG. 85 is a sequence diagram illustrating the simultaneous form changing control by the ATM exchange of the present embodiment.

Then, when the simultaneous changing cannot be performed because changing of the operation kind is required (when the discrimination in step F6' is NO), the simultaneous form changing signaling message inputted from the user A is rejected also in this instance (step F7'). However, when it is discriminated that the changing is possible (when the discrimination in step F6' is YES), even in a condition wherein the communication service in operation is continued, it is reported to all of the pertinent user groups (users B to D, . . . ) using a signaling message that form changing to the broadcast type SVC service is performed as shown in FIG. 85 (step F8').

Further. if responses to the signaling message described above are received from the users B to D, . . . (step F9'), then the ATM exchange 5 discriminates whether or not the form changing of all of the pertinent ones of the users B to D, . . . is possible (steps F10' and F11'). If the form changing is impossible, then the simultaneous form changing signaling message is rejected and this is reported to the user A (from the NO route of step F11' to step F12').

Figure 86:
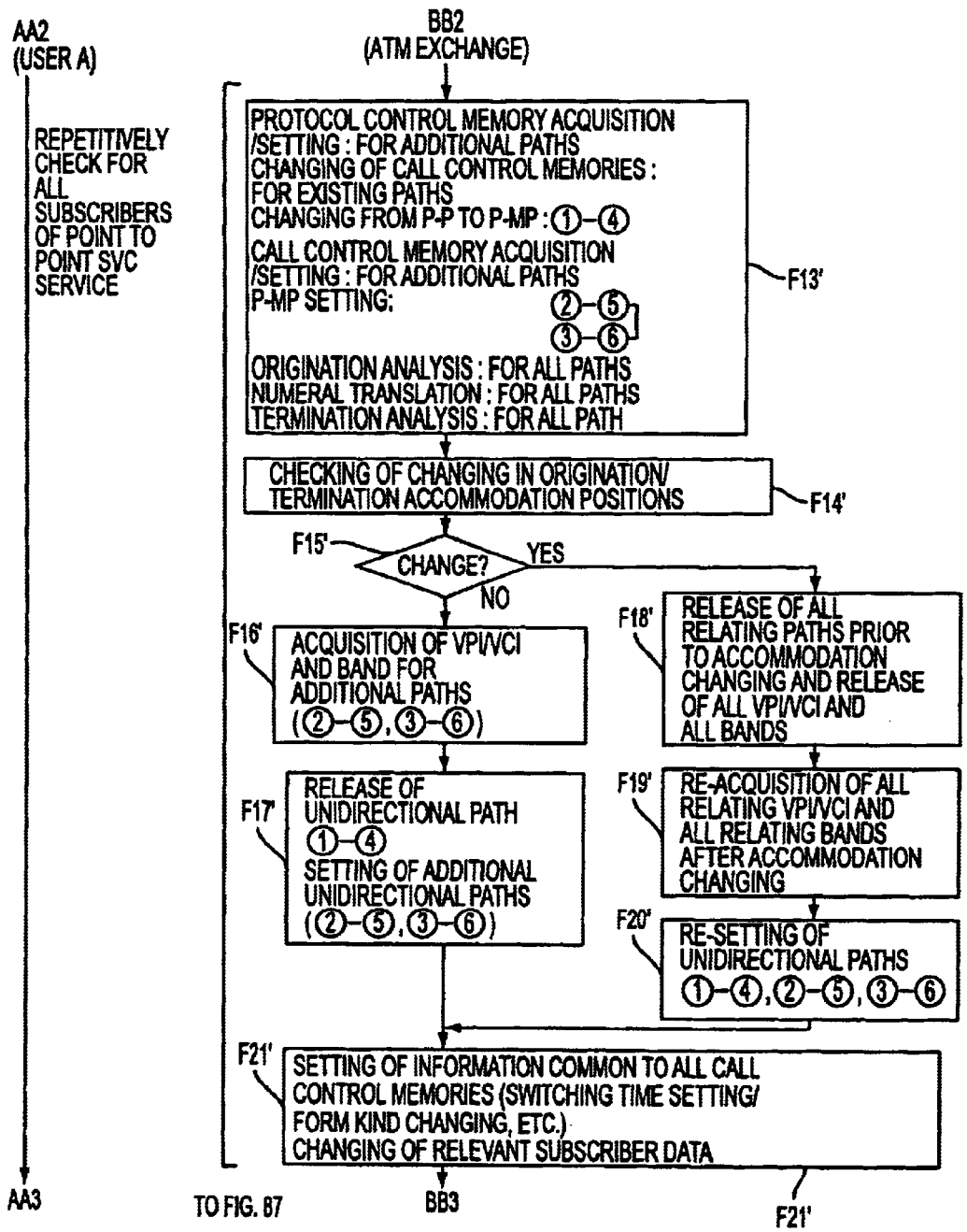
FIG. 86 is a sequence diagram illustrating the simultaneous form changing control by the ATM exchange of the present embodiment.
Figure 87:
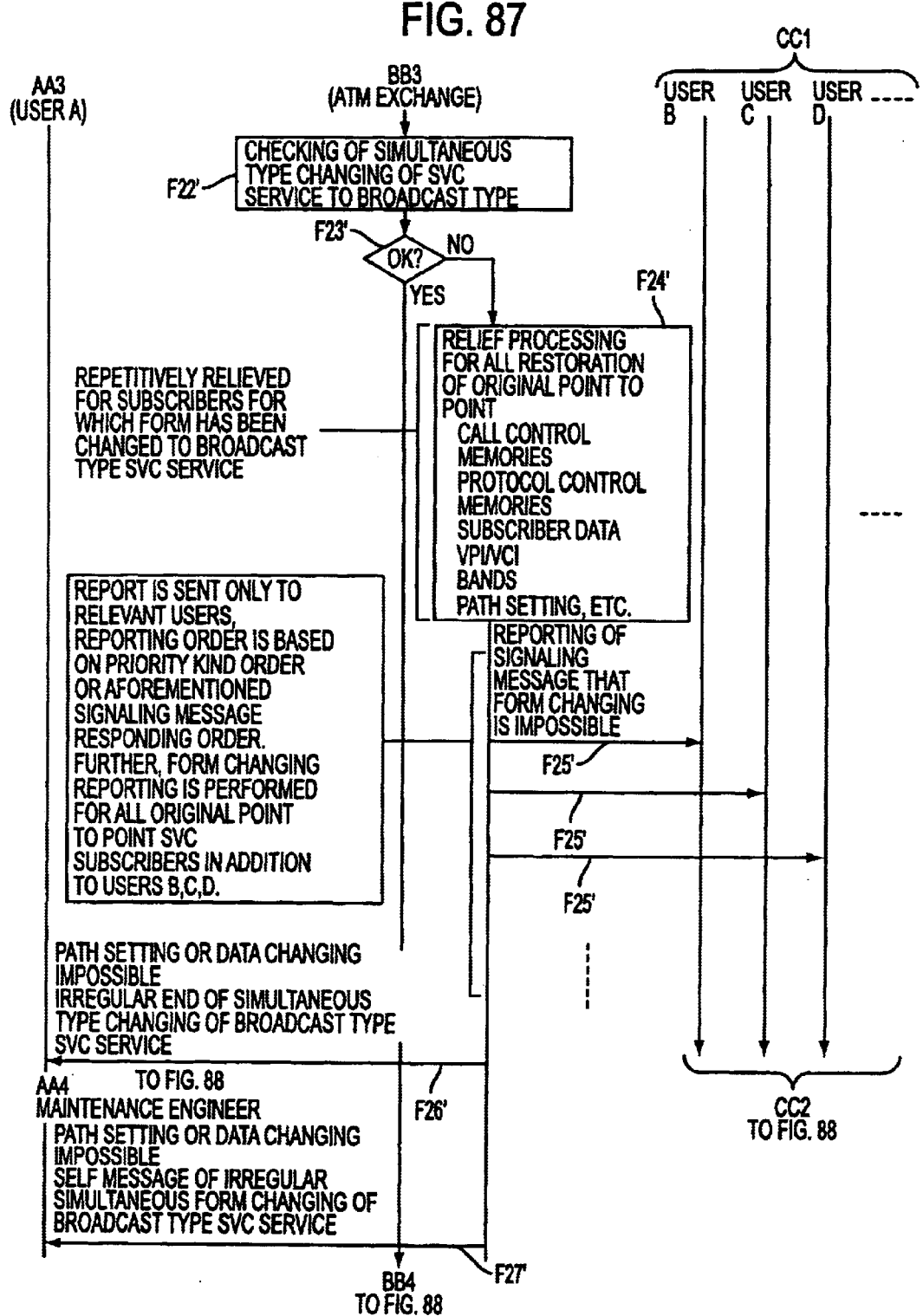
FIG. 87 is a sequence diagram illustrating the simultaneous form changing control by the ATM exchange of the present embodiment.

On the other hand, if the form changing of all of the users B to D, . . . is possible, as shown in FIG. 86, acquisition/setting of the call control memories 521-1 to 521-3 and the protocol control memories 522-1 to 522-6 (refer to FIG. 38), origination analysis, numeral translation and termination analysis processing (step F13'), checking of the origination and termination accommodation positions (steps F14' and F15'), path setting processing (steps F16' to F20') and updating processing for the various data and the subscriber data in the pertinent ones of the call control memories 521-1 to 521-3 (step F21') are repetitively performed for all of the subscribers of the point to point SVC service.

It is to be noted that the processing in steps F16' to F21' described above is performed in the following manner. In particular, when the origination and termination accommodation positions of the users B to D, . . . have not been changed (when the discrimination in step F15' is NO), the ATM exchange 5 acquires VPI/VCI, use bands and the call control memories 521-2 and 521-3 for the additional paths (between ② and ⑤ and between ③ and ⑥) (step F16'), and releases the unidirectional path of the existing path (between ① and ④) and sets a unidirectional path for each of the additional paths (between ② and ⑤ and between ③ and ⑥) (step F17').

On the other hand, if there is some change in the origination and termination accommodation positions of the users B to D, . . . (when the discrimination in step F15' is YES), then the ATM exchange 5 releases all of the paths involved prior to the changing of the origination and termination accommodation positions and releases all of the VPI/VCI and the use bands (step F18'). Thereafter, the ATM exchange 5 re-acquires all of the VPI/VCI and the use bands involved after the changing of the origination and termination accommodation positions (step F19'), and sets a unidirectional path for all of the paths (between ① and ④, between ② and ⑤ and between ③ and ⑥) newly (step F20').

Then, after a path (unidirectional path) is set to each of the paths in this manner, the ATM exchange 5 effects, by the link changing control section 26, setting or addition such as changing of the setting of the time at which the form changing was performed (switching time setting) or the form kind (in this instance, the broadcast type SVC service) for the relevant call control memories 521-1 to 521-3 (refer to FIG. 38) and performs changing of the pertinent subscriber data (step F21').

Thereafter, the ATM exchange 5 checks whether or not the simultaneous form changing (changing to the broadcast type SVC service) has been performed regularly (steps F22' and F23'), and if some trouble is detected (when the discrimination in step F23' is NO), then the ATM exchange 5 performs, by the relief control section 29, relief processing of returning the linked condition of the call control memories 521-1 to 521-3, subscriber data, VPI/VCI, bands, path setting and so forth to those in the condition for the original communication service (point to point SVC service) repetitively for those for which the form changing has been performed (step F24').

Then, the ATM exchange 5 reports to the users B to D, . . . using a signaling message that the simultaneous form changing has not been performed successfully (step F25'), and reports to the user A and the maintenance engineer that the simultaneous form changing has been ended irregularly, thereby ending the processing (steps F26' and F27').

Figure 88:
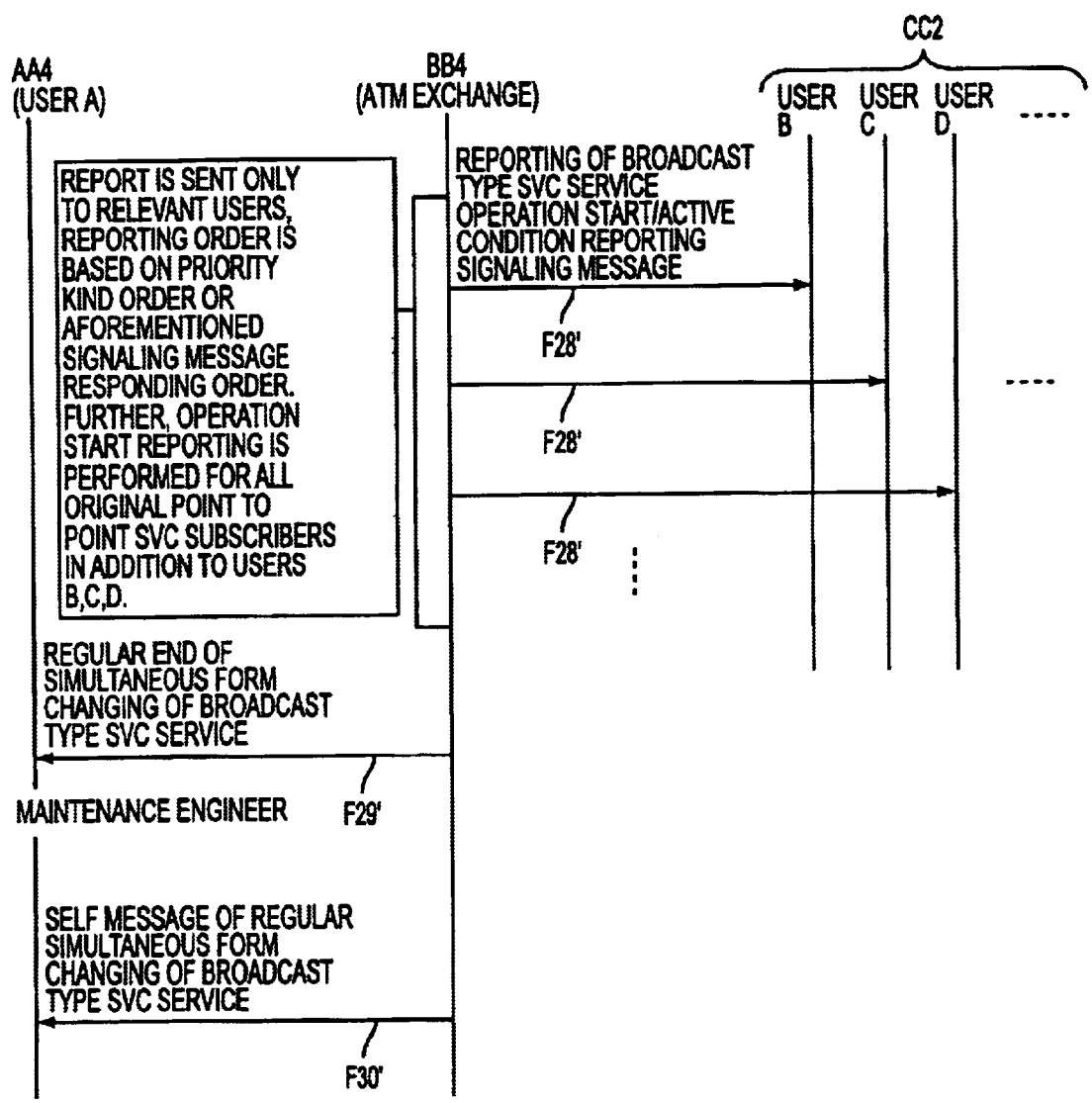
FIG. 88 is a sequence diagram illustrating the simultaneous form changing control by the ATM exchange of the present embodiment.

On the other hand, if the simultaneous form changing has been performed regularly (when the discrimination in step F23' is YES), then as shown in FIG. 88, it is reported to the users B to D, . . . using a signaling message that operation of the broadcast type SVC service is started (step F28') and it is reported to the user A and the maintenance engineer that the simultaneous form changing has been ended regularly, thereby ending the processing (steps F29' and F30').

In this manner, with the ATM exchange 5 described above, similar effects to those described hereinabove in the item (E-2) can be attained, and besides, since, even when the point to point SVC service being operated by a plurality of user groups is to be changed to the broadcast type SVC service, the user A need not enter a type changing signaling message for each one user group to the ATM exchange 5 but is required to enter a simultaneous form changing signaling message, the burden in such a form changing operation as described above can be reduced further remarkably.

It is to be noted that, while simultaneous form changing from the point to point SVC service to the broadcast type SVC service is described here, also simultaneous form changing from the point to point SVC service to the point to multipoint SVC service of any of various types such as the broadcast type, the merge type and the multipoint type is performed in a similar manner.

(F) Description of Line Changing Control Between PVC and SVC Services

Next, line changing control between a communication service (PVC service) of an arbitrary form on a private line and another communication service (SVC service) of an arbitrary form on public lines will be described here. It is to be noted that the "line changing" here signifies a changing of the form of a communication service between a PVC service and an SVC service and may be hereinafter referred to as "form changing".

(F-1) Line Changing Control from the PVC Service to the SVC Service by a Maintenance Engineer First, in the following, as an example of line changing control from the PVC service to the SVC service by a maintenance engineer, control in a case wherein line changing, for example, from such a point to multipoint PVC service (one to multiple communication: unidirectional communication) of the composite type as shown in FIG. 50(*a*) to such an SVC service of a similar form as shown in FIG. 50(*b*) will be described.

Figure 14:
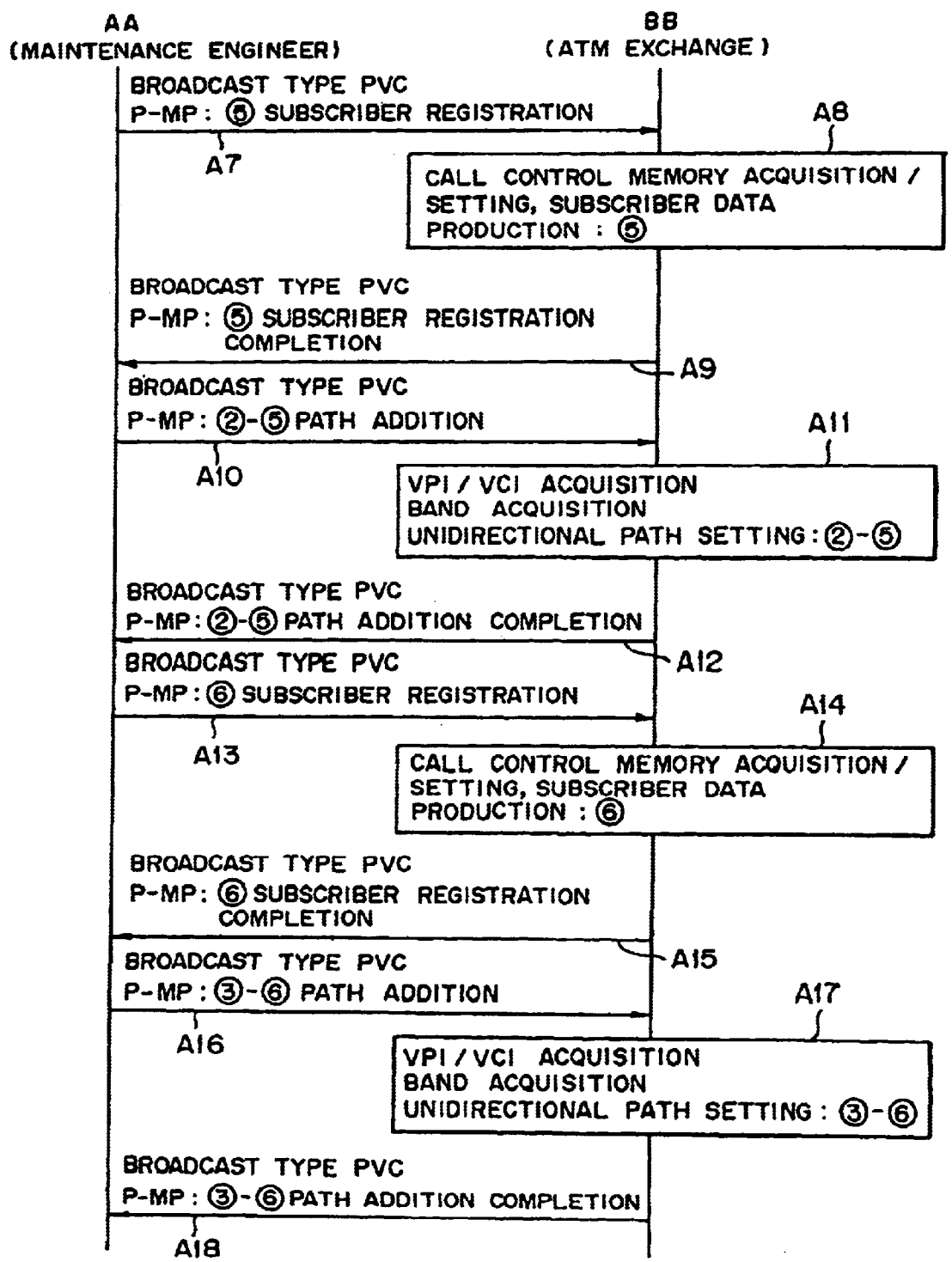
FIG. 14 is a sequence diagram illustrating all type application point to multipoint control by the ATM exchange of the present embodiment.
Figure 55:
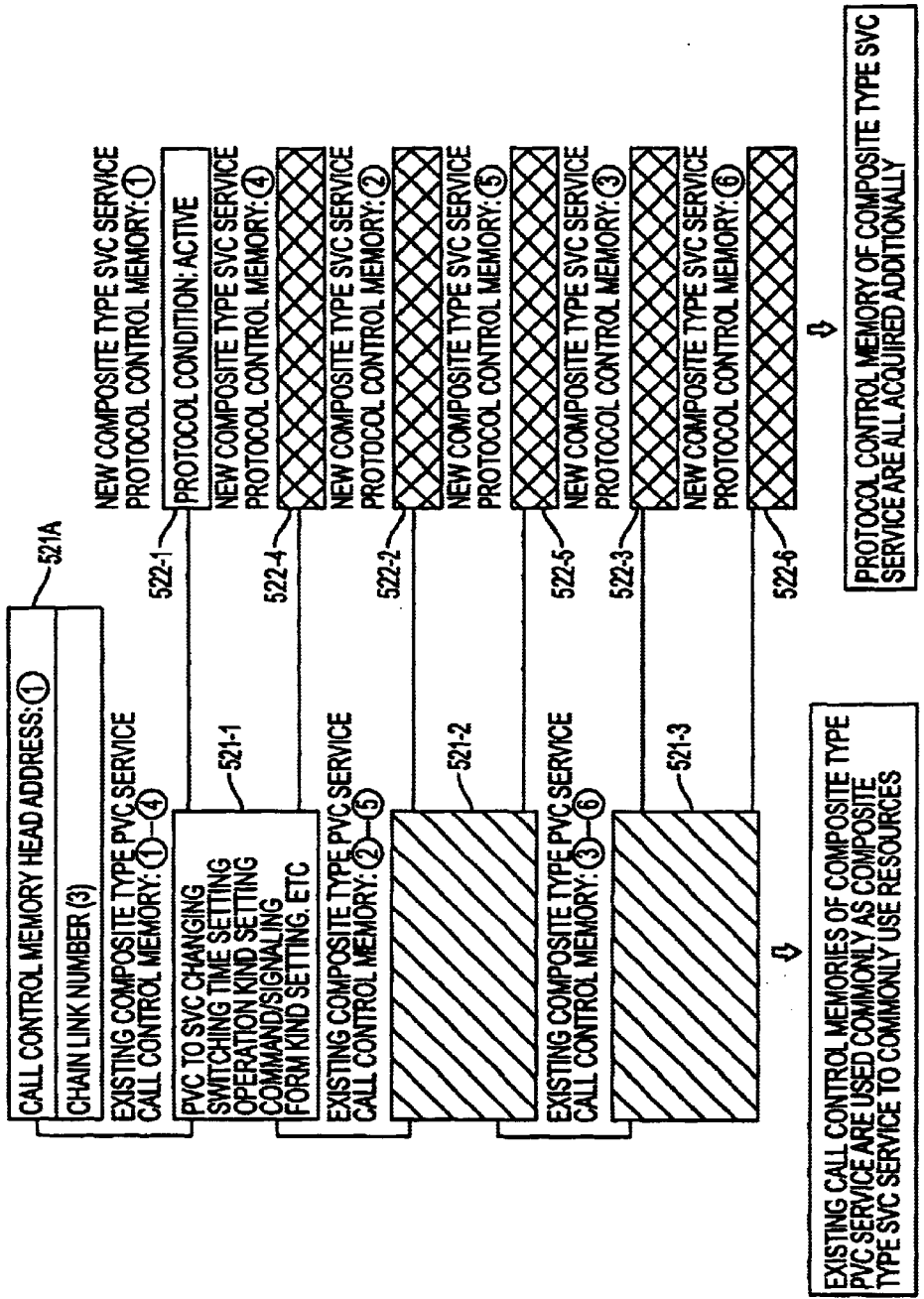
FIG. 55 is a diagrammatic view illustrating an example of mutually linked relationship of the call control memories and the protocol control memories constructed in the ATM exchange of the present embodiment.

It is to be noted that the composite type PVC service illustrated in FIG. 50(*a*) is provided by such a control procedure as described hereinabove with reference to FIGS. 13 and 14 in the item (C) above, and also in this instance, it is assumed that call control memories 521-1 to 521-3 similar to those shown in FIG. 15 are set corresponding to three paths between subscriber information ①  and ④, between subscriber information ② and ⑤ and between subscriber information ③ and ⑥ as shown in FIG. 55, respectively, and they are linked with each other so that the communication service providing section 23 (refer to FIG. 10) is formed.

And, in order for the ATM exchange 5 to perform line changing from such a composite type PVC service as shown in FIG. 50(*a*) to such a composite type SVC service as shown in FIG. 50(*b*), the existing three paths between the subscriber information ① and ④, between the subscriber information ② and ⑤ and between the subscriber information ③ and ⑥ set on the private lines must be set as they are on the public lines.

In the following, such line changing control will be described in detail with reference to the sequence diagrams (steps J1 to J26) shown in FIGS. 51 to 54. It is to be noted that, also in this instance, the originating user 6A-1 will be hereinafter referred to as user A and the terminating users 6A-2 to 6A-4 will be hereinafter referred to as users B to D, respectively.

Figure 51:
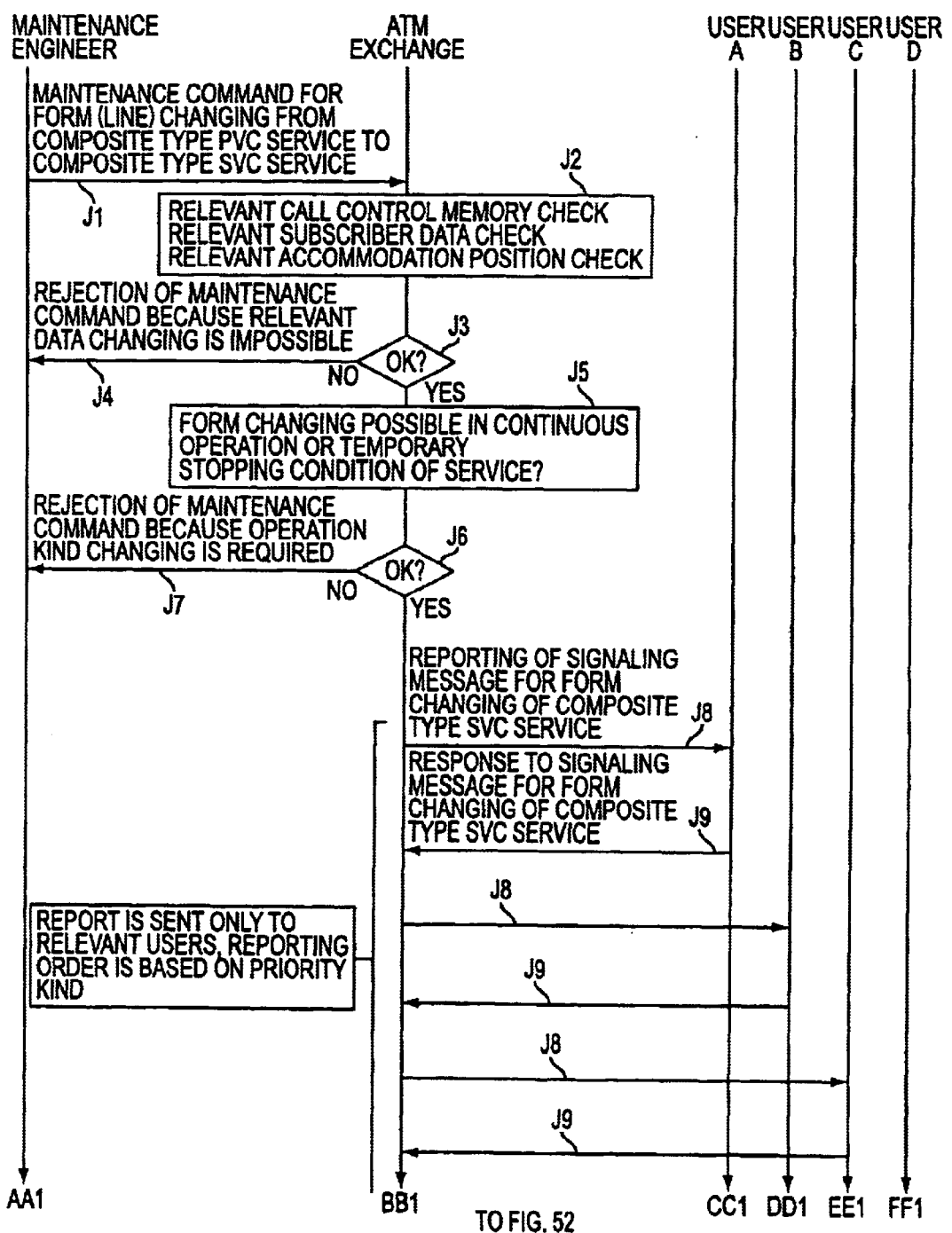
FIG. 51 is a sequence diagram illustrating the line changing control by the ATM exchange of the present embodiment.

First, if the maintenance engineer enters a line changing maintenance command for performing line changing from the composite type PVC service to the composite type SVC service through the maintenance terminal 7 as shown in FIG. 51 (step J1), then the ATM exchange 5 performs, by the registration information condition discrimination section 352 of the maintenance terminal inputting type line changing section 35 (refer to FIG. 10), checking of the call control memories 521-1 to 521-3, subscriber data, accommodation positions of the user terminals 6-1 and 6-4 to 6-6 and so forth which make an object of changing upon the line changing (steps J2 and J3). Then, if changing of the relevant data is impossible (when the discrimination in step J3 is NO), the maintenance command is rejected and this is reported to the maintenance engineer through the maintenance terminal 7 (step J4).

On the other hand. if the changing of the relevant data is possible (when the discrimination in step J3 is YES), it is further discriminated, in the ATM exchange 5, by the service condition discrimination section 351 of the maintenance terminal inputting type line changing section 35 whether or not line changing to the SVC service is possible in a condition wherein the service in operation (composite type PVC service) is continued or in another condition wherein the service in operation is temporarily stopped (steps J5 and J6).

Then, if it is discriminated by the service condition discrimination section 351 that the line changing is impossible because changing of the operation kind is necessary (when the discrimination in step J6 is NO), then also in this instance, the maintenance command entered is rejected (step J7). On the other hand, if it is discriminated that the line changing is possible (when the discrimination in step J6 is YES), it is reported to the users A to D which make an object of the line changing by the reporting section 353 of the maintenance terminal inputting type line changing section 35 using a signaling message that line changing to the composite type SVC service is performed (step J8). It is to be noted that this reporting is performed in accordance with predetermined priority kinds set in advance by means of the priority reporting section 354.

Figure 52:
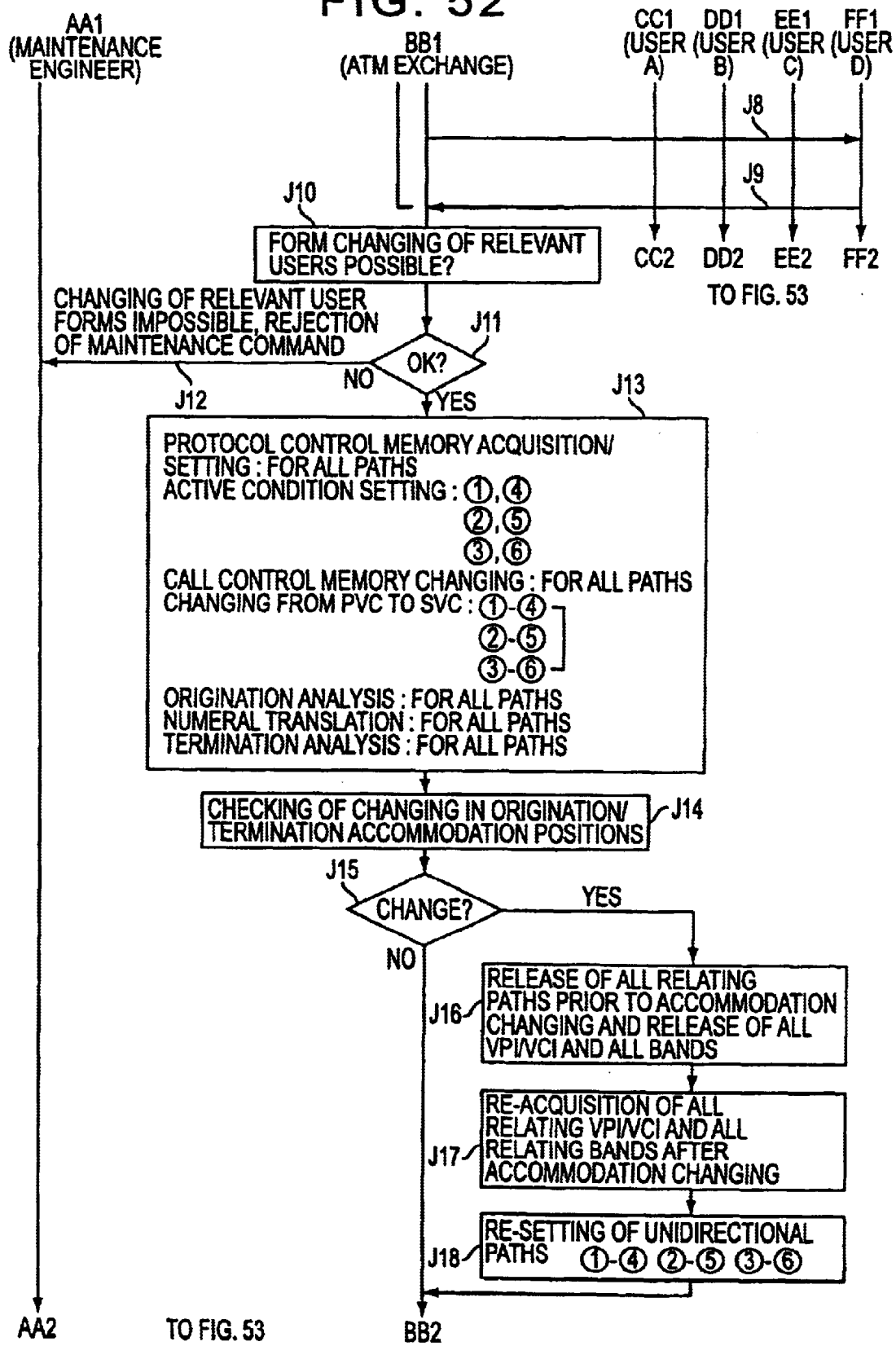
FIG. 52 is a sequence diagram illustrating the line changing control by the ATM exchange of the present embodiment.

Thereafter, when responses to the reporting are received from the users A to D (step J9), the ATM exchange 5 checks whether or not the line changing of the users A to D which make an object of the line changing possible as shown in FIG. 52 (steps J10 and J11), and when the line changing is impossible (when the discrimination in step J11 is NO), the maintenance command entered is rejected (step J12).

On the other hand, when the line changing is possible (when the discrimination in step J11 is YES), as shown in FIG. 55, the protocol control memories 522-1 to 522-6 for all o-f the subscriber information ① to ⑥ are acquired newly and they are individually set to a line changeable condition (active condition setting) and then such changing processing as to change the operation kind in the call control memories 521-1 to 521-3 for all paths (between ① and ④, between ② and ⑤ and between ③ and ⑥) from the PVC service to the SVC service is performed by the resource management section 56 (link changing control section 36: refer to FIG. 10) (step J13).

The reafter, the ATM exchange 5 checks whether or not the origination and termination accommodation positions of the user terminals 6-1 and 6-4 to 6-6 have been changed (steps J14 and J15). If the origination and termination accommodation positions have been changed (when the discrimination in step J15 is YES), then the ATM exchange 5 releases all paths, all VPI/VC. and all bands involved prior to the origination and termination accommodation position changing (step J16) and re-acquires all VPI/VCI and all bands involved after the origination and termination accommodation position changing (step J17). Thereafter, the ATM exchange 5 re-sets unidirectional paths for all paths (between ① and ④, between ② and ⑤ and between ③ and ⑥) (step J18).

Figure 53:
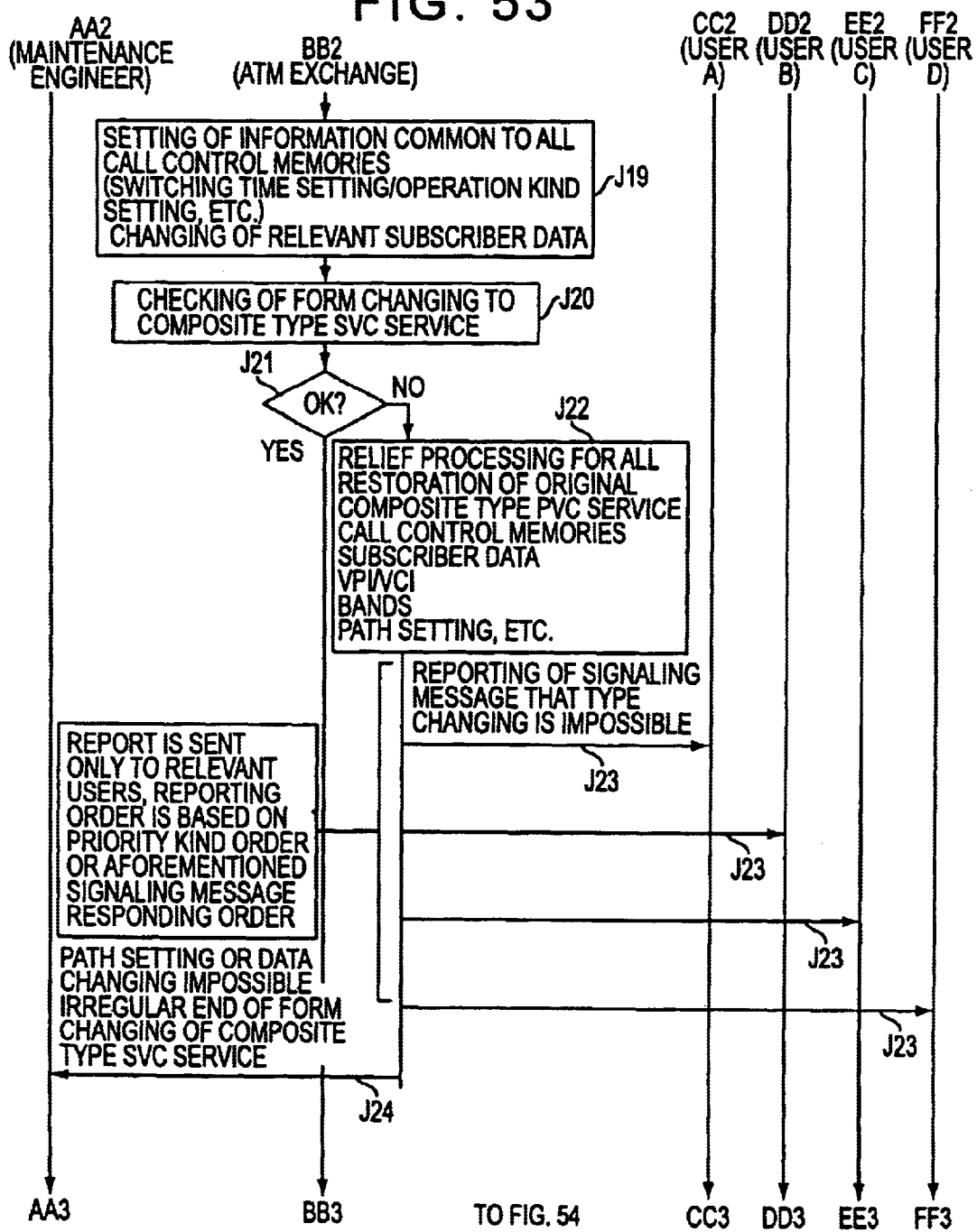
FIG. 53 is a sequence diagram illustrating the line changing control by the ATM exchange of the present embodiment.

Further, the ATM exchange 5 sets common information (a switching time, an operation type and so forth) to all of the call control memories 521-1 to 521-3 and performs changing of the relevant subscriber data as shown in FIG. 53 (step J19). It is to be noted that, if the origination and termination accommodation positions of the user terminals 6-1 and 6-4 to 6-6 have not been changed (when the discrimination in step J15 of FIG. 52 is NO), then the processing in step J19 is performed immediately.

In short, the present ATM exchange 5 is constructed such that, by changing the switching times, operation kinds and so forth of the call control memories 521-1 to 521-3, which have been present already in the composite type PVC service, so that the resources are used commonly as they are and additionally acquiring all of the protocol control memories 522-1 to 522-6, which become required newly as a result of the line changing to the composite type SVC service by means of the resource management section 56 so that they are linked with each other as shown in FIG. 55, a mutually linked condition for the composite type SVC service is constructed.

Thereafter, the ATM exchange 5 checks whether or not the line changing from the composite type PVC service to the composite type SVC service has been performed regularly (steps J20 and J21). If there is a trouble (when the discrimination in step J21 is NO), relief processing to return all data to the original data for the composite type PVC service prior to the line changing is performed by the relief control section 37 (refer to FIG. 10) (step J22).

Then, the ATM exchange 5 reports to the users A to D, which have been an object of the line changing, using a signaling message that the line changing from the composite type PVC service to the composite type SVC service has been impossible (step J23). Further, the ATM exchange 5 reports, by the maintenance terminal trouble end reporting section 371, to the maintenance engineer through the maintenance terminal 7 that the form changing to the composite type SVC service has been ended irregularly, thereby ending the processing (step J24). It is to be noted that the reporting to the users A to D described above is performed in accordance with predetermined priority kinds set in advance or a responding order (refer to step J9) to the signaling message described above by means of the priority reporting section 373.

Figure 54:
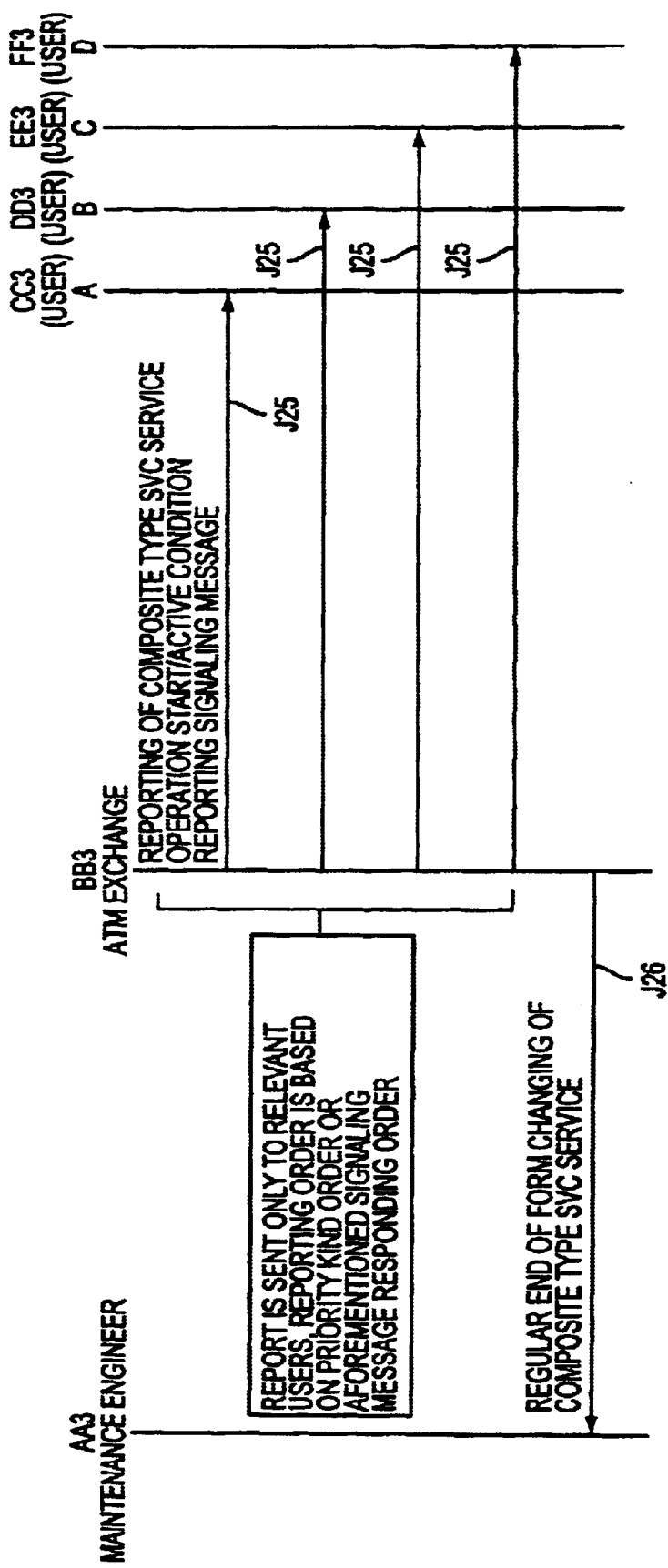
FIG. 54 is a sequence diagram illustrating the line changing control by the ATM exchange of the present embodiment.

On the other hand, if the line changing to the composite type SVC service has been performed regularly (when the discrimination in step J21 is YES), as shown in FIG. 54, the operation start of the composite type SVC service/active condition of the protocol is reported to the users A to D (step J25) and it is reported, by the reporting section 353, to the maintenance engineer through the maintenance terminal 7 that the form changing has been performed regularly (step J26).

In this manner, with the ATM exchange 5 described above, when a line changing maintenance command from the composite type SVC service to the composite type SVC service is inputted through the maintenance terminal 7, since the maintenance terminal inputting type line changing section 35 changes the mutually linked condition of the relevant ones of the call control memories 521-1 to 521-3 and protocol control memories 522-1 to 522-6 in accordance with an aimed line type of the changing to construct a mutually linked condition of the call control memories 521-1 to 521-3 and the protocol control memories 522-1 to 522-6 for the composite type SVC service, the composite type PVC service can be changed to the composite type SVC service very readily and rapidly, and consequently, the number of communication services which can be handled by the single ATM exchange 5 can be increased remarkably.

Further, the maintenance terminal inputting type line changing section 35 described above can perform changing of a line very readily even in a condition wherein the communication service in operation (composite type SVC service) is continued if it is discriminated by the service condition discrimination section 351 that changing of the mutually linked condition of the call control memories 521-1 to 521-3 can be performed.

Furthermore, the maintenance terminal inputting type line changing section 35 can perform the line changing described above with a higher degree of certainty because the mutually linked condition of the relevant ones of the call control memories 521-1 to 521-3 is changed only when it is discriminated by the registration information condition discrimination section 352 based on a line changing maintenance command inputted through the maintenance terminal 7 that the changing of the mutually linked condition can be performed.

Further, the maintenance terminal inputting type line changing section 35 can recognize line changing of the users A to D prior to such line changing because line changing message information is reported to the users A to D, which make an object of the line changing, by the reporting section 353 using a signaling message.

It is to be noted that, since the reporting section 353 reports, when line changing message information is to be reported to the users A to D, in accordance with a predetermined priority order by means of the priority reporting section 354, the users A to D can recognize the line changing with a higher degree of certainty.

Further, as described hereinabove in connection with step J14 of FIG. 52, when there is some change in the origination and termination accommodation positions of the user terminals 6-1 and 6-4 to 6-6-; since the link changing control section 36 cooperates with the maintenance terminal inputting type line changing section 35 to effect changing of the mutually linked condition of all of the relevant ones of call control memories 521-1 to 521-3 and protocol control memories 522-1 to 522-6 in accordance with the line kind, even if there is some change in the origination and termination accommodation positions of the user terminals 6-1 and 6-4 to 6-6, the line changing can be performed very readily.

Furthermore, as described hereinabove in connection with step J22 of FIG. 53, if a trouble is detected when the mutually linked condition of the relevant ones of the call control memories 521-1 to 521-3 is changed in accordance with a line type in order to effect line changing, then since a communication service regarding the line prior to the changing can be restored by the relief control section 37, even if the changing of the line has not been performed successfully, degradation of the service performance such that a communication service cannot be enjoyed over a long period of time can be eliminated with certainty.

Further, in this instance, since the relief control section 37 performs, by the maintenance terminal trouble end reporting section 371, reporting to the maintenance terminal 7 that the condition prior to the changing has been restored, the fact that some trouble has occurred in the line changing can be recognized by the maintenance terminal 7, and the situation of the line changing can be grasped with certainty.

Furthermore, since the relief control section 37 in this instance reports, as described hereinabove in connection with step J23 of FIG. 53, to the users A to D by the user terminal trouble end reporting section 372 using a signaling message that the condition prior to the changing has been restored, the fact that some trouble has occurred in the line changing can be recognized also by the users A to D, and consequently, also the users A to D can grasp the situation of the line changing.

Further, in this instance, since the user terminal trouble end reporting section 372 described above reports, when to perform reporting to the users A to D that the condition prior to the changing has been restored, in accordance with a predetermined priority order by the priority reporting section 373, the fact that some trouble has occurred in the line changing can be recognized by the users A to D with a higher degree of certainty.

It is to be noted that, while the line changing control from the composite type PVC service to the composite type SVC service is described in the ATM exchange 5 described above, also changing control when line changing from the PVC service of any of other various forms to the SVC service is to be performed can be performed by a control procedure similar to that described above.

(F-2) Line Changing Control from the PVC Service to the SVC Service by a User

Subsequently, in the following, as an example of line changing control from the PVC service to the SVC service by a user, line changing control from the composite type PVC service to the composite type SVC service will be described in detail with reference to the sequence diagrams (steps K1 to K30) shown in FIGS. 56 to 60, similarly as in the item (F-1) described above.

First, a maintenance engineer transmits an all subscriber (users A to D) permission command of the composite type SVC service in advance through the maintenance terminal 7 (step K1), and the ATM exchange 5 performs, in response to the maintenance command, subscriber data permission changing processing of the composite type SVC service for the users A to D (step K2).

Then, if a form changing signaling message from the composite type PVC service to the composite type SVC service is inputted, for example, from the user A (step K3), then the ATM exchange 5 receives the signaling message and performs, by the registration information condition discrimination section 382 of the user terminal inputting type line changing section 38 (refer to FIG. 10), checking of the relevant ones of the call control memories 521-1 to 521-3, subscriber data, accommodation positions and so forth (steps K4 and K5).

As a result, if it is discriminated by the registration information condition discrimination section 382 that the relevant data cannot be changed (when the discrimination in step K5 is NO), the signaling message from the user A is rejected (step K6).

On the other hand, if it is discriminated by the registration information condition discrimination section 382 that the changing of the relevant data is possible (when the discrimination in step K5 is YES), it is further discriminated by the service condition discrimination section 381 whether or not the line changing to the composite type SVC service is possible in a condition wherein the service in operation (composite type PVC service) is continuously operated or in another condition wherein the service in operation is temporarily stopped (steps K7 and K8).

Figure 56:
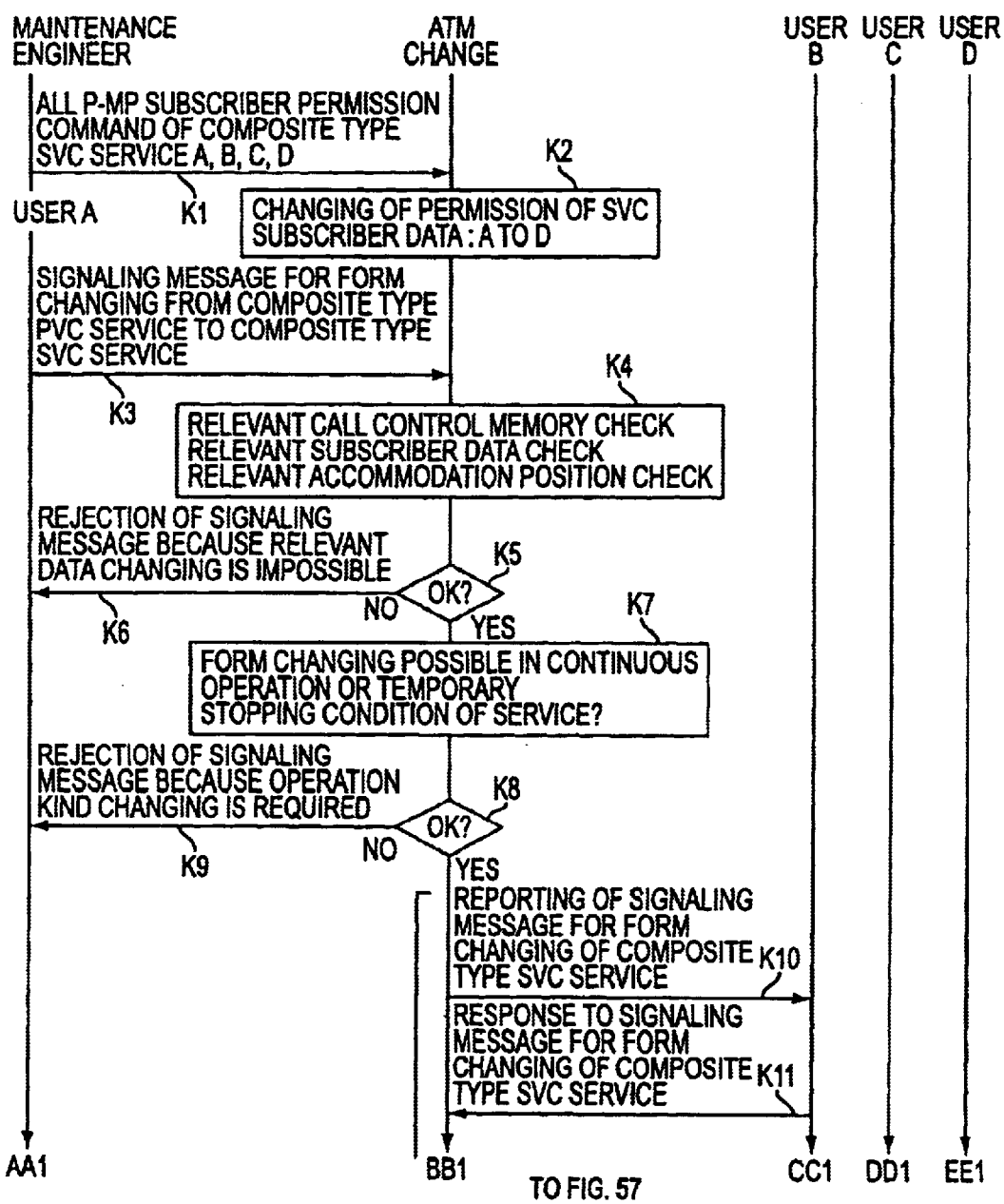
FIG. 56 is a sequence diagram illustrating the line changing control by the ATM exchange of the present embodiment.
Figure 57:
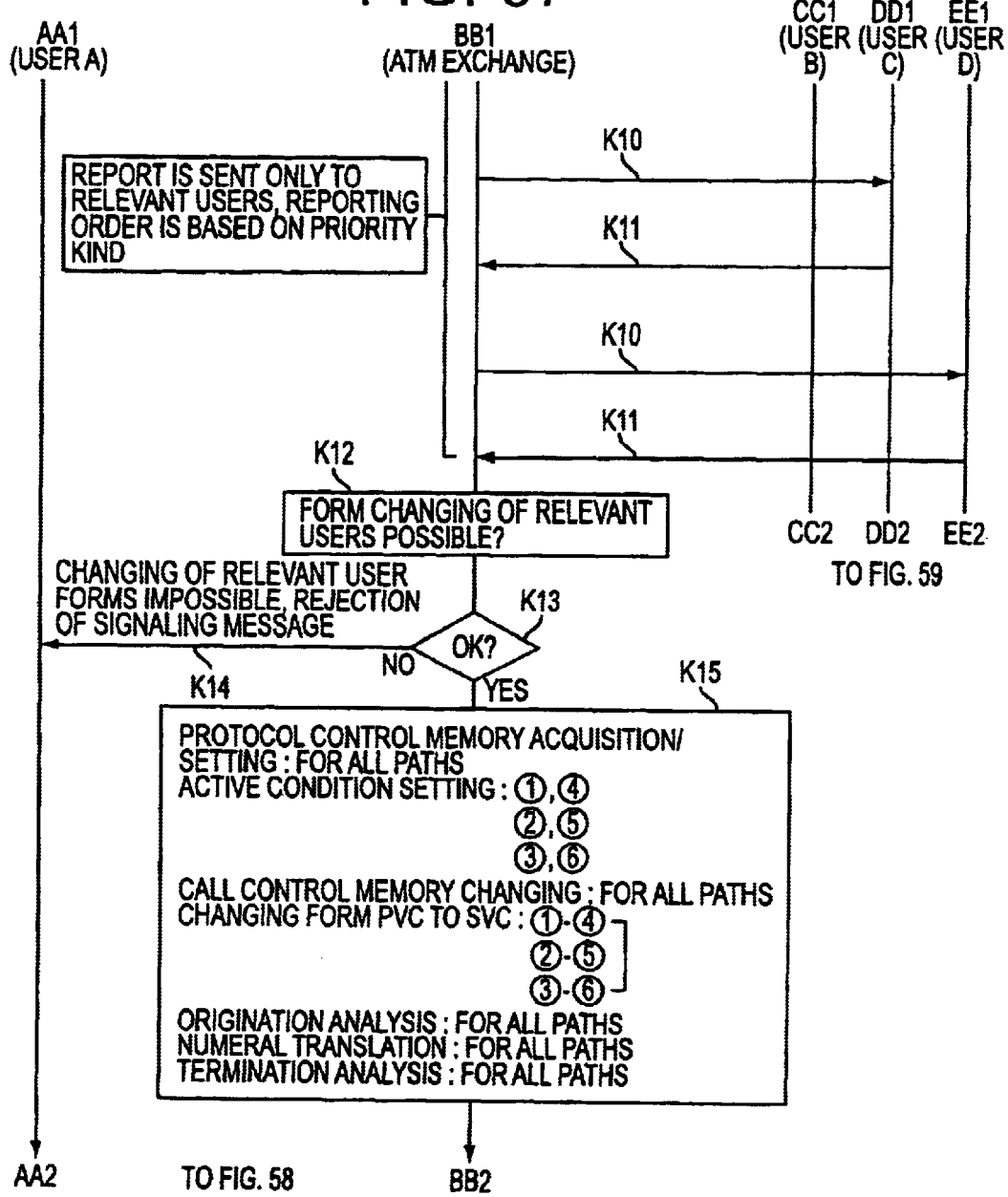
FIG. 57 is a sequence diagram illustrating the line changing control by the ATM exchange of the present embodiment.

Then, if it is discriminated by the service condition discrimination section 381 that the form changing is impossible because changing of the operation kind is necessary (when the discrimination in step K8 is NO), then also in this instance, the signaling message from the user A is rejected (step K9). However, if it is discriminated by the service condition discrimination section 381 that the form changing is possible (when the discrimination in step K8 is YES), it is reported to the other users B to D by the reporting section 383 using a signaling message that line changing to the composite type SVC service is performed as shown in FIGS. 56 and 57 (step K10). It is to be noted that, also in this instance, the reporting to the users B to D is performed in accordance with a predetermined priority order set in advance by means of the priority reporting section 384 in the reporting section 383.

Thereafter, when responses to the reporting are received from the users B to D (step K11), the ATM exchange 5 discriminates whether or not form changing of the users B to D which are an object of the line changing is possible as shown in FIG. 57 (steps K12 and K13), and when the form changing is impossible (when the discrimination in step K13 is NO), the line changing signaling message from the user A is rejected (step K14).

On the other hand, when the line changing is possible (when the discrimination in step K13 is YES), also in this instance, as shown in FIG. 55, the protocol control memories 522-1 to 522-6 for all of the subscriber information ① to ⑥ are additionally acquired newly and they are individually set to an active condition and such changing processing as to change the operation kind of the call control memories 521-1 to 521-3 for all paths (between ① and ④, between ② and ⑤ and between ③ and ⑥) from the PVC service to the SVC service is performed by the resource management section 56 (user terminal inputting type line changing section 38) (step K15).

It is to be noted that, in this instance, also origination analysis, numeral translation, termination analysis and so forth are performed for all paths. Further, also in this instance, slanting line portions of the call control memories 521-2 and 521-3 shown in FIG. 55 represent that various information is set under the same conditions as those of the call control memory 521-1, and netted portions of the protocol control memories 522-2 to 522-6 represent that an active condition is set under the same conditions as those of the protocol control memory 522-1.

Figure 58:
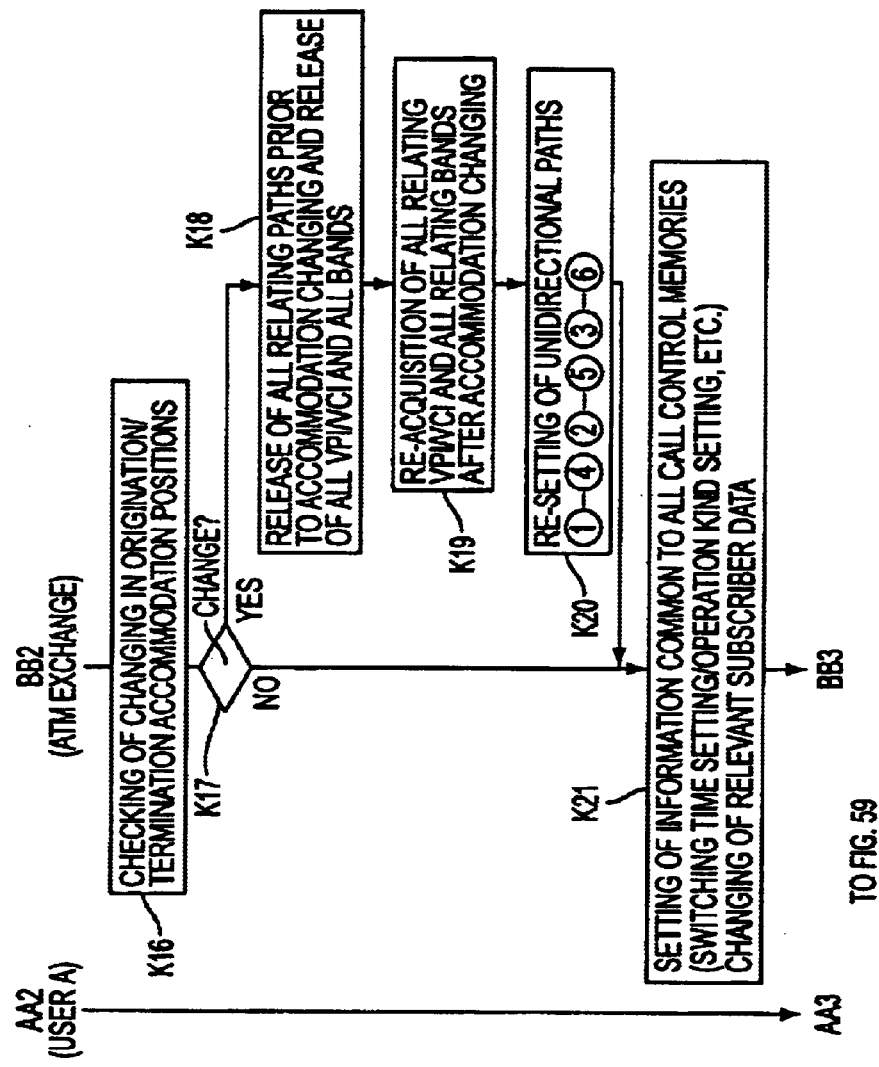
FIG. 58 is a sequence diagram illustrating the line changing control by the ATM exchange of the present embodiment.

Further, the ATM exchange 5 checks whether or not the origination and termination accommodation positions of the user terminals 6-1 and 6-4 to 6-6 which make an object of the line changing have been changed as shown in FIG. 58 (steps K16 and K17). If the origination and termination accommodation positions have been changed (when the discrimination in step K17 is YES), then the ATM exchange 5 releases all paths, all VPI/VCI and all bands involved prior to the accommodation position changing (step K18) and re-acquires all VPI/VCI and all bands involved after the origination and termination accommodation position-changing newly (step K19). Then, the ATM exchange 5 resets unidirectional paths for all paths (between ① and ④, between ② and ⑤ and between ③ and ⑥) (step K20).

Thereafter, the ATM exchange 5 performs setting of the time of the line changing (switching time setting), setting of an operation kind and so forth to effect setting of common information and performs changing of the relevant subscriber data in order to utilize the call control memories 521-1 to 521-3, which have been present already prior to the line changing, commonly also after the line changing (step K21). It is to be noted that, if there is no change in the origination and termination accommodation positions of the user terminals 6-1 and 6-4 to 6-6 (when the discrimination in step K17 is NO), the processing in step K21 is performed immediately.

Figure 59:
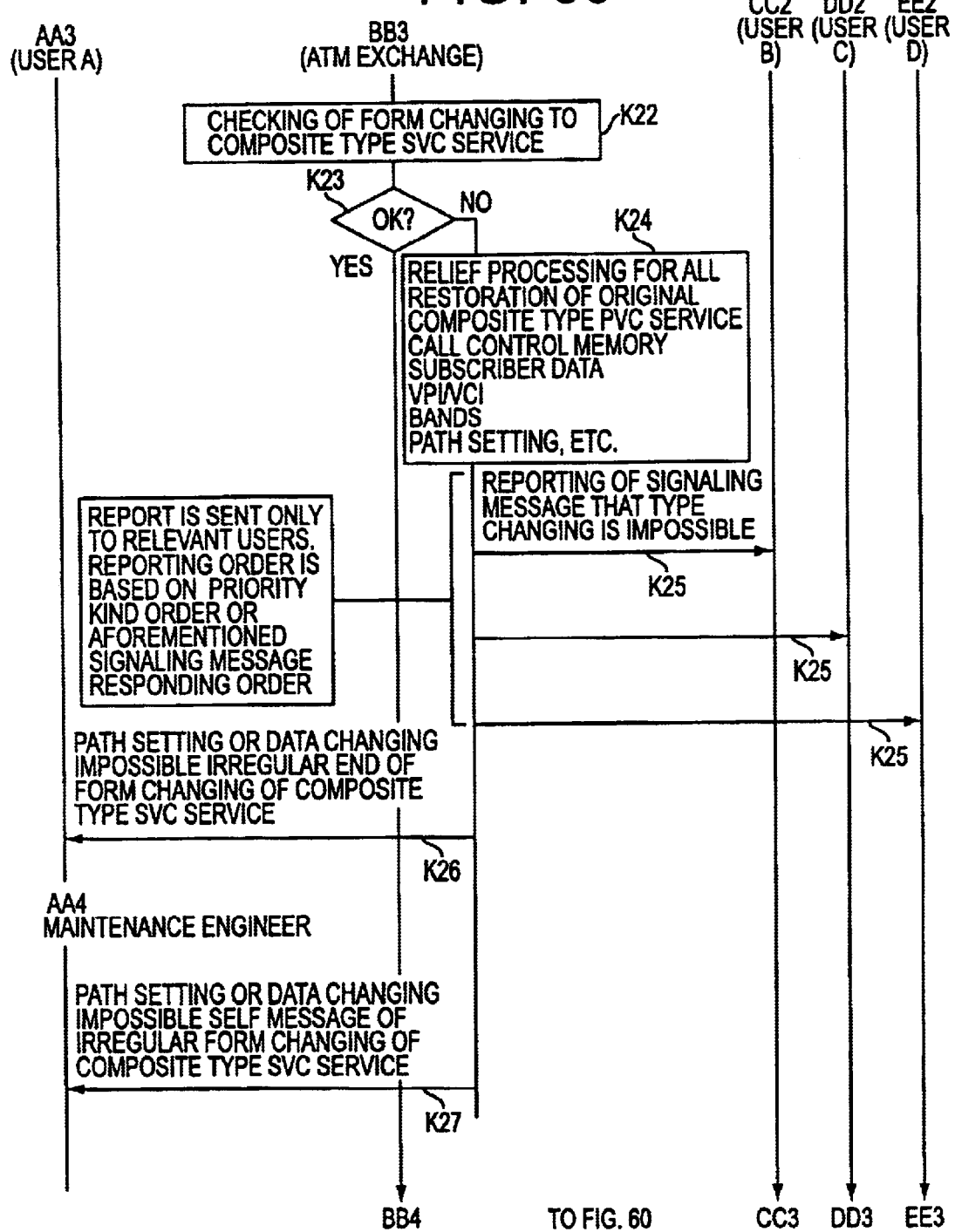
FIG. 59 is a sequence diagram illustrating the line changing control by the ATM exchange of the present embodiment.
Figure 60:
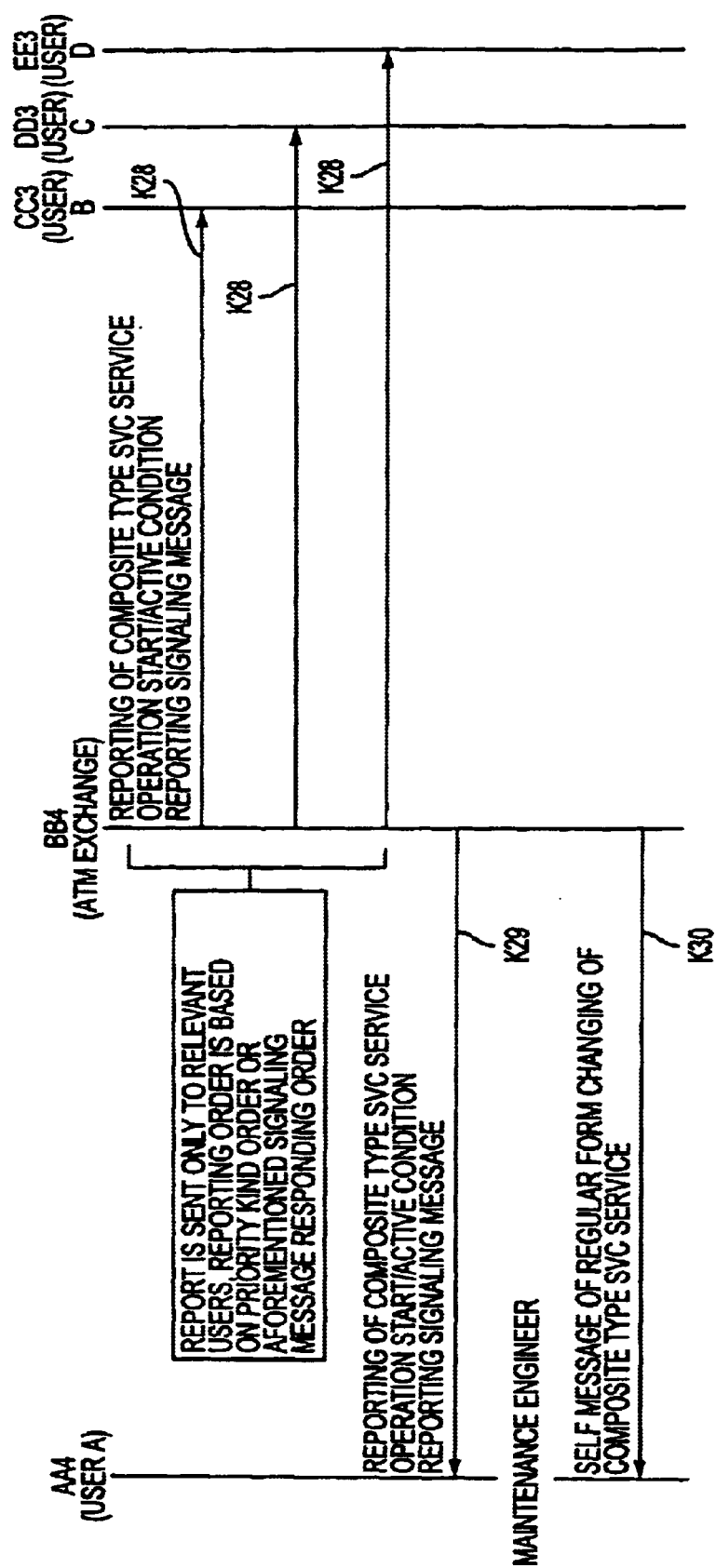
FIG. 60 is a sequence diagram illustrating the line changing control by the ATM exchange of the present embodiment.

Then, the ATM exchange 5 checks whether or not the form changing to the composite type SVC service has been performed regularly as shown in FIG. 59 (steps K22 and K23). If there is some trouble (when the discrimination in step K23 is NO), relief processing to return all data changed and set in such a manner as described above upon the line changing to the original data for the composite type PVC service prior to the changing is performed by the relief control section 40 (step K24).

Further, the ATM exchange 5 reports, by the other user terminal trouble end reporting section 402 (priority reporting section 403), to the users B to D in accordance with priority kinds set in advance or a responding order (refer to step K11) to the signaling message described above that the line changing has been impossible (step K25). Then, the ATM exchange 5 reports this, by the user terminal trouble end reporting section 401, also to the user A and the maintenance engineer (steps K26 and K27).

On the other hand, if the form changing to the composite type SVC service has been performed regularly (when the discrimination in step K23 is YES), that the form changing has been performed successfully, operation start of the composite type SVC service and an active condition of the protocol are reported to the users B to D by the reporting section 384 (priority reporting section 384) in accordance with the priority kinds set in advance or the responding order to the signaling message described above (step K28) and this is reported also to the user A and the maintenance engineer, thereby ending the processing (steps K29 and K30).

In this manner, with the ATM exchange 5 described above, when a line changing signaling message from the composite type PVC service to the composite type SVC service is inputted through the user A, since the user terminal inputting type line changing section 38 changes the mutually linked condition of the relevant ones of the call control memories 521-1 to 521-3 and protocol control protocol control memories 522-1 to 522-6 in accordance with an aimed line type of the changing to construct a mutually linked condition of the call control memories 521-1 to 521-3 and the protocol control memories 522-1 to 522-6 for the composite type SVC service, also in this instance, the composite type PVC service can be changed to the composite type SVC service very readily and rapidly, and consequently, the number of communication services which can be handled by the single ATM exchange 5 can be increased remarkably.

Further, the user terminal inputting type line changing section 38 described above can perform, as described in connection with step K7 of FIG. 56 above, changing to the composite type SVC service even in a condition wherein the composite type PVC service in operation is continued if it is discriminated by the service condition discrimination section 381 that changing of the mutually linked condition of the relevant ones of the call control memories 521-1 to 521-3 and protocol control memories 522-1 to 522-6, which make an object of the changing upon the line changing, and the service performance is further improved.

Further, since the user terminal inputting type line changing section 38 can perform the line changing to the composite type SVC service with a higher degree of certainty because line changing is performed only when the registration information condition discrimination section 382 verifies the call control memories 521-1 to 521-3, the protocol control memories 522-1 to 522-6 and user terminal registration information based on a line changing signaling message inputted from the user A to discriminate that changing of the mutually linked condition of them can be performed as described hereinabove in connection with step K4 of FIG. 56.

Furthermore, since the user terminal inputting type line changing section 38 reports, by the reporting section 383, to the other users B to D than the user A which inputted a line changing signaling message, a signaling message corresponding to the line changing signaling message as described hereinabove in connection with step K10 of FIGS. 56 and 57, also the other users B to D can recognize the line changing prior to the line changing.

Further, since the reporting section 383 in this instance reports, by the priority reporting section 384, the signaling message in accordance with a predetermined priority order, the line changing can be recognized by the users B to D with a higher degree of certainty.

Furthermore, as described hereinabove in connection with step K16 of FIG. 58, when there is some change in the origination and termination accommodation positions of the user terminals 6-1 and 6-4 to 6-6, since the link changing control section 39 cooperates with the user terminal inputting type line changing section 38 to effect changing of the mutually linked condition of all of the relevant ones of the call control memories 521-1 to 521-3 and protocol control memories 522-1 to 522-6 in accordance with the line kind, even if there is some change in the origination and termination accommodation positions of the user terminals 6-1 and 6-4 to 6-6, the line changing can be performed very readily.

Furthermore, as described hereinabove in connection with step K24 of FIG. 59, if a trouble is detected when the mutually linked condition of the relevant ones of the call control memories 521-1 to 521-3 and protocol control memories 522-1 to 522-6 is changed in accordance with a line kind by the user terminal inputting type line changing control section 38, then since the composite type PVC service prior to the changing can be restored by the relief control section 40, even if changing of the line cannot be performed, degradation of the service performance such that the users A to D cannot enjoy a desired communication service over a long period of time can be eliminated with certainty.

Further, in this instance, since the relief control section 40 performs, as described hereinabove in connection with step K26 of FIG. 59, by the user terminal trouble end reporting section 401, reporting to the user A which transmitted the line changing signaling message that all data changed upon the line changing have been returned to the condition prior to the changing, the user A which transmitted the line changing signaling message can grasp the situation of the line changing with certainty.

Further, since the relief control section 40 simultaneously performs, as described hereinabove in connection with step K25 of FIG. 59, by the other user terminal trouble end reporting section 402, reporting also to the other users B to D similarly that some trouble has occurred in the line changing and all data changed upon the line changing have been returned to the condition prior to the changing, also the other users B to D can grasp the situation of the line changing with certainty.

Furthermore, since the other user terminal trouble end reporting section 402 in this instance performs, by the priority reporting section 403, reporting in accordance with a predetermined priority order that the condition prior to the changing is restored, it can be recognized by the other users B to D with a higher degree of certainty that some trouble has occurred in the line changing.

It is to be noted that, also in this instance, control of line changing from the PVC service of any of various other forms (point to point, point to multipoint and so forth) to the SVC service is performed by a control procedure similar to that described above.

(F-3) Line Changing Control from the SVC Service to the PVC Service by a Maintenance Engineer Subsequently, as an example of line changing control from the SVC service of an arbitrary form to the PVC service of an arbitrary form by a maintenance engineer reversely to the form (line) changing control described hereinabove in the items (F-1) and (F-2), control in a case wherein line changing is performed, for example, from such a multipoint type point to multipoint SVC service (one to multiple communication: bidirectional communication) as shown in FIG. 61(a) to such a multipoint type point to multipoint PVC service as shown in FIG. 61(b) will be described below.

It is to be noted that, in FIGS. 61(a) and 61(b) mentioned above, ①to ③ denote subscriber information of the user terminal 6-1 of the originating user 6A-1, ④, ⑦ and ⑧ denote subscriber information of the user terminal 6-4 of the terminating user 6A-2, ⑤, ⑨ and ⑩ denote subscriber information of the user terminal 6-5 of the terminating user 6A-3, and ⑥, ⑪ and ⑫ denote subscriber information of the user terminal 6-6 of the terminating user 6A-4.

Figure 66:
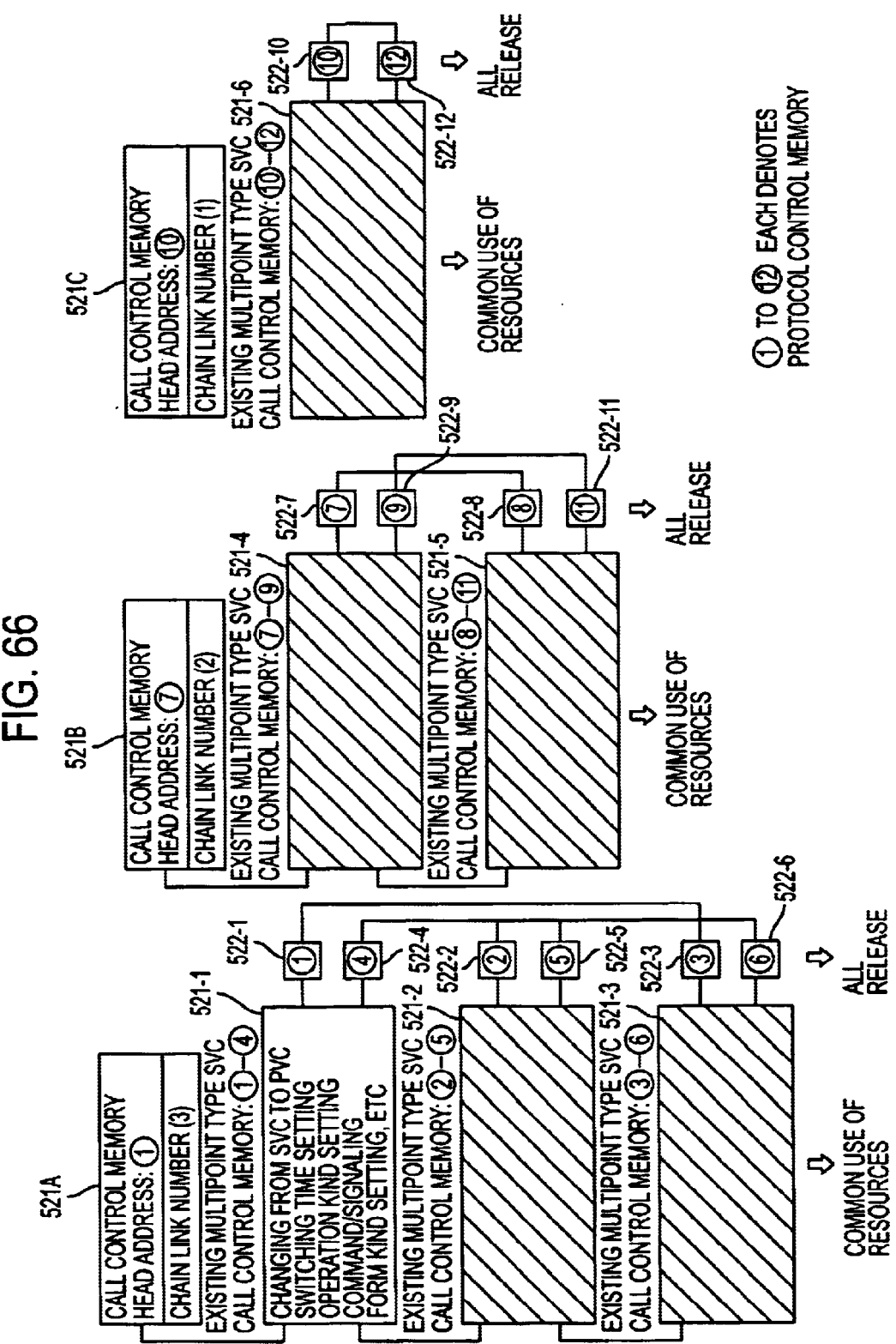
FIG. 66 is a diagrammatic view illustrating an example of mutually linked relationship of the call control memories and the protocol control memories constructed in the ATM exchange of the present embodiment.

Further, also the multipoint type PVC service shown in FIG. 61(a) is provided by a procedure similar to the control procedure described hereinabove with reference to FIGS. 13 and 14 in the item (C), and in this instance, as shown in FIG. 66, call control memories 521-1 to 521-6 are provided individually for 6 paths between the subscriber information ① and ④, between the subscriber information ② and ⑤, between the subscriber information ③ and ⑥, between the subscriber information ⑦ and ⑨, between the subscriber information ⑧ and ⑪ and between the subscriber information ⑩ and ⑫, respectively, and protocol control memories 522-1 to 522-12 are provided individually for the subscriber information ① to ⑫, and they are linked with each other such that the public line communication service providing section 25 is formed.

And, in order for the ATM exchange 5 to perform line changing from such a multipoint type SVC service as shown in FIG. 61(a) to such a multipoint type PVC service as shown in FIG. 61(b), the existing six paths (between ① and ④, between ② and ⑤ and between ③ and ⑥, . . . ) described above set on the public lines must be set on the private line.

In the following, such line changing control will be described in detail with reference to the sequence diagrams (steps L1 to L26) shown in FIGS. 62 to 64. It is to be noted that, also in this instance, the originating user 6A-1 will be hereinafter referred to as user A and the terminating users 6A-2 to 6A-4 will be hereinafter referred to as users B to D, respectively.

Figure 62:
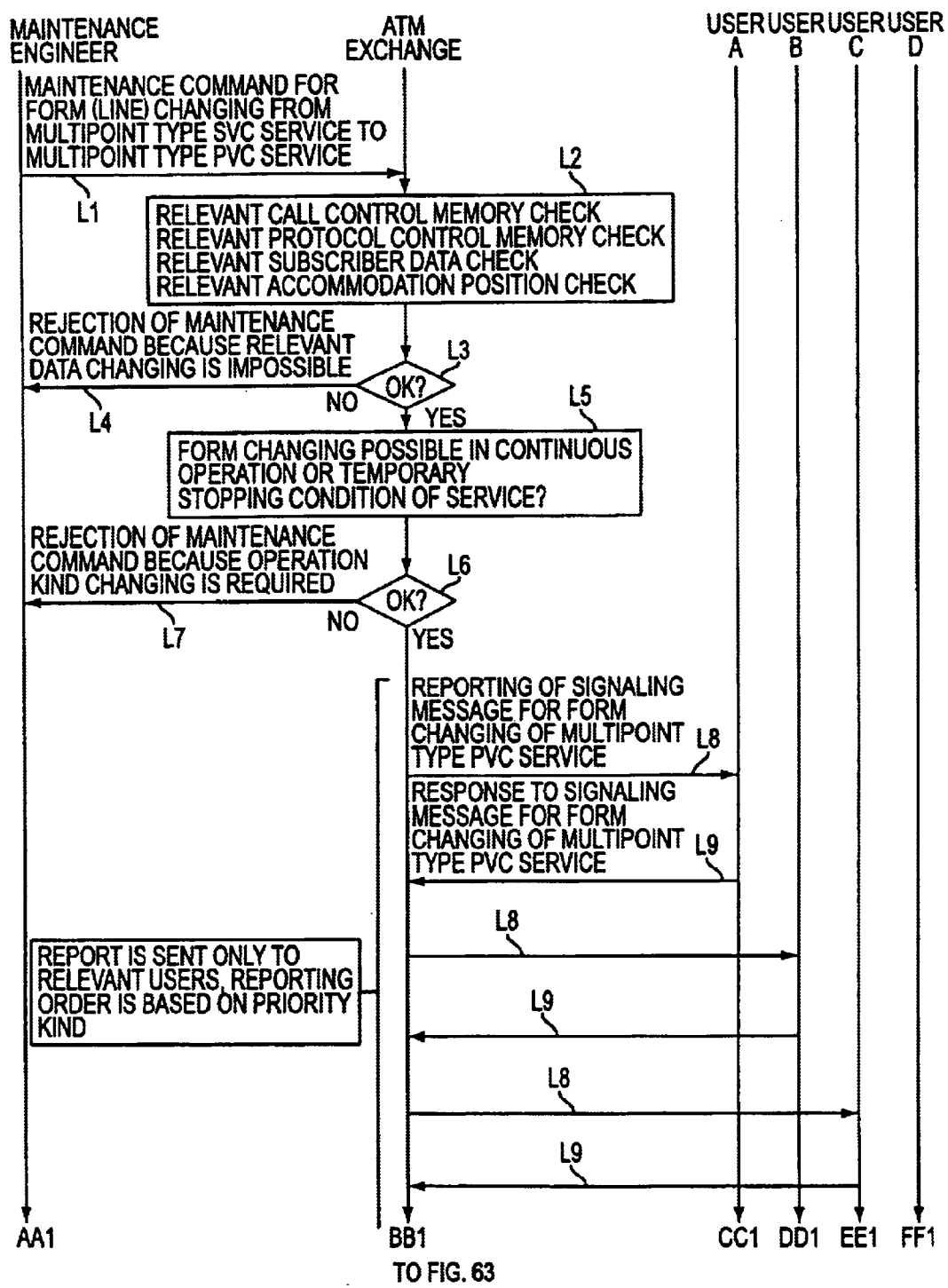
FIG. 62 is a sequence diagram illustrating the line changing control by the ATM exchange of the present embodiment.

First, if a maintenance engineer of the ATM exchange 5 enters a line changing maintenance command from the multipoint type SVC service to the multipoint type PVC service through the maintenance terminal 7 as shown in FIG. 62 (step L1), then the ATM exchange 5 receives the line changing maintenance command and performs, by the registration information condition discrimination section 352 of the maintenance terminal inputting type line changing section 35 (refer to FIG. 10), checking of the call control memories 521-1 to 521-6, protocol control memories 522-1 to 522-12, subscriber data, accommodation positions of the user terminals 6-1 and 6-4 to 6-6 and so forth for which changing is required as a result of the line changing (steps L2 and L3).

As a result, if it is discriminated by the registration information condition discrimination section 352 that the changing of the relevant data is impossible (when the discrimination in step L3 is NO), the maintenance command is rejected (step L4). However, if it is discriminated by the registration information condition discrimination section 352 that the changing of the relevant data is possible (when the discrimination in step L3 is YES), it is further discriminated by the service condition discrimination section 351 whether or not line changing is possible in a condition wherein the service in operation (multipoint type SVC service) is continuously operated or in another condition wherein the service in operation is temporarily stopped (steps L5 and L6).

Then, if it is discriminated by the service condition discrimination section 351 that the line changing is impossible because changing of the operation kind is necessary (when the discrimination in step L6 is NO), then also in this instance, the maintenance command inputted through the maintenance terminal 7 is rejected (step L7). However, if it is discriminated by the service condition discrimination section 351 that the line changing is possible (when the discrimination in step L6 is YES), it is reported to the users A to D which make an object of the line changing by the reporting section 353 and the priority reporting section 354 that line changing to the multipoint type PVC service is performed in accordance with predetermined priority kinds set in advance (step L8).

Figure 63:
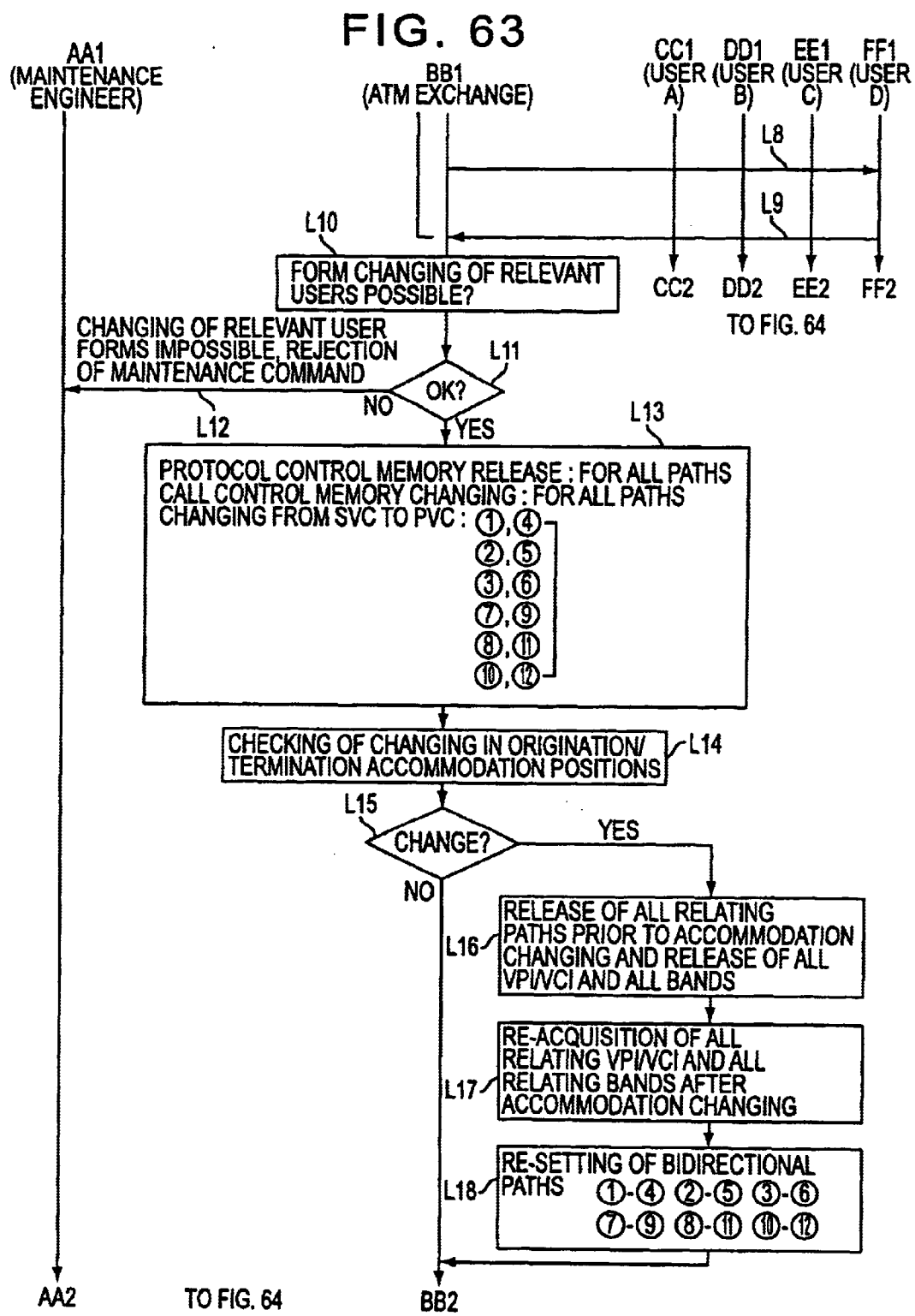
FIG. 63 is a sequence diagram illustrating the line changing control by the ATM exchange of the present embodiment.

Then, when responses to the reporting are received from the users A to D (step L9), the ATM exchange 5 discriminates whether or not the line changing of the relevant ones of the users A to D is possible as shown in FIG. 63 (steps L10 and L11), and when the form changing is impossible (when the discrimination in step L11 is NO), the line changing maintenance command inputted through the maintenance terminal 7 is rejected also in this instance (step L12).

However, when the line changing is possible (when the discrimination in step L11 is YES), as shown in FIG. 66, the protocol control memories 522-1 to 522-12 for all of the subscriber information ① to ⑫ which become unnecessary are released and the information in the call control memories 521-1 to 521-6 for all paths (between ① and ④, between ② and ⑤, between ③ and ⑥, . . . ) is changed from that for the multipoint type SVC service to that for the multipoint type PVC service (step L13).

In short, the present ATM exchange 5 is constructed such that, by the line changing from the multipoint SVC service to the multipoint type PVC service, the PVC/SVC kinds, operation kinds, switching times and so forth of the call control memories 521-1 to 521-6, which have been present already in the multipoint type SVC service, are changed to commonly use the resources as they are, and since the protocol control memories 522-1 to 522-12, which have already been present in the multipoint type SVC service, become unnecessary in the multipoint PVC service after the line changing, the linked relationship with the call control memories 521-1 to 521-6 is lost and all of them are released.

It is to be noted that, in FIG. 66, also in this instance, slanting line portions of the call control memories 521-2 to 521-6 represent that various information (SVC to PVC changing, switching type setting, operation kind setting and so forth) is set under the same conditions as those in the call control memory 521-1.

Thereafter, the ATM exchange 5 discriminates whether or not the origination and termination accommodation positions of the user terminals 6-1 and 6-4 to 6-6 have been changed (steps L14 and L15). If the origination and termination accommodation positions have been changed (when the discrimination in step L15 is YES), then the ATM exchange 5 releases all paths, all VPI/VCI and all bands involved prior to the origination and termination accommodation position changing (step L16) and re-acquires all VPI/VCI and all bands involved after the origination and termination accommodation position changing (step L17). Thereafter, the ATM exchange 5 re-sets bidirectional paths for all paths (step L18).

Figure 64:
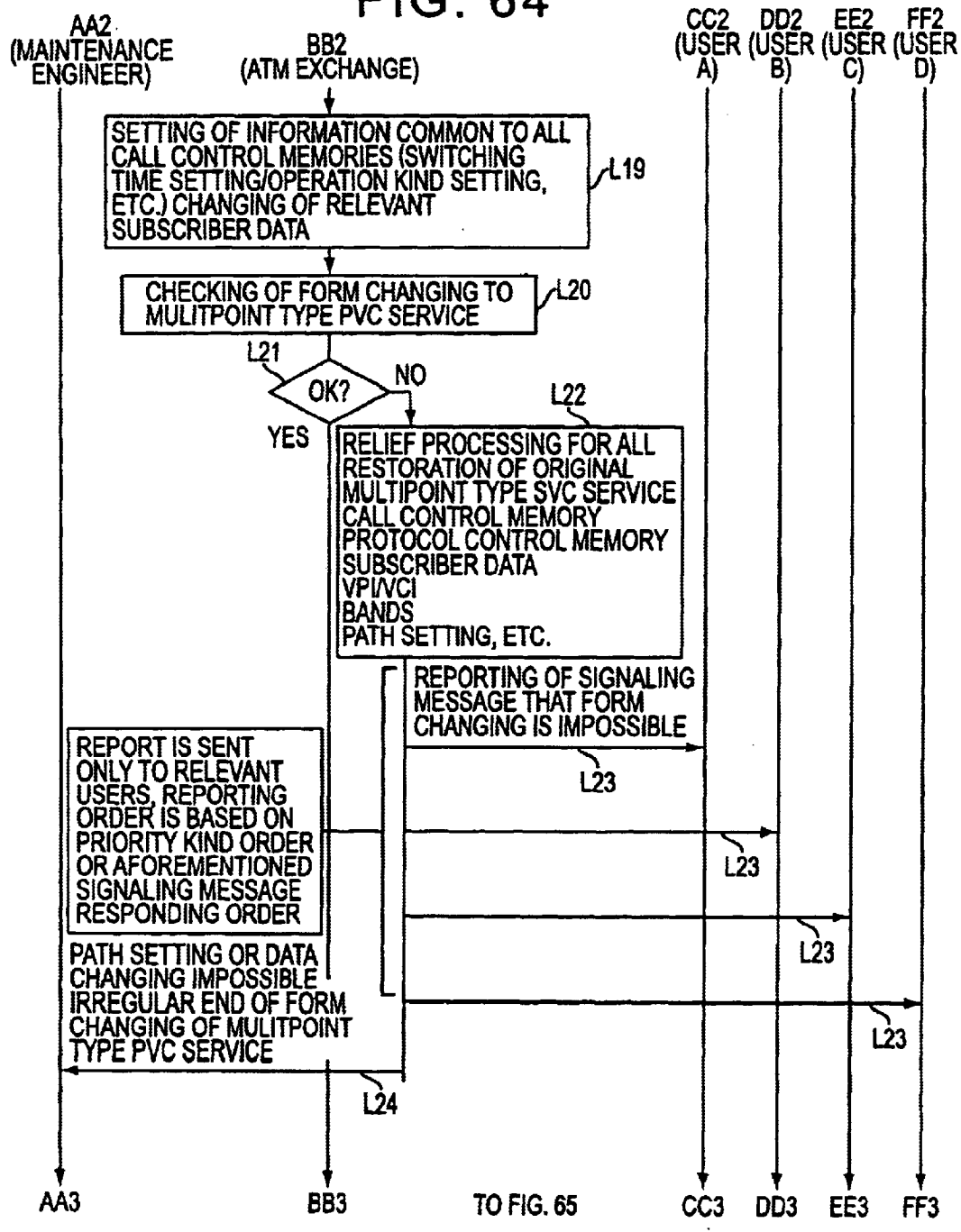
FIG. 64 is a sequence diagram illustrating the line changing control by the ATM exchange of the present embodiment.

Then, the ATM exchange 5 sets common information (a switching time, an operation type and so forth) to all of the call control memories 521-1 to 521-6 by means of the resource management section 56 and performs changing of the relevant subscriber data by means of the subscriber operation condition discrimination section 60 as shown in FIG. 64 in order to utilize the existing call control memories 521-1 to 521-6 to use the resources commonly also after the line changing (step L19). It is to be noted that, if the origination and termination accommodation positions of the user terminals 6-1 and 6-4 to 6-6 have not been changed (when the discrimination in step L15 of FIG. 63 is NO), the processing in step L19 is performed immediately.

Further, the ATM exchange 5 checks whether or not the line changing to the multipoint type PVC service has been performed regularly (steps L20 and L21). If there is some trouble (when the discrimination in step L21 is NO), relief processing to return all data to those for the multipoint type SVC service prior to the changing is performed by the relief control section 37 (step L22).

Then, the ATM exchange 5 reports to the users A to D by the user terminal trouble end reporting section 372 that some trouble has occurred in the line changing and the condition prior to the changing has been restored (step L23). Further, the ATM exchange 5 performs, by the maintenance terminal trouble end reporting section 371, similar reporting also to the maintenance engineer through the maintenance terminal 7, thereby ending the processing (step L24).

It is to be noted that the reporting to the users A to D described above is performed in accordance with predetermined priority kinds set in advance or a responding order (refer to FIG. 61 and step L9 of FIG. 62) to the signaling message described above by means of the priority reporting section 373 provided in the user terminal trouble end reporting section 372.

Figure 65:
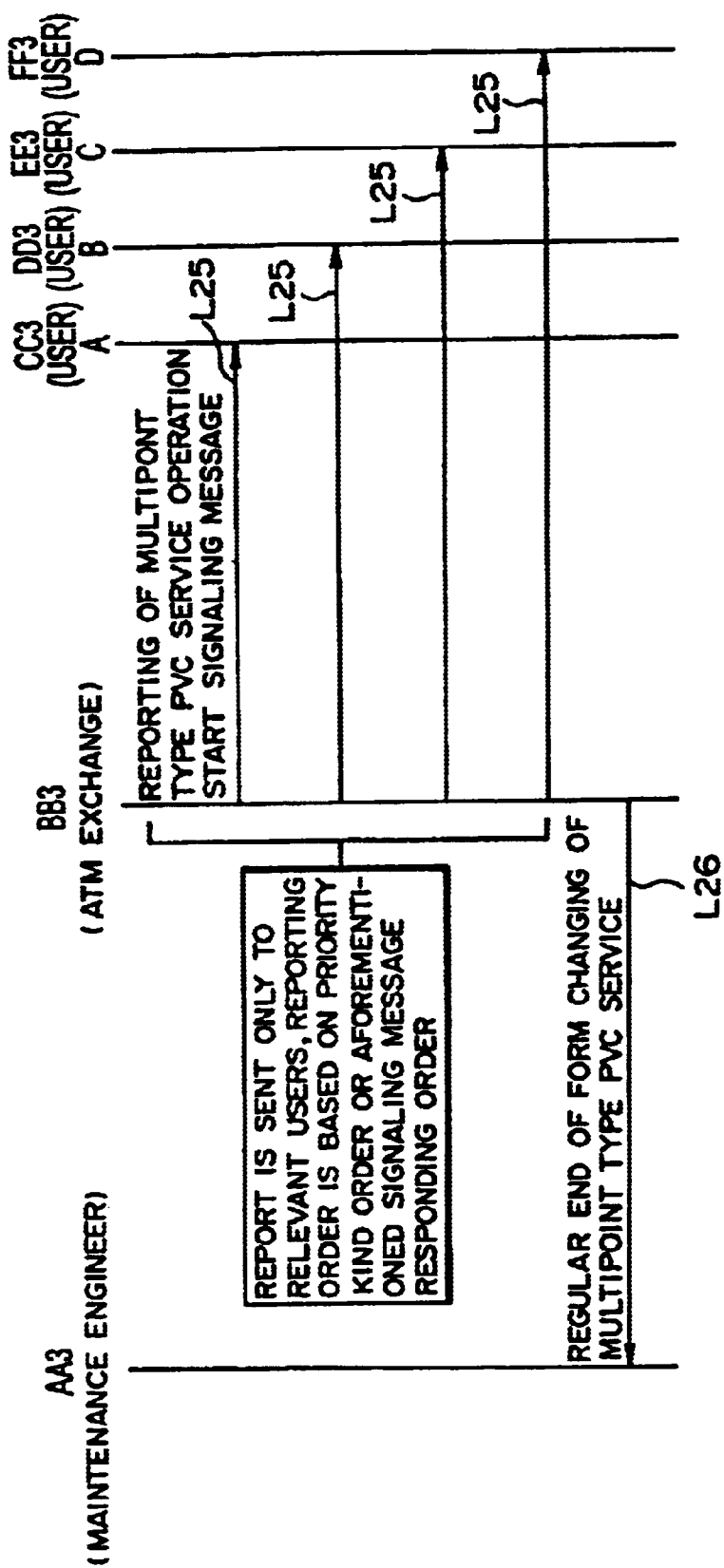
FIG. 65 is a sequence diagram illustrating the line changing control by the ATM exchange of the present embodiment.

On the other hand, if the line changing from the multipoint type SVC service to the multipoint type PVC service has been performed regularly (when the discrimination in step L21 is YES), then the ATM exchange 5 reports, as shown in FIG. 65, a signaling message of starting of operation of the multipoint type PVC service to the users A to D (step L25) and reports also to the maintenance engineer through the maintenance terminal 7 that the line changing has been performed regularly, thereby ending the line changing processing from the multipoint type SVC service to the multipoint type PVC service (step L26).

In this manner, with the ATM exchange 5 described above, when a line changing maintenance command from the multipoint type SVC service to the multipoint type PVC service is inputted through the maintenance terminal 7, since the maintenance terminal inputting type line changing section 35 can change the mutually linked condition of the relevant ones of the call control memories 521-1 to 521-6 and protocol control memories 522-1 to 522-12 in accordance with an aimed line kind of the changing to construct a mutually linked condition of the call control memories 521-1 to 521-6 for the multipoint type PVC service, advantages or effects similar to those of the ATM exchange 5 described hereinabove in the item (F-1) are achieved.

It is to be noted that the ATM exchange 5 described above can perform line changing from the SVC service of any of various other forms (point to point and point to multipoint) to the PVC service of an arbitrary form by a control procedure similar to that described above.

(F-4) Line Changing Control from the SVC Service to the PVC Service by a User

Subsequently, as an example of line changing control from the SVC service to the PVC service by a user, line changing control from the multipoint type PVC service to the multipoint type SVC service will be described in detail below with reference to the sequence diagrams (steps M1 to M28) shown in FIGS. 67 to 70 similarly as in the item (F-3) described above.

Figure 67:
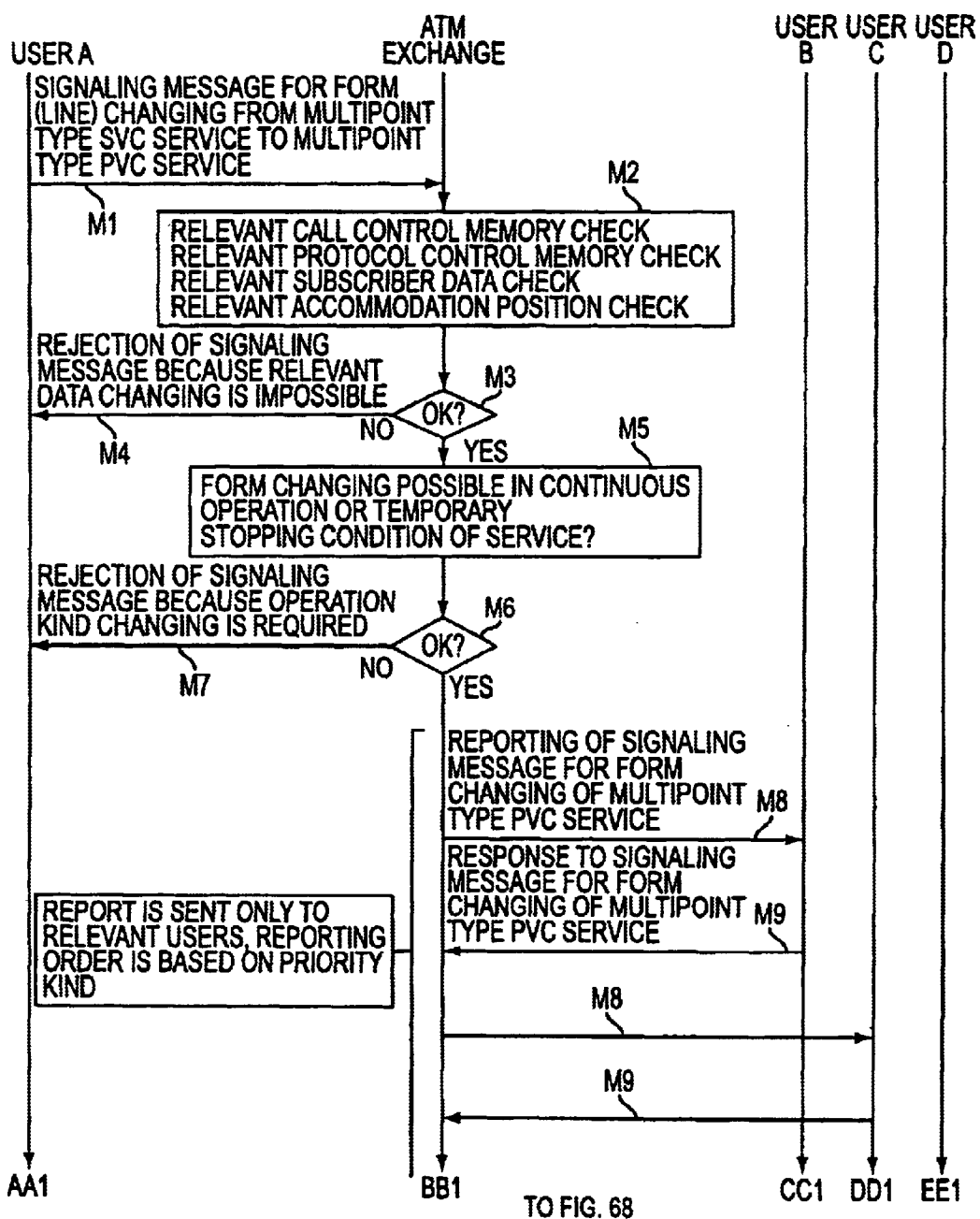
FIG. 67 is a sequence diagram illustrating the line changing control by the ATM exchange of the present embodiment.

First, if a signaling message which requests form (line) changing from the multipoint type SVC service to the multipoint type PVC service is inputted, for example, from the user A as shown in FIG. 67 (step M1), then the ATM exchange 5 performs, by the registration information condition discrimination section 382 of the user terminal inputting type line changing section 38, checking of the relevant ones of the call control memories 521-1 to 521-6, protocol control memories 522-1 to 522-12, subscriber data, accommodation positions of the user terminals 6-1 and 6-4 to 6-6 and so forth for which changing is required as a result of the line changing (steps M2 and M3).

As a result, if it is discriminated by the registration information condition discrimination section 382 that the changing of the relevant data is impossible (when the discrimination in step M3 is NO), the line changing signaling message from the user A is rejected (step M4).

However, if it is discriminated by the registration information condition discrimination section 382 that the changing of the relevant data is possible (when the discrimination in step M3 is YES), it is further discriminated by the service condition discrimination section 381 of the user terminal inputting type line changing section 38 whether or not line changing to the multipoint type PVC service is possible in a condition wherein the service in operation (multipoint type SVC service) is continuously operated or in another condition wherein the service in operation is temporarily stopped (steps M5 and M6).

As a result, if it is discriminated by the service condition discrimination section 381 that the line changing is impossible because changing of the operation kind is necessary (when the discrimination in step M6 is NO), then also in this instance, the line changing signaling message received from the user A is rejected (step M7). However, if the line changing is possible (when the discrimination in step M6 is YES), a signaling message (line changing message information) corresponding to the line changing signaling message inputted through the user A, that is, a signaling message that line changing to the multipoint type PVC service is performed, is reported to the users B to D, which make an object of the line changing, by the reporting section 384 and the priority reporting section 354 in accordance with predetermined priority kinds set in advance (step M8).

Figure 68:
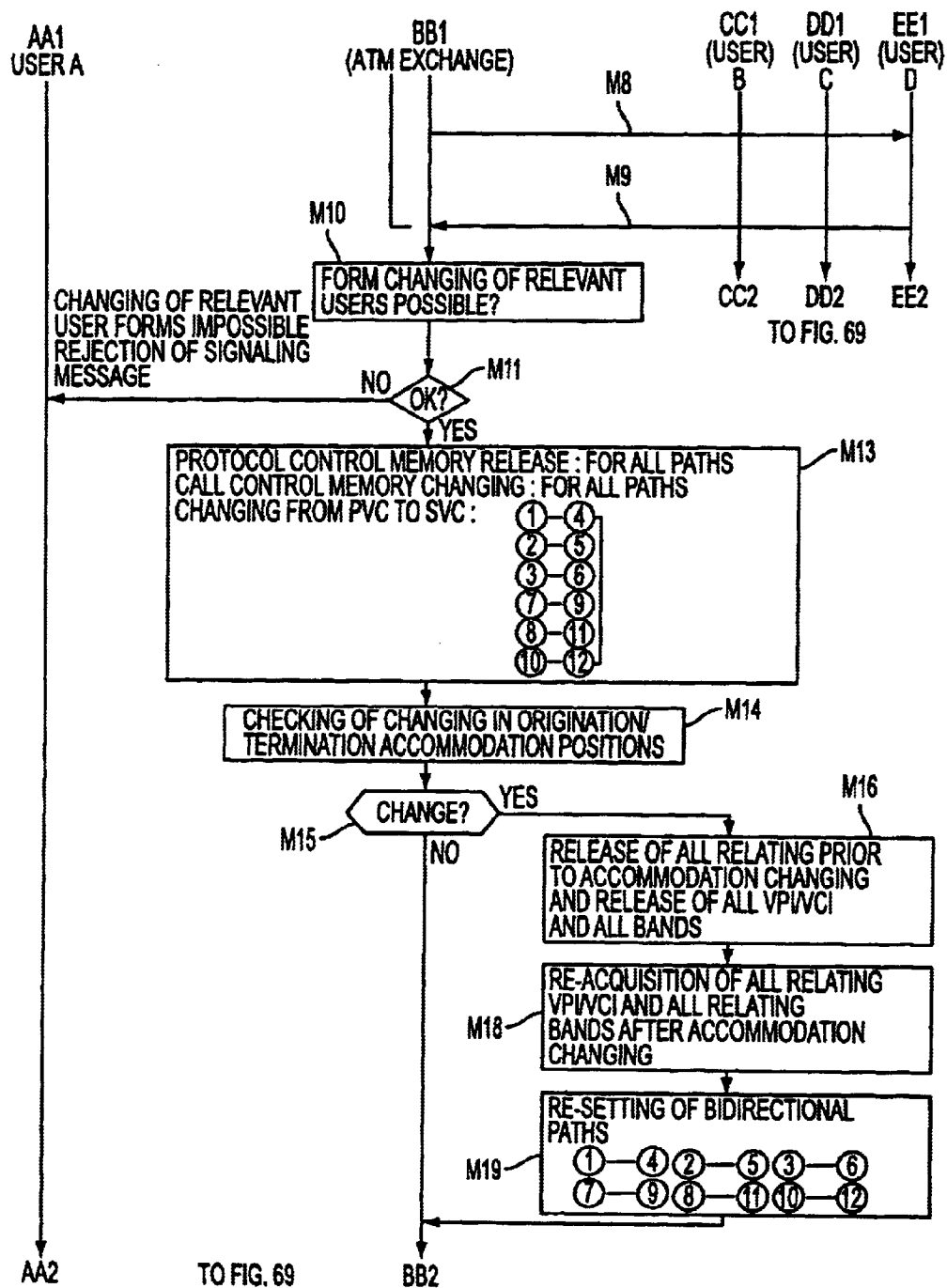
FIG. 68 is a sequence diagram illustrating the line changing control by the ATM exchange of the present embodiment.

Then, when responses to the reporting are received from the users B to D (step M9), the ATM exchange 5 discriminates whether or not line changing of the relevant ones of the users B to D is possible as shown in FIG. 68 (steps M10 and M11), and when the line changing is impossible (when the discrimination in step M11 is NO), the line changing signaling message received from the user A is rejected also in this instance (step M12).

On the other hand, when the line changing is possible (when the discrimination in step M11 is YES), as described hereinabove with reference to FIG. 66, the protocol control memories 522-1 to 522-12 for all information ① to ⑫ which become unnecessary are released and the information in the call control memories 521-1 to 521-6 for all paths (between ① and ④, between ② and ⑤, between ③ and ⑥, ...) is changed from that for the SVC service to that for the PVC service (step M13).

Thereafter, the ATM exchange 5 discriminates whether or not the origination and termination accommodation positions of the user terminals 6-1 and 6-4 to 6-6 have been changed (steps M14 and M15). If the origination and termination accommodation positions have been changed (when the discrimination in step M15 is YES), then the ATM exchange 5 releases all paths, all VPI/VCI and all bands involved prior to the origination and termination accommodation position changing (step M16) and then re-acquires all VPI/VCI and all bands involved after the origination and termination accommodation position changing (step M17). Thereafter, the ATM exchange 5 re-sets bidirectional paths for all paths (step M18).

Figure 69:
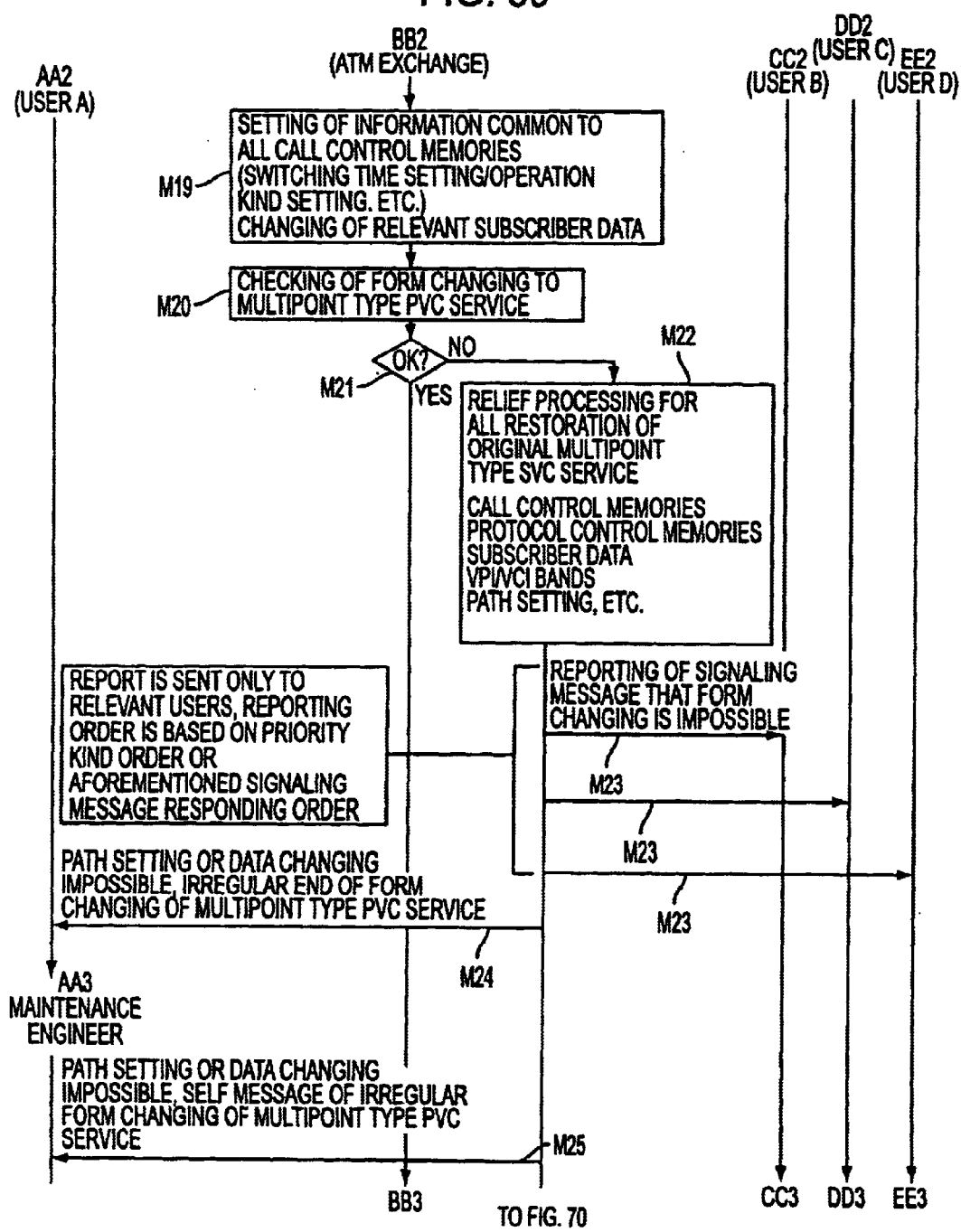
FIG. 69 is a sequence diagram illustrating the line changing control by the ATM exchange of the present embodiment.

Then, the ATM exchange 5 sets common information (a switching time, an operation type and so forth) for the multipoint type PVC service to all of the call control memories 521-1 to 521-6 by means of the resource management section 56 and performs changing of the relevant subscriber data by means of the subscriber operation condition discrimination section 60 as shown in FIG. 69 in order to utilize the existing call control memories 521-1 to 521-3 to use resources commonly also after the line changing (step M19).

It is to be noted that, if the origination and termination accommodation positions of the user terminals 6-1 and 6-4 to 6-6 have not been changed (when the discrimination in step M15 of FIG. 68 is NO), the processing in step M19 is performed immediately.

Further, the ATM exchange 5 checks whether or not the line changing to the multipoint type PVC service has been performed regularly (steps M20 and M21). If there is some trouble (when the discrimination in step M21 is NO), relief processing to return all data such as the call control memories 521-1 to 521-6 and the subscriber data, which have been changed by the line changing, to those for the multipoint type SVC service prior to the changing is performed by the relief control section 40 (step M22).

Then, the ATM exchange 5 reports, to the relevant ones of the users B to D by the other user terminal trouble end reporting section 402 of the relief control section 40, a report that some trouble has occurred in the line changing from the multipoint type SVC service to the multipoint type PVC service and the condition prior to the changing has been restored (step M23). Further, the ATM exchange 5 performs, by the user terminal trouble end reporting section 401 of the relief control section 40, similar reporting also to the user A (user which transmitted the line changing signaling message) and the maintenance engineer, thereby ending the processing (steps M24 and M25).

It is to be noted that the reporting to the users B to D described above is performed in accordance with predetermined priority kinds set in advance or a responding order (refer to step M9 of FIGS. 67 and 68) to the signaling message described above by means of the priority reporting section 403 of the other user terminal trouble end reporting section 402.

Figure 70:
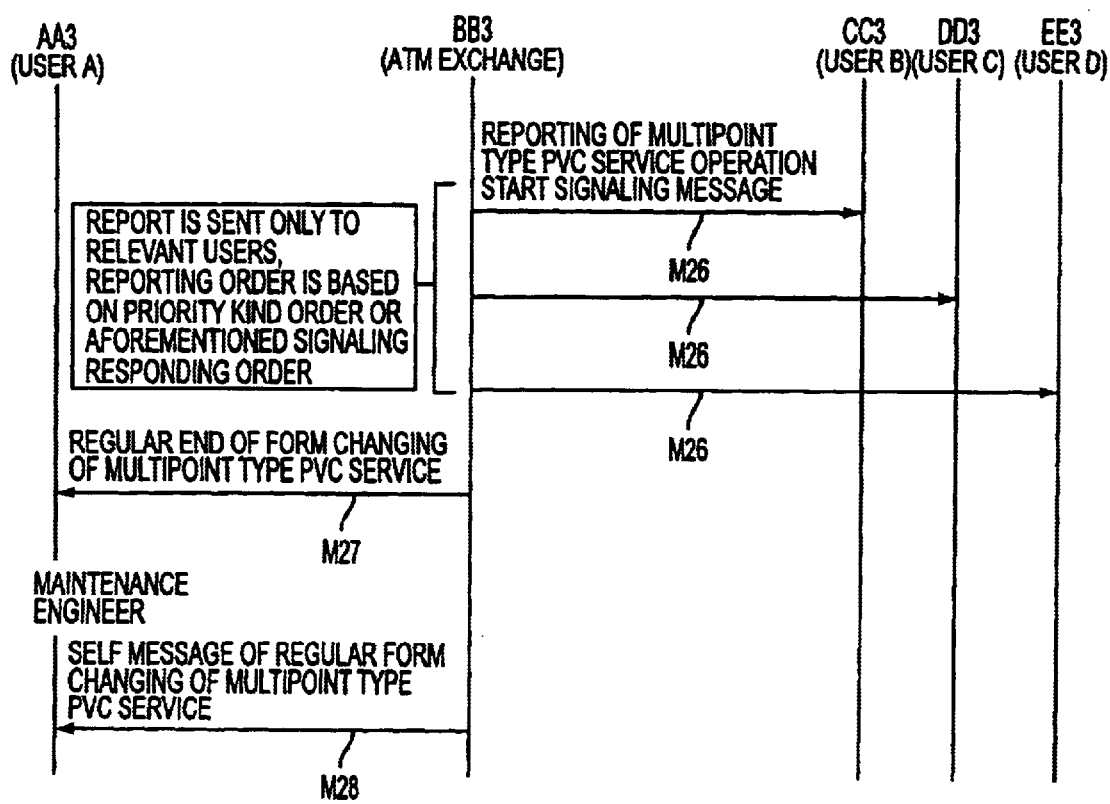
FIG. 70 is a sequence diagram illustrating the line changing control by the ATM exchange of the present embodiment.

On the other hand, if the line changing to the multipoint type PVC service has been performed regularly (when the discrimination in step M21 is YES), then the ATM exchange 5 reports, as shown in FIG. 70, a signaling message of starting of operation of the multipoint type PVC service to the relevant ones of the users B to D (step M26) and reports to the user A and the maintenance engineer that the line changing from the multipoint type SVC service to the multipoint type PVC service has been performed regularly, thereby ending the processing (steps M27 and M28).

In this manner, with the ATM exchange 5 described above, when a line changing signaling message from the multipoint type SVC service to the multipoint type PVC service is inputted through the user A, since the user terminal inputting type line changing section 38 can change the mutually linked condition of the relevant ones of the call control memories 521-1 to 521-6 and protocol control memories 522-1 to 522-12 in accordance with an aimed line kind of the changing to construct a mutually linked condition of the call control memories 521-1 to 521-6 for the multipoint type PVC service, advantages or effects similar to those of the ATM exchange 5 described hereinabove in the item (F-2) are achieved.

Accordingly, with the ATM exchange 5 in the items (F-1) to (F-4) described above, form changing between a communication service (PVC service) of an arbitrary form on a private line and another communication service (SVC service) of an arbitrary form on public lines can be performed readily, and by this, simplification of a maintenance operation and reduction of an influence upon a busy (communicating) user upon form changing can be reduced.

(F-5) Simultaneous Line Changing Control from the PVC Service to the SVC Service by a Maintenance Engineer Subsequently, in the following, a case wherein the line changing control from the PVC service to the SVC service by a maintenance engineer described hereinabove in the item (F-1) is performed simultaneously for a plurality of user groups will be described with reference to the sequence diagrams (steps J1' to J26') shown in FIGS. 89 to 93.

Figure 89:
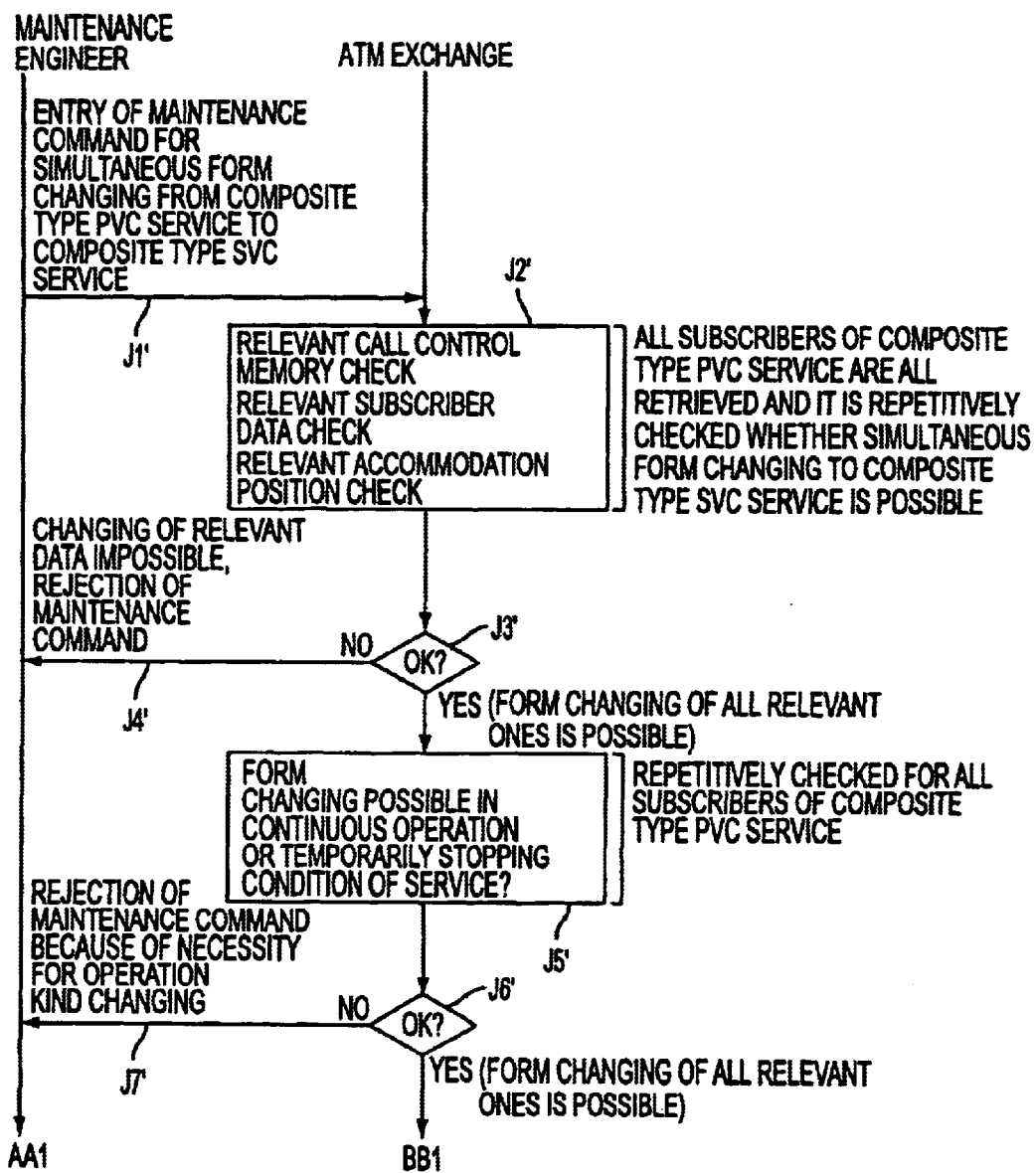
FIG. 89 is a sequence diagram illustrating simultaneous line changing control by the ATM exchange of the present embodiment.

First, if the maintenance engineer enters a simultaneous form changing maintenance command for performing simultaneous form (line) changing from the composite type PVC service to the composite type SVC service through the maintenance terminal 7 as shown in FIG. 89 (step J1'), then the ATM exchange 5 performs, by the registration information condition discrimination section 352 of the maintenance terminal inputting type line changing section 35, checking of the call control memories 521-1 to 521-3, subscriber data, accommodation positions of the user terminals 6-1 and 6-4 to 6-6 and so forth which make an object of changing upon the line changing repetitively for all of the relevant user groups (all subscribers of the composite type PVC service) (step J2').

As a result, if the changing of the relevant data is impossible (when the discrimination in step J3' is NO), then the simultaneous form changing maintenance command is rejected and this is reported to the maintenance engineer through the maintenance terminal 7 (step J4'). On the other hand. if changing of all of the relevant data is possible (when the discrimination in step J3' is YES), the ATM exchange 5 further discriminates, by the service condition discrimination section 351 of the maintenance terminal inputting type line changing section 35, whether or not line changing to the SVC service is possible in a condition wherein the service in operation (composite type PVC service) is continuously operated or in another condition wherein the service in operation is temporarily stopped repetitively for all subscribers of the communication service in operation (step J5').

Then, if it is discriminated by the service condition discrimination section 351 that the type changing is impossible because changing of the operation kind is necessary (when the discrimination in step J6' is NO), then also in this instance, the simultaneous form changing maintenance command entered by the maintenance engineer is rejected (step J7').

Figure 90:
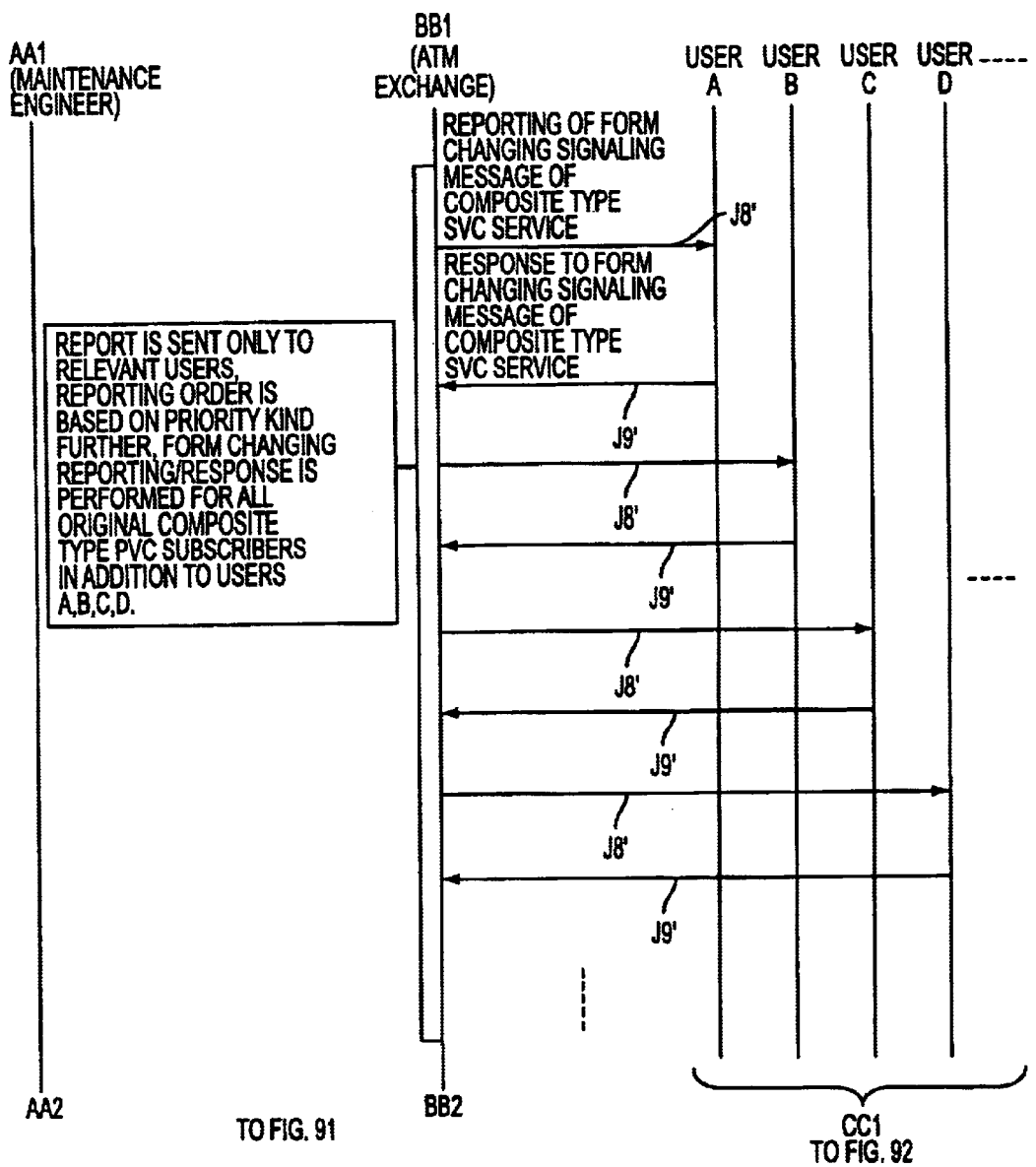
FIG. 90 is a sequence diagram illustrating the simultaneous line changing control by the ATM exchange of the present embodiment.

On the other hand, if it is discriminated that the simultaneous form changing is possible (when the discrimination in step J6' is YES), then it is reported to the users A to D, . . . which make an object of the simultaneous form changing by the reporting section 353 of the maintenance terminal inputting type line changing section 35 as shown in FIG. 90 using a signaling message that simultaneous form changing to the composite type SVC service is performed (step J8'). It is to be noted that the reporting is performed in accordance with predetermined priority kinds set in advance by means of the priority reporting section 354.

Figure 91:
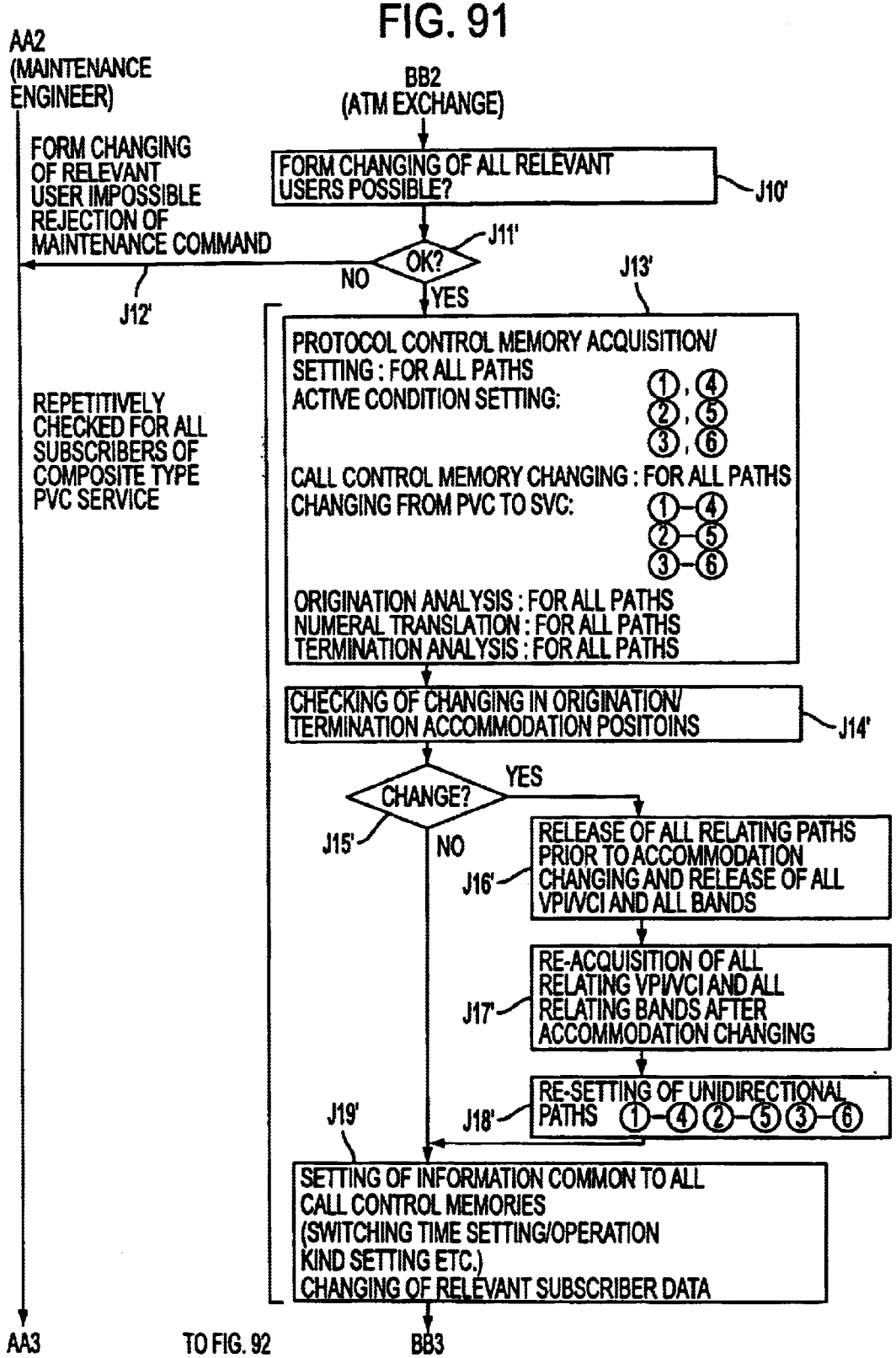
FIG. 91 is a sequence diagram illustrating simultaneous line changing control by the ATM exchange of the present embodiment.

Thereafter, when responses to the reporting are received from the users A to D, . . . (step J9'), the ATM exchange 5 checks whether or not the form changing of all of the users A to D, . . . which make an object of the simultaneous form changing is possible as shown in FIG. 91 (steps J10' and J11'), and when the form changing is impossible (when the discrimination in step J11' is NO), the simultaneous form changing maintenance command entered by the maintenance engineer is rejected (step J12').

On the other hand, when the simultaneous form changing is possible (when the discrimination in step J11' is YES), acquisition/setting of the call control memories 521-1 to 521-3 and the protocol control memories 522-1 to 522-6 (refer to FIG. 55), origination analysis, numeral translation and termination analysis processing (step J13'), checking of the origination and termination accommodation positions (steps J14' and J15'), path setting processing (steps J16' to J18') and updating processing for the various data and the subscriber data in the relevant ones of the call control memories 521-1 to 521-3 (step J19') are repetitively performed for all of the subscribers of the composite type PVC service by the ATM exchange 5.

It is to be noted that the processing in steps J13' to J19' mentioned above proceeds in the following manner. In particular, the ATM exchange 5 newly acquires, by means of the resource management section 56 (link changing control section 36: refer to FIG. 10), the protocol control memories 522-1 to 522-6 for the subscriber information ① to ⑥ and sets them individually to an Active condition, and then performs such changing processing as to change the operation kind in the call control memories 521-1 to 521-3 for all paths (between ① and ④, between ② and ⑤ and between ③ and ⑥) from the PVC service to the SVC service (step J13').

Thereafter, the ATM exchange 5 checks whether or not the origination and termination accommodation positions of the user terminals 6-1 and 6-4 to 6-6 have been changed (steps J14' and J15'). If the origination and termination accommodation positions have been changed (when the discrimination in step J15' is YES), then the ATM exchange 5 releases all paths, all VPI/VCI and all bands involved prior to the origination and termination accommodation position changing (step J16') and re-acquires all VPI/VCI and all bands involved after the origination and termination accommodation position changing (step J17'). Thereafter, the ATM exchange 5 re-sets unidirectional paths for all paths (between ① and ④, between ② and ⑤ and between ③ and ⑥) (step J18').

Then, the ATM exchange 5 sets common information (a switching time, an operation type and so forth) to all of the call control memories 521-1 to 521-3 and performs changing of the relevant subscriber data as described hereinabove with reference to FIG. 53 for each of the user groups of the object of the simultaneous form changing (step J19'). It is to be noted that, if the origination and termination accommodation positions of the user terminals 6-1 and 6-4 to 6-6 have not been changed (when the discrimination in step J15' is NO), the processing in step J19' is performed immediately.

Figure 92:
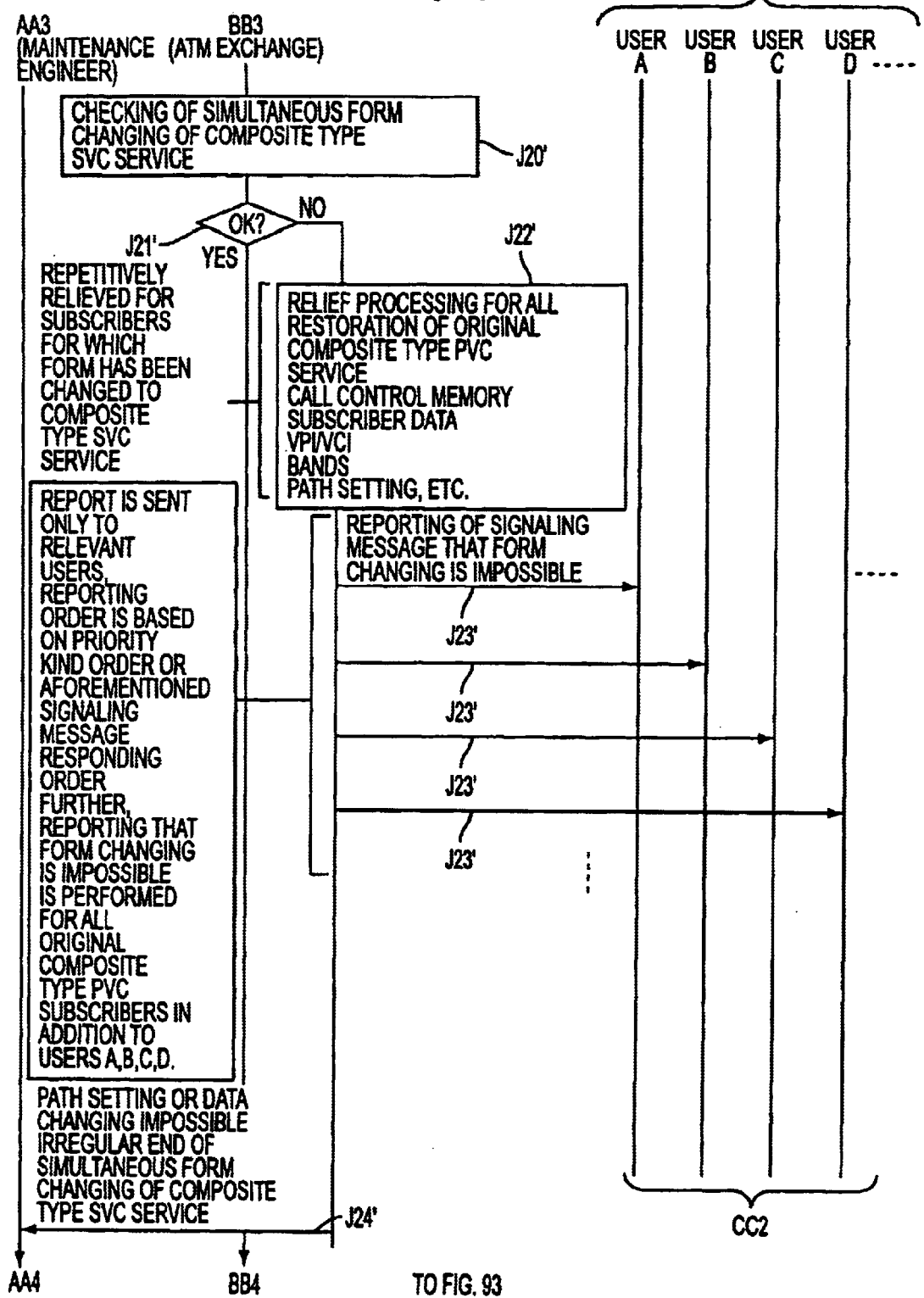
FIG. 92 is a sequence diagram illustrating simultaneous line changing control by the ATM exchange of the present embodiment.

Thereafter, the ATM exchange 5 checks whether or not the simultaneous form changing from the composite type PVC service to the composite type SVC service has been performed regularly as shown in FIG. 92 (steps J20' and J21'). If there is a trouble (when the discrimination in step J21' is NO), then relief processing to return all data to the original data for the composite type PVC service prior to the line changing is performed by the relief control section 37 (refer to FIG. 10) repetitively for those for which the form changing to the composite type SVC service has been performed (step J22').

Then, the ATM exchange 5 reports to the users (user groups) A to D, . . . which have been an object of the line changing, using a signaling message that the line changing from the composite type PVC service to the composite type SVC service is impossible (step J23'). Further, the ATM exchange 5 reports, by the maintenance terminal trouble end reporting section 371, to the maintenance engineer through the maintenance terminal 7 that the form changing to the composite type SVC service has been ended irregularly, thereby ending the processing (step J24'). It is to be noted that the reporting to the users A to D, . . . described above is performed in accordance with predetermined priority kinds set in advance or a responding order (refer to step J9') to the signaling message described above by means of the priority reporting section 373.

Figure 93:
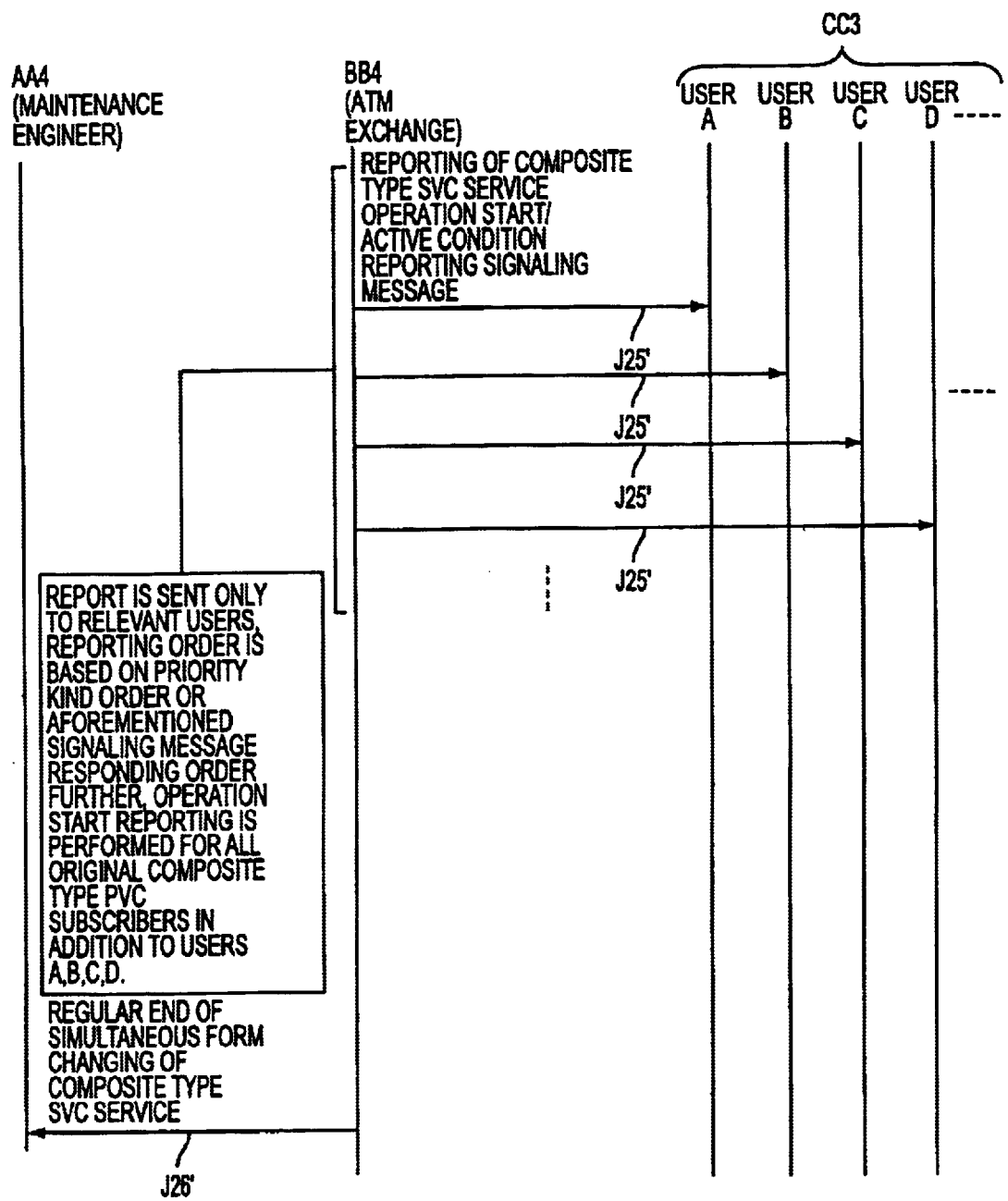
FIG. 93 is a sequence diagram illustrating simultaneous line changing control by the ATM exchange of the present embodiment.
Figure 94:
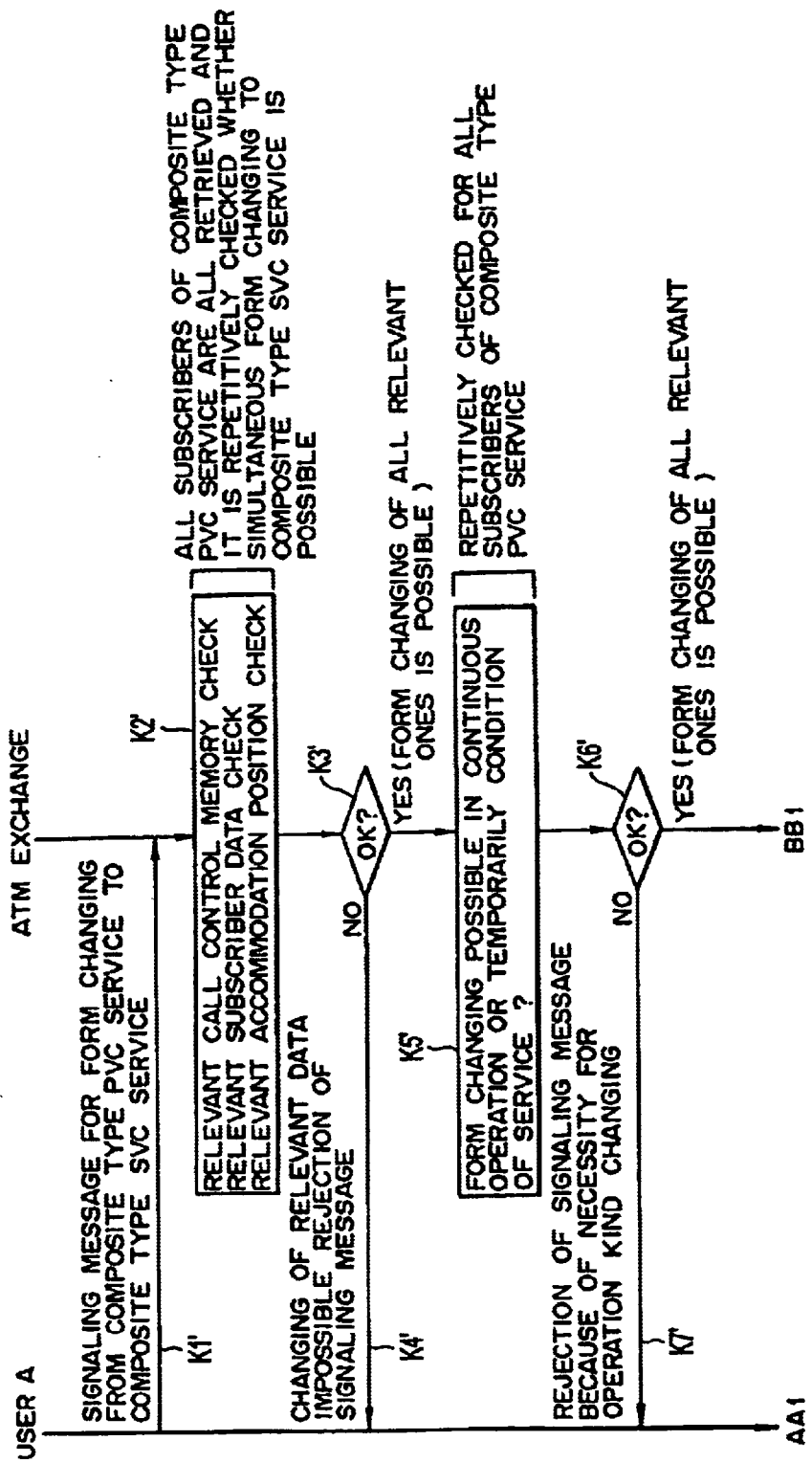
FIG. 94 is a sequence diagram illustrating simultaneous line changing control by the ATM exchange of the present embodiment.

On the other hand, if the line changing to the composite type SVC service has been performed regularly (when the discrimination in step J21' is YES), as shown in FIG. 93, the ATM exchange 5 reports the operation start of the composite type SVC service/active condition of the protocol to the users A to D, . . . using a signaling message (step J25') and reports, by means of the reporting section 353, to the maintenance engineer through the maintenance terminal 7 that the form changing has been performed regularly, thereby ending the processing (step J26').

In this manner, with the ATM exchange 5 described above, advantages or effects similar to those described hereinabove in the item (F-1) are achieved, and besides, even when simultaneous form (line) changing of the composite type PVC service operated in a plurality of user groups (A to D, . . . ) to the composite type SVC service is to be performed, the maintenance engineer need not enter a maintenance command for form changing for each one user group into the ATM exchange 5, but is required only to enter a simultaneous form changing maintenance command, and consequently, the burden of such a form changing operation as described above can be reduced further remarkably.

It is to be noted that, while the simultaneous form changing from the composite type PVC service to the composite type SVC service is described here, also simultaneous form changing from the PVC service of any of other types (or forms) to the SVC service of any of other types (or forms) can be performed in a similar manner.

(F-6) Simultaneous Line Changing Control from the PVC Service to the SVC Service by a User Subsequently, in the following, a case wherein the form changing control from the PVC service to the SVC service by a user described hereinabove in the item (F-2) is performed simultaneously for a plurality of user groups will be described with reference to the sequence diagrams (steps K1' to K27') shown in FIGS. 94 to 98.

First, as shown in FIG. 89, if the user A enters a simultaneous form changing signaling message for performing simultaneous form (line) changing from the composite type PVC service to the composite type SVC service (step K1'), then the ATM exchange 5 performs, by the registration information condition discrimination section 382 of the user terminal inputting type line changing section 38 (refer to FIG. 10), checking of the call control memories 521-1 to 521-3, subscriber data, accommodation positions of the user terminals 6-1 and 6-4 to 6-6 and so forth which make an object of the changing upon the simultaneous form changing repetitively for all of the relevant user groups (all subscribers of the composite type PVC service) (step K2').

As a result, if the changing of the relevant data is impossible (when the discrimination in step K3' is NO), the simultaneous form changing signaling message is rejected and this is reported to the user A (step K4'). However, if the changing of all of the relevant data is possible (when the discrimination in step K3' is YES), the ATM exchange 5 further discriminates, by the service condition discrimination section 381 of the user terminal inputting type line changing section 38, whether or not simultaneous form changing to the SVC service is possible in a condition wherein the service in operation (composite type PVC service) is continuously operated or in another condition wherein the service in operation is temporarily stopped repetitively for the relevant user groups (steps K5' and K6').

Then, if it is discriminated by the service condition discrimination section 381 that the simultaneous form changing is impossible because changing of the operation kind is necessary (when the discrimination in step K6' is NO), then also in this instance, the simultaneous form changing signaling message entered by the maintenance engineer is rejected (step K7').

Figure 95:
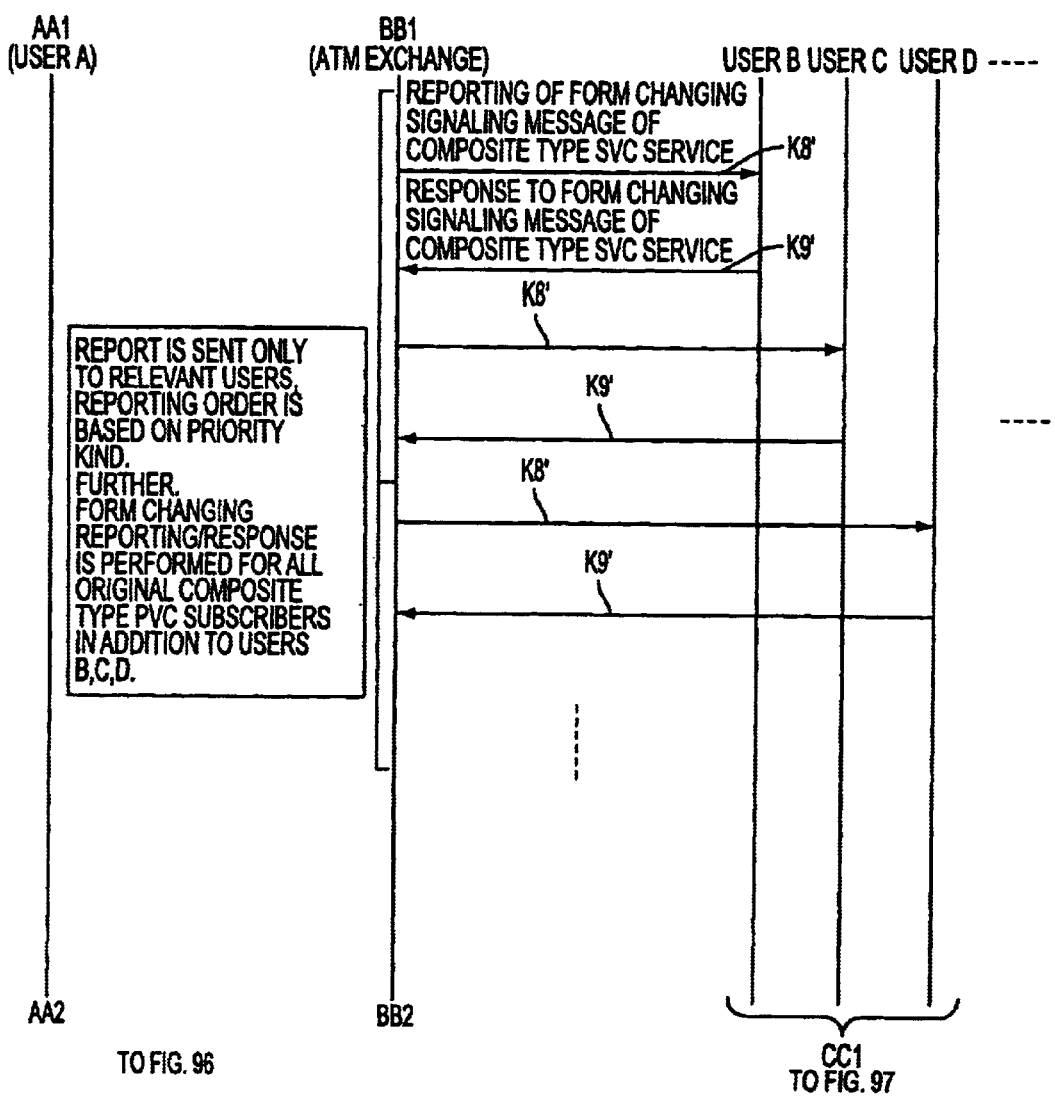
FIG. 95 is a sequence diagram illustrating simultaneous line changing control by the ATM exchange of the present embodiment.

On the other hand, if it is discriminated that the simultaneous form changing is possible (when the discrimination in step K6' is YES), it is reported to the users (user groups) B to D, ..., which make an object of the simultaneous form changing, by the reporting section 383 of the user terminal inputting type line changing section 38 using a signaling message that simultaneous line changing to the composite type SVC service is performed as shown in FIG. 95 (step K8'). It is to be noted that this reporting is performed in accordance with priority kinds set in advance by means of the priority reporting section 384.

Figure 96:
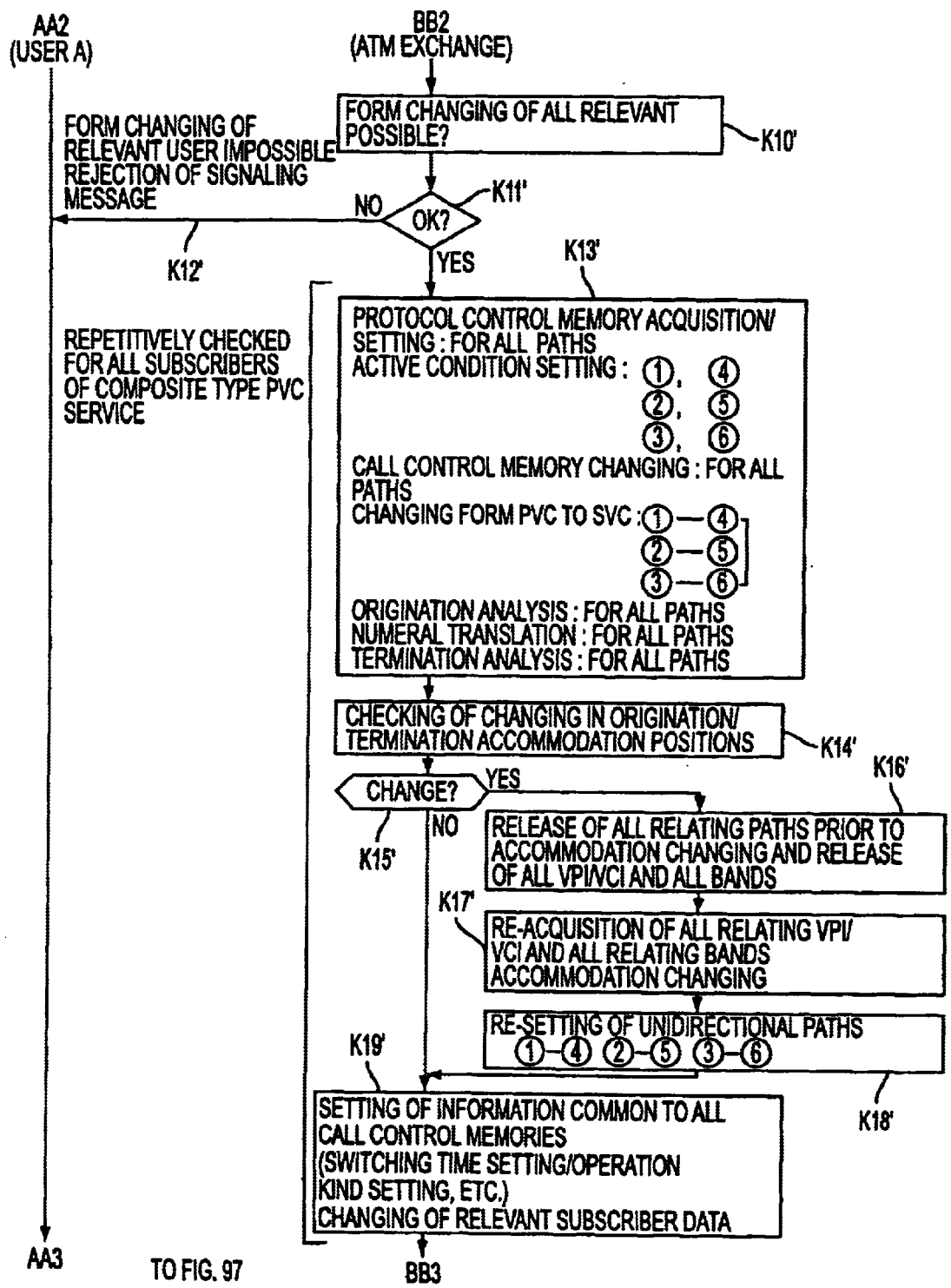
FIG. 96 is a sequence diagram illustrating simultaneous line changing control by the ATM exchange of the present embodiment.

Thereafter, when responses to the reporting are received from the users B to D, ... (step K9'), the ATM exchange 5 checks whether or not form changing of all of the users A to D, ... which make an object of the simultaneous form changing is possible as shown in FIG. 96 (steps K10' and K11'), and when the form changing is impossible (when the discrimination in step K11' is NO), the simultaneous form changing signaling message entered by the maintenance engineer is rejected (step K12').

On the other hand, when the simultaneous form changing is possible (when the discrimination in step K11' is YES), acquisition/setting of the call control memories 521-1 to 521-3 and the protocol control memories 522-1 to 522-6, origination analysis, numeral translation and termination analysis processing (step K13'), checking of the origination and termination accommodation positions (steps K14' and K15'), path setting processing (steps K16' to K18') and updating processing for the various data and the subscriber data in the relevant ones of the call control memories 521-1 to 521-3 (step K19') are repetitively performed for all of the subscribers of the composite type PVC by the ATM exchange 5.

It is to be noted that the processing in steps K13' to K19' mentioned above proceeds in the following manner. In particular, the ATM exchange 5 newly acquires, by the resource management section 56 (link changing control section 36), the protocol control memories 522-1 to 522-6 for the subscriber information ① to ⑥ and individually sets them to an "Active" condition, and then performs such changing processing as to change the operation kind of the call control memories 521-1 to 521-3 for all paths (between ① and ④, between ② and ⑤ and between ③ and ⑥) from the PVC service to the SVC service (step K13').

Thereafter, the ATM exchange 5 checks whether or not the origination and termination accommodation positions of the user terminals 6-1 and 6-4 to 6-6 in the individual user groups have been changed (steps K14' and K15'). If the origination and termination accommodation positions have been changed (when the discrimination in step K15' is YES), then the ATM exchange 5 releases all paths, all VPI/VCI and all bands involved prior to the origination and termination accommodation position changing (step K16') and re-acquires all VPI/VCI and all bands involved after the origination and termination accommodation position changing (step K17'). Then, the ATM exchange 5 re-sets unidirectional paths for all paths (between ① and ④, between ② and ⑤ and between ③ and ⑥) (step K18').

Then, the ATM exchange 5 sets common information (a switching time, an operation kind and so forth) to the call control memories 521-1 to 521-3 and performs changing of the relevant subscriber data (step K19'). It is to be noted that, if there is no change in any of the origination and termination accommodation positions of the user terminals 6-1 and 6-4 to 6-6 in the individual user groups (when the discrimination in step K15' is NO), the processing in step K19' is performed immediately.

Figure 97:
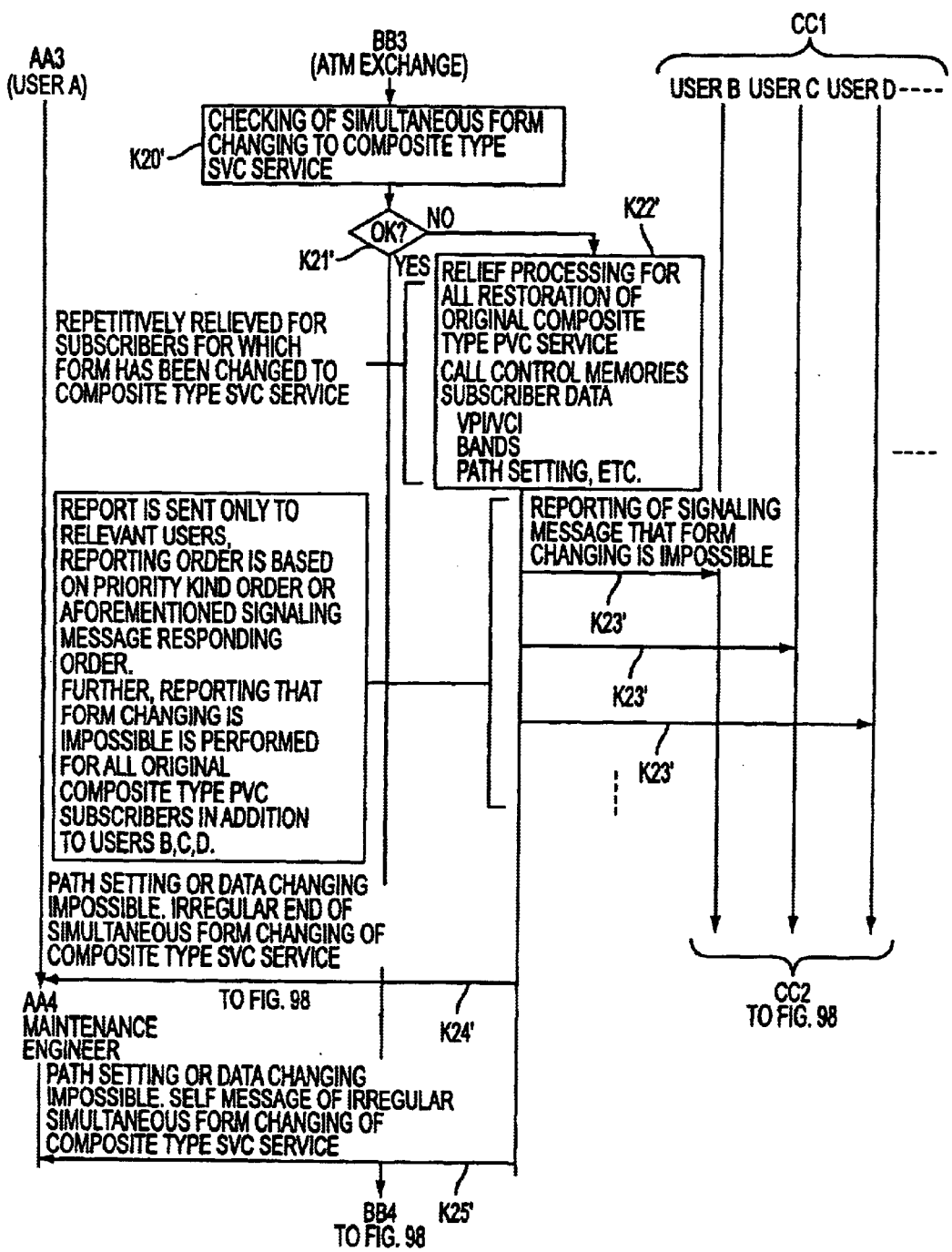
FIG. 97 is a sequence diagram illustrating simultaneous line changing control by the ATM exchange of the present embodiment.

Thereafter, the ATM exchange 5 checks whether or not the simultaneous form changing from the composite type PVC service to the composite type SVC service has been performed regularly as shown in FIG. 97 (steps K20' and K21'). If there is some trouble (when the discrimination in step K21' is NO), then relief processing to return all data to the original data for the composite type PVC service is performed by the relief control section 40 repetitively for those for which the form changing to the composite type SVC service has been performed (step K22').

Then, the ATM exchange 5 reports to the users B to D, ..., which have been an object of the simultaneous form changing, using a signaling message that the simultaneous form changing from the composite type PVC service to the composite type SVC service is impossible (step K23'), and reports, by the user terminal trouble end reporting section 401, to the user A that the form changing to the composite type SVC service has been ended irregularly and reports this also the maintenance engineer, thereby ending the processing (steps K24' and K25'). It is to be noted that the reporting to the users B to D, ... described above is performed by the priority reporting section 403 in accordance with predetermined priority kinds set in advance or a responding order (refer to step K9') to the signaling message described above.

Figure 98:
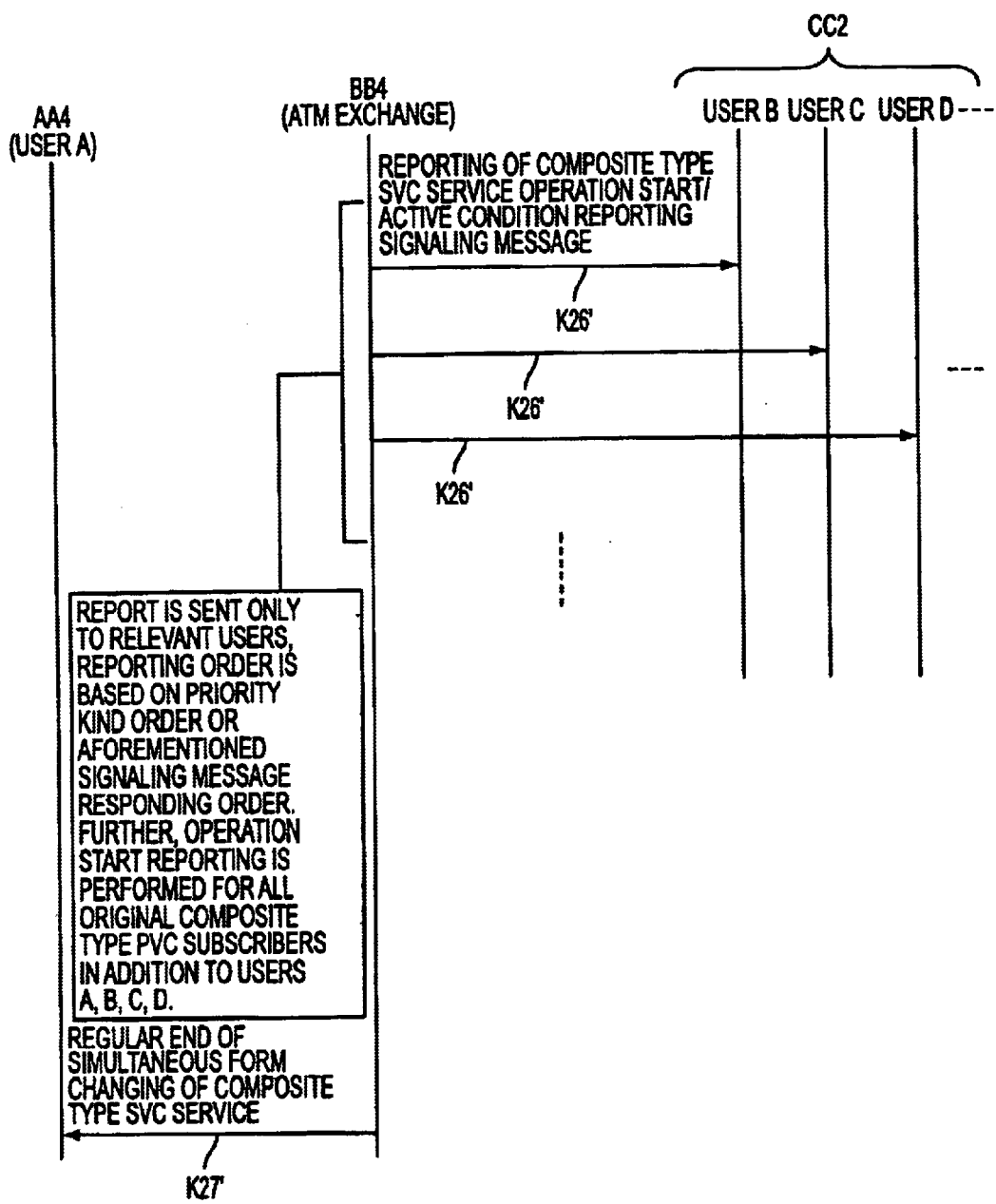
FIG. 98 is a sequence diagram illustrating simultaneous line changing control by the ATM exchange of the present embodiment.

On the other hand, if the simultaneous form changing to the composite type SVC service has been performed regularly (when the discrimination in step K21' is YES), the ATM exchange 5 reports the operation start of the composite SVC service/active condition of the protocol to the users B to D, ... using a signaling message as shown in FIG. 98 (step K26') and reports to the user A by the reporting section 383 that the form changing has been performed regularly, thereby ending the processing (step K27').

In this manner, with the ATM exchange 5 described above, advantages or effects similar to those described hereinabove in the item (F-2) are achieved, and besides, even when simultaneous form (line) changing of the composite type PVC service operated in a plurality of user groups (A to D, . . . ) to the composite type SVC service is to be performed, the user A need not enter a signaling message for form changing for each one user group into the ATM exchange 5, but is required only to enter a simultaneous form changing signaling message, and consequently, the burden of such a form changing operation as described above can be reduced further remarkably.

It is to be noted that, also in this instance, simultaneous form changing from the PVC service of any of other types (or forms) to the SVC service of any of other types (or forms) is performed in a similar manner.

(G) Others

It is to be noted that, although the ATM exchange 5 which handles ATM cells in the embodiment described above effects form changing control of a communication service, the present invention is not limited to this construction, and some other exchange such as a packet exchange which handles packet data may effect similar form changing control.

Further, the present ATM exchange 5 may be constructed, for example, such that a plurality of user terminals 6-1 to 6-N (refer to FIGS. 9 and 10) accommodated therein via a private line or public lines are divided into a plurality of user terminal groups, and call control memories 521-i and protocol control memories 522-j are provided for each of the user terminal groups and user terminal registration information is registered in the call control memories 521-i while the call control memories 521-i or the call control memories 521-i and the protocol control memories 522-j are mutually linked with each other to form a communication service providing section 21 or 23 or else a private line communication service providing section 24 and a public line communication service providing section 25 which can provide communication services of desired forms.

Accordingly, in this instance, changing between communication services regarding such various types, forms and lines as described hereinabove in the items (C) to (F) can be performed specifically to a limited user terminal group or groups, and a communication service of a desired form can be provided with a higher degree of flexibility to each user.

Further, in this instance, since a user terminal which composes each of the user terminal groups may serve overlapping as a component of a different user terminal group, the number of users which can enjoy communication services of a plurality of kinds of forms can be increased remarkably, and consequently, requests of various users can be satisfied with a higher degree of certainty.

Furthermore, the present ATM exchange 5 may be constructed such that a single user terminal group is formed from a plurality of user terminals 6-1 to 6-N and call control memories 521-i and protocol control memories 522-j are provided individually for communication services of a plurality of kinds of forms, and those call control memories 521-i and protocol control memories 522-j are linked with each other to form communication service providing sections 21 or 23 which can provide the different forms of communication services.

And, when changing command information or changing message information to a communication service of a different form is inputted through the maintenance terminal 7 or a user, since only it is required to select that communication service providing section 21 or 23 which corresponds to the communication service of the aimed form of the changing by means of the communication service selection section 25', the communication service of the desired form can be provided very rapidly without changing the mutually linked condition of the call control memories 521-i and the protocol control memories 522-j.

By the way, while control of the ATM exchange 5 where only one such ATM exchange 5 is present for the user terminals 6-1 to 6-N is described in the embodiment described above, control of each ATM exchange 5 where a plurality of such ATM exchanges 5 are present will be described briefly.

Figure 101:
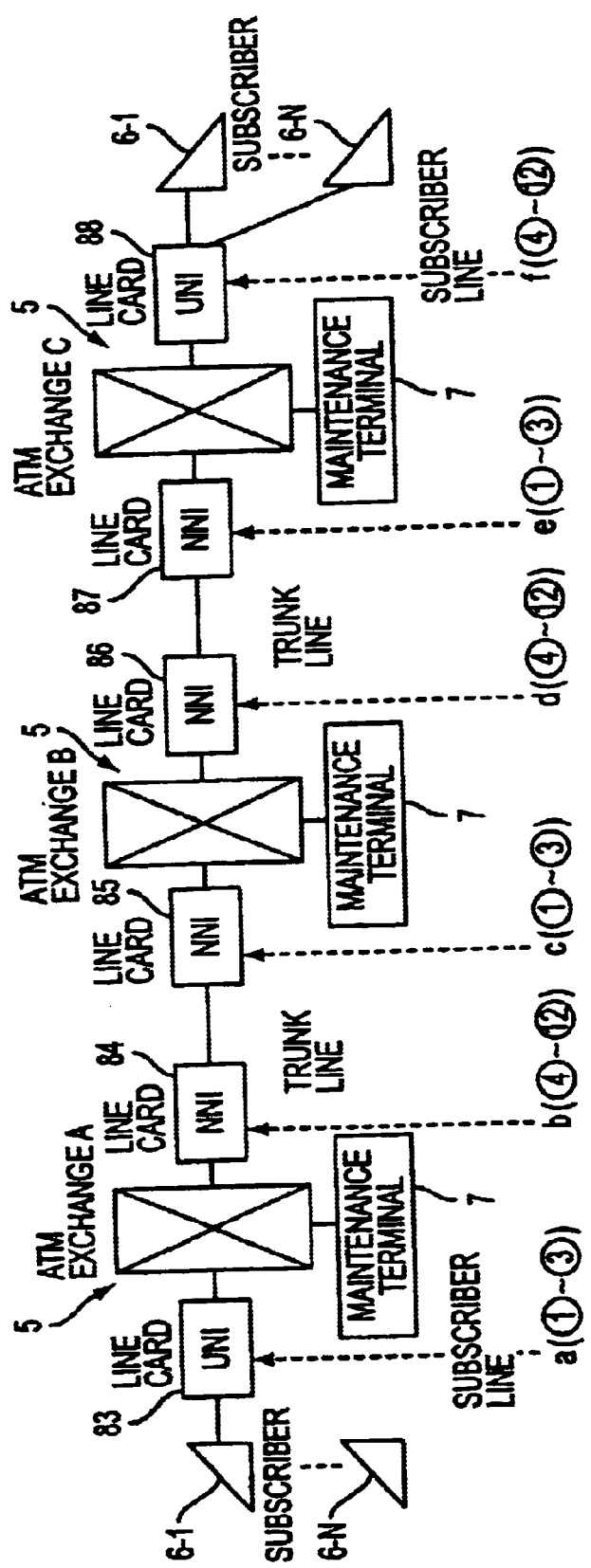
FIG. 101 is a block diagram showing an example of network wherein a plurality of ATM exchanges are involved.
Figure 104A:
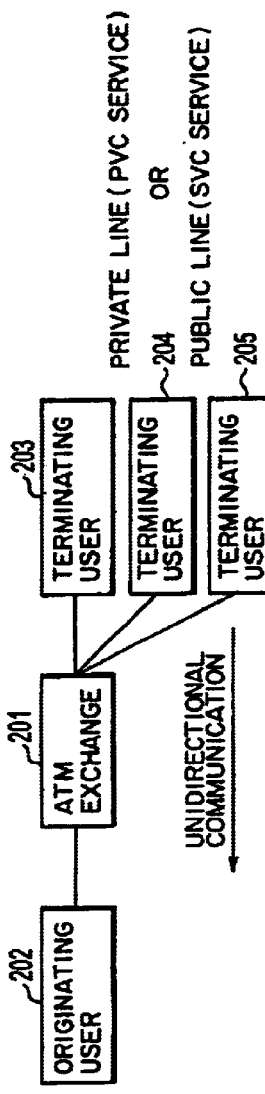
FIGS. 104(a) to 104(c) are diagrammatic views each showing another example of of communication service form provided by an ATM exchange.
Figure 104B:
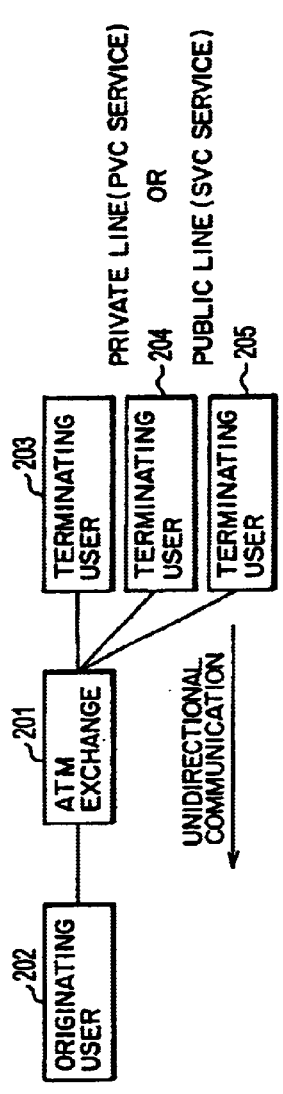
Figure 104C:
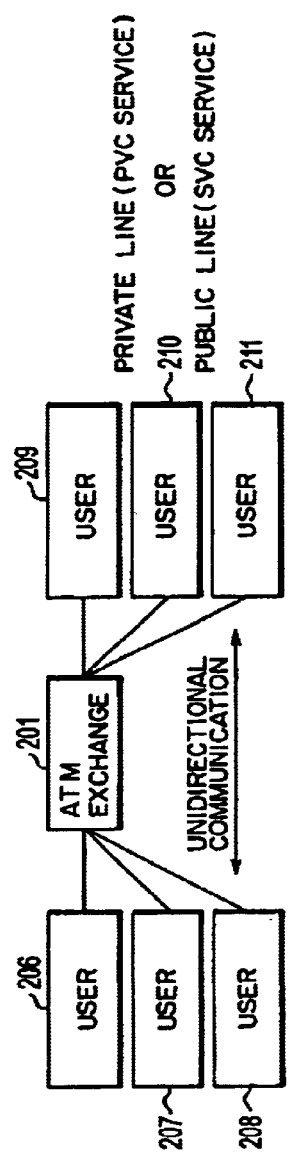

A case is considered wherein, for example, as shown in FIG. 101, three ATM exchanges 5 (A to C) are present and each of the ATM exchanges A and C at the terminal ends accommodates user terminals 6-1 to 6-N (subscribers) described above. It is to be noted that, in FIG. 101, reference numeral 7 denotes a maintenance terminal for a corresponding one of the ATM exchanges A to C, reference numerals 83 and 88 denote each a line card (UNI) which accommodates user terminals 6-1 to 6-N via a subscriber line, and 84 to 87 denote line cards (NNI) for interconnecting the ATM exchanges via a trunk line (cable).

And, where communication is performed via a plurality of ATM exchange 5 in this manner, in the PVC service, control of service form (type) changing and so forth is performed by entering a maintenance command described hereinabove simultaneously from the maintenance terminals 7, but in the SVC service, control of service form (type) changing and so forth is performed by transmitting a signaling message described hereinabove from the ATM exchange A or C at a terminal end or entering a maintenance command from one of the maintenance terminals 7 (ATM exchange A or C).

In this instance, however, control by the ATM exchanges 5 is different as described in the following items (a) and (b) depending upon whether no SVC service intervenes (is involved) before and after provision of an all type application PVC service or service form changing (only a PVC service is involved) or an SVC service intervenes before and after provision of an SVC service or service form changing.

(a) When an SVC Service does not Intervene before and after Provision of a PVC Service or Service form Changing (only a PVC Service is Involved)

Each of the ATM exchange 5 performs service provision or service form changing while it is aware only of an adjacent subscriber line(s)/trunk line(s), and manages, also for setting of data to the call control memories 521-i, only the subscriber line(s)/trunk line(s) adjacent the ATM exchange 5. In short, the ATM exchanges A to C described above perform service control and management of data independently of each other.

For example, in FIG. 101, the ATM exchanges A to C individually perform such service form changing/data management independently of each other:

ATM exchange A: performs service form changing/data management regarding portions (line cards 83 and 84) indicated by broken line arrow marks a and b:

ATM exchange B: performs service form changing/data management regarding portions (line cards 85 and 86) indicated by broken line arrow marks c and d; and ATM exchange C: performs service form changing/data management regarding portions (line cards 87 and 88) indicated by broken line arrow marks e and f.

Accordingly, the procedures (sequences) of provision of the all type application PVC service and the service form changing control for the ATM exchanges A to C in this instance are similar to the procedures described hereinabove in the items (C) to (F) of the embodiment described above, and also the format of each maintenance command to be entered from the maintenance terminal 7 is similar to that used in the embodiment described above.

(b) Where an SVC Service Intervenes before and after SVC Service Provision or Service form Changing Each of the ATM exchanges A and C at the terminal end positions performs service provision or service form changing while it is aware of subscriber lines (accommodated, in FIG. 101, via the line cards 83 and 88) at the terminal end position in addition to the adjacent subscriber line/trunk line, and manages, also for setting of data to the call control memories 521-i/protocol control memories 522-j and so forth, the subscriber lines at the terminal end position in addition to the adjacent subscriber line/trunk line. It is to be noted that management of the data of the subscriber lines at the terminal end positions are performed only for the ATM exchanges A and C, and data of the subscriber lines are not managed by the ATM exchange B as a relay station.

In particular, when a service form changing instruction is received from the ATM exchange A or C, the ATM exchange B performs only service form changing for a connection point (line card 85 or 86) of the trunk line from the ATM exchange A or C (in other words, the ATM exchange B is not aware of the subscriber lines at the terminal end portions).

For example, in FIG. 101, the ATM exchanges A to C individually perform such service form changing/data management as described below:

ATM exchange A: performs service form changing for portions indicated by broken line arrow marks a and b/data management for portions indicated by broken line arrow marks a, b and f;

ATM exchange B: performs service form changing/data management for portions indicated by broken line arrow marks c and d [data at portions indicated by broken line arrow marks a and f merely pass (through) the ATM exchange B]; and ATM exchange C: performs service form changing for portions indicated by broken line arrow marks e and f/data management for portions indicated by broken line arrow marks a, e and f.

Accordingly, when it is considered to effect provision of all type application point to multipoint control, point to multipoint type changing control and service form changing control from the ATM exchange A side, the control procedures (sequences) by the ATM exchange A correspond to the procedures described hereinabove in the items (C) to (F) of the embodiment described above where the terminating user is replaced by the line card 84, and the sequences by the ATM exchange C correspond to the procedures described hereinabove in the items (C) to (F) of the embodiment described above where the originating user is replaced by the line card 87.

It is to be noted that, in this instance, since the ATM exchange B is a relay station, it merely sends out a signaling message, a responding message (similar to that described in the embodiment described above) or the like received from the ATM exchange A or C as it is as a repeating message to the opposing ATM exchange C or A.

Consequently, since the ATM exchanges A and C are aware of subscriber lines at the terminal end positions as described above, form changing of a communication service and data management can be performed freely from any of the ATM exchanges A and C.

In the following, service provision/service form changing and data management applied to the items (C) to (F) described above where a plurality of ATM exchanges 5 are present as described hereinabove will be described:

(1) provision of the PVC service (P-MP) of the item (C-1): service provision and data management recited in the item (a) described above;

(2) provision of the SVC service (P-MP) of the item (C-2): service provision and data management recited in the item (b) described above;

(3) type changing of PVC to PVC of the item (D-1): changing control and data management recited in the item (a) described above;

(4) type changing of SVC to SVC of the item (D-2): changing control and data management recited in the item (b) described above;

(5) simultaneous type changing of PVC to PVC of the item (D-3): changing control and data management recited in the item (a) described above;

(6) simultaneous type changing of SVC to SVC of the item (D-4): changing control and data management recited in the item (b) described above;

(7) form changing of PVC to PVC of the item (E-1): changing control and data management recited in the item (a) described above;

(8) form changing of SVC to SVC of the item (E-2): changing control and data management recited in the item (b) described above;

(9) form changing of PVC to PVC of the item (E-3): changing control and data management recited in the item (a) described above;

(10) form changing of SVC to SVC of the item (E-4): changing control and data management recited in the item (b) described above;

(11) simultaneous form changing of PVC to PVC of the item (E-5): changing control and data management recited in the item (a) described above;

(12) simultaneous form changing of SVC to SVC of the item (E-6): changing control and data management recited in the item (b) described above;

(13) form (line) changing of PVC to SVC of the item (F-1): changing control and data management recited in the item (b) described above;

(14) form (line) changing of PVC to SVC of the item (F-2): changing control and data management recited in the item (b) described above;

(15) form (line) changing of SVC to PVC of the item (F-3): changing control and data management recited in the item (b) described above;

(16) form (line) changing of SVC to PVC of the item (F-4): changing control and data management recited in the item (b) described above;

(17) simultaneous form (line) changing of PVC to SVC of the item (F-5): changing control and data management recited in the item (b) described above;

(18) simultaneous form (line) changing of PVC to SVC of the item (F-6): changing control and data management recited in the item (b) described above.

Here, as a concrete example, it is considered to apply data management wherein, where the originating user A has a single accommodation position and the terminating users B, C and D have another single accommodation position as described above in the item (D) and the allocation of VPI/VCI/band information in the broadcast type SVC service is such as recited in the following items (1) to (4), the allocation of the VPI/VCI/band information is changed to such as recited in the following items (1) to (12) by type changing control to the multipoint type SVC service to a case wherein a plurality of ATM exchanges 5 (A to C) are present as described above.

(1) Between ① and ATM exchange: VPI=0, VCI=32, band=10 Mbps
(2) Between ATM exchange and ④: VPI=0, VCI=32, band=10 Mbps
(3) Between ATM exchange and ⑤: VPI=0, VCI=33, band=10 Mbps
(4) Between ATM exchange and ⑥: VPI=0, VCI=34, band=10 Mbps
(5) Between ② and ATM exchange: VPI=0, VCI=33, band=10 Mbps
(6) Between ATM exchange and ⑦: VPI=0, VCI=35, band=10 Mbps
(7) Between ATM exchange and ⑨: VPI=0, VCI=36, band=10 Mbps
(8) Between ATM exchange and ⑪: VPI=0, VCI=37, band=10 Mbps
(9) Between ③ and ATM exchange: VPI=0, VCI=34, band=10 Mbps
(10) Between ATM exchange and ⑧: VPI=0, VCI=38, band=10 Mbps
(11) Between ATM exchange and ⑩: VPI=0, VCI=39, band=10 Mbps
(12) Between ATM exchange and ⑫: VPI=0, VCI=40, band=10 Mbps It is to be noted that, in the following description, subscriber information of the user terminal 6-1 accommodated in a portion of a broken line arrow mark a in FIG. 101 is represented by ①-③, connection point information at a portion of a broken line arrow mark b is represented by ④-⑫ (which corresponds, in the embodiment described above, to the subscriber information ④ to ⑫), connection point information at a portion of a broken line arrow mark c is represented by ①-③, connection point information at a portion of a broken line arrow mark d is represented by ④-⑫, connection point information at a portion of a broken line arrow mark e is represented by ①-③, and subscriber information of the user terminals 6-4 to 6-6 accommodated in a portion of a broken line arrow mark f is represented by ④-⑫.

In this instance, for example, if the allocation of VPI/VCI/band information in the broadcast type SVC service is such as recited in the items (1) to (16) given below, the allocation of VPI/VCI/band information in the multipoint type SVC service after type changing is such as recited in the items (1') to (36') given below. However, also in this instance, the allocation is performed such that the same VCI may not be designated in paths (VPs) of the same subscriber line/trunk line.

It is to be noted that, in the items (1) to (16) and (1') to (36') given below, a① represents subscriber information ① at the portion of the broken line arrow mark a in FIG. 101 and b④ represents connection point information ④ at the portion of the broken line arrow mark b in FIG. 101, and also other subscriber information/connection point information at the portions indicated by the broken line arrow marks a to w in FIG. 101 is represented in a similar manner.

(1) Between a① (or a② or a③) and ATM exchange A: VPI=0, VCI=32, band=10 Mbps
(2) Between ATM exchange A and b④: VPI=0, VCI=32, band=10 Mbps
(It is to be noted that, between b④ and c①, values are similar to those between the ATM exchange A and b④ because only a cable connection is provided therefor.)
(3) Between c① and ATM exchange B: VPI=0, VCI=32, band=10 Mbps
(4) Between ATM exchange B and d④: VPI=0, VCI=32, band=10 Mbps
(It is to be noted that, between d④ and e①, values are similar to those between the ATM exchange B and d④ because only a cable connection is provided therefor.)
(5) Between e① and ATM exchange C: VPI=0, VCI=32, band=10 Mbps
(6) Between ATM exchange C and f④: VPI=0, VCI=32, band=10 Mbps
(7) Between ATM exchange A and b⑤: VPI=0, VCI=33, band 10 Mbps
(It is to be noted that, between b⑤ and c②, values are similar to those between the ATM exchange A and b⑤ because only a cable connection is provided therefor.)
(8) Between c② and ATM exchange B: VPI=0, VCI=33, band=10 Mbps
(9) Between ATM exchange B and d⑤: VPI=0, VCI=33, band=10 Mbps
(It is to be noted that, between d⑤ and e②, values are similar to those between the ATM exchange B and d⑤ because only a cable connection is provided therefor.)
(10) Between e② and ATM exchange C: VPI=0, VCI=33, band=10 Mbps
(11) Between ATM exchange C and f⑤: VPI=0, VCI=33, band=10 Mbps
(12) Between ATM exchange A and b⑥: VPI=0, VCI=34, band 10 Mbps
(It is to be noted that, between b⑥ and c③, values are similar to those between the ATM exchange A and b⑥ because only a cable connection is provided therefor.)
(13) Between c③ and ATM exchange B: VPI=0, VCI=34, band=10 Mbps
(14) Between ATM exchange B and d⑥: VPI=0, VCI=34, band=10 Mbps
(It is to be noted that, between d⑥ and e③, values are similar to those between the ATM exchange B and d⑥ because only a cable connection is provided therefor.)
(15) Between e③ and ATM exchange C: VPI=0, VCI=34, band=10 Mbps
(16) Between ATM exchange C and f⑥: VPI=0, VCI=34, band=10 Mbps
(1') Between a① and ATM exchange A: VPI=0, VCI=32, band=10 Mbps
(2') Between ATM exchange A and b④: VPI=0, VCI=32, band=10 Mbps
(It is to be noted that, between b④ and c①, values are similar to those between the ATM exchange A and b④ because only a cable connection is provided therefor.)
(3') Between c① and ATM exchange B: VPI=0, VCI=32, band=10 Mbps
(4') Between ATM exchange B and d④: VPI=0, VCI=32, band=10 Mbps
(It is to be noted that, between d④ and e①, values are similar to those between the ATM exchange B and d④ because only a cable connection is provided therefor.)
(5') Between e① and ATM exchange C: VPI=0, VCI=32, band=10 Mbps
(6') Between ATM exchange C and f④: VPI=0, VCI=32, band=10 Mbps
(7') Between ATM exchange A and b⑤: VPI=0, VCI=33, band 10 Mbps (It is to be noted that, between b⑤ and c②, values are similar to those between the ATM exchange A and b⑤ because only a cable-connection is provided therefor.)

(8') Between c② and ATM exchange B: VPI=0, VCI=33, band=10 Mbps (9') Between ATM exchange B and d⑤: VPI=0, VCI=33, band=10 Mbps (It is to be noted that. between d⑤ and e②, values are similar to those between the ATM exchange B and d⑤ because only a cable connection is provided therefor.)

(10') Between e② and ATM exchange C: VPI=0, VCI=33, band=10 Mbps (11') Between ATM exchange C and f⑤: VPI=0, VCI=33, band=10 Mbps (12') Between ATM exchange A and b⑥: VPI=0, VCI=34, band=10 Mbps (It is to be noted that, between b⑥ and c③, values are similar to those between the ATM exchange A and b⑥ because only a cable connection is provided therefor.)

(13') Between c③ and ATM exchange B: VPI=0, VCI=34, band=10 Mbps (14') Between ATM exchange B and d⑥: VPI=0, VCI=34, band=10 Mbps (It is to be noted that, between d⑥ and e③, values are similar to those between the ATM exchange B and d⑥ because only a cable connection is provided therefor.)

(15') Between e③ and ATM exchange C: VPI=0, VCI=34, band=10 Mbps (16') Between ATM exchange C and f⑥: VPI=0, VCI=34, band=10 Mbps (17') Between a② and ATM exchange A: VPI=0, VCI=33, band=10 Mbps (18') Between ATM exchange A and b⑦: VPI=0, VCI=35, band=10 Mbps (It is to be noted that, between b⑦ and c①, values are similar to those between the ATM exchange A and b⑦ because only a cable connection is provided therefor.)

(19') Between ATM exchange B and d⑦: VPI=0, VCI=35, band=10 Mbps (20') Between ATM exchange C and f⑦: VPI=0, VCI=35, band=10 Mbps (21') Between ATM exchange A and b⑨: VPI=0, VCI=36, band=10 Mbps (It is to be noted that, between b⑨ and c②, values are similar to those between the ATM exchange A and b⑨ because only a cable connection is provided therefor.)

(22') Between ATM exchange B and d⑨: VPI=0, VCI=36, band=10 Mbps (It is to be noted that, between d⑨ and e②, values are similar to those between the ATM exchange B and d⑨ because only a cable connection is provided therefor.)

(23') Between ATM exchange C and f⑨: VPI=0, VCI=36, band=10 Mbps (24') Between ATM exchange A and b⑪: VPI=0, VCI=37, band=10 Mbps (25') Between ATM exchange B and d⑪: VPI=0, VCI=37, band=10 Mbps (It is to be noted that, between d⑪ and e③, values are similar to those between the ATM exchange B and d⑪ because only a cable connection is provided therefor.)

(26') Between ATM exchange C and f⑪: VPI=0, VCI=37, band=10 Mbps (27') Between a③ and ATM exchange A: VPI=0, VCI=34, band=10 Mbps (28') Between ATM exchange A and b⑧: VPI=0, VCI=38, band=10 Mbps (It is to be noted that, between b⑧ and c①, values are similar to those between the ATM exchange A and b⑧ because only a cable connection is provided therefor.)

(29') Between ATM exchange B and d⑧: VPI=0, VCI=38, band=10 Mbps (It is to be noted that, between d⑧ and e①, values are similar to those between the ATM exchange B and d⑧ because only a cable connection is provided therefor.)

(30') Between ATM exchange C and f⑧: VPI=0, VCI=38, band=10 Mbps (31') Between ATM exchange A and b⑩: VPI=0, VCI=39, band 10 Mbps (It is to be noted that, between b⑩ and c②, values are similar to those between the ATM exchange A and b⑩ because only a cable connection is provided therefor.)

(32') Between ATM exchange B and d⑩: VPI=0, VCI=39, band=10 Mbps (It is to be noted that, between d⑩ and e②, values are similar to those between the ATM exchange B and d⑩ because only a cable connection is provided therefor.)

(33') Between ATM exchange C and f⑩: VPI=0, VCI=39, band=10 Mbps (34') Between ATM exchange A and b⑫: VPI=0, VCI=40, band=10 Mbps (It is to be noted that, between b⑫ and c③, values are similar to those between the ATM exchange A and b⑫ because only a cable connection is provided therefor.)

(35') Between ATM exchange B and d⑫: VPI=0, VCI=40, band 10 Mbps (It is to be noted that, between d⑫ and e③, values are similar to those between the ATM exchange B and d⑫ because only a cable connection is provided therefor.)

(36') Between ATM exchange C and of VPI=0, VCI=40, band=10 Mbps

As a result, to the call control memories 521-i of the ATM exchanges A to C, VPI/VCI/band information for the pair of originating/terminating users are finally allocated in the following manner.

<Final setting information of the ATM exchange A with the multipoint type> call control memory 521-1 for the path between ① and ④: VPI/VCI/band information recited in (1'), (2') and (6') above call control memory 521-2 for the path between ② and ⑤: VPI/VCI/band information recited in (7'), (11') and (17') above call control memory 521-3 for the path between ③ and ⑥: VPI/VCI/band information recited in (12'), (16') and (27') above call control memory 521-4 for the path between ⑦ and ⑨: VPI/VCI/band information recited in (18') and (21') above call control memory 521-5 for the path between ⑧ and ⑪: VPI/VCI/band information recited in (24') and (28') above call control memory 521-6 for the path between ⑩ and ⑫: VPI/VCI/band information recited in (31') and (34') above <Final setting information of the ATM exchange B with the multipoint type> call control memory 521-1 for the path between ① and ④: VPI/VCI/band information recited in (3') and (4') above call control memory 521-2 for the path between ②  and ⑤: VPI/VCI/band information recited in (8') and (9') above call control memory 521-3 for the path between ③ and ⑥: VPI/VCI/band information recited in (13') and (14') above call control memory 521-4 for the path between ⑦ and ⑨: VPI/VCI/band information recited in (19') and (22') above call control memory 521-5 for the path between ⑧ and ⑪: VPI/VCI/band information recited in (25') and (29') above call control memory 521-6 for the path between ⑩ and ⑫: VPI/VCI/band information recited in (32') and (35') above <Final setting-information of the ATM exchange C with the multipoint type> call control-memory 521-1 for the path between ① and ④: VPI/VCI/band information recited in (1') (5') and (6') above call control memory 521-2 for the path between ② and ⑤: VPI/VCI/band information recited in (10'), (11') and (17') above call control memory 521-3 for the path between ③ and ⑥: VPI/VCI/band information recited in (15'), (16') and (27') above call control memory 521-4 for the path between ⑦ and ⑨: VPI/VCI/band information recited in (20') and (23') above call control memory 521-5 for the path between ⑧ and ⑪: VPI/VCI/band information recited in (26') and (30') above call control memory 521-6 for the path between ⑩ and ⑫: VPI/VCI/band information recited in (33') and (36') above

INDUSTRIAL APPLICABILITY OF THE INVENTION

As described above, with a communication service controlling exchange apparatus of the present invention, a communication service of a desired form can be provided very readily and rapidly in response to a request of a user by the single communication service controlling exchange apparatus, and consequently, it can satisfy various requests of users such as changing to a communication service of any of various forms with certainty and it is considered that the utility is very high.

What is claimed is:

1. A switching system providing a communication service to a user terminal, comprising:

a communication service providing section having call processing control software, which is adaptable to a plurality of types of services, having linking means for linking a plurality of sets of call control information, the plurality of sets of call control information being equal in number to a number of paths between user terminals, according to a desired service type to be provided so as to manage call processing control commonly to each service type.

2. A switching system to accommodate a plurality of user terminals and control a condition of a communication service to be provided to said user terminals, comprising:

call control memories, the call control memories being equal in number to a number of paths between user terminals, each for storing call control information to control a call for the path; and communication service providing means having registering means for registering user terminal registration information of those user terminals which can receive a communication service of a desired form into said call control memories and linking means for linking call control memories needed for providing a communication service of the desired form with each other so that a communication service of the desired form can be provided is formed.

3. The switching system according to claim 2, further comprising:

link changing control means for changing the mutually linked condition of the pertinent ones of said call control memories in response to changing command information to a communication service of a different form.

4. The switching system according to claim 2, wherein said plurality of user terminals are divided into a plurality of user terminal groups, said call control memories and said communication service providing means provide for the individual user terminal groups.

5. The switching system according to claim 2, further comprising:

link changing control means, provided for the individual terminal groups, for changing the mutually linked condition of the pertinent ones of said call control memories in response to changing command information to a communication service of a different form.

6. The switching system according to claim 4, wherein any of said user terminals which form the individual user terminal groups is capable of serving also as a component of a different one of the user terminal groups in an overlapping relationship.

7. A switching system to accommodate a plurality of user terminals and control a condition of a communication service to be provided to said user terminals, comprising:

call control memories individually provided for paths between said user terminals, each for storing call control information to control a call for the path;

communication service providing means for registering user terminal registration information of those user terminals which can receive a communication service of a desired form into said call control memories and linking said call control memories with each other so that a communication service of the desired form can be provided is formed; and link changing control means for changing the mutually linked condition of the pertinent ones of said call control memories in response to changing command information to a communication service of a different form, wherein said link changing control means includes registration information condition discrimination means for verifying said call control memories and the user terminal registration information based on the changing command information to discriminate whether or not changing of the mutually linked condition of the pertinent ones of said call control memories is possible.

8. A switching system to accommodate a plurality of user terminals and control a condition of a communication service to be provided to said user terminals, comprising:

call control memories individually provided for paths between said user terminals, each for storing call control information to control a call for the path;

communication service providing means for registering user terminal registration information of those user terminals which can receive a communication service of a desired form into said call control memories and linking said call control memories with each other so that a communication service of the desired form can be provided is formed; and link changing control means for changing the mutually linked condition of the pertinent ones of said call control memories in response to changing command information to a communication service of a different form, wherein said link changing control means includes service condition discrimination means for discriminating whether or not changing of the mutually linked condition of the pertinent ones of said call control memories is possible in a condition wherein a communication service in operation is continued or in another condition wherein the communication service in operation is temporarily stopped.

9. The switching system according to claim 3 or 5, wherein said link changing control means is constructed so as to perform changing of the mutually linked condition of those of the pertinent ones of said call control memories for which changing should be performed newly when there is no change in origination and termination accommodation positions but to perform changing of the mutually linked condition of all of the pertinent ones of said call control memories when there is a change in the origination and termination accommodation positions.

10. The switching system according to claim 3 or 5, wherein means is provided for restoring, if a trouble is detected when the mutually linked condition of the pertinent ones of said call control memories is changed by said link changing control means, a condition prior to the changing.

11. A switching system to accommodate a plurality of user terminals and control a condition of a communication service to be provided to said user terminals, comprising:

call control memories individually provided for paths between said user terminals, each for storing call control information to control a call for the path;

communication service providing means for registering user terminal registration information of those user terminals which can receive a communication service of a desired form into said call control memories and linking said call control memories with each other so that a communication service of the desired form can be provided is formed; and link changing control means, provided for the individual terminal groups, for changing the mutually linked condition of the pertinent ones of said call control memories in response to changing command information to a communication service of a different form, wherein said plurality of user terminals are divided into a plurality of user terminal groups, said call control memories and said communication service providing means provide for the individual user terminal groups, and wherein said link changing control means is constructed so as to change, when simultaneous changing command information for changing a communication service in operation in each of said user terminal groups simultaneously to a communication service of a different form is inputted as the changing command information, the mutually linked condition of the pertinent ones of said call control memories of each of said user terminal groups simultaneously for each of said user terminal groups.

12. The switching system according to claim 2, wherein said call control memories and said communication service providing means provide for each of communication services of a plurality of (m) kinds of forms.

13. The switching system according to claim 12, further comprising:

communication service selection means for selecting, in response to changing command information to a communication service of a different form, one of said communication service providing means which corresponds to the communication service of the aimed form of the changing.

14. A switching system to accommodate a plurality of user terminals and control a condition of a communication service to be provided to said user terminals, comprising:

call control memories individually provided for paths between said user terminals, each for storing call control information to control a call for the path;

protocol control memories individually provided for said user terminals, each for storing information to control communication protocol for the user terminal;

user terminal registration means for registering user terminal registration information of those of said user terminals which can receive a communication service of a desired form into said call control memories is provided; and communication service providing means for linking, when a trigger signal is inputted through any of said user terminals, said call control memories and said protocol control memories with each other so that a communication service of a desired form can be provided is formed.

15. The switching system according to claim 14, further comprising:

link changing control means for changing, when changing message information to a communication service of a different form is inputted through any of said user terminals, the mutually linked condition of the pertinent ones of said call control memories and protocol control memories is provided.

16. The switching system according to claim 14, wherein said plural user terminals are divided into a plurality of user terminal groups, said call control memories, said protocol control memories, said user terminal registration means and said communication service providing means provide for the individual user terminal groups.

17. The switching system according to claim 16, further comprising:

link changing control means, provided for the individual user terminal groups for changing, when changing message information to a communication service of a different form is inputted through any of said user terminals, the mutually linked condition of the pertinent ones of said call control memories and protocol control memories is provided.

18. The switching system according to claim 16, wherein any of said user terminals which form the individual user terminal groups is capable of serving also as a component of a different one of the user terminal groups in an overlapping relationship.

19. The switching system according to claim 15 or 17, wherein said link changing control means includes registration information condition discrimination means for verifying, based on the changing message information, said call control memories, said protocol control memories and the user terminal registration information to discriminate whether or not changing of the mutually linked condition of the pertinent ones of said call control memories and protocol control memories is possible.

20. The switching system according to claim 15 or 17, wherein said link changing control means includes service condition discrimination means for discriminating whether or not changing of the mutually linked condition of the pertinent ones of said call control memories and protocol control memories is possible in a condition wherein a communication service in operation is continued or in another condition wherein the communication service in operation is temporarily stopped.

21. The switching system according to claim 15 or 17, wherein each of said link changing control means includes reporting means for reporting to the other ones of said user terminals changing message information corresponding to the changing message information inputted through the pertinent one of said user terminals.

22. The switching system according to claim 20, wherein said reporting means includes priority reporting means for reporting, when the changing message information is to be reported to the other ones of said user terminals, the changing message information in accordance with a predetermined priority order.

23. The switching system according to claim 15 or 17, wherein said link changing control means is constructed so as to perform changing of the mutually linked condition of those of the pertinent ones of said call control memories and said protocol control memories for which changing should be performed newly when there is no change in origination and termination accommodation positions but to perform changing of the mutually linked condition of all of the pertinent ones of said call control memories and said protocol control memories when there is a change in the origination and termination accommodation positions.

24. The switching system according to claim 15 or 17, wherein means is provided for restoring, if a trouble is detected when the mutually linked condition of the pertinent ones of said call control memories and said protocol control memories is changed based on the changing message information from any of said user terminals by said link changing control means, a condition prior to the changing.

25. The switching system according to claim 24, wherein said means for restoring a condition prior to the changing includes trouble end reporting means for reporting to that one of said user terminals which sent out the changing message information that the condition prior to the changing has been restored.

26. The switching system according to claim 24, wherein said means for restoring a condition prior to the changing includes other user terminal trouble end reporting means for reporting to the other ones of said user terminals than that one of said user terminals which sent out the changing message information that the condition prior to the changing has been restored.

27. The switching system according to claim 26, wherein said other user terminal trouble end reporting means includes priority reporting means for reporting, when it is to be reported to the other ones of said user terminals that the condition prior to the changing has been restored, in accordance with a predetermined priority order.

28. The switching system according to claim 15 or 17, wherein said link changing control means includes communication service kind discrimination means for discriminating a kind of communication service of an aimed form of changing in response to a number of times by which the changing message information is received.

29. The switching system according to claim 17, wherein said link changing control means is constructed so as to change, when simultaneous changing message information for changing a communication service in operation in each of said user terminal groups simultaneously to a communication service of a different form is inputted as the changing message information, the mutually linked condition of the pertinent ones of said call control memories and said protocol control memories of each of said user terminal groups simultaneously for each of said user terminal groups.

30. The switching system according to claim 14, wherein said call control memories, said protocol control memories, said user terminal registration means and said communication service providing means provide for each of communication services of a plurality of kinds of form.

31. The switching system according to claim 32, further comprising:

communication service selection means for selecting, when changing message information to a communication service of a different form is inputted through any of said user terminals, one of said communication service providing means which corresponds to the communication service of the aimed form of the changing.

32. A switching system to accommodate a plurality of user terminals via private lines or public lines and control a condition of a communication service to be provided to said user terminals, comprising:

call control memories individually provided for paths between said user terminals, each for storing call control information to control a call for the path;

protocol control memories individually provided for said user terminals, each for storing information to control communication protocol of the user terminal;

private line communication service providing means for registering user terminal registration information of those of said user terminals which can receive a communication service of a desired form regarding said private lines into said call control memories and linking said call control memories with each other so that a communication service of a desired form regarding said private lines can be provided is provided;

user terminal registration means for registering user terminal registration information of those of said user terminals which can receive a communication service of a desired form regarding said public lines into said call control memories; and public line communication service providing means for linking, when a trigger signal is inputted through any of said user terminals, said call control memories and said protocol control memories with each other so that a communication service of a desire form regarding said public lines can be provided are provided.

33. The switching system according to claim 32, wherein said plurality of user terminals are divided into a plurality of user terminal groups, said call control memories, said protocol control memories, said private line communication service providing means, said user terminal registration means and said public line communication service providing means provide for the individual user terminal groups.

34. The switching system according to claim 32, further comprising:

maintenance terminal inputting type line changing control means for changing, when line changing command information regarding a communication service of an arbitrary form is inputted through a maintenance terminal, the mutually linked condition of those of said call control memories and said protocol control memories in which the pertinent user terminal registration information is registered in response to an aimed line kind of changing regarding said user terminals.

35. The switching system according to claim 34, wherein said maintenance terminal inputting type line changing control means includes registration information condition discrimination means for verifying, based on the line changing command information, said call control memories, said protocol control memories and the user terminal registration information to discriminate whether or not changing of the mutually linked condition of the pertinent ones of said call control memories or changing of the mutually linked condition of the pertinent ones of said call control memories and protocol control memories is possible.

36. The switching system according to claim 34, wherein said maintenance terminal inputting type line changing control means includes service condition discrimination means for discriminating whether or not changing of the mutually linked condition of the pertinent ones of said call control memories or changing of the mutually linked condition of the pertinent ones of said call control memories and protocol control memories is possible in a condition wherein a communication service in operation is continued or in another condition wherein the communication service in operation is temporarily stopped.

37. The switching system according to claim 34, wherein said maintenance terminal inputting type line changing control means includes reporting means for reporting line changing message information to said user terminals.

38. The switching system according to claim 37, wherein said reporting means includes priority reporting means for reporting, when the line changing message information is to be reported to said user terminals, the line changing message information in accordance with a predetermined priority order.

39. The switching system according to claim 34, further comprising:
   link changing control means for cooperating with said maintenance terminal inputting type line changing control means to perform, when there is a change in origination and termination accommodation positions, changing of the mutually linked condition of all of the pertinent ones of said call control memories and said protocol control memories in response to a line type.

40. The switching system according to claim 34, further comprising:
   means for restoring, if a trouble is detected when the mutually linked condition of the pertinent ones of said call control memories is changed by said maintenance terminal inputting type line changing control means in accordance with an aimed line type of changing of said user terminals based on the line changing command information from said maintenance terminal, a condition prior to the changing.

41. The switching system according to claim 40, wherein said means for restoring a condition prior to the changing includes maintenance terminal trouble end reporting means for reporting to said maintenance terminal that the condition prior to the changing has been restored.

42. The switching system according to claim 40, wherein said means for restoring a condition prior to the changing includes user terminal trouble end reporting means for reporting to said user terminals that the condition prior to the changing has been restored.

43. The switching system according to claim 42, wherein said user terminal trouble end reporting means includes priority reporting means for reporting, when it is to be reported to said user terminals that the condition prior to the changing has been restored, in accordance with a predetermined priority order.

44. The switching system according to claim 34, wherein said maintenance terminal inputting type line changing control means is constructed so as to change, when simultaneous line changing command information for changing a communication service in operation in each of said user terminal groups simultaneously to a communication service of a different line kind is inputted as the line changing command information, the mutually linked condition of the pertinent ones of said call control memories and said protocol control memories of each of said user terminal groups in response to the aimed line kind of the changing regarding said user terminals simultaneously for each of said user terminal groups.

45. The switching system according to claim 32, further comprising:
   user terminal inputting type line changing control means for changing, when line changing message information regarding a communication service of an arbitrary form is inputted through any of said user terminals, the mutually linked condition of those of said call control memories and said protocol control memories in which the pertinent user terminal registration information is registered in response to an aimed line kind of changing.

46. The switching system according to claim 45, wherein said user terminal inputting type line changing control means includes registration information condition discrimination means for verifying, based on the line changing message information, said call control memories, said protocol control memories and the user terminal registration information to discriminate whether or not changing of the mutually linked condition of the pertinent ones of said call control memories or changing of the mutually linked condition of the pertinent ones of said call control memories and protocol control memories is possible.

47. The switching system according to claim 45, wherein said user terminal inputting type line changing control means includes service condition discrimination means for discriminating whether or not changing of the mutually linked condition of the pertinent ones of said call control memories and protocol control memories is possible in a condition wherein a communication service in operation is continued or in another condition wherein the communication service in operation is temporarily stopped.

48. The switching system according to claim 45, wherein said user terminal inputting type line changing control means includes reporting means for reporting to the other ones of said user terminals line changing message information corresponding to the changing message information inputted through the pertinent one of said user terminals.

49. The switching system according to claim 48, wherein said reporting means includes priority reporting means for reporting, when the line changing message information is to be reported to the other ones of said user terminals, the line changing message information in accordance with a predetermined priority order.

50. The switching system according to claim 45, further comprising:
   link changing control means for cooperating with said user terminal inputting type line changing control means to perform, when there is a change in origination and termination accommodation positions, changing of the mutually linked condition of all of the pertinent ones of said call control memories and said protocol control memories in response to a line type.

51. The switching system according to claim 45, further comprising:

means for restoring, if a trouble is detected when the mutually linked condition of the pertinent ones of said call control memories is changed by said user terminal inputting type line changing control means in accordance with an aimed line type of changing of said user terminals based on the line changing message information from any of said user terminals, a condition prior to the changing.

52. The switching system according to claim 51, wherein said means for restoring a condition prior to the changing includes user terminal trouble end reporting means for reporting to that one of said user terminals which transmitted the line changing message information that the condition prior to the changing has been restored.

53. The switching system according to claim 51, wherein said means for restoring a condition prior to the changing includes other user terminal trouble end reporting means for reporting to the other ones of said user terminals that one of said user terminals which transmitted the line changing message information that the condition prior to the changing has been restored.

54. The switching system according to claim 53, wherein said other user terminal trouble end reporting means includes priority reporting means for reporting, when it is to be reported to the other user terminals that the condition prior to the changing has been restored, in accordance with a predetermined priority order.

55. The switching system according to claim 45, wherein said user terminal inputting type line changing control means is constructed so as to change, when simultaneous line changing message information for changing a communication service in operation in each of said user terminal groups simultaneously to a communication service of a different line kind is inputted as the line changing message information, the mutually linked condition of the pertinent ones of said call control memories and said protocol control memories of each of said user terminal groups in response to the aimed line kind of the changing simultaneously for each of said user terminal groups.

56. A switching system to accommodate a plurality of user terminals and control a condition of a communication service to be provided to said user terminals, comprising:

call control memories individually provided for paths between said user terminals, each for storing call control information to control a call for the path;

protocol control memories individually provided for said user terminals, each for storing information to control communication protocol for the user terminal;

user terminal registration means for registering user terminal registration information of those of said user terminals which can receive a communication service of a desired form into said call control memories is provided; and communication service providing means for linking said call control memories and said protocol control memories with each other so that a communication service of a desired form can be provided is formed.

57. A switching system to accommodate a plurality of user terminals via private lines or public lines and control a condition of a communication service to be provided to said user terminals, comprising:

call control memories individually provided for paths between said user terminals, each for storing call control information to control a call for the path;

protocol control memories individually provided for said user terminals, each for storing information to control communication protocol for the user terminal;

private line communication service providing means for registering user terminal registration information of those of said user terminals which can receive a communication service of a desired form regarding said private lines into said call control memories and linking said call control memories with each other so that a communication service of a desired form regarding said private lines can be provided is provided;

user terminal registration means for registering user terminal registration information of those of said user terminals which can receive a communication service of a desired form regarding said public lines into said call control memories;

public line communication service providing means for linking said call control memories and said protocol control memories with each other so that a communication service of a desired form regarding said public lines can be provided; and user terminal inputting type line changing control means for changing, when a trigger signal including line changing message information regarding a communication service of an arbitrary form is inputted through any of said user terminals, the mutually linked condition of those of said call control memories and said protocol control memories in which the pertinent user terminal registration information is registered in response to an aimed line kind of changing.

58. A switching system to accommodate a plurality of user terminals and control a condition of a communication service to be provided to said user terminals, comprising:

call control memories individually provided for paths between said user terminals, each for storing call control information to control a call for the path;

communication service providing means for registering user terminal registration information of those user terminals which can receive a communication service of a desired form into said call control memories and linking said call control memories with each other so that a communication service of the desired form can be provided is formed; and link changing control means, provided for the individual terminal groups, for changing the mutually linked condition of the pertinent ones of said call control memories in response to changing command information to a communication service of a different form, wherein said plurality of user terminals are divided into a plurality of user terminal groups, said call control memories and said communication service providing means provide for the individual user terminal groups, and wherein said link changing control means includes registration information condition discrimination means for verifying said call control memories and the user terminal registration information based on the changing command information to discriminate whether or not changing of the mutually linked condition of the pertinent ones of said call control memories is possible.

59. A switching system to accommodate a plurality of user terminals and control a condition of a communication service to be provided to said user terminals, comprising:

call control memories individually provided for paths between said user terminals, each for storing call control information to control a call for the path;

communication service providing means for registering user terminal registration information of those user terminals which can receive a communication service of a desired form into said call control memories and linking said call control memories with each other so that a communication service of the desired form can be provided is formed; and link changing control means, provided for the individual terminal groups, for changing the mutually linked condition of the pertinent ones of said call control memories in response to changing command information to a communication service of a different form, wherein said plurality of user terminals are divided into a plurality of user terminal groups, said call control memories and said communication service providing means provide for the individual user terminal groups, and wherein said link changing control means includes service condition discrimination means for discriminating whether or not changing of the mutually linked condition of the pertinent ones of said call control memories is possible in a condition wherein a communication service in operation is continued or in another condition wherein the communication service in operation is temporarily stopped.

\* \* \* \* \*

UNITED STATES PATENT AND TRADEMARK OFFICE
CERTIFICATE OF CORRECTION

PATENT NO.   : 6,636,513 B1
DATED        : October 21, 2003
INVENTOR(S)  : Yasuhiro Nishikawa et al.

It is certified that error appears in the above-identified patent and that said Letters Patent is hereby corrected as shown below:

<u>Title page,</u>
Please add:
-- [30]       Foreign Application Priority Data

Sep. 6, 1995     (JP)     Japan ......................... 7-229527 --

Signed and Sealed this

Twenty-fourth Day of February, 2004

JON W. DUDAS
*Acting Director of the United States Patent and Trademark Office*